US011704765B2

(12) United States Patent
Kamath et al.

(10) Patent No.: US 11,704,765 B2
(45) Date of Patent: Jul. 18, 2023

(54) ARTWORK GENERATED TO CONVEY DIGITAL MESSAGES, AND METHODS/APPARATUSES FOR GENERATING SUCH ARTWORK

(71) Applicant: Digimarc Corporation, Beaverton, OR (US)

(72) Inventors: Ajith M. Kamath, Beaverton, OR (US); Christopher A. Ambiel, Milwaukie, OR (US); Utkarsh Deshmukh, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 13 days.

(21) Appl. No.: 16/853,327

(22) Filed: Apr. 20, 2020

(65) Prior Publication Data

US 2020/0320660 A1    Oct. 8, 2020

Related U.S. Application Data

(63) Continuation of application No. 16/212,125, filed on Dec. 6, 2018, now abandoned.

(Continued)

(51) Int. Cl.
*G06T 1/00*    (2006.01)
*G06K 19/06*    (2006.01)
(Continued)

(52) U.S. Cl.
CPC ........ *G06T 1/0092* (2013.01); *G06F 16/1858* (2019.01); *G06K 19/06103* (2013.01); *G06N 3/08* (2013.01); *G06T 11/20* (2013.01)

(58) Field of Classification Search
CPC ............... G06T 1/0092; G06T 11/20; G06T 2201/0061; G06F 16/1858; G06K 19/06103; G06N 3/08; G06N 3/0454
See application file for complete search history.

(56) References Cited

U.S. PATENT DOCUMENTS 5,636,292 A    6/1997    Rhoads
5,832,119 A    11/1998    Rhoads
(Continued)

FOREIGN PATENT DOCUMENTS

WO    2006048368    5/2006
WO    2011029845    3/2011
(Continued)

OTHER PUBLICATIONS

International Preliminary Report on Patentability for PCT/US2019/036126, dated May 22, 2020. (8 pages).
(Continued)

*Primary Examiner* — Qun Shen
(74) *Attorney, Agent, or Firm* — Digimarc Corporation

(57) ABSTRACT

Features from a style image are adapted to express a machine-readable code. For example, grains of rice depicted in a style image may be positioned to create a pattern mimicking that of a machine-readable code. The resulting output image can then be used as a graphical component in product packaging (e.g., as a background, border, or pattern fill), while also serving to convey a product identifier to a compliant reader device (e.g., a retail point-of-sale terminal). In some embodiments, a neural network is trained to apply a particular style image to machine readable codes. A great variety of other features and arrangements are also detailed.

31 Claims, 71 Drawing Sheets
(25 of 71 Drawing Sheet(s) Filed in Color)

Related U.S. Application Data

(60) Provisional application No. 62/745,219, filed on Oct. 12, 2018, provisional application No. 62/596,730, filed on Dec. 8, 2017.

(51) Int. Cl.
    *G06T 11/20*      (2006.01)
    *G06N 3/08*      (2006.01)
    *G06F 16/18*      (2019.01)

(56) References Cited

U.S. PATENT DOCUMENTS

| | | |
|---|---|---|
| 5,862,260 A | 1/1999 | Rhoads |
| 6,060,428 A * | 5/2000 | Chang ............... B42D 25/29 503/201 |
| 6,345,104 B1 | 2/2002 | Rhoads |
| 6,567,534 B1 | 5/2003 | Rhoads |
| 6,590,996 B1 | 7/2003 | Reed |
| 6,614,914 B1 | 9/2003 | Rhoads |
| 6,625,297 B1 | 9/2003 | Bradley |
| 6,760,464 B2 | 7/2004 | Brunk |
| 6,987,861 B2 | 1/2006 | Rhoads |
| 6,993,152 B2 | 1/2006 | Patterson |
| 7,072,490 B2 | 7/2006 | Stach |
| 7,340,076 B2 | 3/2008 | Stach |
| 7,532,741 B2 | 5/2009 | Stach |
| 7,555,139 B2 | 6/2009 | Rhoads |
| 7,831,062 B2 | 11/2010 | Stach |
| 7,856,143 B2 | 12/2010 | Abe |
| 8,009,893 B2 | 8/2011 | Rhoads |
| 8,144,368 B2 | 3/2012 | Rodriguez |
| 8,515,121 B2 | 8/2013 | Stach |
| 9,635,378 B2 | 4/2017 | Holub |
| 9,747,656 B2 | 8/2017 | Stach |
| 10,657,676 B1 | 5/2020 | Rehfeld |
| 10,748,232 B2 | 8/2020 | Kamath |
| 11,062,108 B2 | 7/2021 | Bradley |
| 11,276,133 B2 | 3/2022 | Kamath |
| 2002/0136429 A1 | 9/2002 | Stach |
| 2003/0039376 A1 * | 2/2003 | Stach ............... G06T 1/0028 382/173 |
| 2003/0053654 A1 | 3/2003 | Patterson |
| 2004/0032972 A1 | 2/2004 | Stach |
| 2005/0207615 A1 | 9/2005 | Stach |
| 2006/0071081 A1 | 4/2006 | Wang |
| 2006/0115110 A1 | 6/2006 | Rodriguez |
| 2007/0071278 A1 | 3/2007 | Cheng |
| 2008/0112590 A1 | 5/2008 | Stach |
| 2008/0264824 A1 * | 10/2008 | Alejandra ............ B65D 5/4204 206/581 |
| 2009/0018996 A1 | 1/2009 | Hunt |
| 2009/0129592 A1 | 5/2009 | Swiegers |
| 2009/0220121 A1 | 9/2009 | Stach |
| 2010/0119108 A1 | 5/2010 | Rhoads |
| 2010/0303349 A1 | 12/2010 | Bechtel |
| 2011/0110555 A1 | 5/2011 | Stach |
| 2011/0212717 A1 | 9/2011 | Rhoads |
| 2011/0214044 A1 * | 9/2011 | Davis ............... G06T 11/80 715/201 |
| 2011/0276663 A1 | 11/2011 | Rhoads |
| 2012/0133954 A1 | 5/2012 | Takabayashi |
| 2012/0229467 A1 | 9/2012 | Czerwinski |
| 2013/0001313 A1 | 1/2013 | Denniston, Jr. |
| 2014/0052555 A1 * | 2/2014 | MacIntosh ......... G06K 9/00664 705/201 |
| 2014/0210780 A1 | 7/2014 | Lee |
| 2014/0366052 A1 | 12/2014 | Ives |
| 2015/0262347 A1 | 9/2015 | Duerksen |
| 2015/0269617 A1 * | 9/2015 | Mikurak ............ G06Q 50/12 705/14.54 |
| 2016/0026853 A1 | 1/2016 | Wexler |
| 2016/0275326 A1 * | 9/2016 | Falkenstern ....... G06K 19/0614 |
| 2017/0024840 A1 | 1/2017 | Holub |
| 2017/0024845 A1 | 1/2017 | Filler |
| 2017/0193628 A1 | 7/2017 | Sharma |
| 2018/0068463 A1 * | 3/2018 | Risser ............... G06T 7/45 |
| 2018/0082407 A1 | 3/2018 | Rymkowski |
| 2018/0082715 A1 | 3/2018 | Rymkowski |
| 2018/0150947 A1 | 5/2018 | Lu |
| 2018/0158224 A1 | 6/2018 | Bethge |
| 2018/0211157 A1 | 7/2018 | Liu |
| 2018/0285679 A1 | 10/2018 | Amitay |
| 2018/0357800 A1 | 12/2018 | Oxholm |
| 2018/0373999 A1 * | 12/2018 | Xu ............... G06T 11/60 |
| 2019/0139176 A1 | 5/2019 | Stach |
| 2019/0213705 A1 | 7/2019 | Kamath |
| 2019/0289330 A1 | 9/2019 | Alakuijala |
| 2020/0082249 A1 | 3/2020 | Hua |

FOREIGN PATENT DOCUMENTS

| | | |
|---|---|---|
| WO | 2016153911 | 9/2016 |
| WO | 2018111786 | 6/2018 |
| WO | 2019113471 | 6/2019 |
| WO | 2019165364 | 8/2019 |

OTHER PUBLICATIONS

Li Hai-Sheng et al., "Style transfer for QR code", Multimedia Tools and Applications, vol. 79, No. 45-46, Dec. 1, 2020, pp. 33839-33852, XP037308023.

Chu, et al, Halftone QR codes, ACM Transactions on Graphics, vol. 32, No. 6, Nov. 1, 2013, p. 217.

Davis B, Signal rich art: enabling the vision of ubiquitous computing. In Media Watermarking, Security, and Forensics III Feb. 8, 2011 (vol. 7880, p. 788002). International Society for Optics and Photonics.

Gatys, et al, A Neural Algorithm of Artistic Style. arXiv preprint arXiv:1508.06576, Aug. 26, 2015. 16 pages.

Johnson, et al, Perceptual losses for real-time style transfer and super-resolution, European Conference on Computer Vision, Oct. 8, 2016, pp. 694-711.

Johnson, excerpts from github web site "Fast-neural-style," Nov. 19, 2017. 19 pages.

Lengstrom, excerpts from github web site, "Fast Style Transfer in TensorFlow," Oct. 3, 2017. 24 pages.

Lin, et al, Artistic QR code embellishment. Computer Graphics Forum, Oct. 1, 2013, vol. 32, No. 7, pp. 137-146.

Lin, et al, Efficient QR code beautification with high quality visual content, IEEE Transactions on Multimedia, vol. 17, No. 9, Sep. 2015, pp. 1515-1524.

Liu, et al, Line-based cubism-like image—A new type of art image and its application to lossless data hiding, IEEE Transactions on Information Forensics and Security, vol. 7, No. 5, Oct. 2012, pp. 1448-1458.

Nikulin, Exploring the neural algorithm of artistic style, arXiv preprint arXiv:1602.07188, Feb. 23, 2016. 15 pages.

Photoshop Elements Help—Patterns, Web Archive, Mar. 13, 2014. 2 pages.

Preston, et al, Enabling hand-crafted visual markers at scale, Proceedings of the 2017 ACM Conference on Designing Interactive Systems, Jun. 10, 2017, pp. 1227-1237.

Puyang, et al, Style Transferring Based Data Hiding for Color Images, International Conference on Cloud Computing and Security, Jun. 8, 2018, pp. 440-449.

Raval, excerpts from github web site, Style Transfer Using VGG-16 Model, Mar. 8, 2017. 15 pages.

Rosebrock, excerpts from web page Neural Style Transfer with OpenCV, Aug. 27, 2018. 23 pages.

Simonyan et al, Very Deep Convolutional Networks for Large-Scale Image Recognition, arXiv preprint 1409.1556v6, Apr. 10, 2015. 14 pages.

Ulyanov, et al., Improved texture networks: Maximizing quality and diversity in feed-forward stylization and texture synthesis, Proc. 2017 IEEE Conference on Computer Vision and Pattern Recognition, pp. 6924-6932.

(56) References Cited

OTHER PUBLICATIONS

Yang, et al, ARTcode: Preserve art and code in any image, Proc. 2016 ACM International Joint Conference on Pervasive and Ubiquitous Computing, pp. 904-915.

Hayes et al., "Generating Steganographic Images via Adversarial Training", Proceedings of the 31st annual conference on advances in Neural Information Processing Systems, Mar. 2017, pp. 1951-1960.

Jun-Yan Zhu et al, "Unpaired Image-to-Image Translation Using Cycle-Consistent Adversarial Networks", 2017 IEEE International Conference on Computer Vision (ICCV), (Mar. 30, 2017), doi:10.1109/ICCV.2017.244, ISBN 978-1-5386-1032-9, pp. 2242-2251, XP055573065.

Ke et al., "Kernel Target Alignment for Feature Kernel Selection in Universal Steganographic Detection based on Multiple Kernel SVM", International Symposium on Instrumentation & Measurement, Sensor Network and Automation, Aug. 2012, pp. 222-227.

Invitation to Pay Additional Fees including Communication Relating to the Results of the Partial International Search in PCT/US2018/064516, dated Apr. 5, 2019. 17 pages.

Google Scholar Search Results.

International Search Report and Written Opinion for Application No. PCT/US19/36126, dated Oct. 9, 2019, 12 pages.

A. Secord, "Weighted Voronoi Stippling," Proc. 2nd Ann. Symp. Non-Photorealistic Animation and Rendering (NPAR 2002), ACM Press, 2002, pp. 27-43.

Wong, Fernando J. et al: "Abstracting images into continuous-line artistic styles", Visual Computer, Springer, Berlin, DE, vol. 29, No. 6, Apr. 23, 2013 (Apr. 23, 2013), pp. 729-738, XP035366252, ISSN: 0178-2789, DOI: 10.1007/S00371-013-0809-1 [retrieved on Apr. 23, 2013].

Kaplan, Craig S. et al: "TSP Art", BRIDGES 2005: Renaissance BANFF: Mathematics, Music, Art, Culture, Jul. 31, 2005 (Jul. 31, 2005), pp. 301-308, XP055893366, ISBN: 978-0-9665201-6-3 Retrieved from the Internet: URL:https://archive.bridgesmathart.org/2005/bridges2005-301.pdf.

Davis, Bruce ED—Memon Nasir D. et al: "Signal rich art: enabling the vision of ubiquitous computing", Media Watermarking, Security, and Forensics III, SPIE, 1000 20th St. Bellingham WA 98225-6705 USA, vol. 7880, No. 1, Feb. 10, 2011, pp. 1-10, XP060007207, DOI: 10/1117/12.881742 (retrieved on Feb. 8, 2011).

Grinchuk, et al., Learnable visual markers, Advances In Neural Information Processing Systems 29 (2016).

Excerpts from file of corresponding EPO application 18836559.7 including related PCT documents concerning application PCT/US18/64516 (published as WO2019113471).

40 Gorgeous QR Code Artworks That Rock, Kongkiat blog from Web Archive, copy dated Apr. 9, 2015.

12 Creative Barcode Designs that (Amazingly) Work, Kongkiat blog from Web Archive, copy dated Apr. 23, 2015.

Russian and Japanese Barcodes: A New Venue for Artistic Expression, Inventorspot web page from Web Archive, copy dated Mar. 20, 2015.

\* cited by examiner

FIG. 4, Prior Art VGG Deep Neural Network

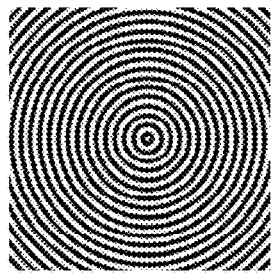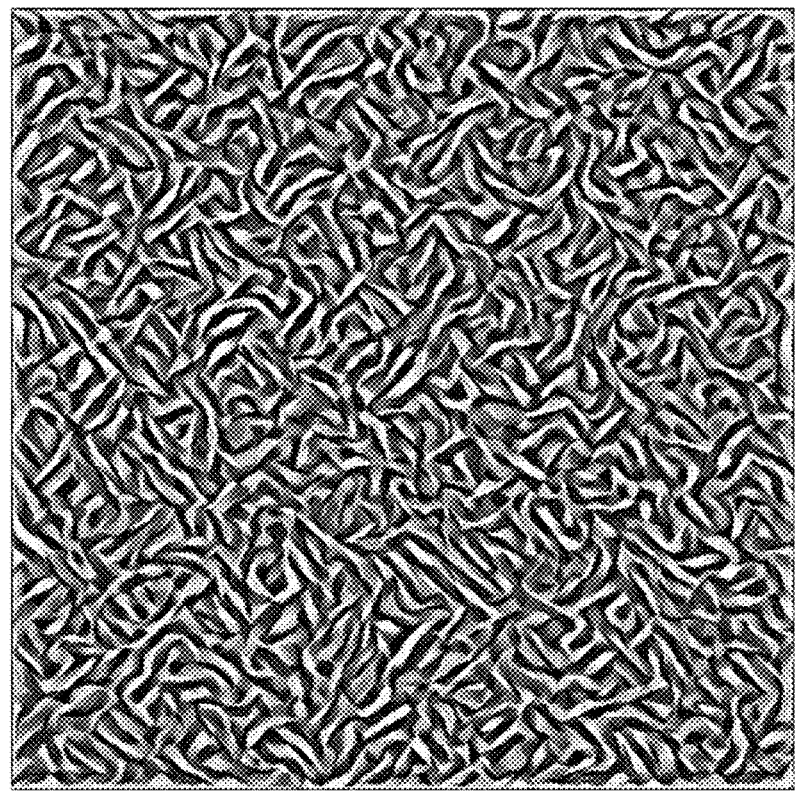
20 ITERATIONS
FIG. 8
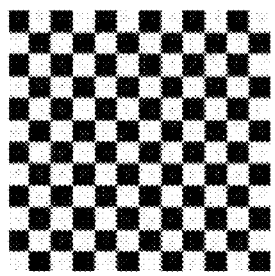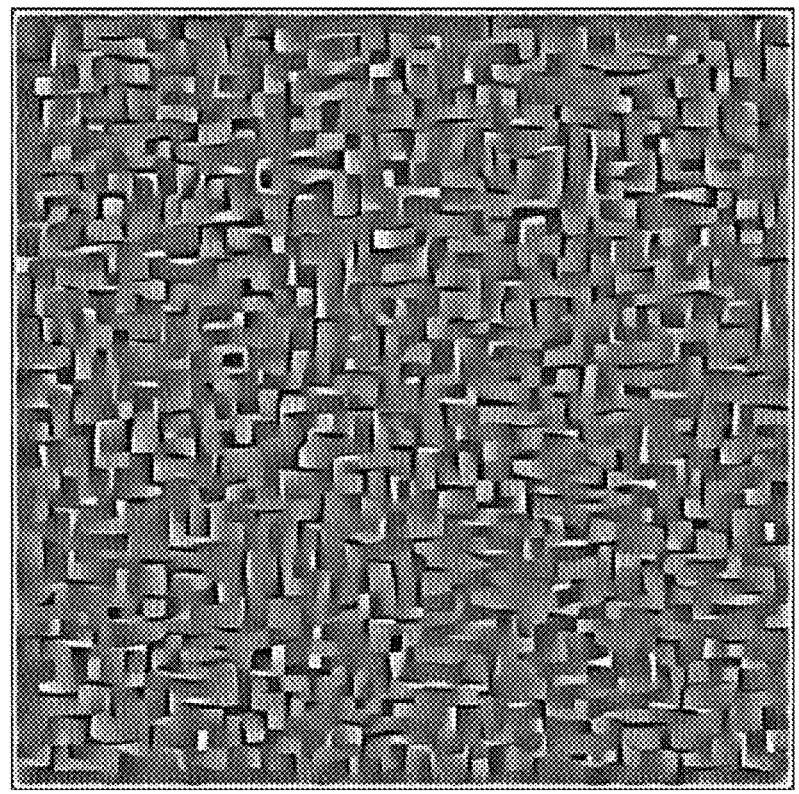
20 ITERATIONS
FIG. 9

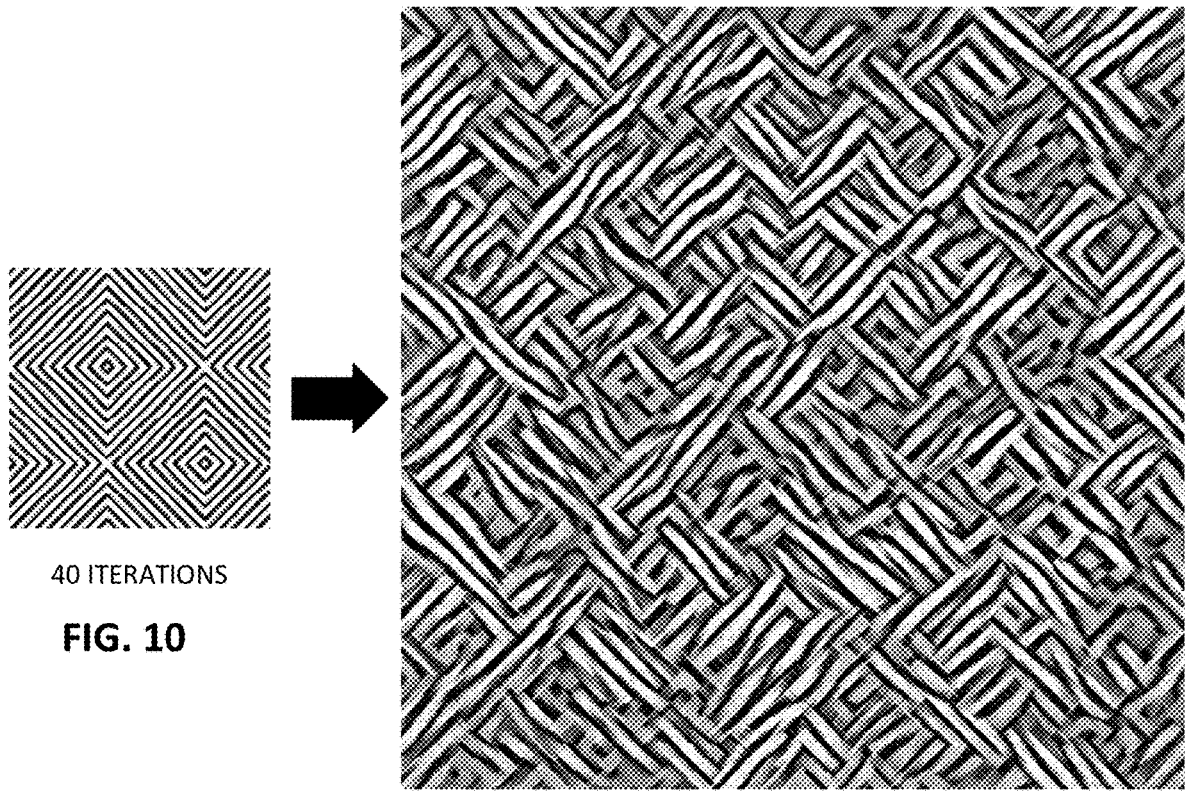
40 ITERATIONS
FIG. 10
FIG. 11
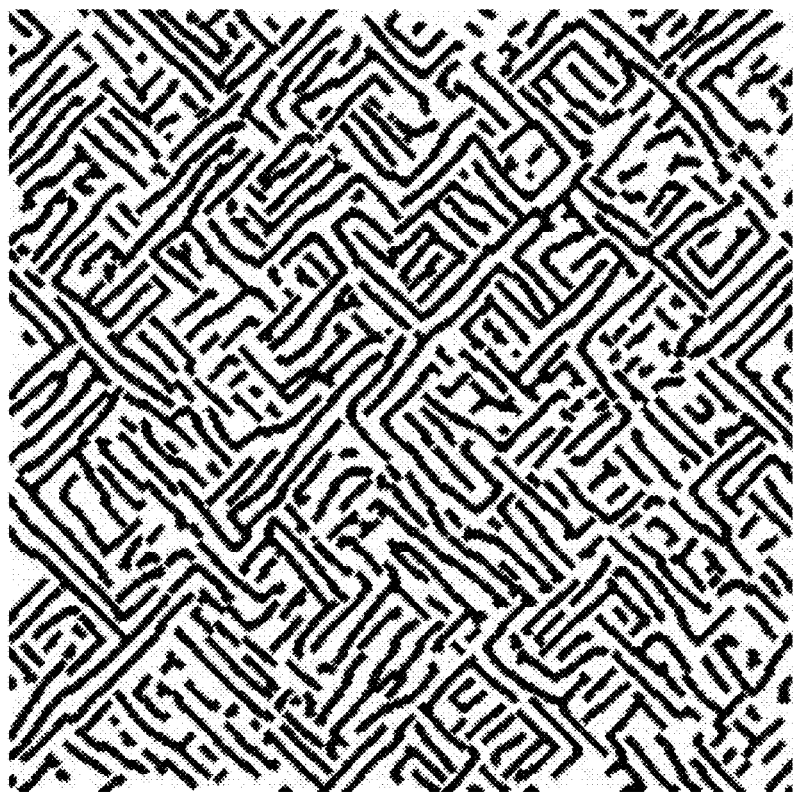

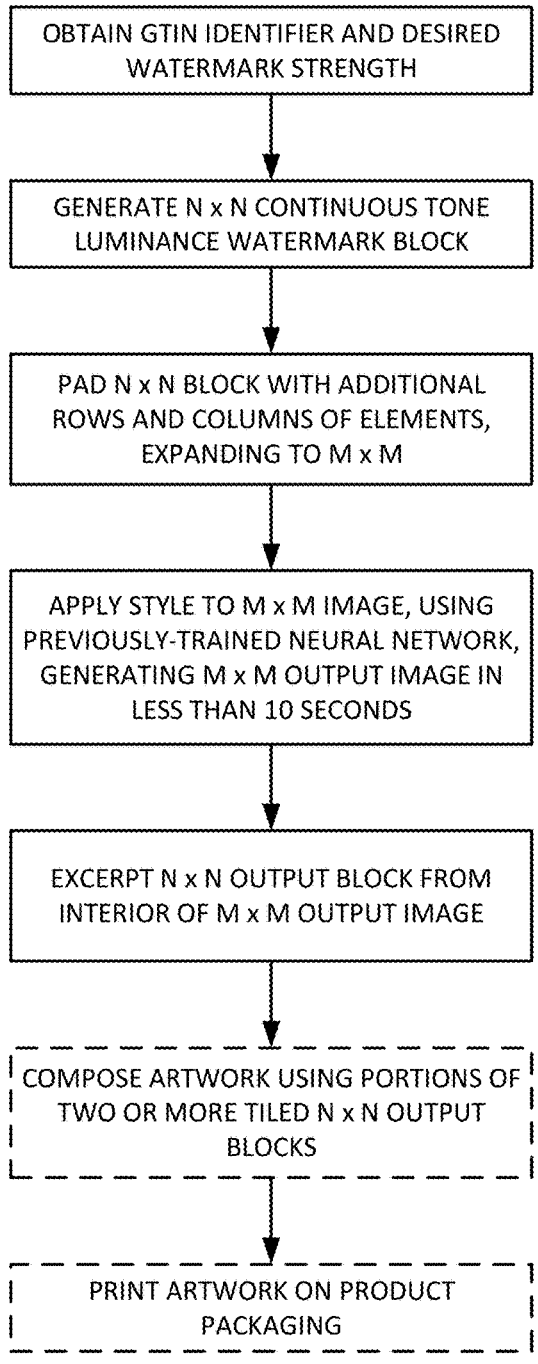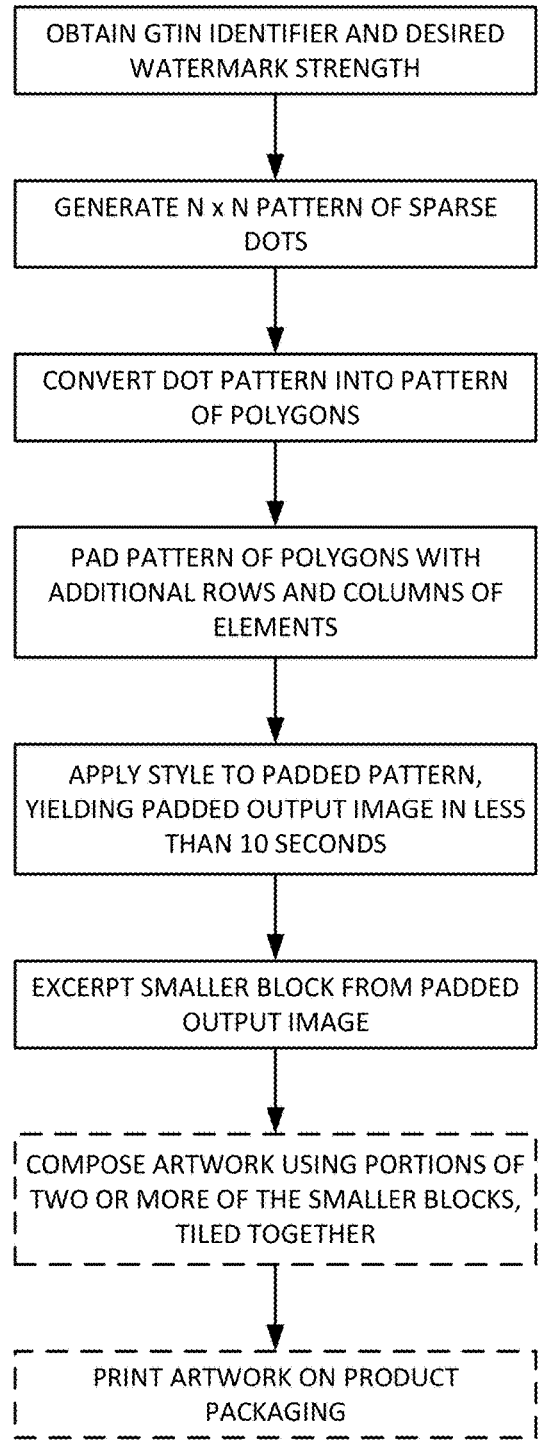
FIG. 14B
FIG. 14C

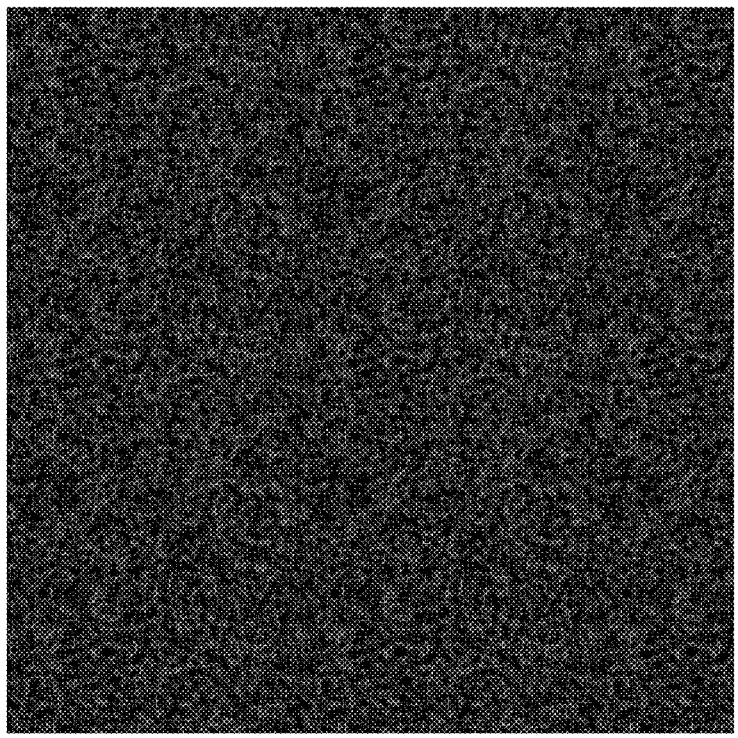
FIG. 33A
FIG. 33B
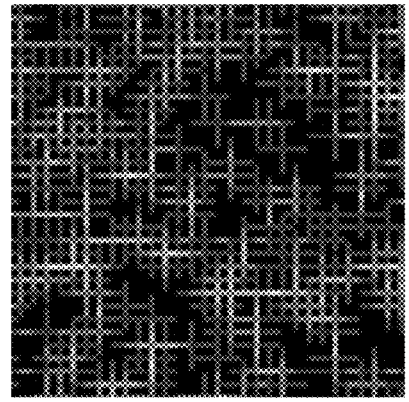
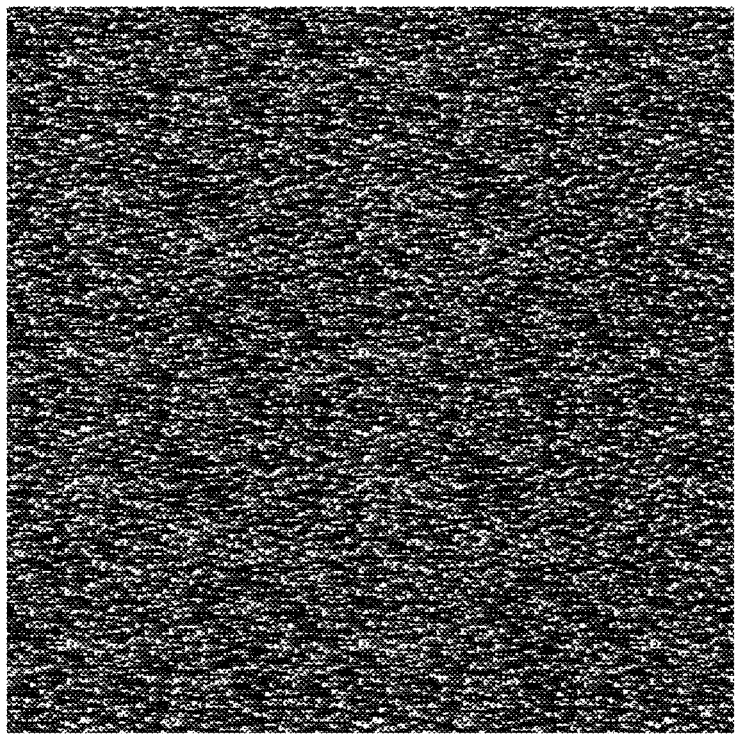
FIG. 34A
FIG. 34B
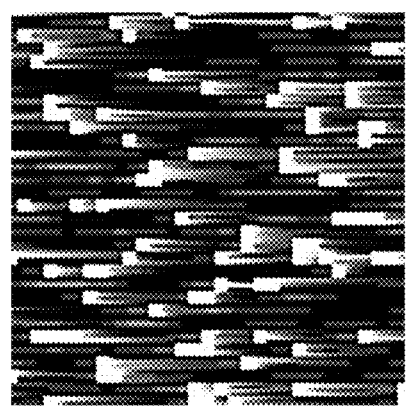

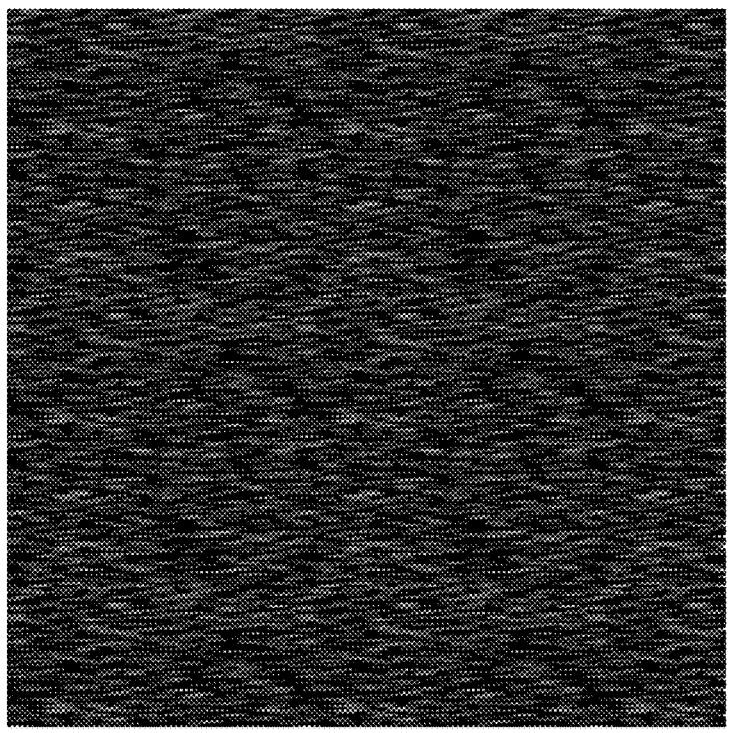
FIG. 35A
FIG. 35B
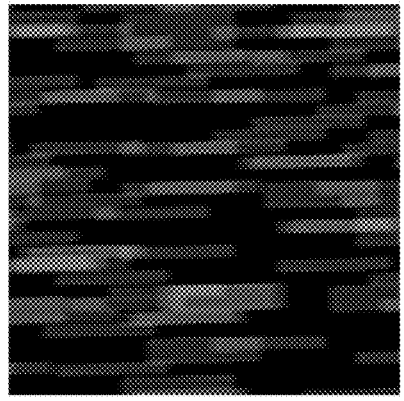
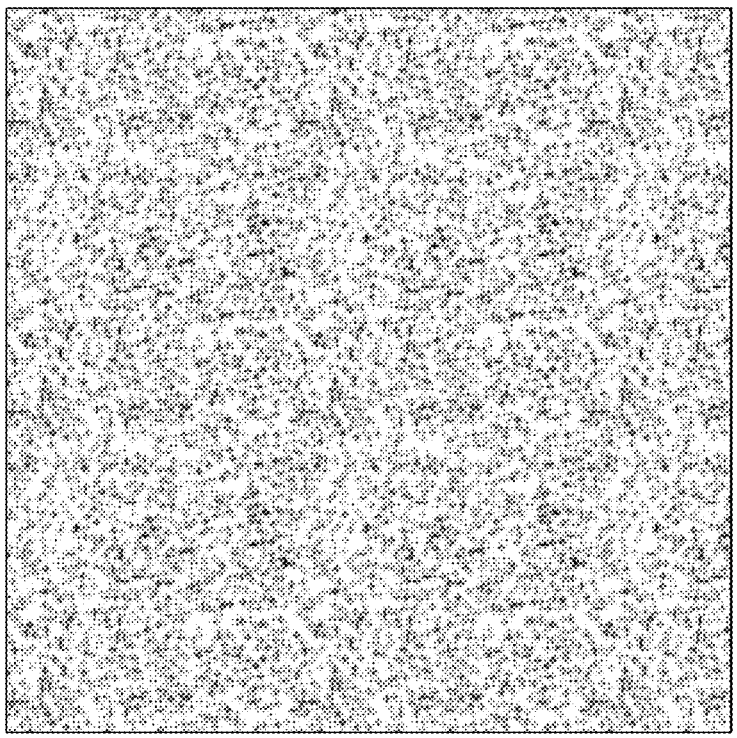
FIG. 36A
FIG. 36B
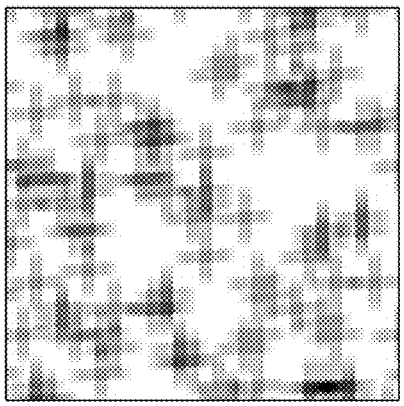

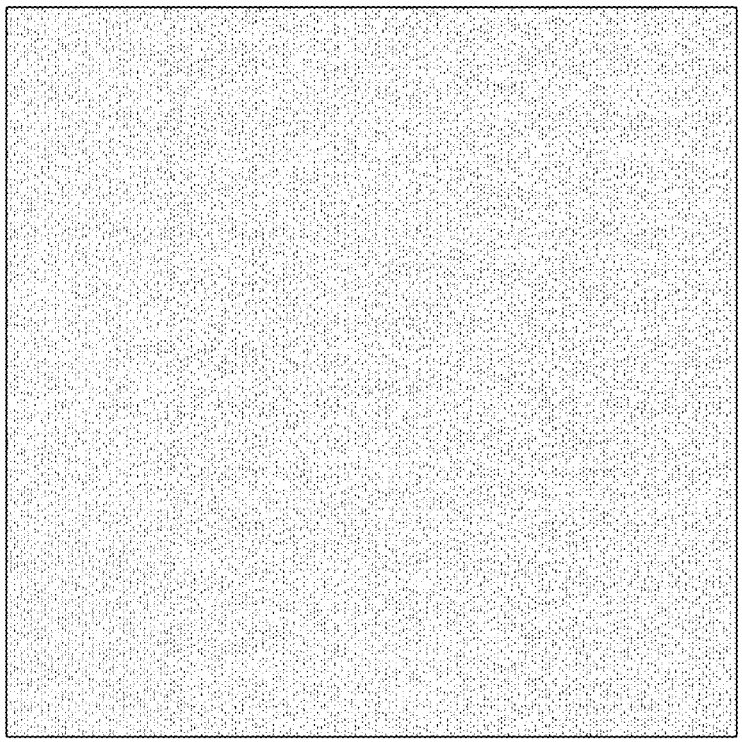
FIG. 39A
FIG. 39B
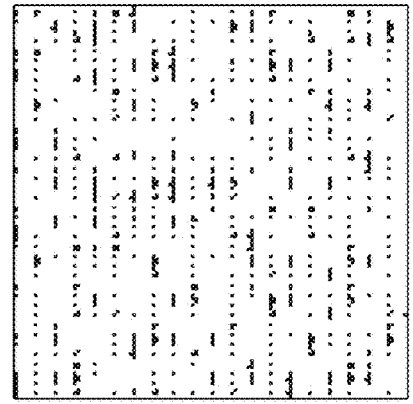
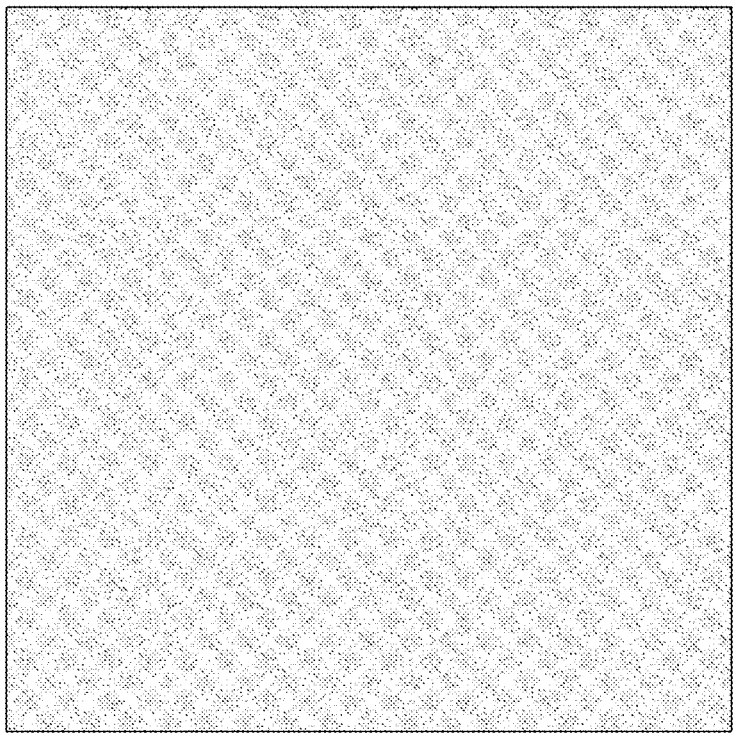
FIG. 40A
FIG. 40B
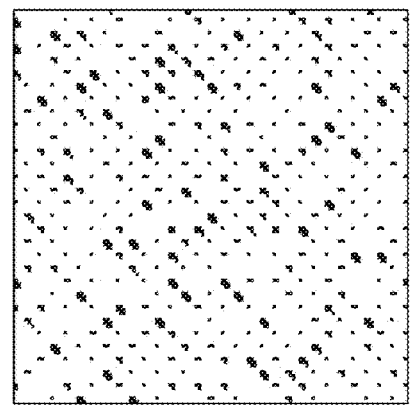

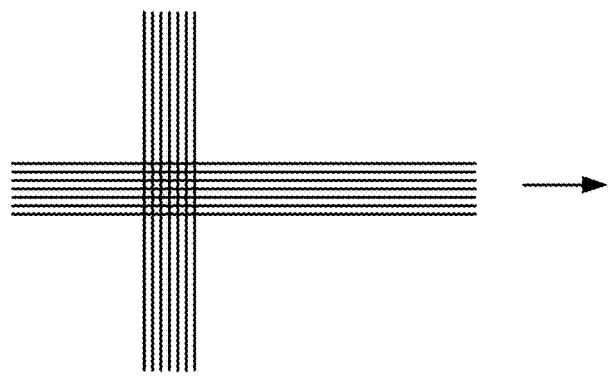
FIG. 47
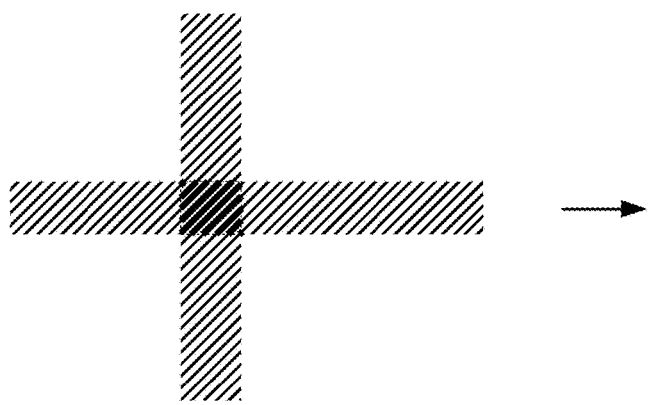
FIG. 48
FIG. 49A
FIG. 49B
FIG. 49C

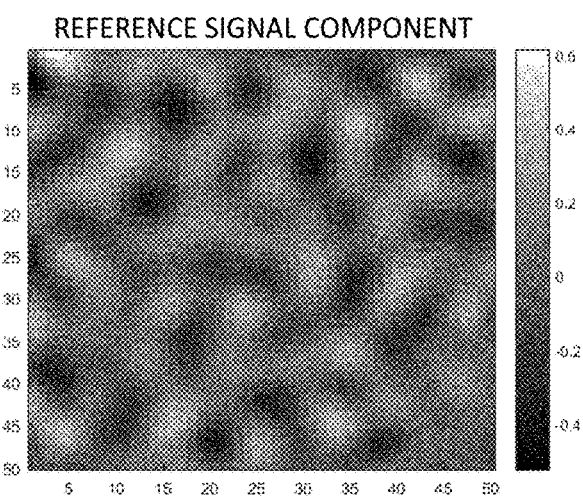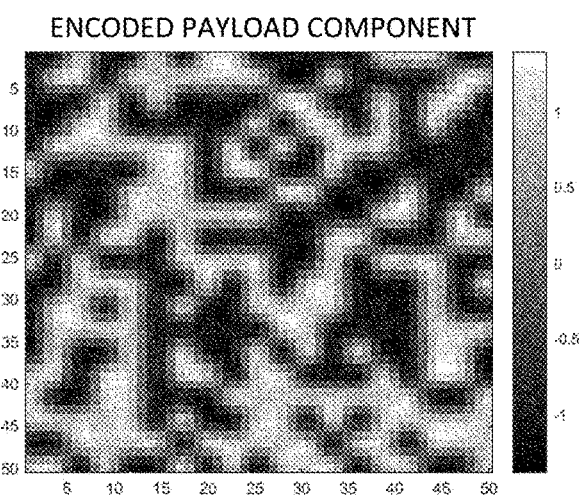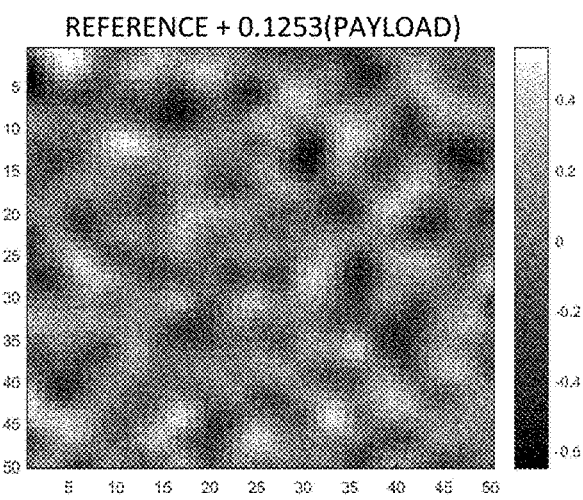
FIG. 53

= "0"

= "1"

= "0"

= "1"

671 milk, sugar, eggs
baking soda, salt

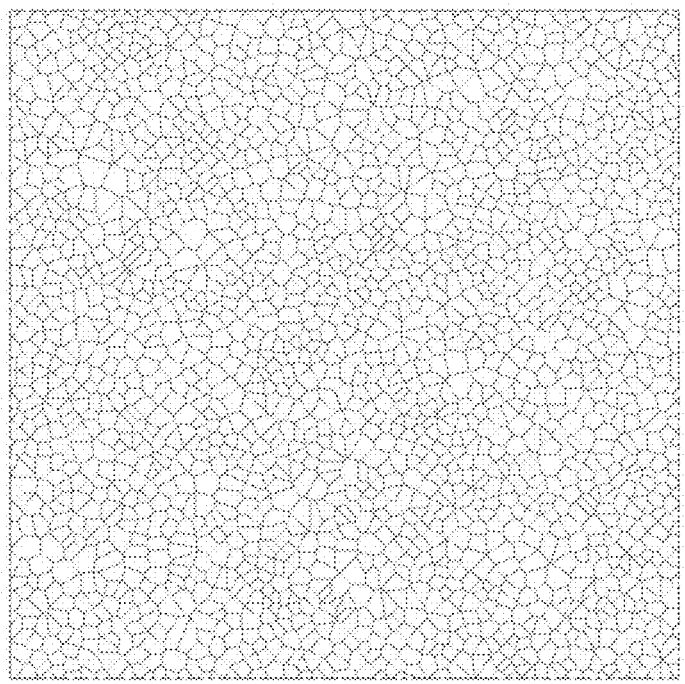
550 FIG. 70
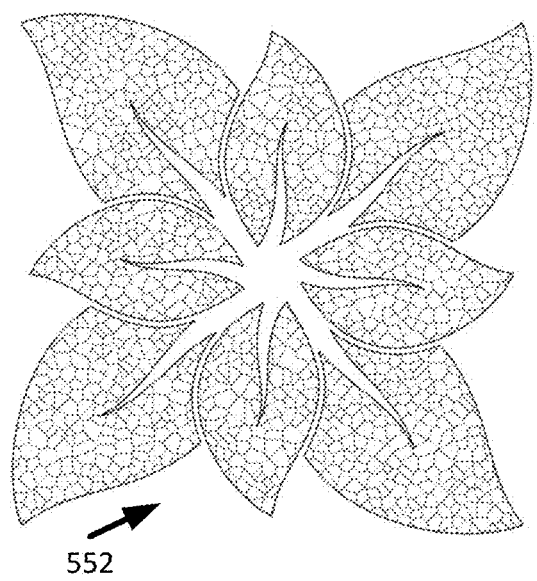
552
FIG. 71
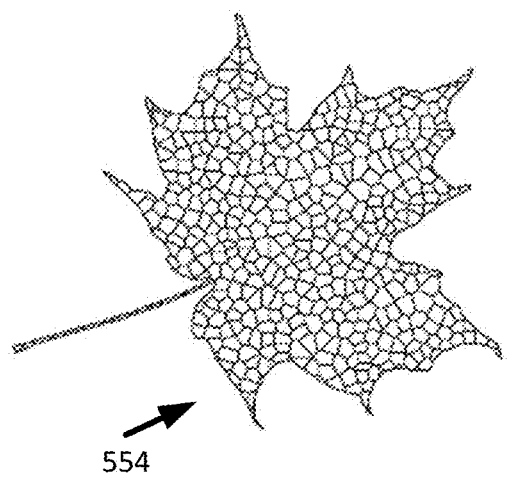
554
FIG. 72

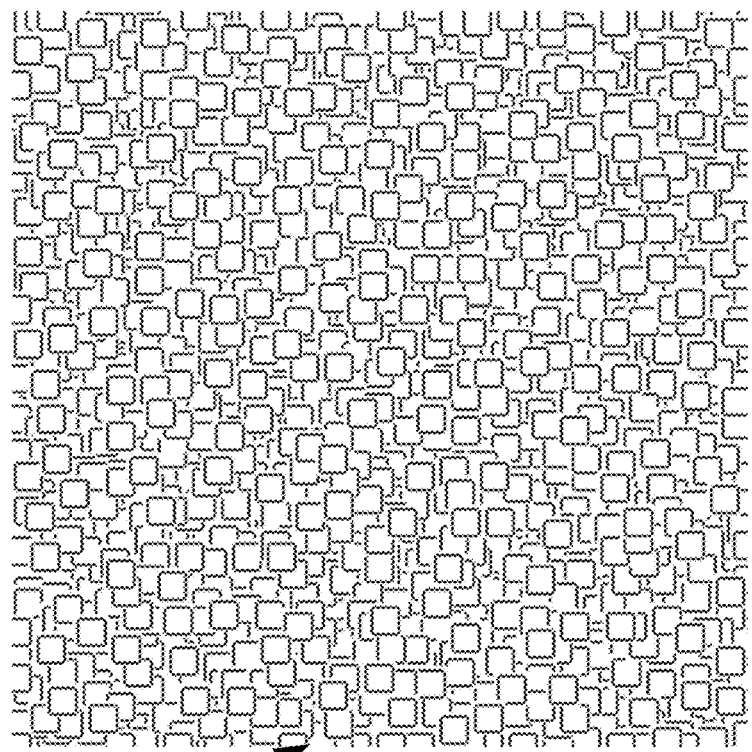
556  FIG. 73
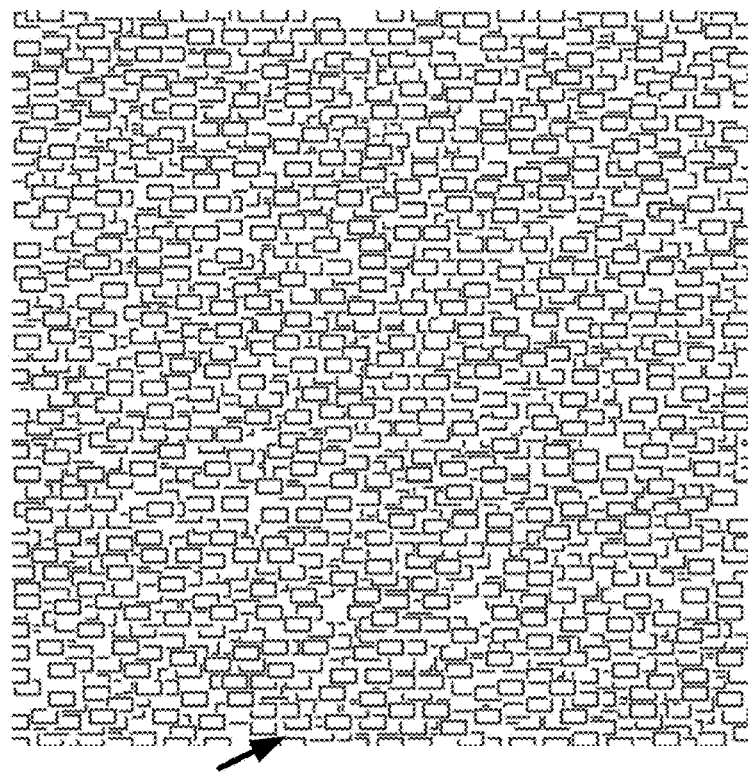
558  FIG. 74

ARTWORK GENERATED TO CONVEY DIGITAL MESSAGES, AND METHODS/APPARATUSES FOR GENERATING SUCH ARTWORK

RELATED APPLICATION DATA

This application is a continuation of application Ser. No. 16/212,125, filed Dec. 6, 2018 (published as 20190213705), which claims priority to provisional applications 62/745,219, filed Oct. 12, 2018, and 62/596,730, filed Dec. 8, 2017.

The subject matter of the present application is related to that of copending application Ser. No. 15/072,884, filed Mar. 17, 2016 (published as 20170024840), Ser. No. 16/002,989, filed Jun. 7, 2018 (published as 20190171856), 62/682,731, filed Jun. 8, 2018, Ser. No. 16/129,487, filed Sep. 12, 2018 (published as 20190139176), and 62/751,084, filed Oct. 26, 2018.

The disclosures of the above applications are incorporated herein by reference.

TECHNICAL FIELD

The present technology concerns message signaling. The technology is particularly illustrated in the context of message signaling through artwork of grocery item packaging, to convey plural-bit messages—of the sort presently conveyed by UPC barcodes. However, the technology is not so-limited.

BACKGROUND AND INTRODUCTION

Barcodes are in widespread use on retail items, but take up real estate that the manufacturers would prefer to use for other purposes. Some retail brands find that printing a barcode on a product detracts from its aesthetics.

Steganographic digital watermarking is gaining adoption as an alternative to visible barcodes. Watermarking involves making subtle changes to packaging artwork to convey a multi-bit product identifier or other message. These changes are generally imperceptible to humans, but are detectable by a computer.

FIG. 1 shows an illustrative digital watermark pattern, including a magnified view depicting its somewhat mottled appearance. In actual use, the watermark pattern is scaled-down in amplitude so that, when overlaid with packaging artwork in a tiled fashion, it is an essentially transparent layer that is visually imperceptible amid the artwork details.

Designing watermarked packaging involves establishing a tradeoff between this amplitude factor, and detectability. To assure reliable detection—even under the adverse imaging conditions that are sometimes encountered by supermarket scanners—the watermark should have as strong an amplitude as possible. However, the greater the amplitude, the more apparent the pattern of the watermark becomes on the package. A best balance is struck when the watermark amplitude is raised to just below the point where the watermark pattern becomes visible to human viewers of the packaging.

FIG. 2 illustrates this graphically. When a watermark is added to artwork at low levels, human visibility of the watermark is nil. As strength of the watermark increases, there becomes a point at which humans can start perceiving the watermark pattern. Increases in watermark amplitude beyond this point result in progressively greater perception (e.g., from barely, to mild, to conspicuous, to blatant). Point "A" is the desired "sweet-spot" value, at which the amplitude of the watermark is maximum, while visibility of the watermark is still below the point of human perception.

Setting the watermark amplitude to this sweet-spot value, when creating packaging artwork (e.g., using Adobe Illustrator software), is one thing. Hitting this sweet-spot "on-press" is another.

All print technologies, being physical processes, have inherent uncertainty. Some print technologies have more uncertainty than others. Dry offset printing is one; it is notably inaccurate. (Dry offset is advantageous in other respects; for example, it works well with the tapered shapes of plastic tubs, such as for yogurt and sour cream.)

Dry offset offers only gross control of dot size and other print structures. For example, if a digital artwork file specifies that ink dots are to be laid down with a density of 15%, a dry offset press will typically deposit a much greater density of ink, e.g., with 30% density.

Printer profiles exist to characterize such behavior. A profile for a particular model of dry offset press may specify that artwork indicating a 15% density will actually be rendered with a 25% density (e.g., a 10% dot gain). But there is a great deal of variation between presses of the same model—depending on factors including age, maintenance, consumables, temperature, etc. So instead of depositing ink at a 25% density—as indicated by a printer's profile, a particular press may instead deposit ink at a 20% density. Or a 40% density. Or anything in between.

This uncertainty poses a big obstacle for use of digital watermark technology. Packaging artwork that has been carefully designed to set the watermark amplitude to the point "A" sweet-spot of FIG. 2, may instead be printed with the watermark amplitude at point "B", making the watermark plainly visible.

Our patent publication 20110214044 teaches that, rather than attempt to hide a digital watermark signal in artwork, the payload data may be encoded as overt elements of the artwork. One example is a digital watermark in which the amplitude is set to a plainly human-visible level. Another example is a 1D or 2D black and white barcode that is used as a fill pattern, e.g., laid down by a paintbrush in Adobe Photoshop software.

These techniques often do not prove satisfactory. As illustrated by FIG. 1, a digital watermark, with its amplitude set to a plainly human-visible level, yields a pattern that does not fit well into the design of most packaging. Painted barcode fills similarly have limited practical utility.

In accordance with one aspect of the technology, a neural network is applied to imagery including a machine readable code, to transform its appearance while maintaining its machine readability. One particular method includes training a neural network with a style image having various features. The trained network is then applied to an input pattern that encodes a plural-symbol payload. The network adapts features from the style image to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

The foregoing and additional features and advantages of the present technology will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 shows an obfuscated code signal produced by the present technology from the digital watermark pattern of FIG. 1 and a (depicted) bitonal geometrical pattern.

FIG. 9 shows another obfuscated code signal produced by the present technology from the digital watermark pattern of FIG. 1 and a (depicted) bitonal geometrical pattern.

FIG. 10 shows still another obfuscated code signal produced by the present technology from the digital watermark pattern of FIG. 1 and still another (depicted) bitonal geometrical pattern.

FIG. 11 shows a line art counterpart to the image of FIG. 10, produced by the method of FIG. 12.

FIGS. 14B and 14C detail exemplary methods employed by the software of FIG. 14A.

FIGS. 32A, 32B, 33A, 33B, 34A, 34B, 35A, 35B, 36A, 36B, 37A, 37B, 38A and 38B are similar to FIGS. 31A and 31B, but using different image transformations.

FIGS. 39A and 40A show artistic signaling patterns generated from a continuous tone watermark using various image transformations, and FIGS. 39B and 40B are enlargements thereof.

FIG. 47 conceptually-illustrates how two overlapping brush strokes may effect a darkening of a common region, while maintaining two directional textures.

FIG. 48 conceptually-illustrates how two overlapping brush strokes that apply a signal-carrying pattern may effect a darkening of a common region by changing mean value of the pattern.

FIG. 49A shows that the mean value of patterning in a rendering of handwritten glyphs can depend on stylus-applied pressure.

FIG. 49B is like FIG. 49A but with the patterning less-exaggerated in contrast.

FIG. 49C is like FIG. 49B, but is presented at a more typical scale.

FIG. 53 is a diagram illustrating a combination of optical code elements, including an encoded payload and a reference component, to form a dense composite optical code.

FIG. 61 shows an excerpt from a printed label that includes an optical code, in which certain fixed marks are suppressed due to proximity with text, signaling that nearby variable marks should be discounted in extracting a message.

FIG. 70 illustrates an optical code signal tile created by the method of FIG. 69.

FIGS. 71-72 illustrate examples of optical code signals, masked to fit the shape of artwork elements.

FIGS. 73-74 illustrate additional examples of optical code signal tiles generated from coordinates of maxima in a dense optical code signal tile.

DETAILED DESCRIPTION

Figure 3:
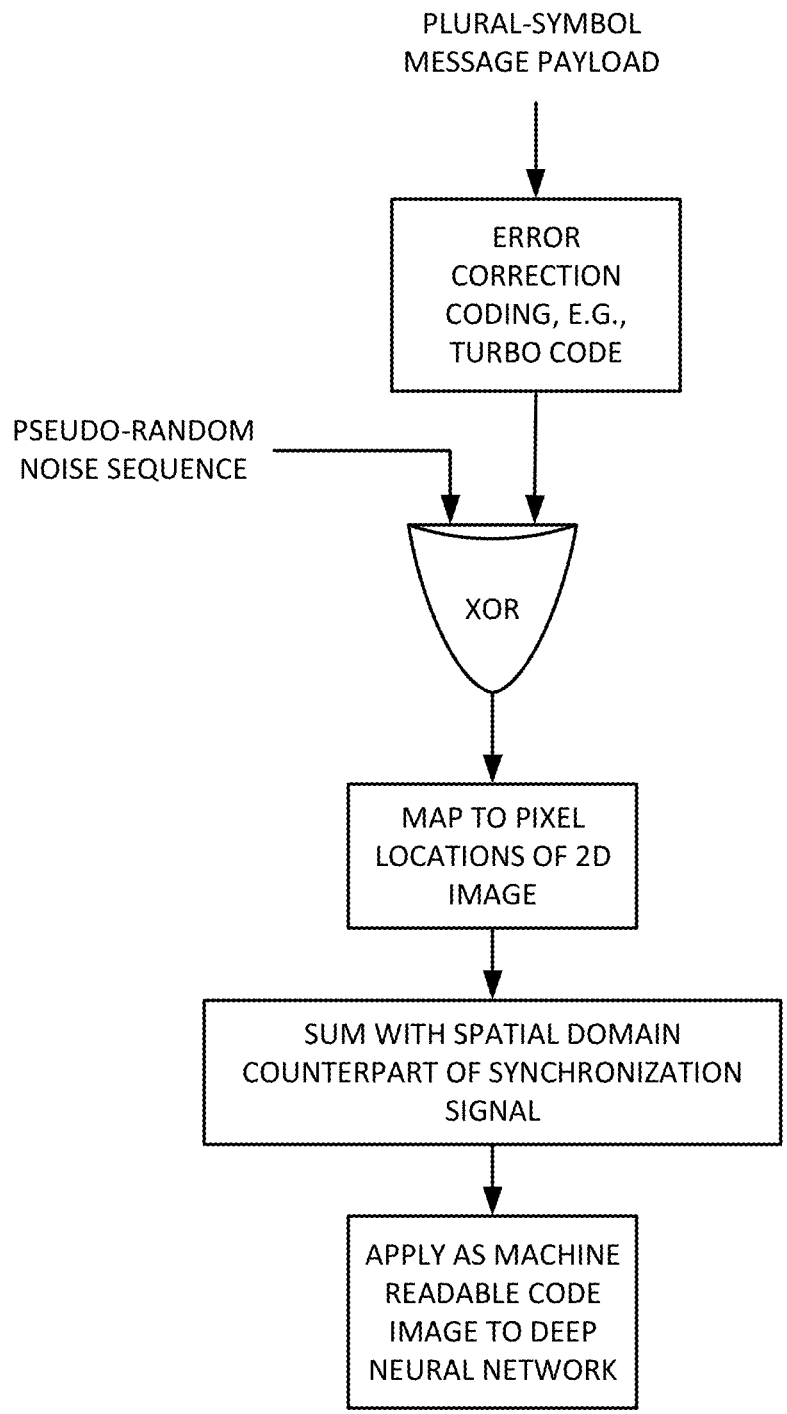
FIG. 3 is a diagram depicting an algorithm for generating a digital watermark tile.

FIG. 3 shows an illustrative direct sequence spread spectrum watermark generator. A plural-symbol message payload (e.g., 40 binary bits, which may represent a product's Global Trade Identification Number, or GTIN) is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 4,096, which may be termed "raw bits."

These raw bits each modulate a pseudorandom noise (carrier) sequence of length 16, e.g., by XORing. Each raw bit thus yields a 16-bit modulated carrier sequence, for an enlarged payload sequence of 65,536 elements. This sequence is mapped to elements of a square block having 256×256 embedding locations. These locations correspond to pixel samples at a configurable spatial resolution, such as 100 or 300 dots per inch (DPI). (In a 300 DPI embodiment, a 256×256 block corresponds to an area of about 0.85 inches square.) Such blocks can be tiled edge-to-edge to for printing on the paper or plastic of a product package/label.

There are several alternatives for mapping functions to map the enlarged payload sequence to embedding locations. In one, the sequence is pseudo-randomly mapped to the embedding locations. In another, they are mapped to bit cell patterns of differentially encoded bit cells as described in published patent application 20160217547. In the latter, the block size may be increased to accommodate the differential encoding of each encoded bit in a pattern of differential encoded bit cells, where the bit cells correspond to embedding locations at a target resolution (e.g., 300 DPI).

The enlarged payload sequence of 65,536 elements is a bimodal signal, e.g., with values of 0 and 1. It is mapped to a larger bimodal signal centered at 128, e.g., with values of 95 and 161.

A synchronization signal is commonly included in a digital watermark, to help discern parameters of any affine transform to which the watermark may have been subjected prior to decoding (e.g., by image capture with a camera having an oblique view of the pattern), so that the payload can be correctly decoded. A particular synchronization signal (sometimes termed a calibration signal, or registration signal, or grid signal) comprises a set of dozens of magnitude peaks or sinusoids of pseudorandom phase, in the Fourier domain. This signal is transformed to the spatial domain in a 256×256 block size (e.g., by an inverse Fast Fourier transform), corresponding to the 256×256 embedding locations to which the enlarged payload sequence is mapped. (Spatial domain values larger than a threshold value, e.g., 40, are clipped to that threshold, and likewise with values smaller than a negative threshold value, e.g., −40.)

This spatial domain synchronization signal is summed with the block-mapped 256×256 payload sequence to yield a final watermark signal block.

In another embodiment, a block of size 128×128 is generated, e.g., with a coder output of 1024 bits, and a payload sequence that maps each of these bits 16 times to 16,384 embedding locations.

The just-described watermark signal may be termed a "continuous tone" watermark signal. It is usually characterized by multi-valued data, i.e., not being just on/off (or 1/0, or black/white)—thus the "continuous" moniker. Each pixel of the host image (or of a region within the host image) is associated with one corresponding element of the watermark signal. A majority of the pixels in the image (or image region) are changed in value by combination with their corresponding watermark elements. The changes are typically both positive and negative, e.g., changing the local luminance of the imagery up in one location, while changing it down in another. And the changes may be different in degree—some pixels are changed a relatively smaller amount, while other pixels are changed a relatively larger amount. Typically the amplitude of the watermark signal is low enough that its presence within the image escapes notice by casual viewers (i.e., it is steganographic).

In a variant continuous tone watermark, the signal acts not to change the local luminance of artwork pixels, but rather their color. Such a watermark is termed a "chrominance" watermark (instead of a "luminance" watermark). An example is detailed, e.g., in U.S. Pat. No. 9,245,308, the disclosure of which is incorporated herein by reference.

"Sparse" or "binary" watermarks are different from continuous tone watermarks in several respects. They do not change a majority of pixel values in the host image (or image region). Rather, they have a print density (which may sometimes be set by the user) that results in marking between 5% and 45% of pixel locations in the image. Adjustments are all made in the same direction, e.g., reducing luminance. Sparse elements are typically bitonal, e.g., being either white or black. Although sparse watermarks may be formed on top of other imagery, they are usually presented in regions of artwork that are blank, or colored with a uniform tone. In such cases a sparse marking may contrast with its background, rendering the marking visible to casual viewers. As with continuous tone watermarks, sparse watermarks generally take the form of signal blocks that are tiled across an area of imagery.

Exemplary sparse marking technology is detailed in the patent documents referenced at the beginning of this specification.

A sparse pattern can be rendered in various forms. Most straight-forward is as a seemingly-random pattern of dots. But more artistic renderings are possible, including Voronoi, Delaunay, and stipple half-toning. Such techniques are detailed in above-cited application 62/682,731. (In a simple Voronoi pattern, a line segment is formed between a dot and each of its neighboring dots, for all the dots in the input pattern. Each line segment extends until it intersects with another such line segment. Each dot is thus surrounded by a polygon.)

Unless otherwise indicated, the techniques described below can be applied to any type of watermarks—continuous tone luminance, continuous tone chrominance, sparse dot, Voronoi, Delaunay, stipple, etc., as well as to images incorporating such watermarks.

First Exemplary Embodiment

A first exemplary embodiment of the present technology processes a watermark signal block, such as described above, with a neural network. The network can be of various designs. One, shown in FIG. 4, is based on the VGG network described in Simonyan et al, Very Deep Convolutional Networks for Large-Scale Image Recognition, arXiv preprint 1409.1556v6, Apr. 10, 2015 (familiar to those skilled in that art, and attached to application 62/596,730), but lacking its three fully-connected layers, and its SoftMax classifier.

Figure 4:
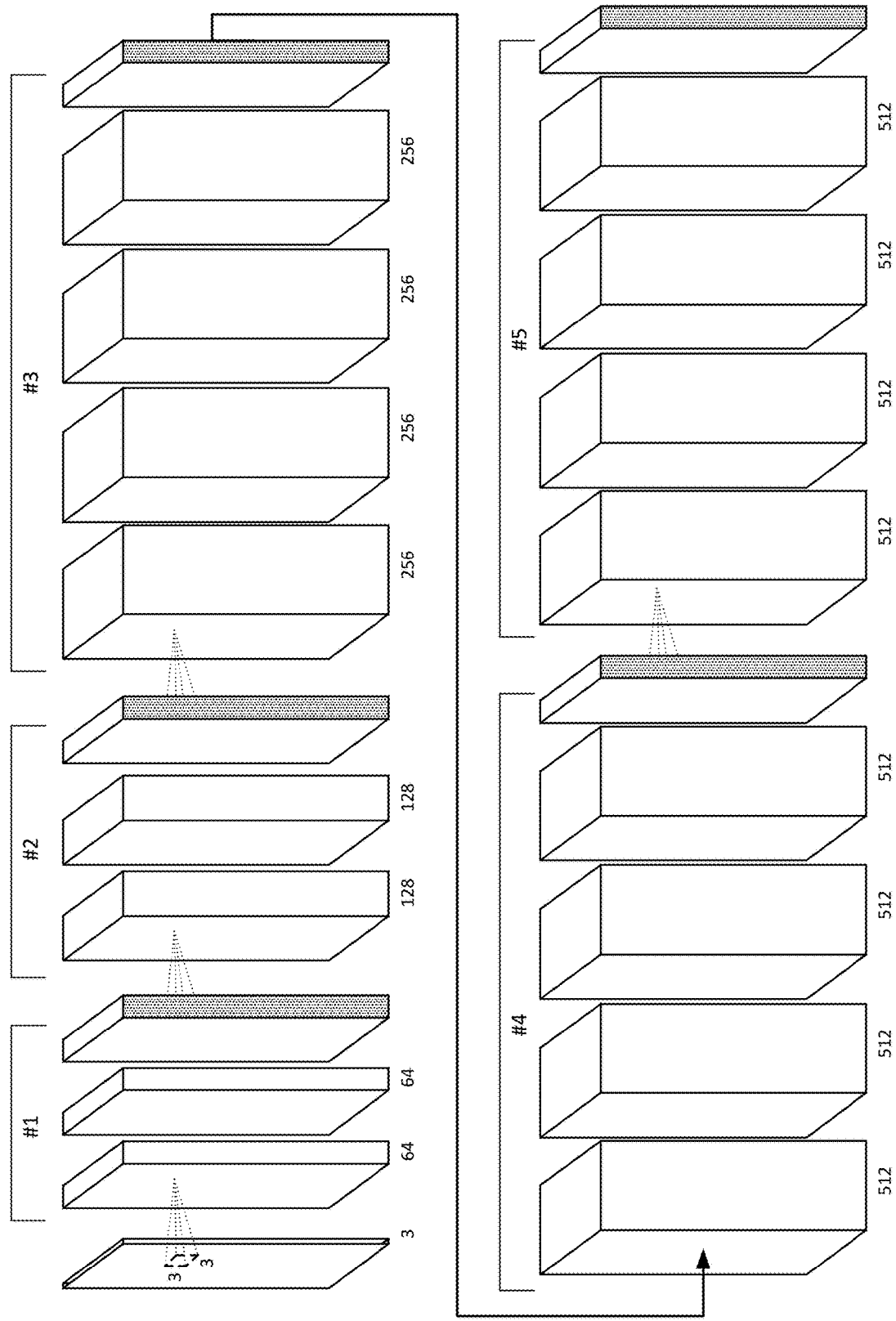
FIG. 4 details an illustrative neural network that can be used in embodiments of the present technology FIGS. 5 and 6 further detail use of the FIG. 4 neural network in an illustrative embodiment of the technology.

The network of FIG. 4 is characterized by five stacks of convolutional layers, each based on 3×3 receptive fields. These 3×3 filters are convolved with their inputs at every pixel, i.e., with a stride of 1. The first stack includes two cascaded convolutional layers, of 64 channels each. The second stack again includes two cascaded convolutional layers, but of 128 channels each. The third stack includes four cascaded convolutional layers, of 256 channels each. The fourth and fifth stacks include four cascaded convolutional layers, of 512 channels each. Each layer includes a Rectified Linear Unit (ReLu) stage to zero any negative values in the convolutional outputs. Each stack additionally includes a concluding average pooling layer (rather than the max pooling layer taught by Simonyan), which is indicated in FIG. 4 by the shaded layer at the right of each stack. The input image is an RGB image of size 224×224 pixels.

In its original conception, the VGG network was designed to identify images, e.g., to determine into which of several classes (dog, cat, car, etc.) an image belongs. And the network here is configured for this purpose—employing filter kernels that have been trained to classify an input image into one of the one thousand classes of the ImageNet collection. However, the network is here used for a different purpose. It is here used to discern "features" that help characterize a watermark image. And it is used again to discern features that characterize a geometrical pattern image. And it is used a third time to characterize features of a test image (which may be a frame of pseudo-random noise). This test image is then adjusted to drive its features to more closely correspond both to features of the watermark image and to features of the geometrical pattern image. The adjusted test image is then re-submitted to the network, and its features are re-determined. Adjustment of the test image continues in an iterative fashion until a final form is reached that incorporates geometrical attributes of the geometrical pattern image, while also being decodable by a digital watermark decoder.

Figure 5:
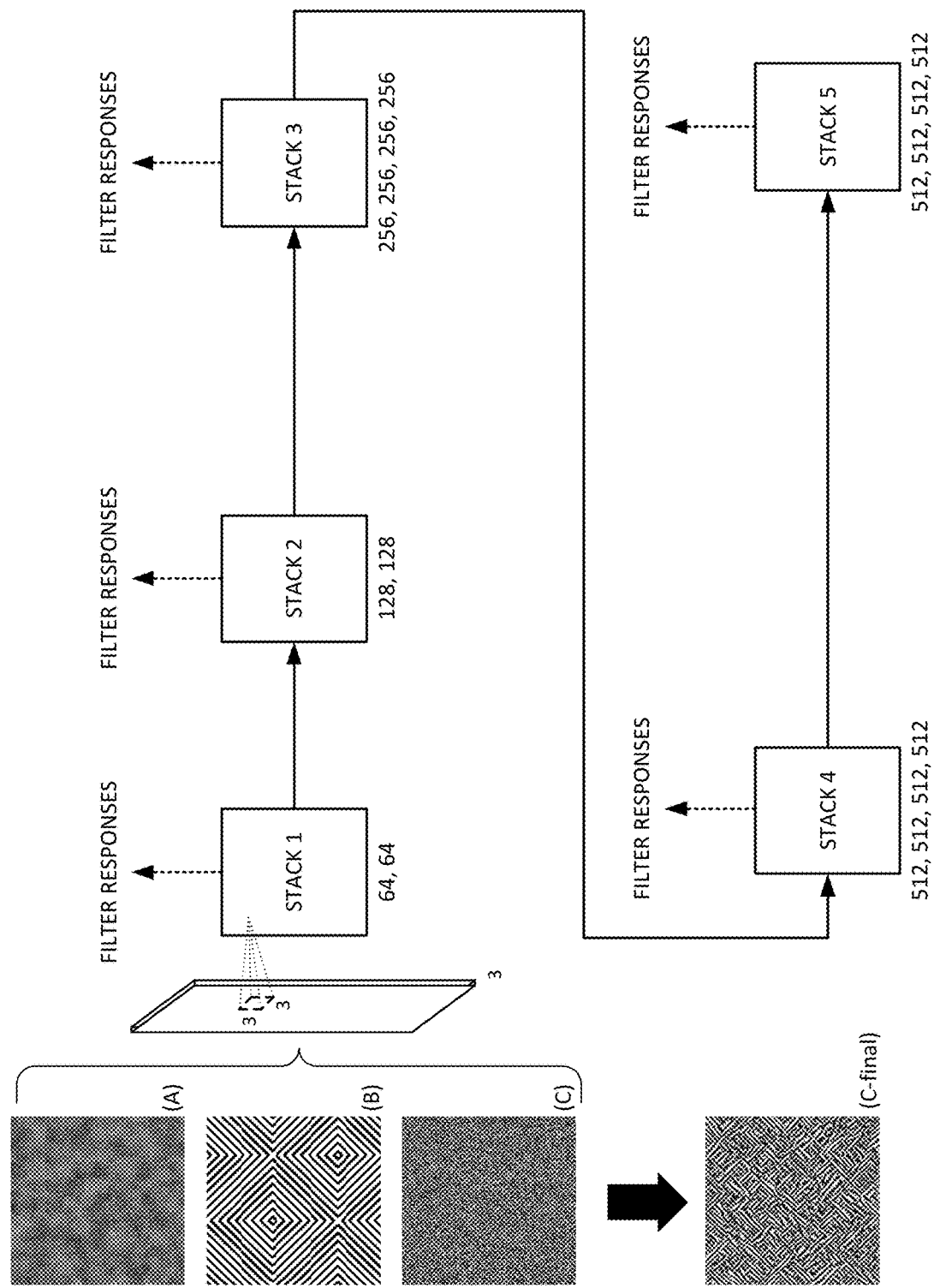
Figure 6:
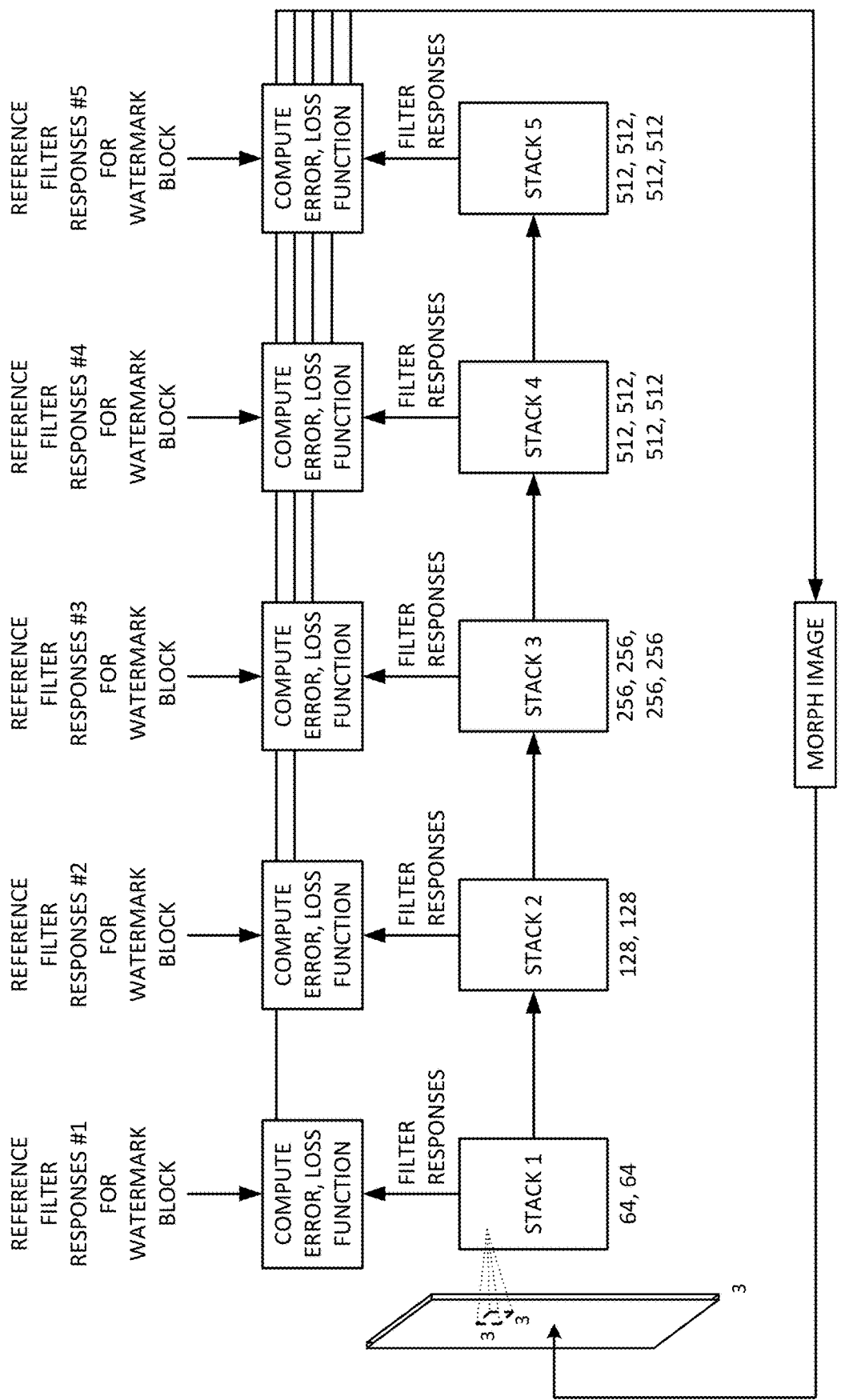

FIGS. 5 and 6 help further explain this process. A watermark signal block (A) is input to the network. Each of the stacks of convolutional layers produces filter responses, determined by applying the convolutional parameters of their 3×3 filters on respective excerpts of input data. These filter responses are stored as reference features for the watermark signal block, and will later serve as features towards which features of the third image are to be steered.

A similar operation is applied to the geometrical pattern image (B). The geometrical pattern image is applied to the network, and each of the stacks produces corresponding filter responses. In this case, however, these filter responses are processed to determine correlations between different filter channels of a layer. This correlation data, which is further detailed below, serves as feature data indicating the style, or texture, of the geometrical pattern image. This correlation data is stored, and is later used as a target towards which similarly-derived correlation data from the test image is to be steered.

A test image (C) is next applied to the network. The starting test image can be of various forms. Exemplary is a noise signal. Each of the stacks of convolutional layers produces filter responses. Correlations between such filter responses—between channels of layers—are also determined. The test image is then adjusted, so that its filter responses more closely approximate those of the watermark signal block, and so that its texture-indicating correlation data more closely approximates that of the geometrical pattern block.

Diving more deeply, consider the watermark image applied to the network to be denoted as $\vec{w}$. This image can be characterized by the networks filters' responses to this image. A layer l in the first stack of FIG. 5, with 64 ($N_l$) channels, has 64 distinct feature maps, each of size $M_l$, where $M_l$ is the number of elements in the feature map (width times height, or $222^2$). A matrix $W^l$, of dimensions $64 \times 222^2$ can thus be defined for each layer in the network, made up of the 64 filter responses for each of the $222^2$ positions in the output from layer l. $W^l_{ij}$ defines the activation of the ith filter at position j in this layer.

If a test image $\vec{x}$ is applied to the network, a different matrix is similarly defined by its filter responses. Call this matrix X. A loss function can then be defined based on differences between these filter response matrices. A squared-loss error is commonly used, and may be computed, for a given layer l, as $$\text{Loss}_W(\vec{w}, \vec{x}, l) = \frac{1}{2} \Sigma_{i,j} (X^l_{i,j} - W^l_{i,j})^2$$

Taking the derivative of this function indicates the directions that the filter responses should change, and relative magnitudes of such changes:

$$\frac{\partial (\text{Loss}_W)}{\partial X^l_{ij}} = \begin{cases} (X^l - W^l)_{ij} & \text{if } X^l_{ij} > 0 \\ 0 & \text{if } X^l_{ij} < 0 \end{cases}$$

This derivative establishes the gradients used to adjust the test image using back-propagation gradient descent methods. By iteratively applying this procedure, the test image can be morphed until it generates the same filter responses, in a particular layer of the network, as the watermark image $\vec{w}$.

The geometrical pattern image can be denoted as $\vec{g}$. Rather than use filter responses, per se, as features of this image, a variant feature space is built, based on correlations between filter responses, using a Gram matrix.

As is familiar to artisans in such technology, and as detailed in a Wikipedia article entitled Gramain Matrix (attached to application 62/596,730), a Gram matrix is composed of elements that are inner products of vectors in a Euclidean space. In the present case the vectors involved are the different filter responses resulting when the geometrical pattern is applied to the network.

Consistent with the former notation used for the watermark pattern image $\vec{w}$ and the test image $\vec{x}$, the filter responses for a given layer l of geometrical pattern image $\vec{g}$ are expressed as the matrix $G^l_{ij}$, where i denotes one of the N filter channels (e.g., one of the 64 filter channels for the first layer), and j denotes the spatial position (from among $222^2$ positions for the first layer). The correlation-indicating Gram matrix C for a particular layer in geometrical pattern image $\vec{g}$ is an N×N matrix:

$$C^l_{ij} = \sum_k (G^l_{ik} G^l_{jk})$$

That is, the Gram matrix is the inner product between the vectorized filter responses i and j in layer l, when the geometrical pattern image $\vec{g}$ is applied to the network (i.e., the inner product between intermediate activations—a tensor operation that results in an N×N matrix for each layer of N channels).

This procedure is again applied twice: once on the geometrical pattern image, and once on the test image. Two feature correlations result, as indicated by the two Gram matrices. Gradient descent is then applied to the test image to minimize a mean-squared difference between elements of the two Gram matrices.

If $C^l_{ij}$ as defined above is the Gram matrix for the geometrical pattern image, and $D^l_{ij}$ is the corresponding Gram matrix for the test image, then the loss E associated with layer l for the two images is:

$$E_l = \frac{1}{4 N_l^2 M_l^2} \sum_{i,j} (C^l_{ij} - D^l_{ij})^2$$

The total loss function, across plural layers L, between the geometrical pattern image $\vec{g}$ and the test image $\vec{x}$ is then $$\text{Loss}_G(\vec{g}, \vec{x}) = \sum_{l=0}^{L} (a_l E_l)$$

where $a_l$ are weighting factors for the contribution of each layer to the total loss.

The derivative of $E_l$ with respect to the filter responses in that layer is expressed as:

$$\frac{\partial (E_l)}{\partial X^l_{ij}} = \begin{cases} \frac{1}{4 N_l^2 M_l^2} \left( (X^l)^T (C^l - D^l) \right)_{ij}, & \text{if } X^l_{ij} > 0 \\ 0, & \text{if } X^l_{ij} < 0 \end{cases}$$

Again, standard error back-propagation can be applied to determine the gradients of $E_l$, which can be used to iteratively adjust the test image, to bring its correlation features (Gram matrix) closer to that of the geometrical pattern image.

While the two loss functions defined above, $\text{Loss}_W$ and $\text{Loss}_G$, can be used to adjust the test image to more closely approximate the watermark block image, and the geometrical pattern image, respectively, the loss functions are desirably applied jointly, in a weighted fashion. That is:

$$\text{Loss}_{TOTAL} = \alpha \text{Loss}_W + \beta \text{LOSS}_G$$

where $\alpha$ and $\beta$ are weighting factors for the watermark pattern and the geometrical pattern, respectively.

The derivative of this combined loss function, with respect to the pixel values of the test image $\vec{x}$, is then used to drive the back propagation adjustment process. An optimization routine, BFGS, can optionally be applied. (Cf., Zhu et al, Algorithm 778: L-BFGS-B: Fortran Subroutines for Large-Scale Bound-Constrained Optimization, ACM Trans. on Mathematical Software, 23(4), pp. 550-560, 1997.)

In a particular embodiment, the loss factor $LOSS_G$ is based on filter responses from many of the 16 different convolution layers in the network—in some cases all of the layers. In contrast, the loss factor $Loss_W$ is typically based on filter responses from a small number of layers—in some cases just one (e.g., the final layer in stack #4).

The foregoing discussion draws heavily from Gatys et al, Image Style Transfer Using Convolutional Neural Networks, Proc. of IEEE Conference on Computer Vision and Pattern Recognition (CVPR), pp. 2414-2423, 2016, and its predecessor Gatys, et al, A Neural Algorithm of Artistic Style. arXiv preprint arXiv:1508.06576, Aug. 26, 2015 (both familiar to artisans in that field, and both attached to application 62/596,730), which provide additional details. Those papers, however, particularly concern transferring artistic styles between digitized paintings and photographs, and do not contemplate machine readable codes (nor geometrical patterns).

The Gatys work is reviewed and expanded in Johnson, et al, Perceptual Losses for Real-Time Style Transfer and Super-Resolution, European Conference on Computer Vision, Oct. 8, 2016, pp. 694-711, and in Nikulin, et al, Exploring the Neural Algorithm of Artistic Style, arXiv preprint arXiv:1602.07188, Feb. 23, 2016 (both are again familiar to artisans in that field, and both are attached to application 62/596,730; the former method is sometimes termed "the method of Johnson" or "the Johnson method" herein).

The procedure detailed above is applied to iteratively adjust the test image until it adopts patterning from the geometrical pattern image to a desired degree, e.g., to a degree sufficient to obfuscate the mottled patterning of the watermark block—while still maintaining the machine readability of the watermark block.

Figure 7:
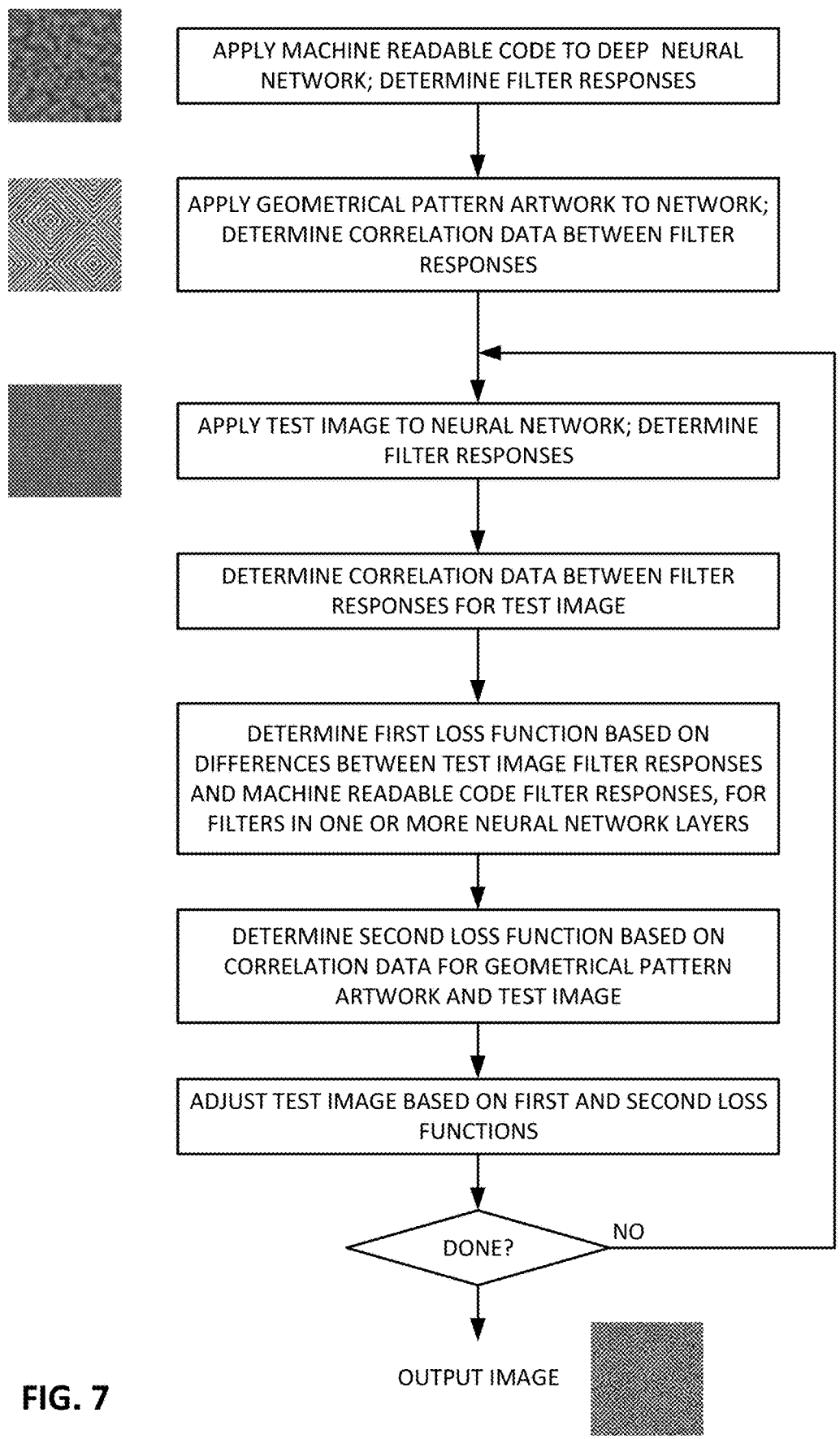
FIG. 7 details an algorithm employed in one illustrative embodiment of the technology.

FIG. 7 is a flow chart detailing aspects of the foregoing method.

FIG. 8 shows an illustrative application of the method. A bitonal geometrical pattern of the same size as the earlier-defined watermark signal block was created to serve as the style image, comprising concentric black and white circles. Its Gram matrix was computed, for the 16 layers in the FIG. 4 network. After 20 iterations, the detailed procedure updated an input random image until it took the form shown on the right.

Figure 1:
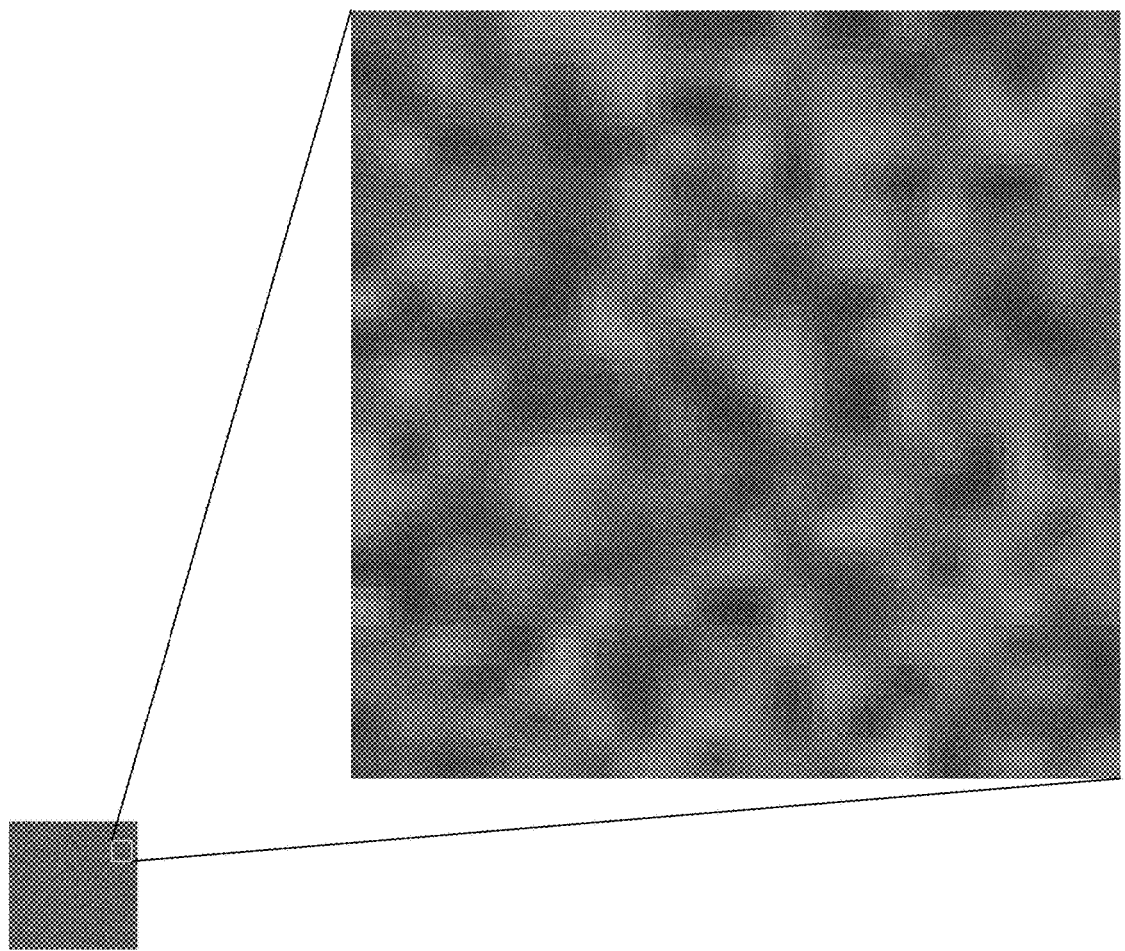
FIG. 1 is an illustration of a digital watermark pattern.

It will be recognized that this pattern shown on the right of FIG. 8 is more suitable for incorporating into packaging artwork than the pattern shown on the right of FIG. 1.

FIG. 9 shows a similar example, this one based on a bitonal checkerboard pattern.

FIG. 10 shows another example, this one based on a pattern of tiled concentric squares.

As noted in the Background discussion, some printing technologies have substantial variability. Dry offset was particularly mentioned. When printing a press run of product packaging, this variability can cause a digital watermark pattern, which is intended to be rendered with an ink coverage resulting in human imperceptibility, to pop into conspicuous visibility.

Figure 2:
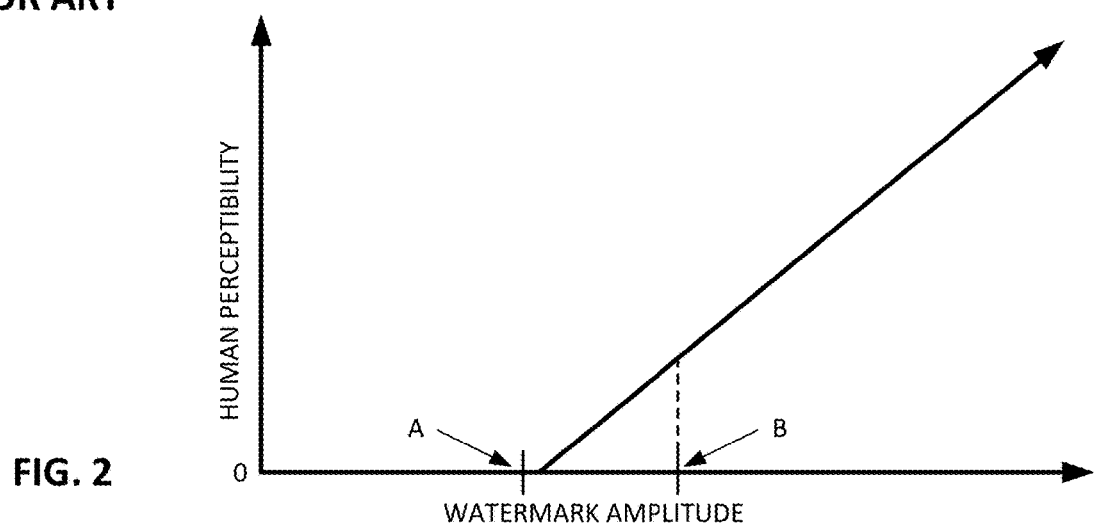
FIG. 2 is a graph showing how a digital watermark is human-imperceptible at low strengths, but becomes progressively more conspicuous at higher strengths.

The patterns of FIGS. 8, 9 and 10 are robust to such printing errors. If more or less ink is applied due to press variability, the package appearance will change somewhat. But it will not cause a pattern that is meant to be concealed, to become visible. And the strength of the encoded signal is robust—far to the right on FIG. 2, and far stronger than the strengths (e.g., "A" to "B") with which watermarks intended for imperceptibility are applied. Supermarket scanners thus more reliably decode the product identifying information (e.g., GTINs) from such printing, even if only a fraction of the pattern is depicted in an image frame, or if contrast or glare issues would impair reading of an imperceptible watermark.

The patterns on the right of FIGS. 8-10 can be further processed to form line art images. FIG. 11 shows an example. Such line art images are even more robust to press variations, and extend application of this technology to other forms of printing that are commonly based on line structures (e.g., intaglio).

Figure 12:
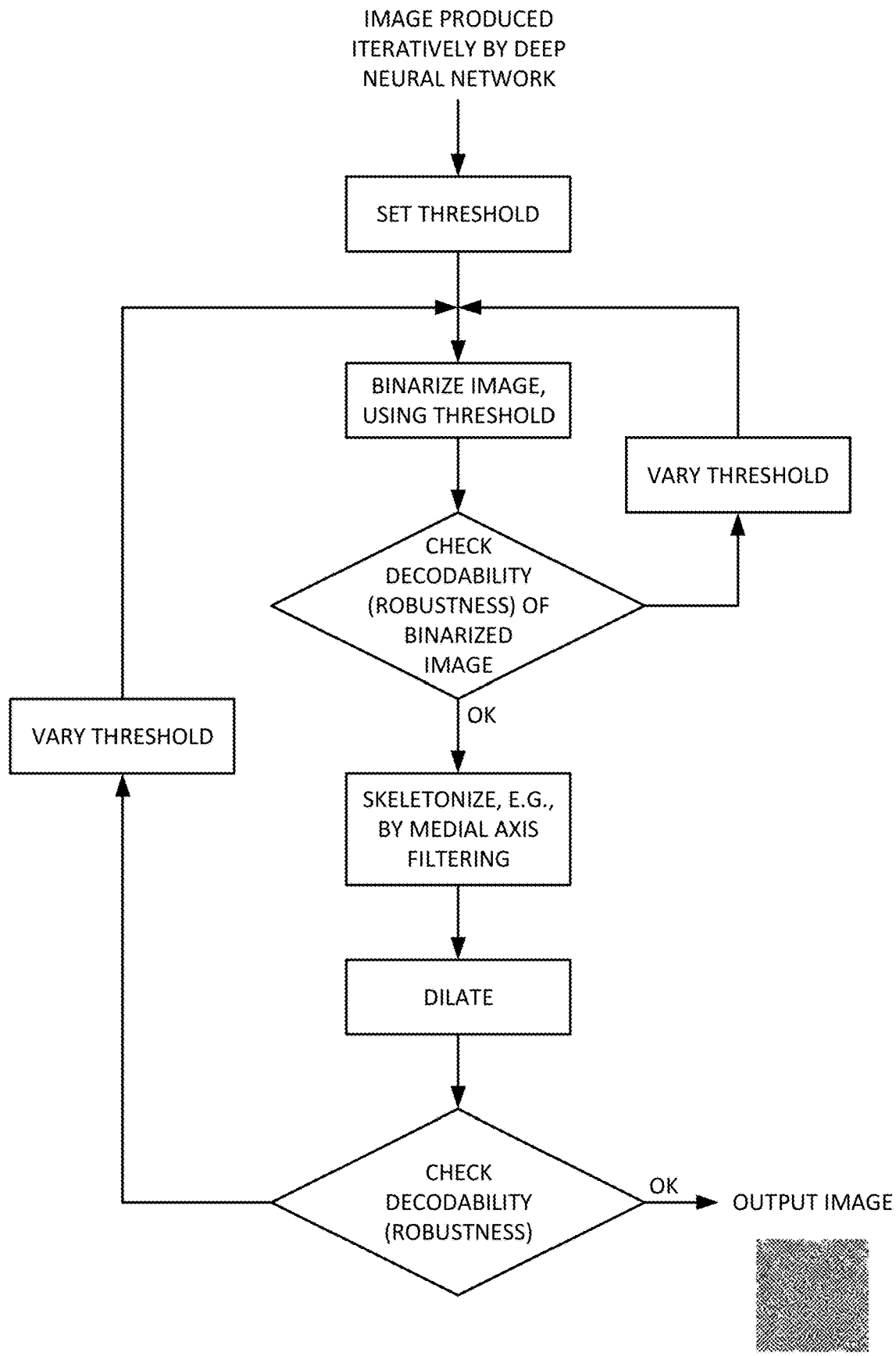
FIG. 12 details an algorithm for further-processing an image produced with the present technology.

The FIG. 11 image is derived from the FIG. 10 (right side) image by first binarizing the image against a threshold value, e.g., of 128 (i.e., setting all pixels having a value above 128 to a value of 255, and setting all other pixels to a value of 0). A skeletonizing operation (e.g., a medial axis filter) is then applied to the binarized image. The "skeleton" thereby produced is then dilated, by a dilation filter (e.g., replacing each pixel in the skeleton with a round pixelated dot, e.g., of diameter 2-20). Such a procedure is illustrated by the flow chart of FIG. 12. (Additional information on such procedure is detailed in U.S. application Ser. No. 16/129,487, published as 20190139176.)

Figure 13:
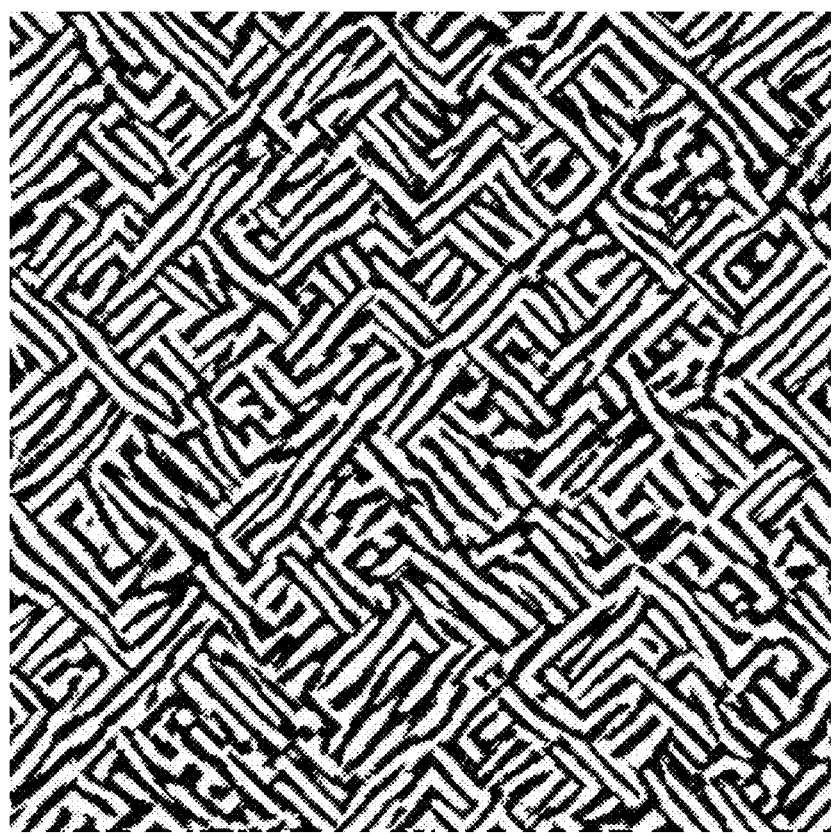
FIG. 13 shows another pattern produced by methods of the present technology.

In a variant embodiment (i.e., not strictly line art), the FIG. 10 image is simply binarized. Such an image is shown in FIG. 13.

Through this process, decodability of the encoded payload should persist. Accordingly, at the end of any image processing operation—and optionally at interim steps (e.g., between iterations)—the test image may be checked to confirm that the watermark is still decodable. A watermark signal strength metric can be derived as detailed, e.g., in U.S. Pat. No. 9,690,967, and in application Ser. No. 16/129,487, filed Sep. 12, 2018 (published as 20190139176), Ser. No. 15/816,098, filed Nov. 17, 2017 (now U.S. Pat. No. 10,593,007), and Ser. No. 15/918,924, filed Mar. 12, 2018 (now U.S. Pat. No. 10,382,645), the disclosures of which are incorporated herein by reference.

In the cited binarization operations, different thresholds may be tested, and strength metrics for the watermark signal can be determined for each. In choosing between candidate thresholds that all yield suitable patterning for use in a particular package, the threshold that yields the strongest watermark signal strength may be selected Similarly, when using a neural network to morph a test image to take on attributes of a geometrical pattern, the geometrical pattern may come to dominate the morphed test image—depending on the weighting parameters $\alpha$ and $\beta$, and the number of iterations. Here, too, periodically assessing the strength of the watermark signal can inform decisions such as suitable weights for $\alpha$ and $\beta$, and when to conclude the iterative process.

Second Exemplary Embodiment

A second exemplary embodiment is conceptually similar to the first exemplary embodiment, so the teachings detailed above are generally applicable. In the interest of conciseness, such common aspects are not repeated here.

This second embodiment is hundreds or thousands of times faster than the first embodiment in applying a particular style to an image—requiring only a forward pass through the network. However, the network must first be pre-trained to apply this particular style, and the training process is relatively lengthy (e.g., four hours on a capable GPU machine).

An advantage of this embodiment for our purposes is that, once trained, the network can quickly apply the style to any watermark (or watermarked) input image. This method is thus suitable for use in a tool for graphic artists, by which they can apply one of dozens or hundreds of styles (for which training has been performed in advance) to an input pattern, e.g., to generate a signal-carrying pattern for incorporation into their artwork.

Figure 14A:
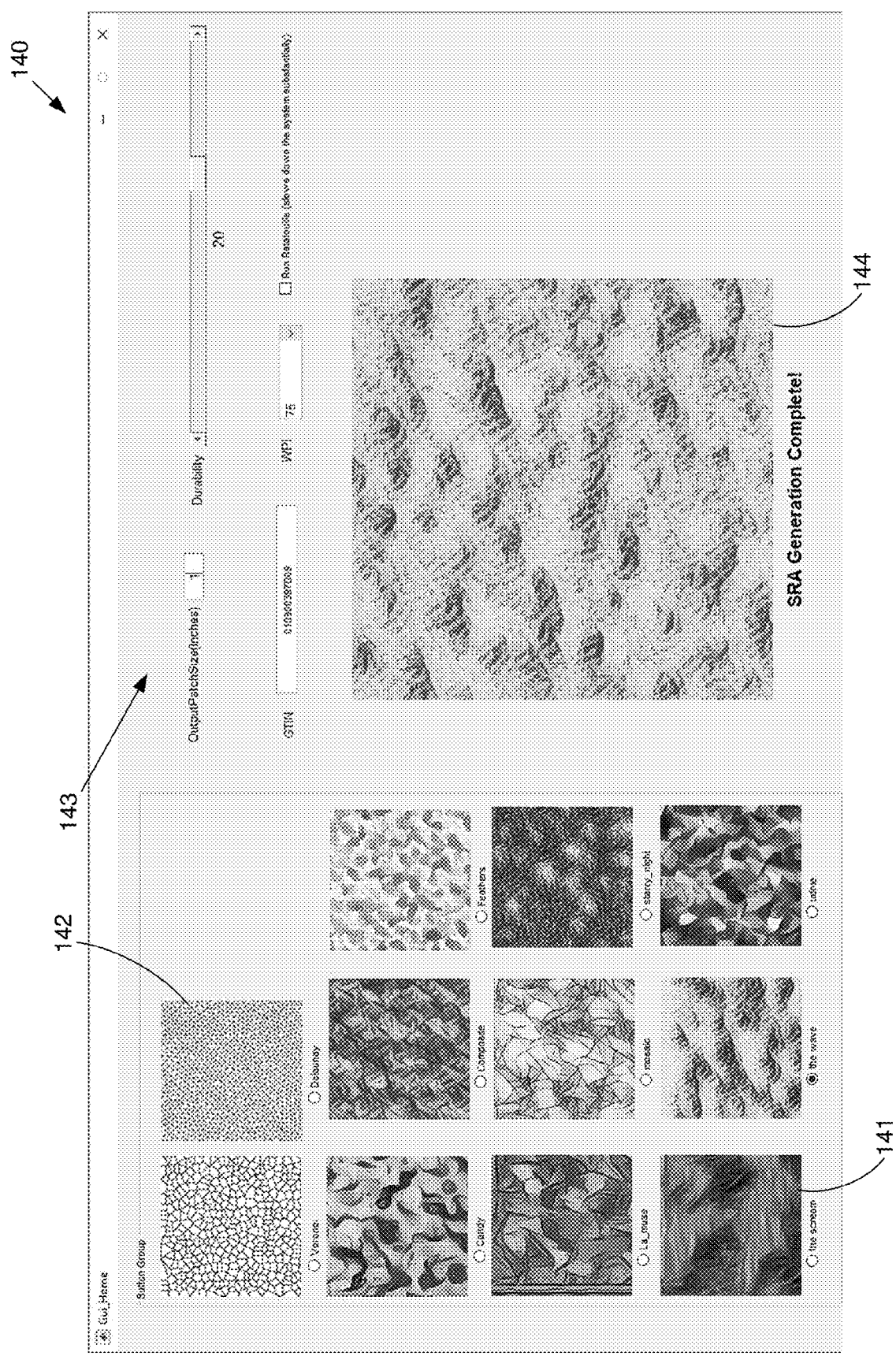
FIG. 14A depicts a user interface of software that generates a watermark pattern with user-defined parameters, and enables an artist to specify a style to be applied to the pattern.
Figure 14D:
FIGS. 14D, 14E, 14F and 14G are images on which the "Candy," "Mosaic," "Feathers," and "La Muse" styles visible in FIG. 14 are based.
Figure 14E:
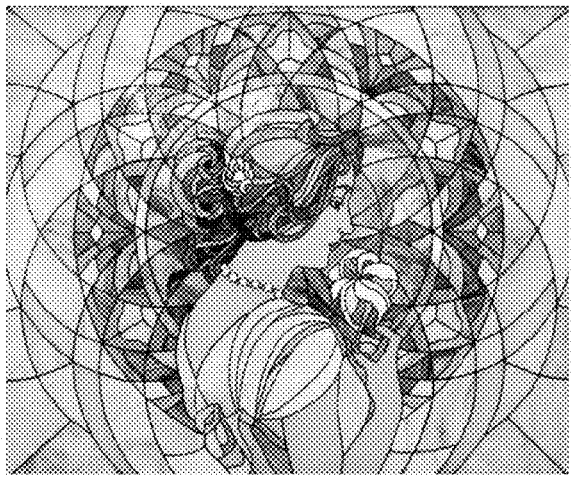
Figure 14F:
Figure 14G:

FIG. 14A is a screenshot of the user interface 140 of such a software tool. A palette of pre-trained neural styles is on the left, such as style 141 derived from Edvard Munch's "The Scream." (Also included can be some algorithmic patterns 142, such as Voronoi, Delaunay and stipples, as referenced above.) The user clicks a button to select a desired style. In the upper right are dialog features 143 by which the user can specify attributes of a watermark pattern. That is, in this particular example, a watermark pattern is not input, per se. Rather, parameters for a watermark pattern are specified through the user interface, and the watermark pattern is generated on the fly, as part of operation of the software. (A sparse dot marking may be generated if an algorithmic pattern, such as Voronoi, is selected. A continuous tone watermark may be generated if one of the other styles is selected.) The selected style is then applied to the specified watermark.

In particular, the user enters parameters specifying the payload of the watermark signal (e.g., a 12 digit GTIN code), and the resolution of the desired watermark signal block in watermarks per inch (WPI). The user also specifies the physical scale of the watermark signal block (in inches), and the strength ("Durability") with which the watermark signal is to be included in the finished, stylized, block. An analysis tool, termed Ratatouille, can be selectively invoked to perform a signal strength analysis of the resulting stylized block, in accordance with teachings of the patent documents referenced earlier. A moment after the parameters are input (typically well less than ten seconds), a stylized, watermarked signal block is created, and stored in an output directory with a file name that indicates metadata about its creation, such as the date, time, style, and GTIN. A rendering 144 of the signal block is also presented in the UI, for user review.

FIGS. 14B and 14C further detail aspects of the software's operation.

The pre-training to generate the neural styles 141 of FIG. 14 proceeds according to the method of Johnson, referenced earlier. As noted, this method is familiar to artisans; its method is briefly reviewed in a separate section, below. His paper has been cited over a thousand times in subsequent work. His method has been implemented in various freely-accessible forms. One is an archive of software code written by author Justin Johnson, available at github<dot>com/ jcjohnson/fast-neural-style. (The <dot> convention is used in lieu of a period, to assure there is no browser-executable code in this specification, per MPEP § 608.) Another is an archive of code written by Logan Engstrom, available at github<dot>com/lengstrom/fast-style-transfer. Still another is code written by Adrian Rosebrock, using functionality of the open source library OpenCV (e.g., version 3.4.1), detailed at www<dot>pyimagesearch<dot>com/2018/08/ 27/neural-style-transfer-with-opencv/. The Web Archive (web<dot>archive<dot>org) has backups of all these materials.

Appendices A, B and C to application 62/745,219 form part of this specification and present material from the public gitbub web site—including source code—for the method of Johnson, and for its implementation by Engstrom and Rosebrock, respectively. Such code can use previously compiled style models, e.g., in a binary Torch format (*.t7). Sample t7 models are freely available from an archived Justin Johnson page from a Stanford web server, web<dot>archive<dot>org/web/20170917122404/http:// cs.stanford.edu:80/people/jcjohns/fast-neural-style/models/ instance_norm/. Alternatively, style models can be newly-created.

FIGS. 14D, 14E, 14F and 14G show the original images that were used as style images in the method of Johnson, to define the "Candy," "Mosaic," "Feathers," and "La Muse" styles—each of which is a selectable option for applying to a watermark pattern, in the user interface of FIG. 14A.

Figure 15A:
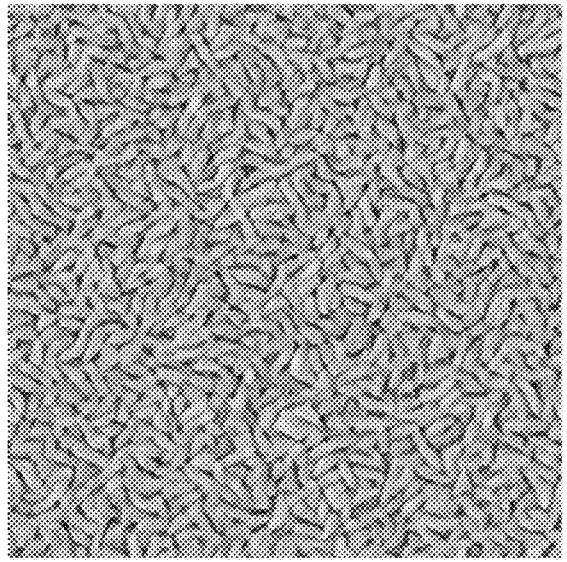
FIGS. 15A-15ZZ depict continuous tone watermark patterns that have been processed in accordance with aspects of the present technology.
Figure 15B:
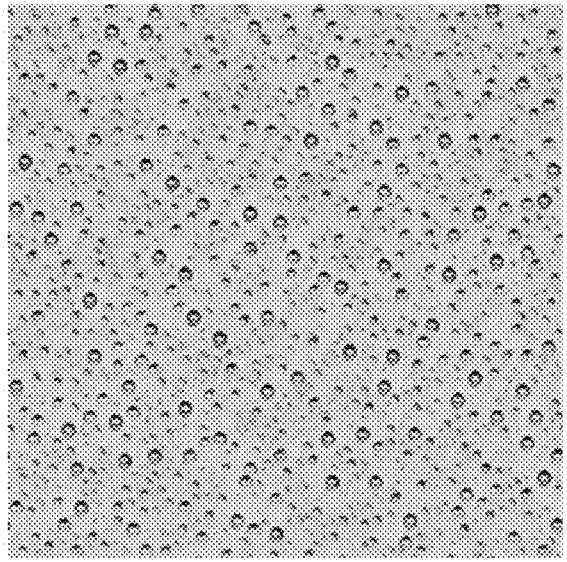
Figure 15C:
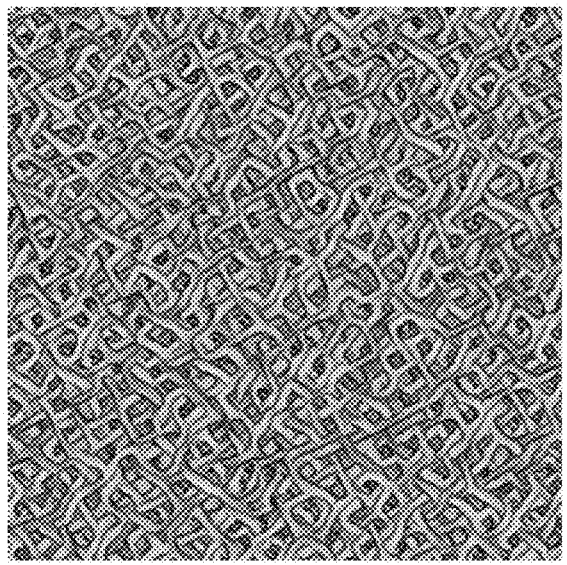
Figure 15D:
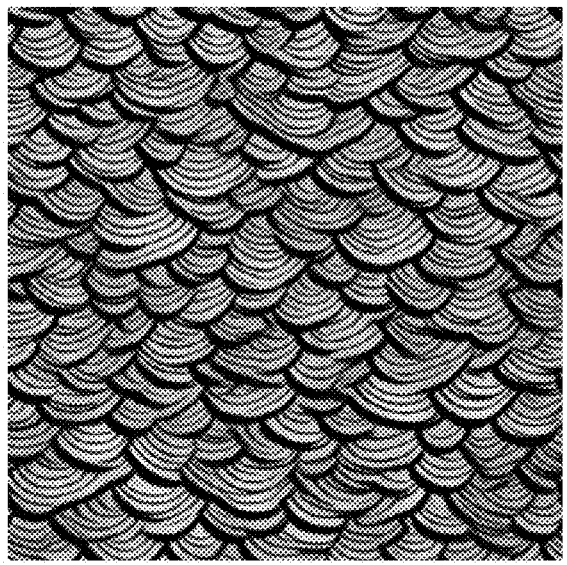
Figure 15E:
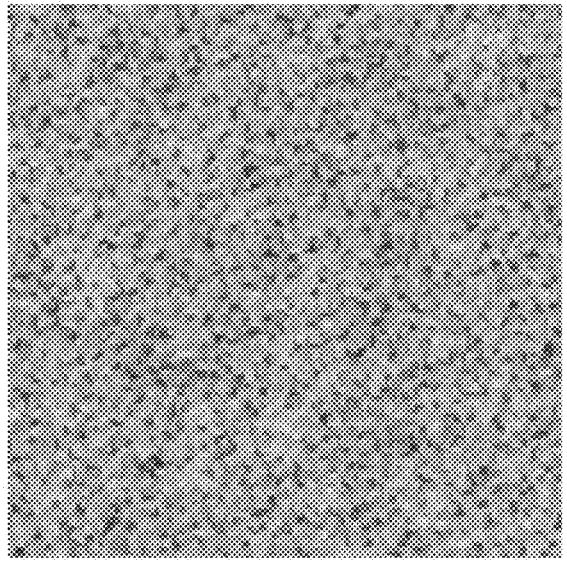
Figure 15F:
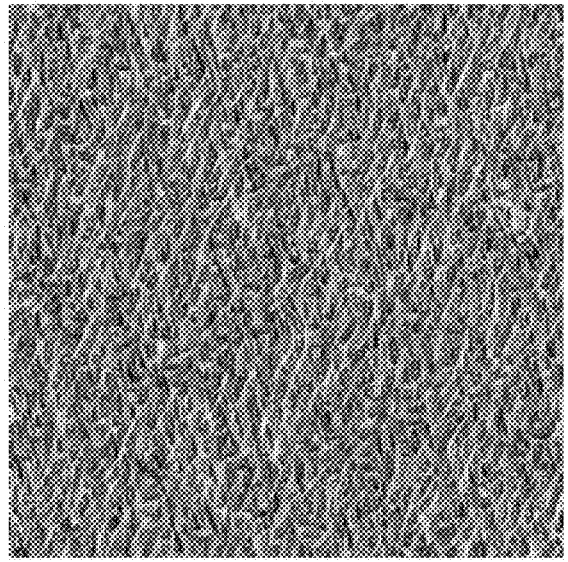
Figure 15G:
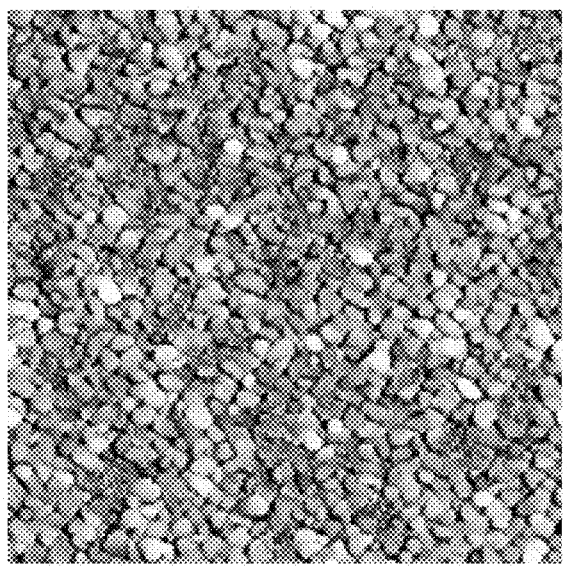
Figure 15H:
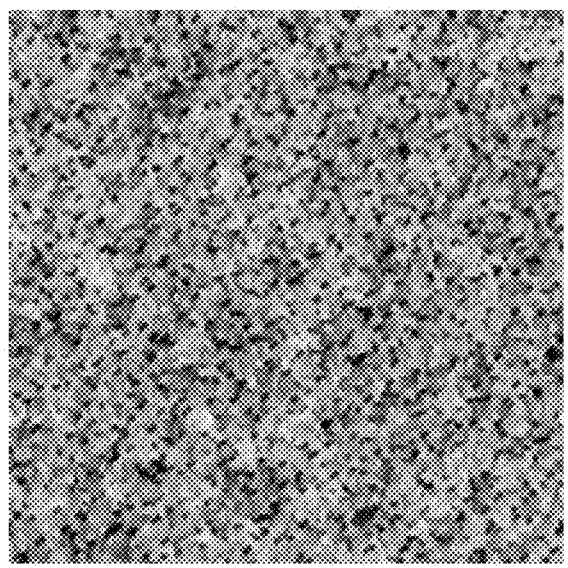
Figure 15I:
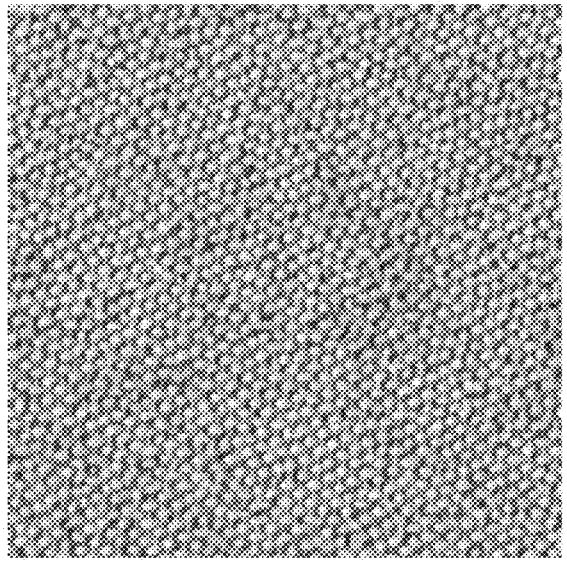
Figure 15J:
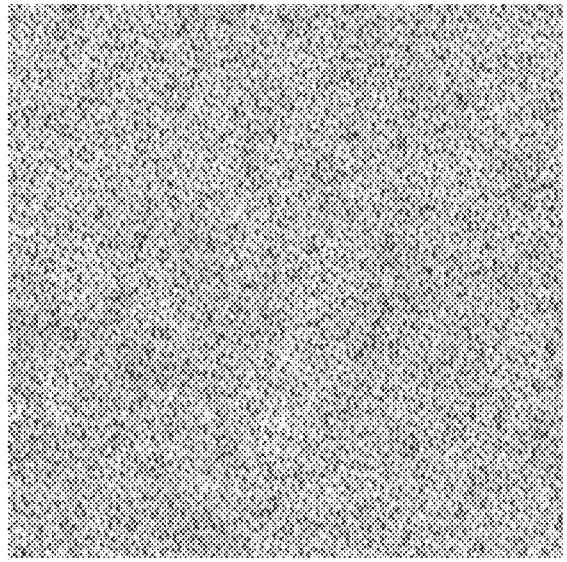
Figure 15K:
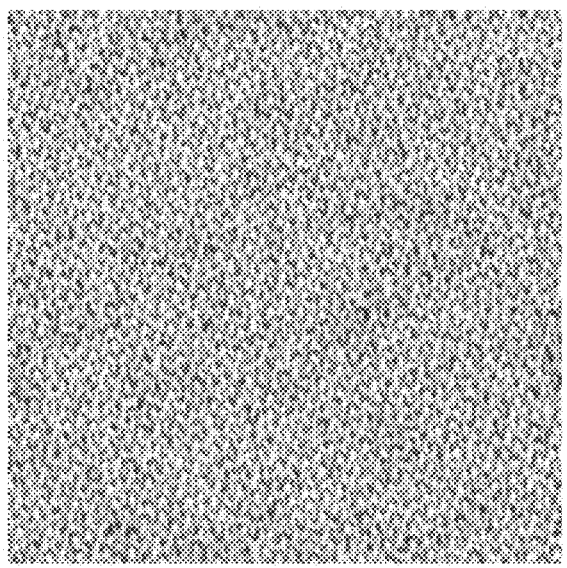
Figure 15L:
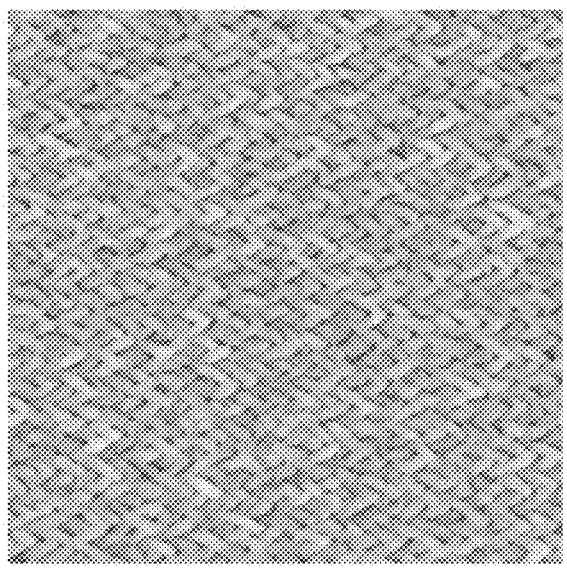
Figure 15M:
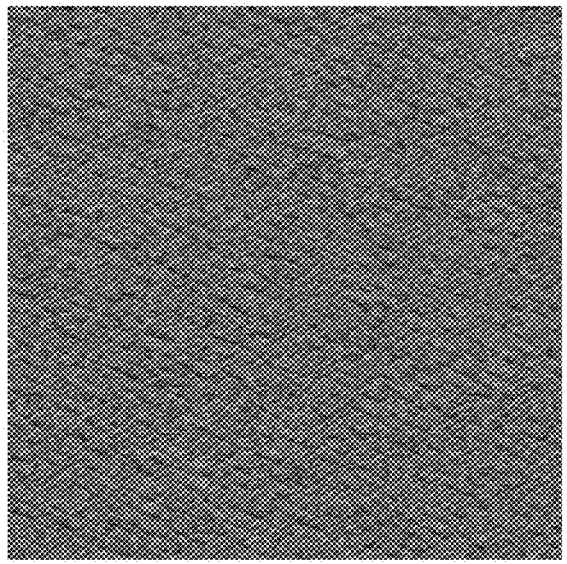
Figure 15N:
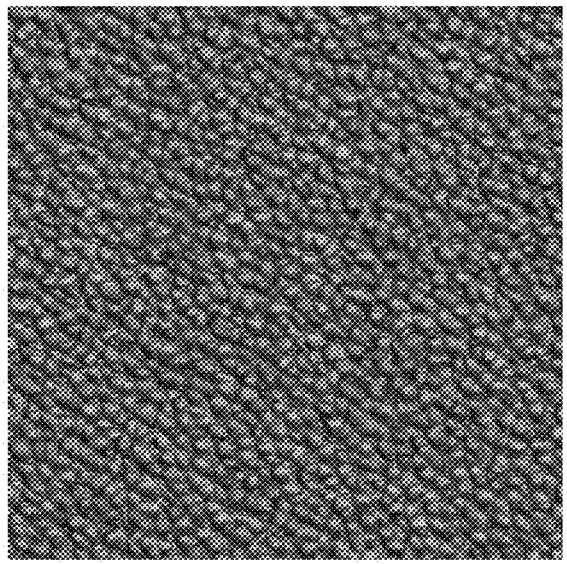
Figure 15O:
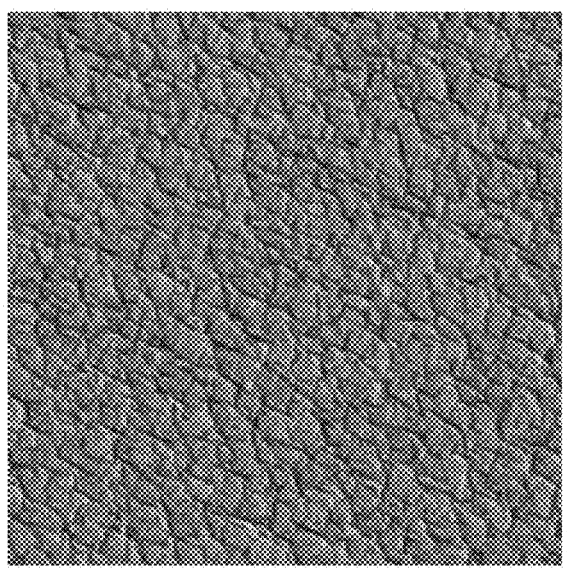
Figure 15P:
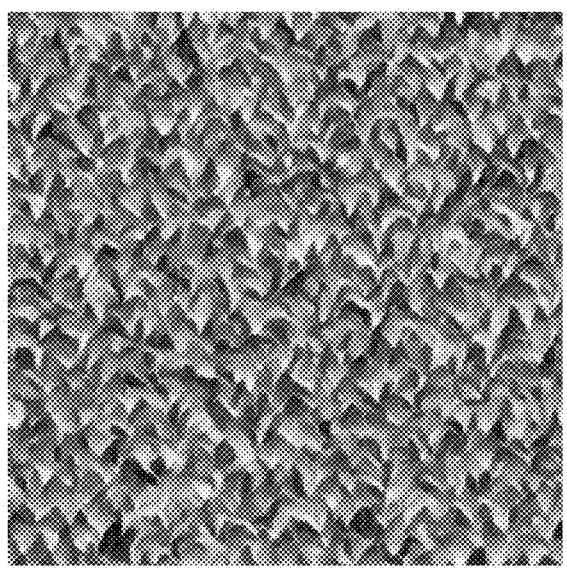
Figure 15Q:
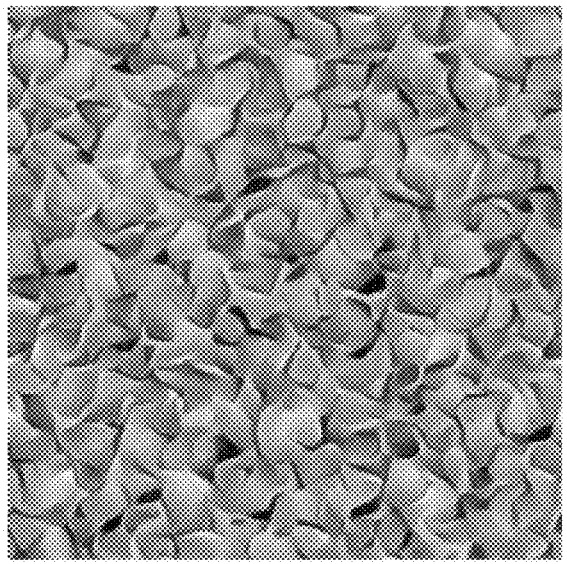
Figure 15R:
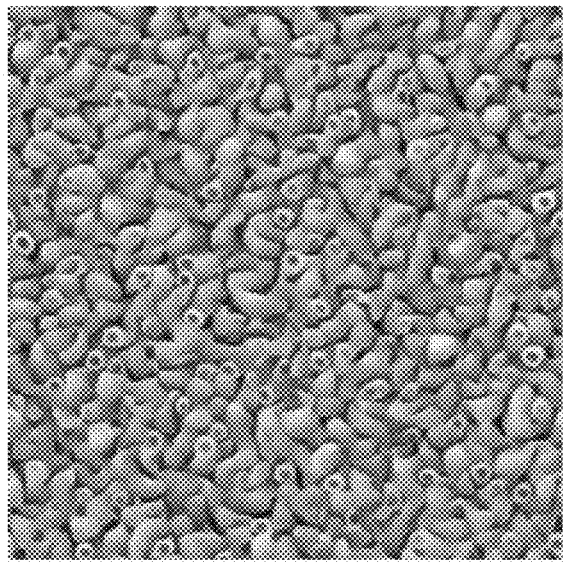
Figure 15S:
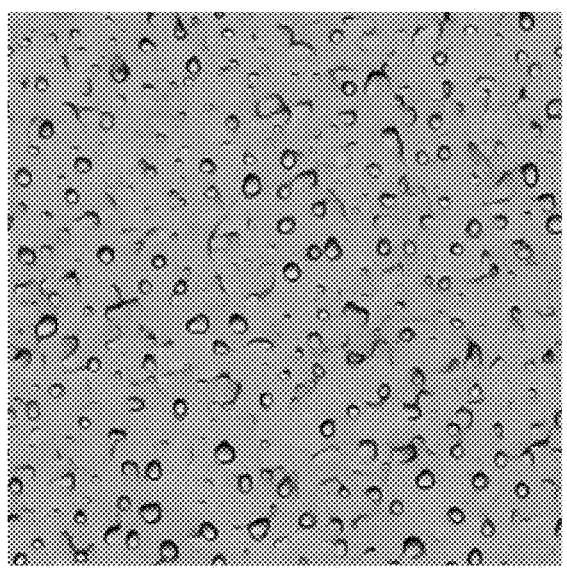
Figure 15T:
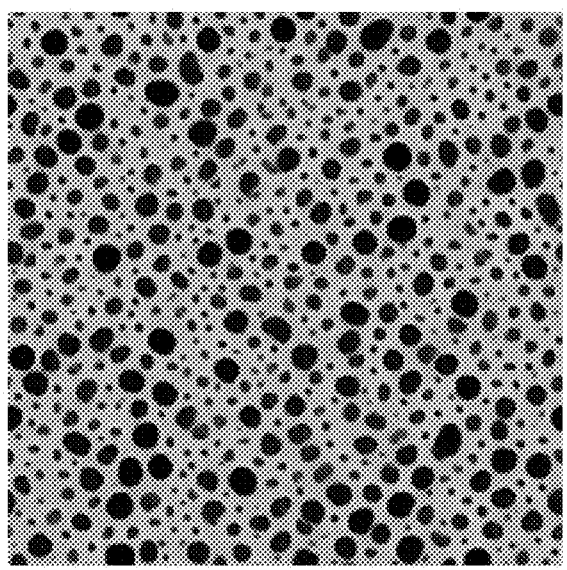
Figure 15U:
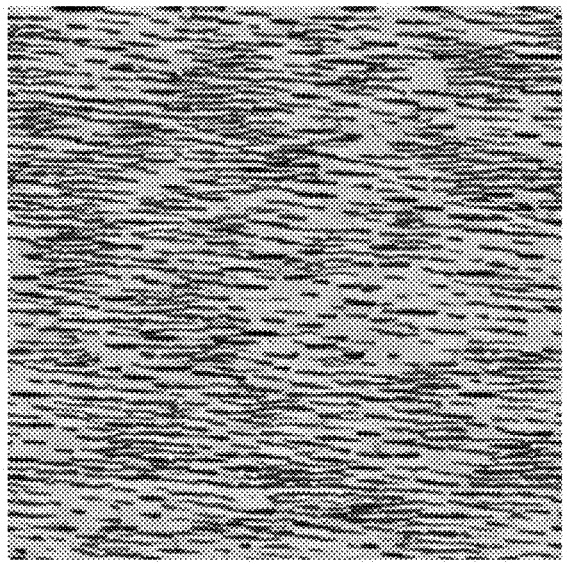
Figure 15V:
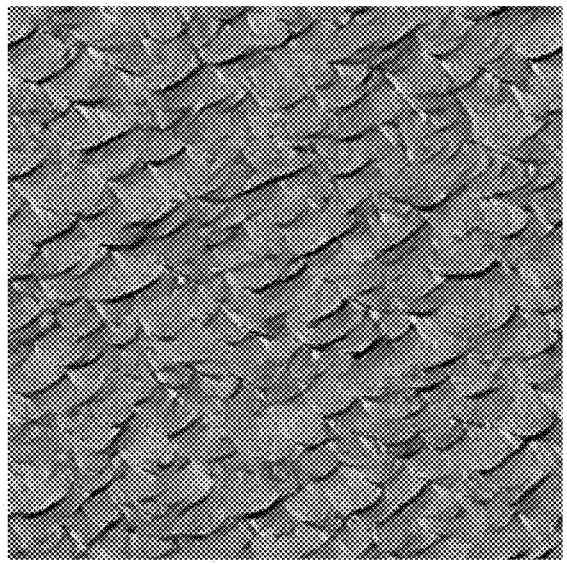

FIG. 15A shows a result of the method, when a network using the method of Johnson is trained to apply a style derived from a photograph of rice grains, and this style is applied to a watermark pattern that encodes a particular plural-bit payload (in this case a continuous tone luminance watermark, like that shown in FIG. 1). FIGS. 15B-15ZZ show similar results, when the network is trained to apply other styles to such a watermarked pattern. Some of the styles are based on photographs of physical items, e.g., grains of rice, water droplets on grass, leaves of grass, pasta noodles, candy corn, woven basket reeds, denim fabric, etc. (natural imagery). Others of the styles are based on computer graphics (synthetic imagery), such as the geometric bitonal imagery used as inputs in FIGS. 8-10.

Figure 15W:
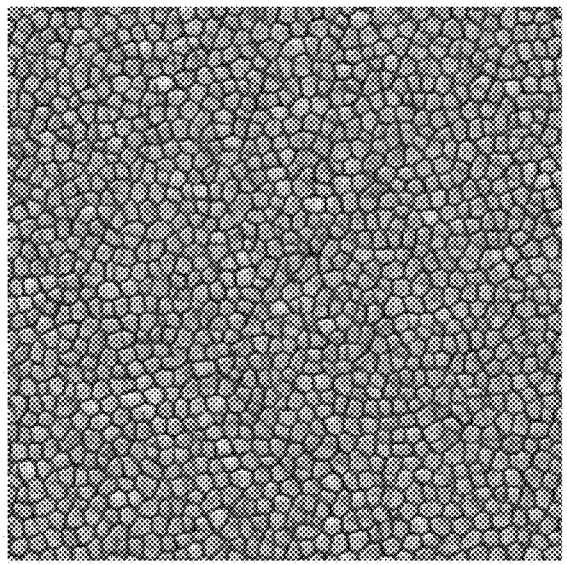
Figure 15X:
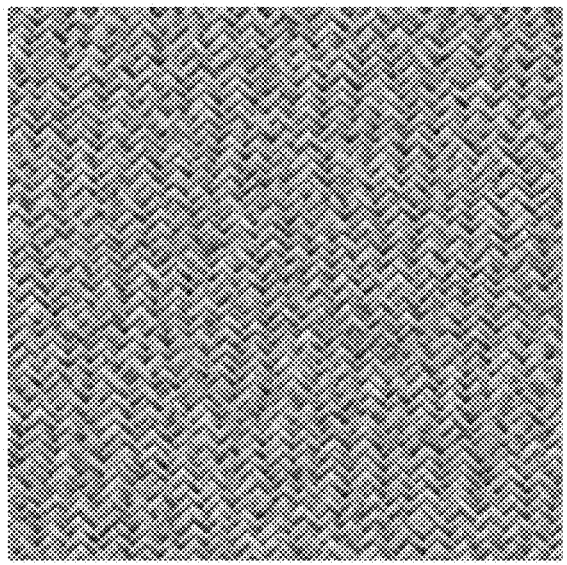

FIG. 15WW is generated by applying the Johnson method with the "Candy" style (e.g., as shown in FIG. 14) to a continuous tone watermark, converting to greyscale, increasing the contrast, and applying a blue spot color. FIG. 15XX is similarly generated, except that it is rendered in a duotone mode. That is, highlights and mid-tones of the image are identified and rendered in a first user-selected (light blue) color. The remaining, darker, tones are rendered in a second user-selected (darker blue) color.

Figure 15Y:
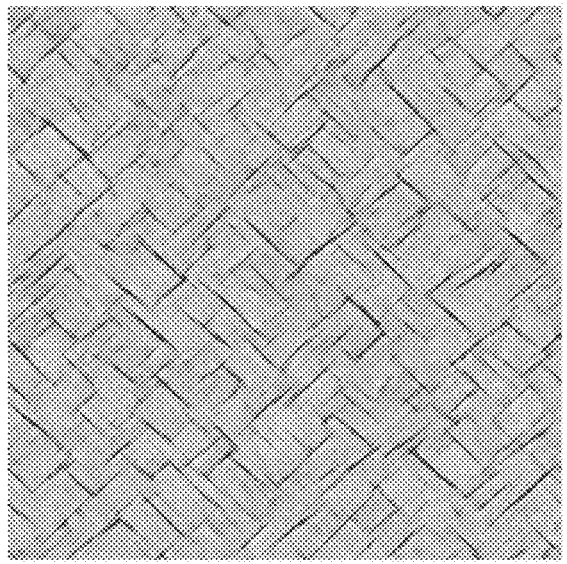
Figure 15Z:
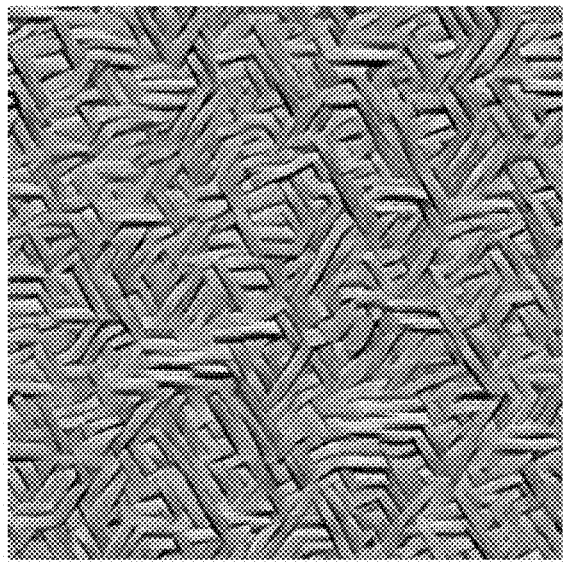
Figure 15A:
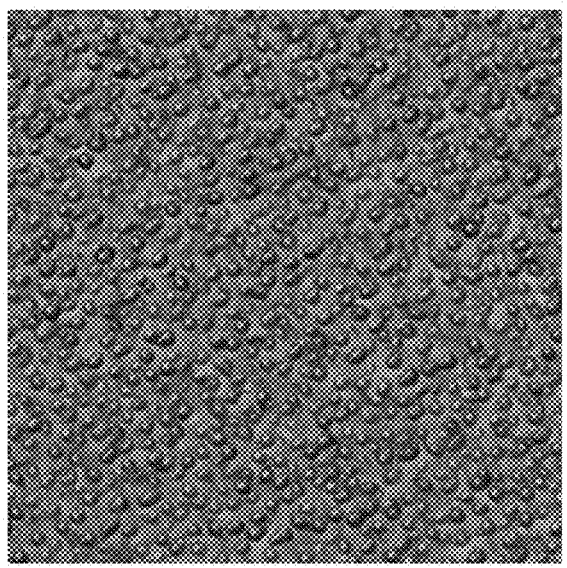
Figure 15B:
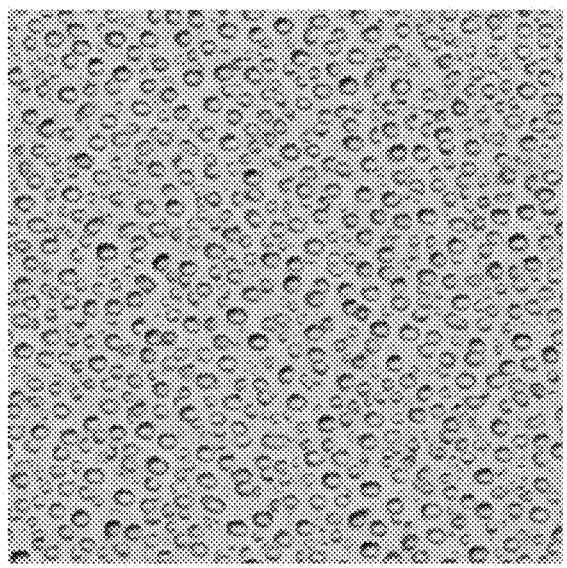
Figure 15C:
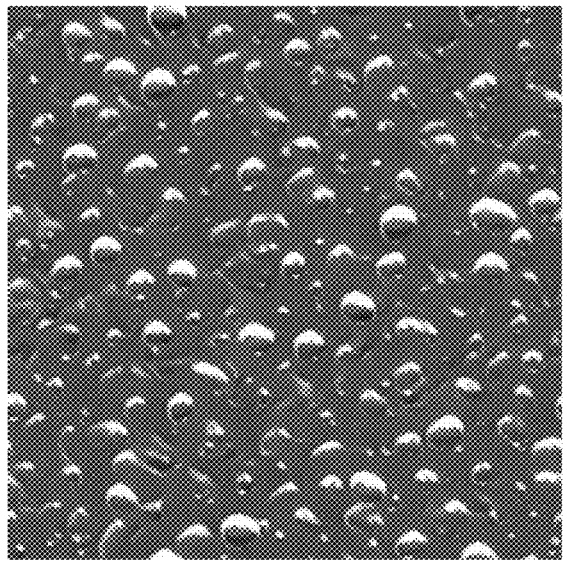
Figure 15D:
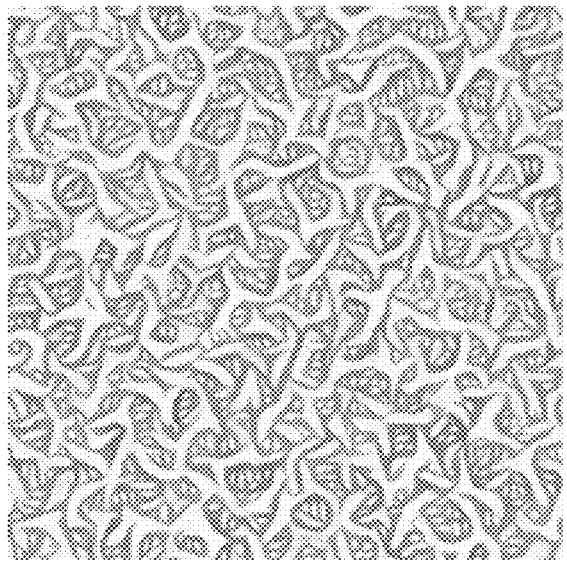
Figure 15E:
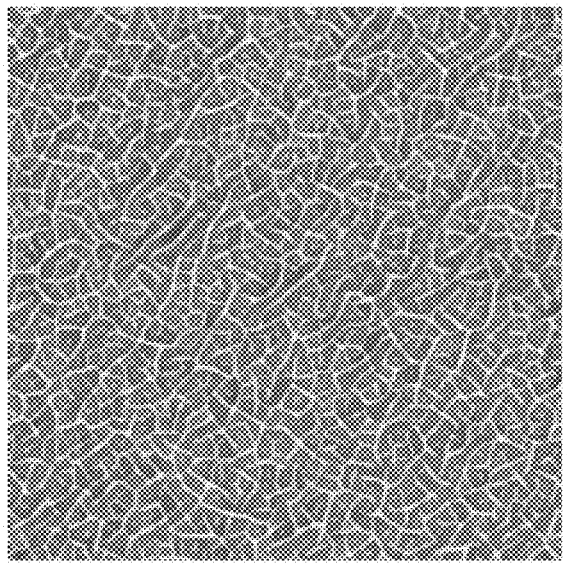
Figure 15F:
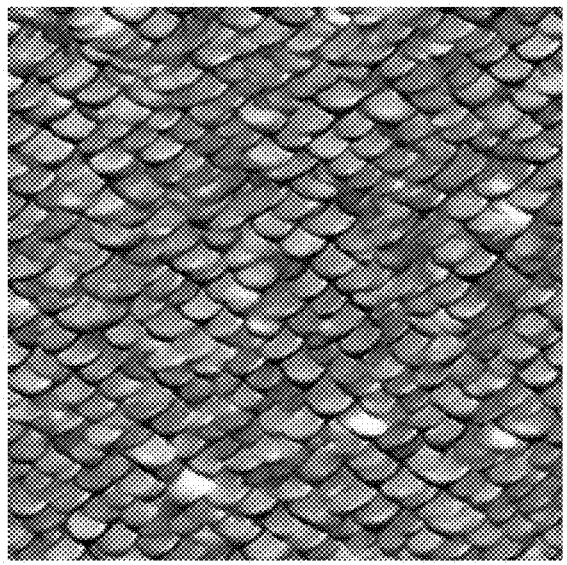
Figure 15G:
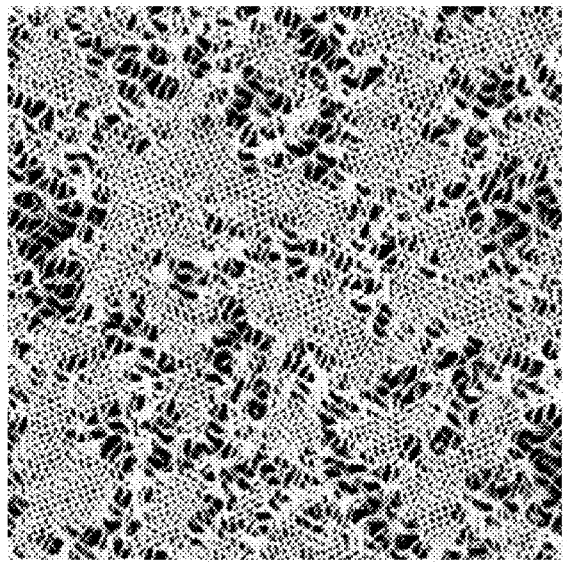
Figure 15H:
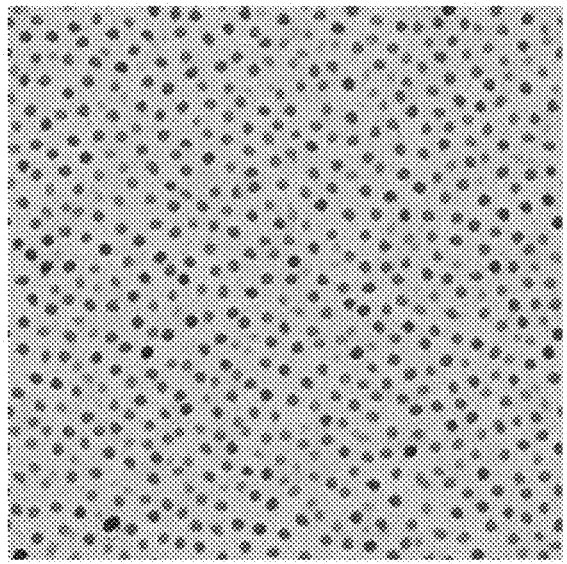
Figure 15I:
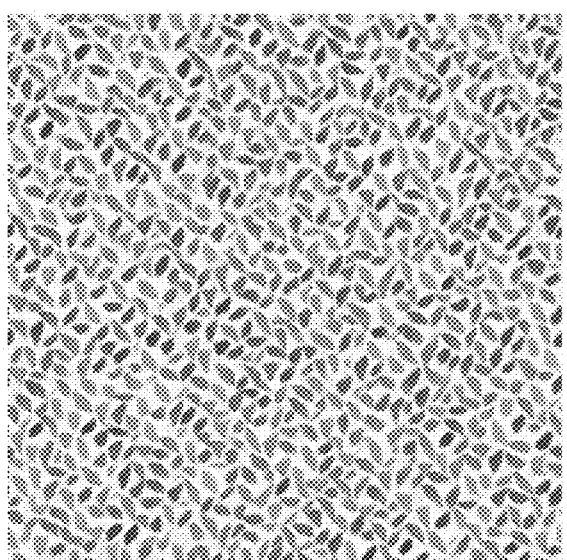
Figure 15J:
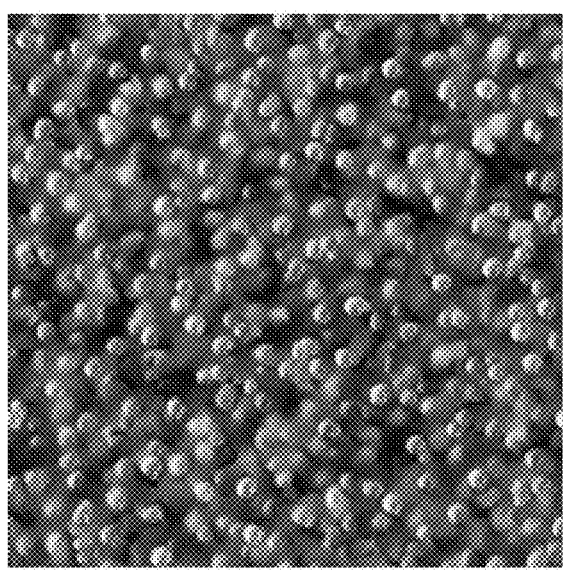
Figure 15K:
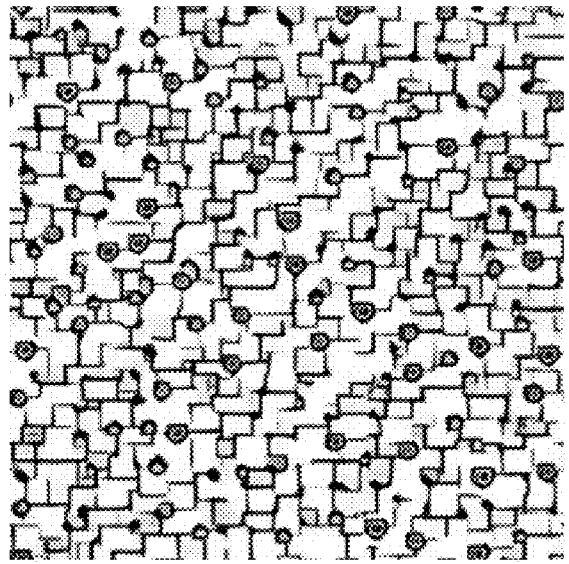
Figure 15L:
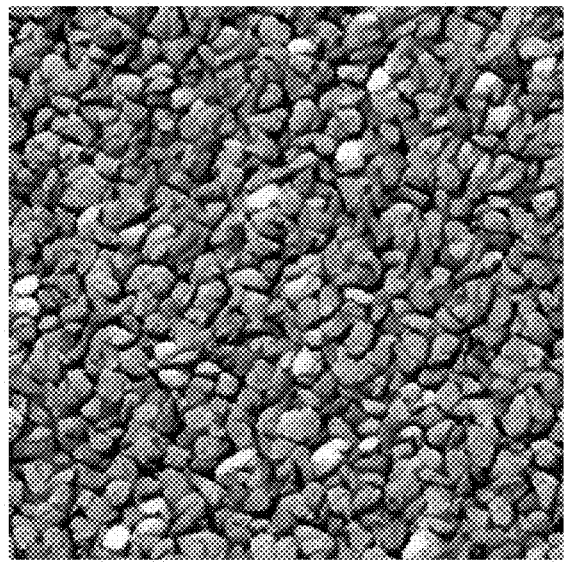
Figure 15M:
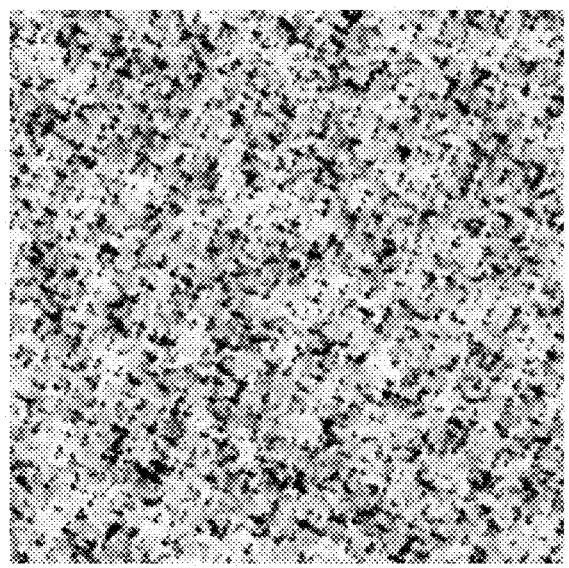
Figure 15N:
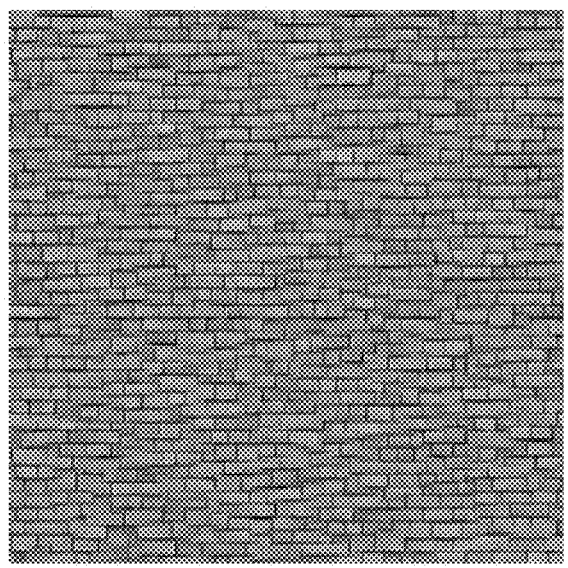
Figure 15O:
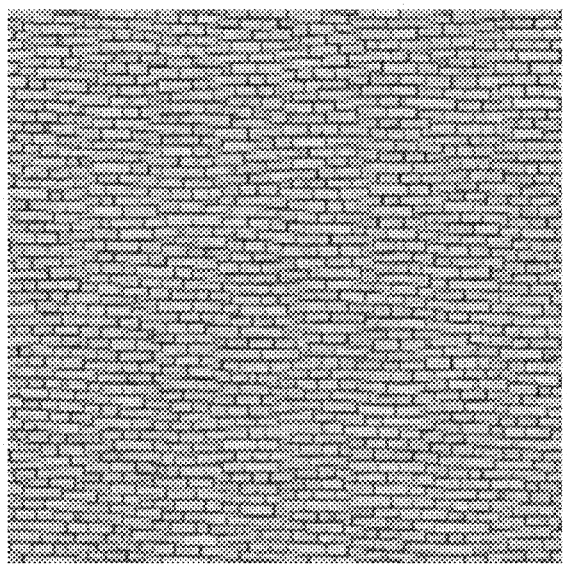
Figure 15P:
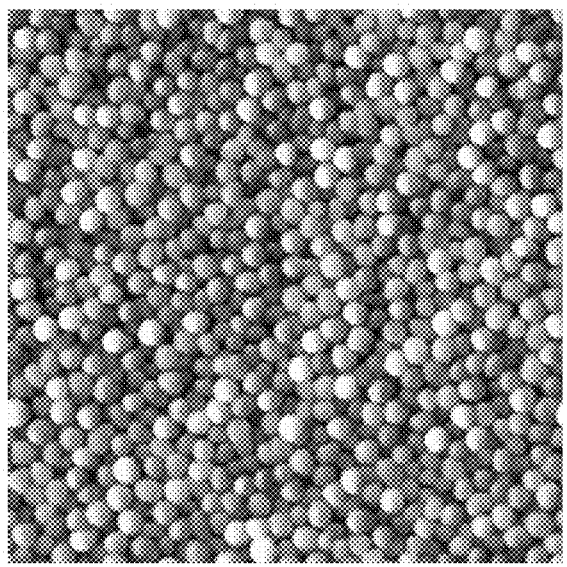
Figure 15Q:
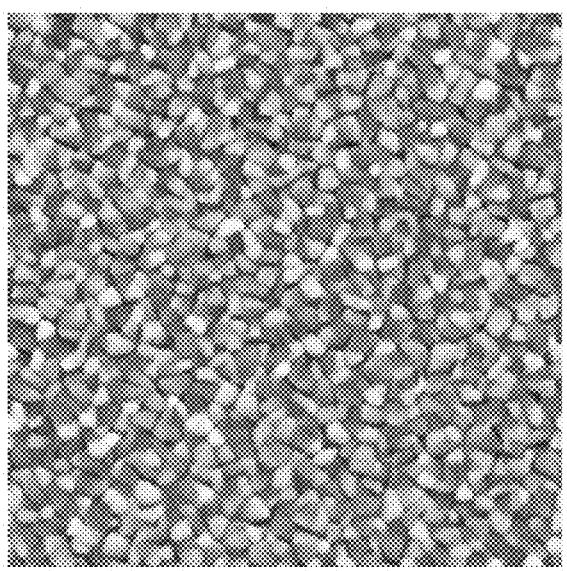
Figure 15R:
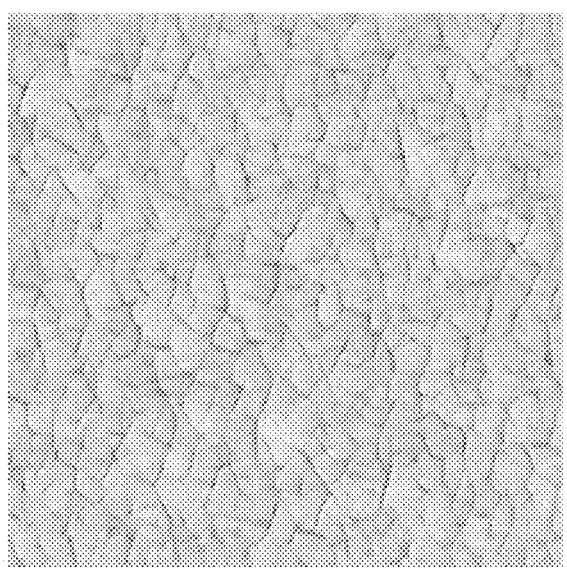
Figure 15S:
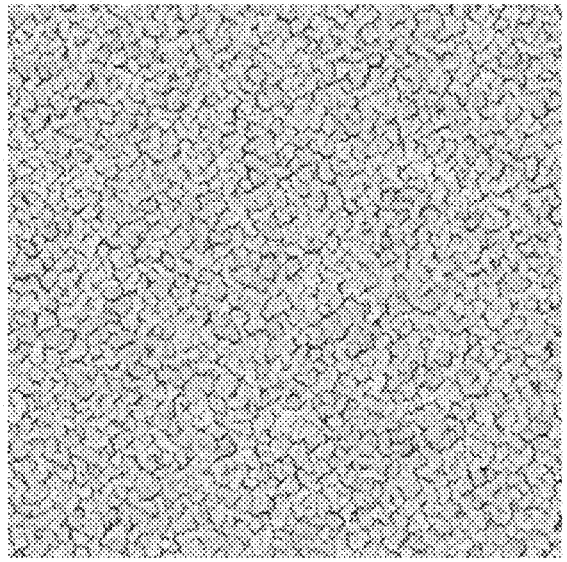
Figure 15T:
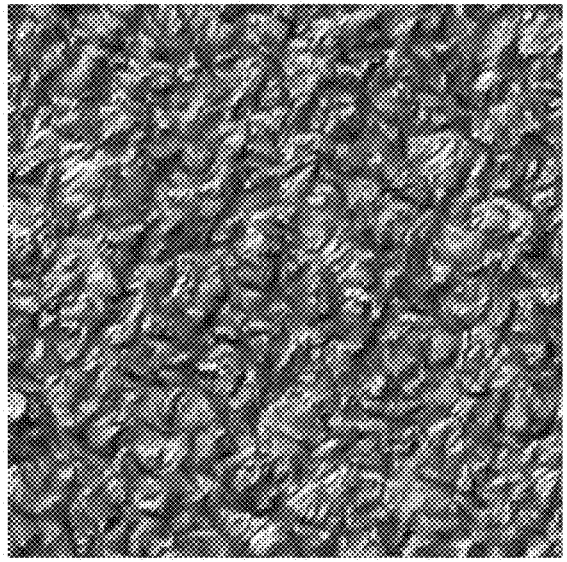
Figure 15U:
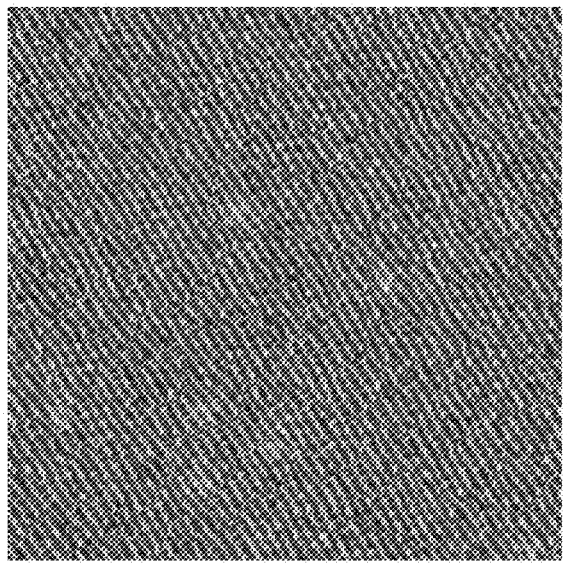
Figure 15V:
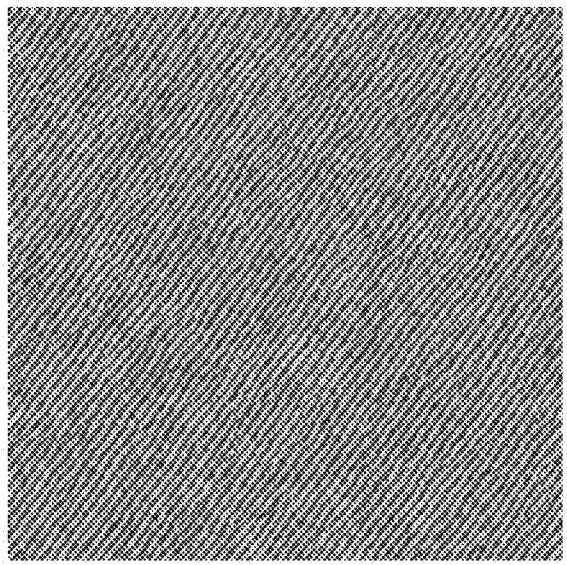
Figure 15W:
Figure 15X:
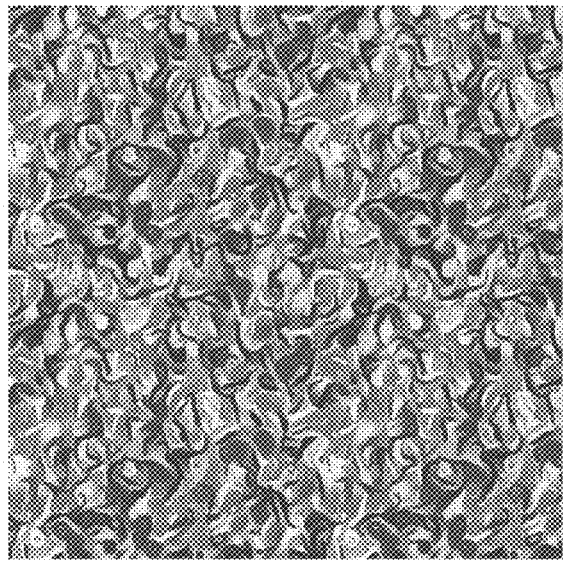
Figure 15Y:
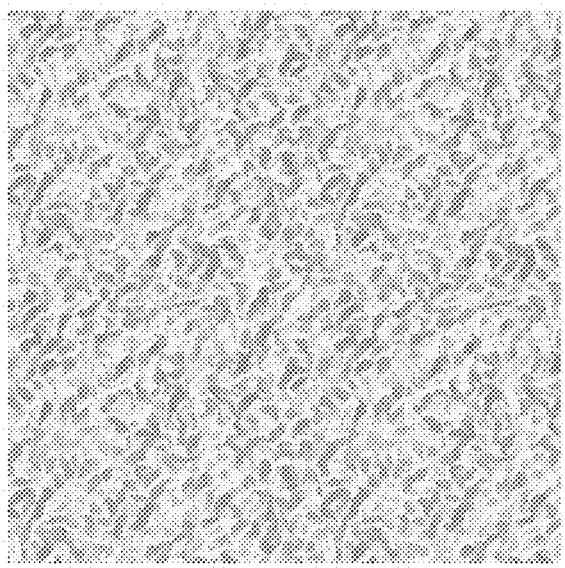
Figure 15Z:
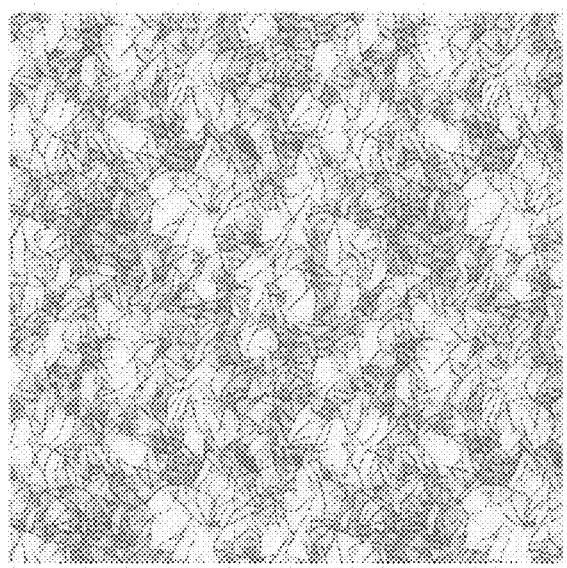

FIG. 15YY is similar to FIG. 15WW, but generated with the "Feather" style. FIG. 15ZZ is similar, but generated with the "Mosaic" style.

It will be recognized that color features of the style images (Feather, Mosaic, etc.) are omitted from the images shown in FIGS. 15WW-15ZZ. The output from the neural network is often converted to greyscale and then false-colored—commonly in monochrome—for use in a particular packaging context. (It is often the case that structure is more important than color, when adapting features from a style image for use in consumer packaging. Color is commonly changed to suit the package colors. Compare, e.g., the colored gumballs of FIG. 15PP, and the falsely-colored gumball background of FIG. 28A.)

Applicant has discovered that style images can yield better or worse results depending on the atomic scale of elements depicted in the image. The watermark pattern, to which the style is applied, is commonly comprised of units (watermark elements, or "waxels") that have a particular scale, e.g., regions of 2×2 or 3×3 pixels. The stylized results most faithfully follow the style image, and the watermark is most reliably readable from the stylized result, if the style image has a structure with elements of a comparable scale. Comparable here means a majority of elements in the style image have a scale in the range of 0.5 to 25× that of elements in the watermark. Thus, for waxels that are 3×3 pixels, individual rice grains in a style image desirably have a minimum dimension (width) of 1.5 pixels, and a maximum dimension (length) of 75 pixels. Likewise for blades of grass, weaves of fabric or basketry, droplets of water, pieces of candy corn, etc. (Best results are with items that are not just comparable, but close, in scale, e.g., in a range of 0.5×-3× the waxel dimension.)

By so doing, the style transfer network can morph the style pattern to assume spatial attributes of the watermark pattern, without either grossly departing from the style of the style image, nor distorting the scale of the watermark waxels so that their readability is impaired.

Figure 16A:
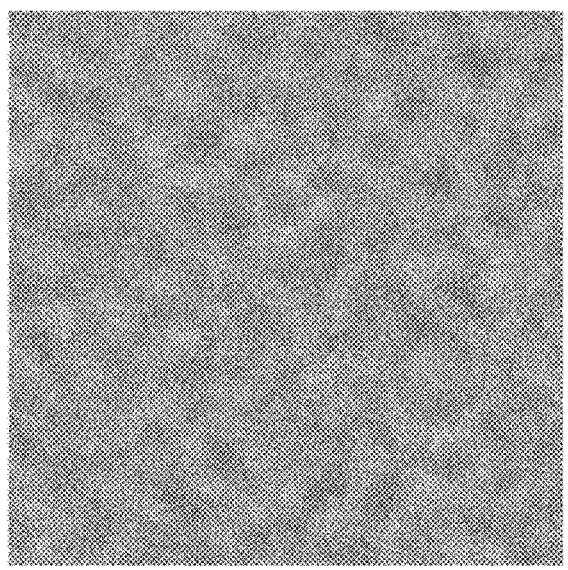
FIGS. 16A-16C show how stylization of a watermark pattern serves to scale, translate, and rotate features of a style image to mimic, or echo, features of the watermark pattern.
Figure 16B:
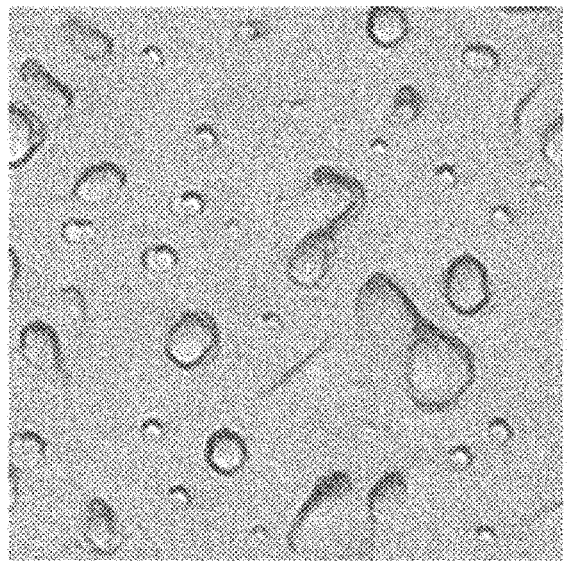
Figure 16C:
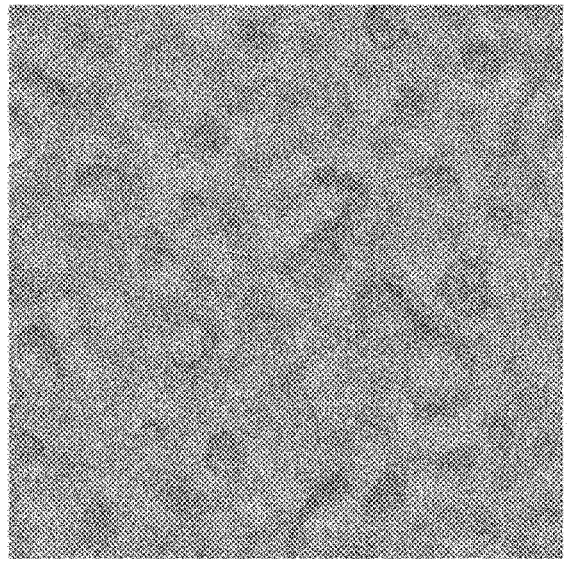

This is illustrated by FIGS. 16A-16C. FIG. 16A shows an excerpt of a watermark pattern. FIG. 16B shows a pattern resulting after a network trained with the Johnson method, using a raindrop style pattern, is applied to the FIG. 16A excerpt of a watermark pattern. FIG. 16C overlays FIGS. 16A and 16B. Note how the network has adapted the orientation, translation, scale and contours of the raindrops to conform to the orientation, translation, scale and contours of features within the watermark pattern. The correlation is somewhat astounding.

In the prior art, continuous tone watermark signals are commonly spread across host artwork at a very low amplitude, changing pixel values in an image a small amount—perhaps up to 10 or 20 digital numbers in an 8-bit (0-255) image. In some applications of style transfer-based watermarking, in contrast, the signal needn't be spread across the image; it may be lumpy—limited to local regions, e.g., just 10-30% of the image (as in the water droplets style of FIG. 16B). But in those local regions its amplitude can be much greater, e.g., spanning 100-, 200- or more bits of dynamic range; in some cases the full 256 bits. The net signal energy may be comparable, but its concentration in limited areas can make the signaling more robust to distortion and signal loss.

Review

To review, one aspect of the present technology concerns a method of generating artwork for labeling of a food package. Such method includes receiving imagery that encodes a plural-bit payload therein; neural network processing the imagery to reduce a difference measure between the processed imagery and a style image; and incorporating some or all of the neural network-processed imagery in artwork for labeling of a food package, where the plural-bit payload persists in the neural network-processed imagery. Such arrangement enables a compliant decoder module in a retail point of sale station to recover the plural-bit payload from an image of the food package.

In a related method, a first image (e.g., a host image, depicting a subject) is digitally-watermarked to encode a plural-bit payload therein, yielding a second image. This second image is neural network-processed to reduce a difference measure between the processed second image and a style image.

In such arrangements, the distance measure can be based on a difference between a Gram matrix for the processed second image and a Gram matrix for the style image.

(It will be recognized that reducing a difference measure between the processed imagery and the style image can be replaced by increasing a similarity measure between the processed imagery and the style image.)

A further aspect of the technology involves a method that starts by receiving a pattern that encodes a plural-symbol payload. This pattern is then stylized, using a neural network (typically previously-trained), to produce a stylized output image. The style is based on a style image having various features, wherein the network adapts features from the style image to express details of the received pattern, to thereby produce an image in which features from the style image contribute to encoding of said plural-symbol payload.

In another aspect, a method again starts with an input pattern that encodes a plural-symbol payload. This pattern is then stylized, using a neural network, to produce a stylized output image. The network is trained based on an image depicting a multitude of items of a first type (rain drops, rice grains, candy balls, leaves, blades of grass, stones, beans, pasta noodles, bricks, fabric threads, etc.). The network adapts scale, location, and rotation of the items as depicted in the stylized output image to echo, or mimic, features of the originally-input pattern, to thereby produce an image depicting plural of the items in a configuration that encodes said plural-symbol payload.

Another aspect of the technology concerns a method in which a user interface enables a user to define a multi-symbol payload, and to select from among plural different styles. In response to user selection of a first style, a sparse watermark pattern is generated. This pattern includes a web of lines defining plural polygons, with the arrangement of the polygons encoding the payload. In response to user selection of a second style, a continuous tone watermark pattern is generated, and elements of the second style are adapted to mimic elements of the watermark pattern and encode the payload.

Yet another method involves receiving a sparse pattern of points that encodes plural-symbol data, such as a Global Trade Item Number identifier. A transformed image is generated from this sparse pattern of points by a process that includes transforming the sparse pattern by applying a directional blur or wind filter in a first direction. Such filtering may also be applied to the sparse pattern in a second direction, and the results combined with the earlier results.

Another aspect of the technology involves a food package on which artwork is printed, where the artwork encodes a plural bit payload (e.g., including a Global Trade Item Number identifier). The artwork has first and second regions, which may be adjoining. The first region includes a background pattern that has been stylized from a watermarked input image using a neural network.

In such arrangement, the second region may include a watermarked image that has not been stylized using a neural network, yet the watermark included in the second region is geometrically-aligned with a watermark signal included in the first region. By such variant arrangement, a detector can jointly use signals from both regions in decoding the payload.

Still another aspect of the technology involves receiving a watermarked image, and then stylizing the watermarked image, to produce a styled output. This styled output is then false-colored, and incorporated into artwork.

A further aspect involves obtaining data defining a square watermark signal block, comprising N rows and N columns of elements. This signal block encodes an identifier, such as a Global Trade Item Number identifier. Plural of these row and columns are replicated along two adjoining edges of the square signal block, producing an enlarged signal block having M rows and M columns of elements. The enlarged block is then sent for processing to a style-transfer neural network. The enlarged signal block is received back after processing, and an N row by N column portion is excerpted from the received block. This excerpt is then used, in tiled fashion, within artwork to convey the identifier to camera-equipped devices (e.g., enabling a POS terminal to add an item to a shopper's checkout tally).

Yet another aspect is a method including: receiving a pattern of dots encoding a plural-symbol payload, and then padding the pattern of dots, by replicating portions of the pattern along at least two adjoining sides of the square, to yield a larger pattern of dots. A pattern of polygons is then generated from this larger pattern of dots. The polygon pattern can then be used as a fill or background pattern in commercial art, such as product packaging.

Still another method includes obtaining a watermark signal that encodes an identifier and is represented by watermark signal elements (e.g., waxels) of a first size. This watermark signal is stylized in accordance with a style image, which depicts multiple items of a first type (e.g., grains of rice, droplets of water, pieces of candy), where the items depicted in the style image have a size that is between 0.5 and 25 times said first size.

Yet another aspect of the technology concerns a method for producing a code for message signaling through an image. The method employs a neural network having an input, one or more outputs, and plural intermediate layers. Each layer comprises plural filters, where each filter is characterized by plural parameters that define a response of the filter to a given input. The method is characterized by iteratively adjusting an input test image, based on results produced by the filters of said neural network, until the test image adopts both (1) style features from one image, and (2) signal-encoding features from a second image.

Yet a further aspect of the technology is a method for producing a code for message signaling through an image, using a deep neural network—which may have been trained to perform object recognition. The network has an input, one or more outputs, and plural intermediate layers, where each layer includes multiple filters, each characterized by plural parameters that define a response of the filter to a given input. The method includes receiving an image comprising a machine readable code that is readable by a digital watermark decoder, where the machine readable code includes a signal modulated to convey a plural-symbol payload. This machine readable code image is presented to the network, causing the filters in the network layers to produce machine readable code image filter responses. The method further includes receiving an artwork image; presenting the artwork image to the network; and determining correlations between filter responses in different of the layers, to thereby determine style information for the artwork image. The method further includes receiving an initial test image, and presenting same to the neural network, causing filters in plural of the layers to produce test image filter responses. Style information for the test image is then determined by establishing correlations between the test image filter responses of plural of the filter layers. A first loss function is determined based on differences between the test image filter responses and the machine readable code image filter responses, for filters in one or more of said layers. A second loss function is determined based on a difference between the style information for the first and test images. The test image is then adjusted based on the determined first and second loss information. This procedure is repeated plural times, to incrementally adjust the test image to successively adopt more and more of the style of the artwork image. By such arrangement, the test image is transformed into an image in which the modulated signal is obfuscated by the style of the artwork image, yet is still readable by the digital watermark decoder.

Still another aspect of the technology concerns a method for producing an obfuscated code for message signaling through an image. This method includes: receiving a plural symbol payload; applying an error correction coding algorithm to the plural symbol payload to generate an enlarged bit sequence; and processing the enlarged bit sequence with pseudo-random data to yield a pseudo-random bit sequence. This bit sequence is mapped to locations in an image block. A counterpart image block depicts a spatial domain counterpart to plural signal peaks in a spatial frequency domain, and the two image blocks are combined to yield a code pattern from which the plural symbol payload can be recovered by a decoder. This code is applied to a multi-layer convolutional neural network. Filter responses for one or more layers in the network are stored as first reference data. A pattern (e.g., a bitonal geometric pattern) is then applied to the convolutional neural network. Data indicating correlations between filter responses between two or more of the layers, are stored as second reference data. A test image is then modified based on the first and second reference data, to yield an obfuscated code pattern, different from the code pattern and different from said geometrical pattern, from which the plural symbols can be recovered by the decoder.

As noted, one use of these technologies is in producing artwork for use in packaging retail items, such as grocery items. For example, a part of the artwork can be based on the stylized output image. This enables a camera-equipped point of sale apparatus to identify the package, by decoding the plural symbol payment (which may comprise a GTIN).

Another aspect of the technology is a packaged food product having label artwork that is derived from a pattern substantially similar (in a copyright sense) to one of the patterns illustrated in FIGS. 1, 8-11, 13, 14A, 15A-15ZZ, 19A, 19B, 21D, 21E, 29A-29C, 30A, 30B, 31A-41, and 44. The pattern may be monochrome or colored (included false-colored).

Review of the Johnson Method

The earlier-discussed Gatys approach has three inputs: a style image, a content image, and a test image (which may be a noise frame). A network iteratively modifies the test image until it reaches a suitable compromise between the style image and the content image—by optimizing a loss function based on differences from those first two inputs. The Johnson approach, in contrast, uses a single-pass feed-forward network, trained to establish parameters configuring it to apply a single style image. After training it has just one input—the content image.

Johnson's feed-forward image transformation network is a convolutional neural network configured by parameter weights W. It transforms input images x into output images ŷ by the mapping:

$$\hat{y} = f_W(x)$$

The weights W are established using information from a second, VGG-16 network, termed a loss network. This network is one that has been pretrained for image classification, e.g., on the ImageNet dataset. Such training configures it to produce features that represent semantic and perceptual information about applied imagery. These features are used to define a feature reconstruction loss and a style reconstruction loss that measure differences in content and style between images.

For each input image x there is a content target $y_c$ and a style target $y_s$. For style transfer, the content target $y_c$ is actually the input image x, and the output image ŷ should combine the content of $x=y_c$ with the style of ys. Two perceptual scalar loss functions are used in this process, to measure high-level semantic and perceptual differences between images. Instead of encouraging the pixels of the output image ŷ (i.e., fw(x)) to exactly match the pixels of the target image y, the Johnson network encourages them to have similar feature representations as computed by the loss network.

The first loss function indicates similarity to the originally-input image. This is termed the feature reconstruction loss. Consider ϕj(x) as the activation of the jth layer of the loss network ϕ when processing an image x. If j is a convolution layer having C filters, then ϕj(x) will be a feature map of shape $C_1 \times H_1 \times W_1$. The feature reconstruction loss is the (squared, normalized) Euclidean distance between feature representations:

$$\ell_{feat}^{\phi,j}(\hat{y}, y) = \frac{1}{C_j H_j W_j} \|\phi_j(\hat{y}) - \phi_j(y)\|_2^2$$

An image ŷ that minimizes this feature reconstruction loss for early layers in the VGG-16 image recognition network, tends to produce images that are visually indistinguishable from y. That's not desired. Instead minimization of this feature reconstruction loss for one or more later layers in the network is employed. This produces images that preserve general shape and spatial structure, but permits variation in color, texture, and shape details. Thus, applying this feature reconstruction loss in training the image transformation network encourages the output image ŷ to be perceptually similar (semantically similar) to the target image y, but does not drive the images to correspond exactly.

The second loss function indicates style similarity to the style image. This is termed the style reconstruction loss. As in Gatys, a Gram matrix is used.

Again, let ϕj(x) be the activations at the jth layer of the loss network ϕ for the input x, which is a feature map of shape $C_j \times H_j \times W_j$. The Gram matrix $G_j^\phi(x)$ is the Cj×Cj matrix whose elements are given by:

$$G_j^\phi(x)_{c,c'} = \frac{1}{C_j H_j W_j} \sum_{h=1}^{H_j} \sum_{w=1}^{W_j} \phi_j(x)_{h,w,c} \phi_j(x)_{h,w,c'}$$

The style reconstruction loss is the squared Frobenius norm of the difference between the Gram matrices of the output and target images:

$$\ell_{style}^{\phi,j}(\hat{y},y) = \|G_j^\phi(\hat{y}) - G_j^\phi(y)\|_F^2$$

Minimizing this style reconstruction loss minimizes stylistic differences between the output and target images, but may mess with the spatial structure. Johnson found that generating the style reconstruction loss using information from later layers in the VGG-16 network helps preserve large-scale structure from the target image. Desirably, information from a set of layers J, rather than a single layer j is used. In such case the style reconstruction loss is the sum of losses for all such layers.

In a particular embodiment, Johnson computes the feature reconstruction loss using feature data output by layer relu2_2 of the VGG-16 loss network. and computes the style reconstruction loss from feature data output by layers relu1_2, relu2_2, relu3_3 and relu4_3.

To train weights W of the image transformation network, Johnson applies the 80,000 images of the Microsoft COCO dataset to the network. The images output by the image transformation network are examined by the loss network to compute feature reconstruction loss and style reconstruction loss data. The weights W of the image transformation network are adjusted, in a stochastic gradient descent method, to iteratively reduce a weighted combination of the two loss function $\ell_1$ and $\ell_2$, using corresponding regularization parameters $\lambda_i$:

$$W^* = \mathrm{argmin}_W E_{x,\{y_i\}}\left[\sum_{i=1} \lambda_i \ell_i(f_W(x), y_i)\right]$$

(Johnson applied normalization—updating weights W of his image transformation network—in batch fashion. Ulyanov later demonstrated that superior results may be achieved by applying normalization with a batch size of 1, i.e., with every training image. (See "Improved Texture Networks: Maximizing Quality and Diversity in Feed-Forward Stylization and Texture Synthesis," Proc. of IEEE Conf. on Computer Vision and Pattern Recognition, 2017, pp. 6924-6932). For present purposes, the Ulyanov improvement is regarded as falling within the Johnson method.)

In the above-detailed manner, the image transformation network is trained to cause the output images to adopt the style of the style image, while still maintaining the general image content and overall spatial structure of the input images.

(Naturally, this is an abbreviated summary of the Johnson method. The reader is directed to the Johnson paper, and the many public implementations of his method on Github, for additional information.)

Further Arrangements

Applicant has extended the above-detailed methods to combine elements from three images. This is illustrated by FIGS. 17A-E.

Figure 17A:
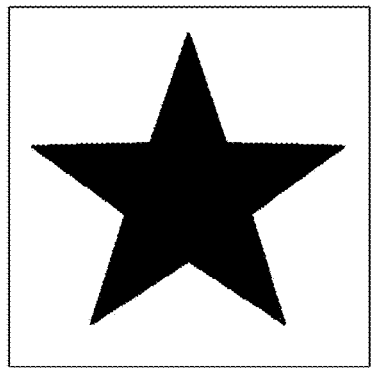
FIGS. 17A-17E illustrate how three patterns can be combined: a host image, a watermark pattern, and a style image.
Figure 17B:
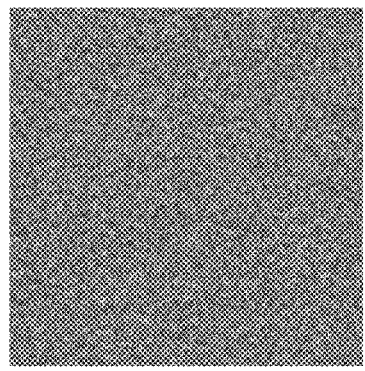
Figure 17C:
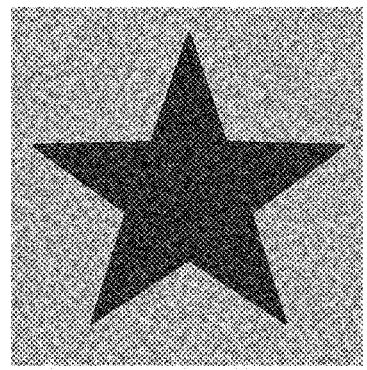
Figure 17D:
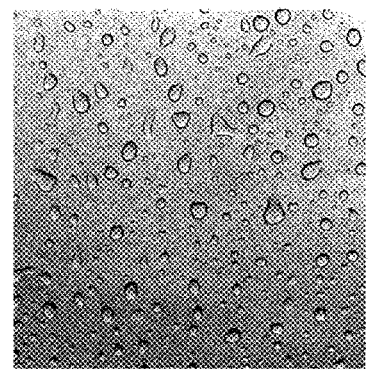
Figure 17E:
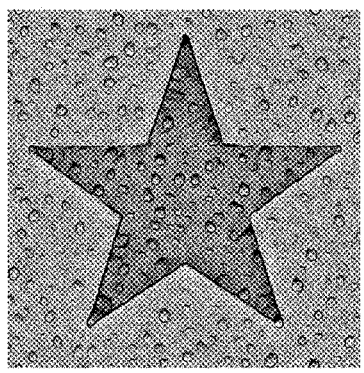

FIG. 17A is first host artwork, in a vector format. FIG. 17B is a watermark pattern that encodes a particular payload. These two images are combined (e.g., by weighted summing, multiplication, or otherwise) to yield the watermarked artwork of FIG. 17C. FIG. 17D shows a style image with which a network has been trained by the Johnson method. FIG. 17E shows the composite artwork of FIG. 17C, after stylization by the trained Johnson network. (As just-discussed in connection with FIGS. 16A-16C, the stylized elements (droplets) in FIG. 17E are adapted in size, position, and contours, to conform to features within the FIG. 17B watermark pattern.)

One application of the just-described process is to generate logos of consumer brands, which are both watermarked (e.g., to convey a URL to a corporate web page) and stylized. Such stylized logos can be printed, e.g., on packaging artwork.

Figure 18A:
FIGS. 18A-18C illustrate the Lenna image styled with images of candy balls, denim, and grass, respectively.
Figure 18B:
Figure 18C:

The host artwork needn't be bitonal (e.g., black and white), and it needn't be in vector format. Instead, it can be continuously-toned, such as a greyscale or RGB image. For example, FIG. 18A shows a watermarked version of the Lenna image, after stylization using the network that produced FIG. 15PP (i.e., applying a candy ball style). FIG. 18B shows a watermarked version of Lenna stylized with the same network that produced FIG. 15VV (i.e., applying a denim fabric style). FIG. 18C shows a watermarked version of Lenna stylized with the same network that produced FIG. 15F (applying a grass style).

Since stylization typically imparts a dominating texture on the artwork, the watermark signal can be embedded at an amplitude far greater than usual. As noted, continuous tone watermark signals are usually applied at amplitudes small enough to prevent the watermark patterning from being perceptible to casual viewers. But since the image texture is so-altered by stylization, patterning due to the watermark signal is masked—even if grossly visible prior to stylization (as in FIG. 17C).

Figure 19A:
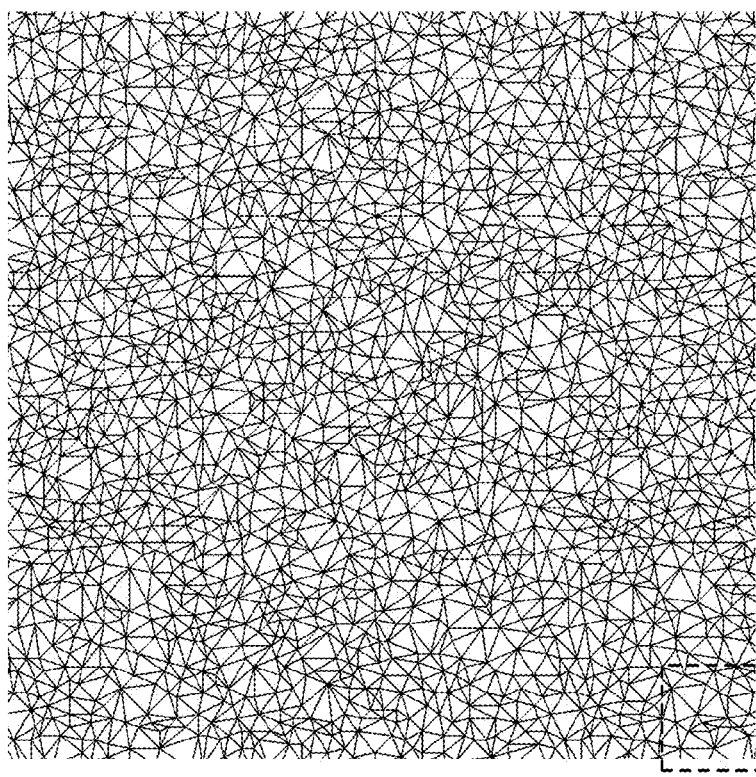
FIGS. 19A-19C illustrate that a sparse mark, rendered as a Delaunay triangulation, can be stylized with a pattern of leaves, resulting in an output image in which the leaves are morphed in scale, location and rotation to correspond to triangles of the Delaunay pattern.
Figure 19C:
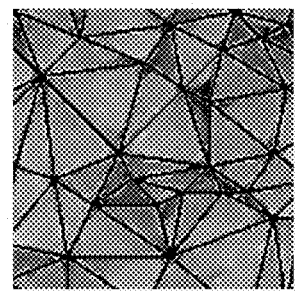
Figure 19B:
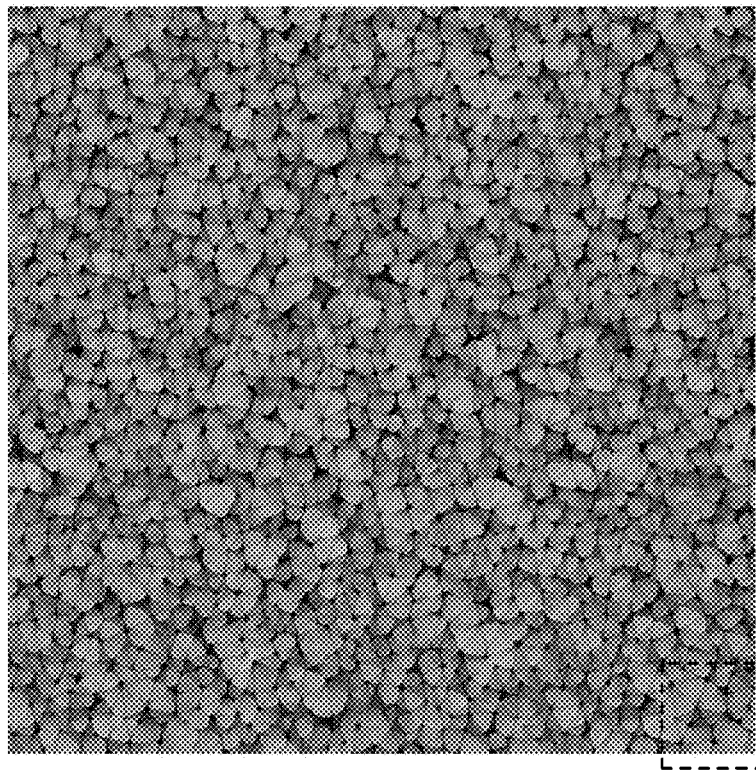

As noted, the detailed methods can be applied to any watermark pattern or watermarked imagery. FIG. 19A shows a sparse watermark rendered as a Delaunay triangle pattern. FIG. 19B shows this same watermark after stylization with a leaf pattern. Again, each of the leaf elements in FIG. 19B has been scaled, rotated, and positioned to correspond to one of the component triangles within the Delaunay pattern. FIG. 19C shows enlargements of the lower right corners of the two images (indicated by the dashed squares in FIGS. 19A and 19B) overlaid together, by which the correspondence can be examined.

A single pattern can be parlayed into a dozen or more different patterns using invertible transforms. Invertible transforms are those that can be reversed—enabling a transformed set of information to be restored back to its original state.

In geometry, invertible transforms include affine transforms such as rotation, scaling (both scaling uniformly in x- and y-, and non-uniformly), translation, reflection, and shearing. Invertible geometrical transforms also include non-affine transforms, such as perspective, cylindrical, spherical, hyperbolic and conformal distortion. There are other invertible transforms as well, such as color transforms, color inversion, etc.

Figure 20:
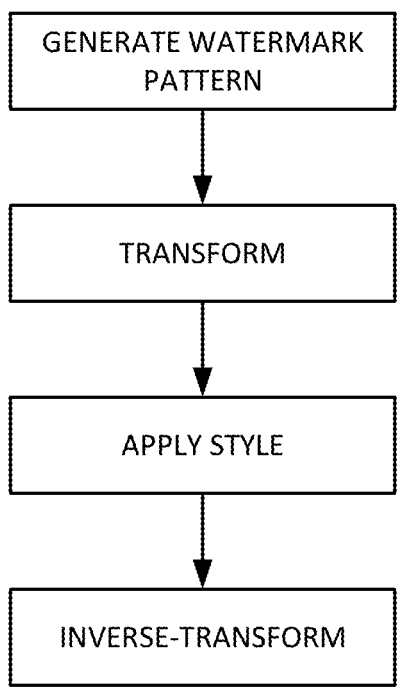
FIG. 20 depicts an inverted transform method according to one aspect of the technology.

A general process employing this aspect of the technology is depicted by FIG. 20. A watermark pattern is generated, transformed, stylized, and inverse-transformed.

Figure 21A:
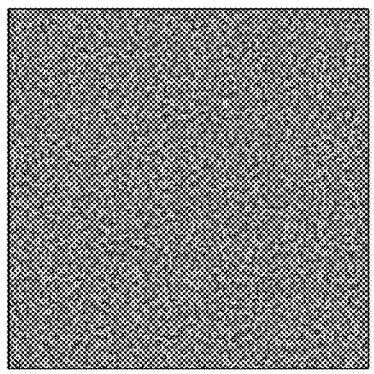
FIGS. 21A-21E depicts application of an inverted transform method in connection with a Voronoi pattern.
Figure 21B:
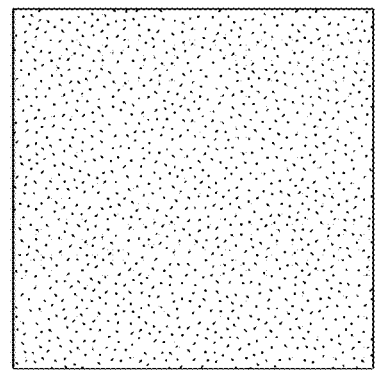
Figure 21C:
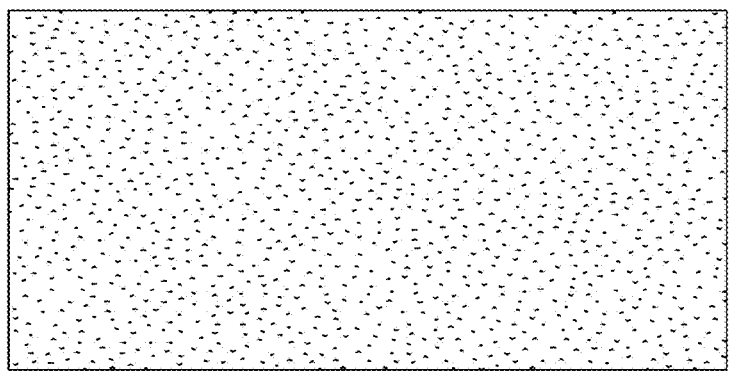
Figure 21D:
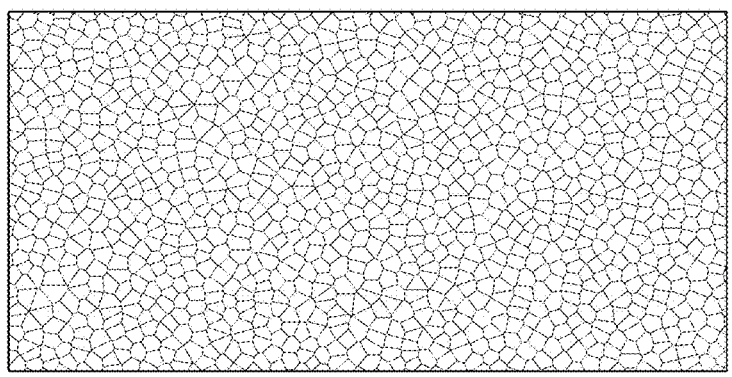
Figure 21E:
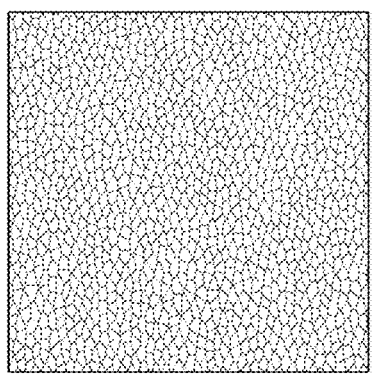

In a particular embodiment of the FIG. 20 process, a continuous tone watermark pattern is generated (FIG. 21A), containing a desired payload. A sparse mark (FIG. 21B) is derived from the FIG. 21A pattern, e.g., by thresholding, or by one of the techniques detailed in the cited patent documents. (The dots are enlarged in size for sake of visibility.) The FIG. 21B pattern is then asymmetrically (differentially) scaled—expanding the horizontal expanse by a factor of two—producing the FIG. 21C pattern. That pattern is then converted into a corresponding Voronoi pattern, shown in FIG. 21D. That pattern is then inverse-transformed—compressing the horizontal expanse by a factor of two—producing the FIG. 21E pattern.

The original watermark pattern is thus differentially-scaled, and then inverse-differentially-scaled. This restores the watermark pattern to its original state. But the Voronoi cells are added in the middle of the process. They do not undergo two complementary operations. Rather, that Voronoi pattern is just horizontally compressed by a factor of two (i.e., scaled by a horizontal factor of 0.5). Its appearance thus changes.

Figure 22:
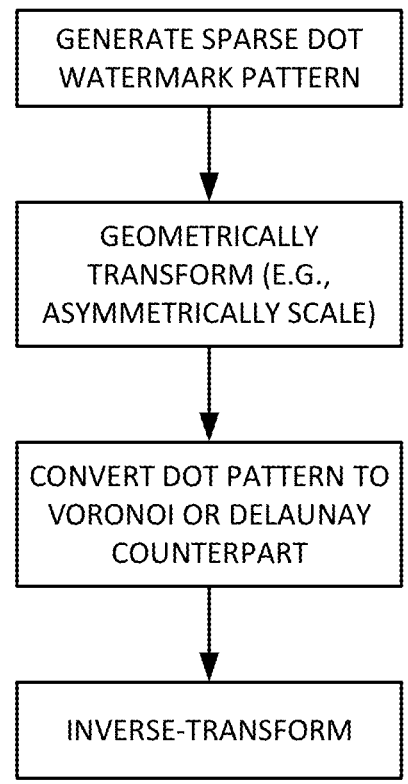
FIG. 22 depicts an inverted transform method according to one aspect of the technology.
Figure 23A:
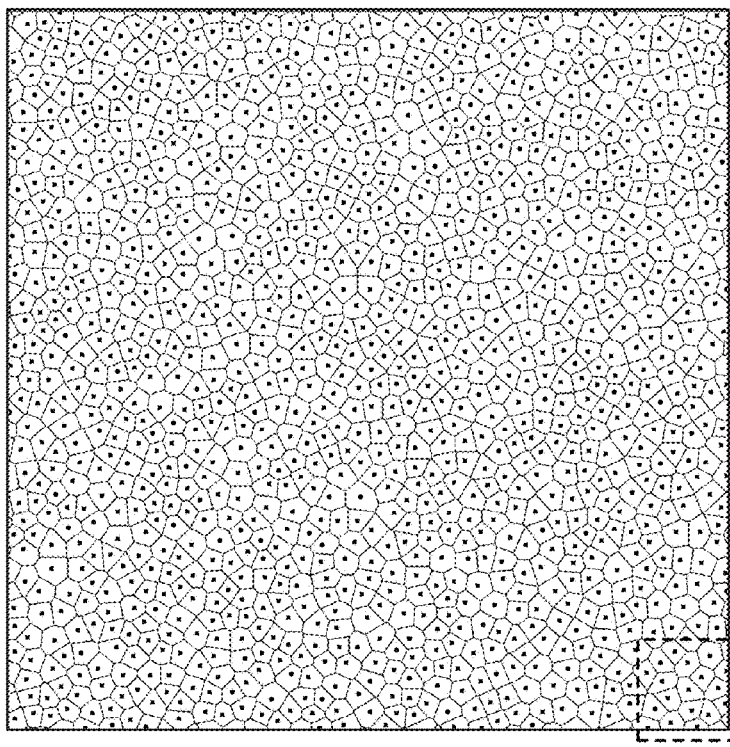
FIGS. 23A and 23B show a Voronoi pattern based on a sparse pattern of dots, and the same pattern after application of the inverted transform method of FIG. 22.
Figure 24A:
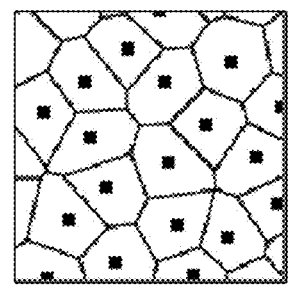
FIGS. 24A and 24B are enlargements from FIGS. 23A and 23B.
Figure 23B:
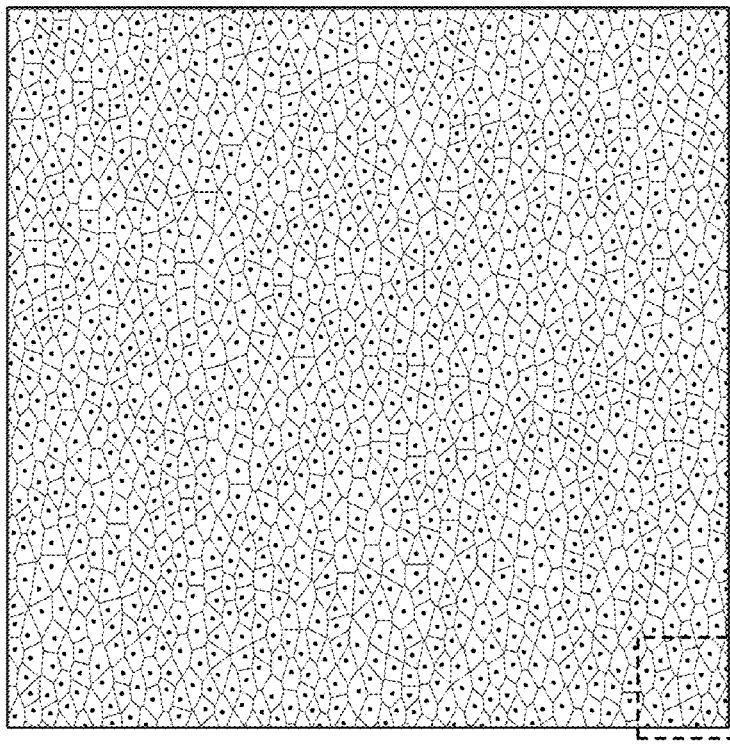
Figure 24B:
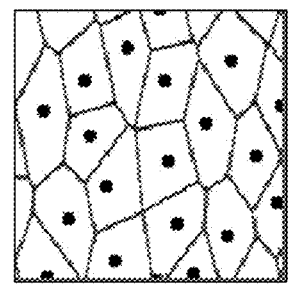

FIG. 23A shows the Voronoi pattern corresponding to the original dot pattern of FIG. 22B. FIG. 23B is the Voronoi pattern produced by the just-detailed transform/inverted-transform method (i.e., it is an enlargement of FIG. 22E). Each is shown overlaid with the original patterns of dots. As can be seen, each dot is still surrounded by a polygon. But the shapes of the polygons are different, as is particularly evident from the enlarged excerpts of FIGS. 24A and 24B (corresponding to the lower right hand corners of FIGS. 23A and 23B, respectively).

Figure 25A:
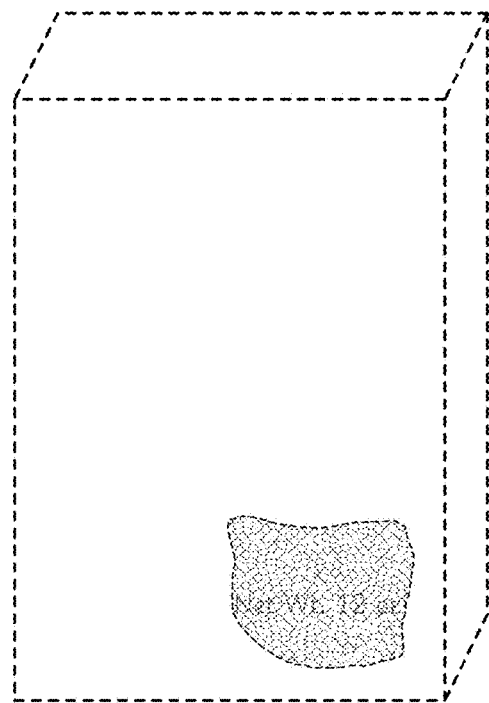
FIGS. 25A and 25B illustrate how artistic signaling patterns according to the present technology can be used as background patterns on a boxed item of food.
Figure 25B:
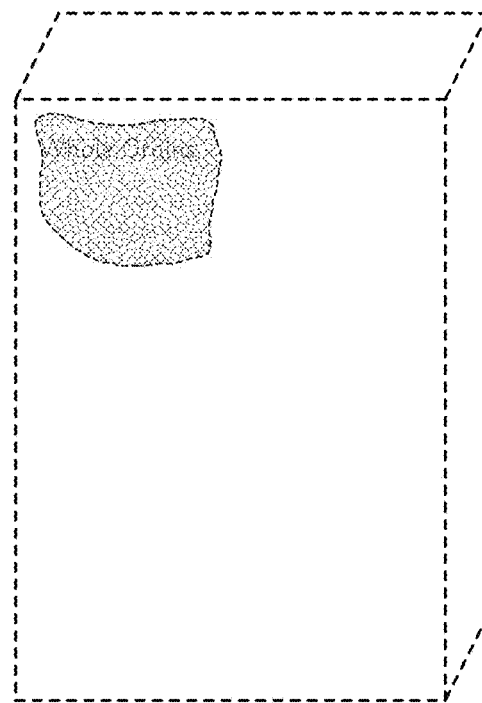
Figure 26:
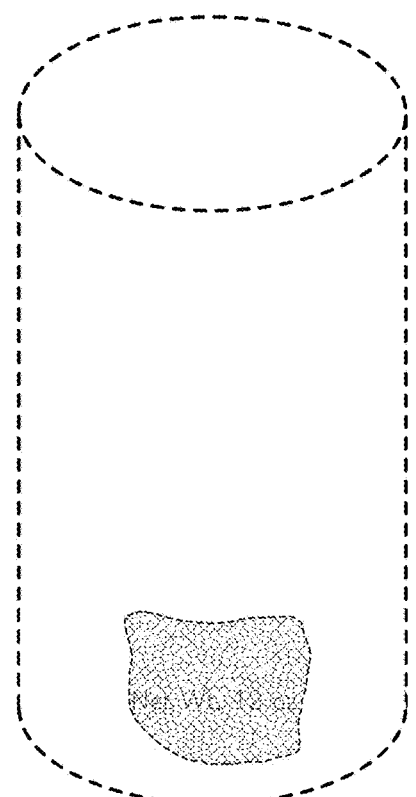
FIGS. 26 and 27 are like FIGS. 25A and 25B, but showing application of artistic signaling patterns to food items in cans and plastic tubs.
Figure 27:
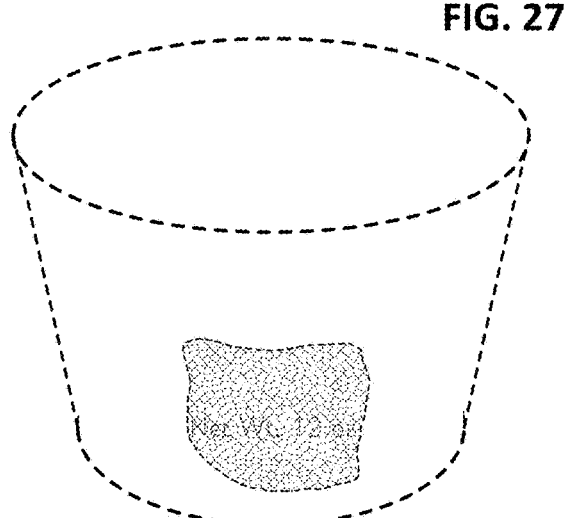

FIGS. 25A and 25B show that visible patterning encoded with machine readable data, produced according to the methods herein, can be used as a background pattern, or texture, on a food container—such as a cereal or cake mix box. Such patterning can appear at any location on the container, and on any face(s) (not just the illustrated front face). FIG. 26 shows such a pattern on a can, such as a drink can, a soup can, or a can of vegetables. FIG. 27 shows such a pattern on a plastic tub, such as a yogurt or sour cream tub. While a Voronoi pattern is illustrated, it should be understood that patterns produced by any of the processes referenced herein can be so-utilized.

Figure 28A:
FIGS. 28A and 28B illustrate use of artistic signaling patterns, based on continuous tone watermarks, as graphic backgrounds on a grocery item.
Figure 28B:

FIGS. 28A and 28B are enlarged excerpts from a yogurt container, depicting signal-conveying artwork produced by the above-detailed process (employing a trained network according to the Johnson method) employed as background patterns. The pattern of FIG. 28A was produced using a Johnson network to apply a bubble gum balls pattern to a watermark signal block, e.g., as shown in FIG. 15PP. The pattern of FIG. 28B was produced by the method of Johnson to apply a fanciful pattern to a watermark signal block, e.g., as shown in FIG. 15D. Both patterns have been altered in coloration—an additional processing step that does not impair decodability of the luminance-based watermark signal blocks on which both are based.

The artwork on the yogurt containers depicted in FIGS. 28A/28B also includes a depiction of a vanilla tree flower, branch and leaf. This artwork is defined by layers of patterned spot color inks (e.g., Pantone 121, 356, 476) and black. For example, the flower petals are predominantly screened Pantone 121. That layer is watermarked with a luminance watermark. The payload conveyed by the watermark in the flower petals (i.e., the GTIN for the yogurt product) is the same payload as is conveyed by the watermark in the violet background patterning (which is rendered with screened Pantone 2071). Moreover, although printed in different ink layers, the watermark signal block portions encoded within the flower petals are geometrically registered with the watermark signal block portions encoded within the background patterning. (A few such blocks are shown by dashed lines in FIG. 28B; many span both the background pattern and the foreground vanilla art.) Both the foreground pattern and background pattern watermarks contribute signal by which a detector extracts the watermark payload; the detector doesn't distinguish between the signals contributed by the different layers since they seamlessly represent common watermark signal blocks.

When processing a watermark or watermarked image with a style transfer networks, edge artifacts can be a problem. Watermark patterns, themselves, are continuous at their edges. If tiled, watermark patterns continue seamlessly across the edges. Style patterns, in contrast, are typically not continuous at their edges. Further, the convolution operations performed by style transfer networks can "run out of pixels" when convolving at image edges. This can lead to disruptions in the edge-continuity of the watermark.

To address this problem, applicant pads the input watermark with rows and columns of additional watermark signal, as if from adjoining tiles, before applying to the style transfer network. A 128×128 element watermark signal block may be padded, for example, to 150×150 elements. This enlarged image is processed by the style transfer network. The network outputs a processed 150×150 image. The center 128×128 elements are then excerpted. No edge artifacts then appear.

In some instances, applicant generates a 256×256 element input image by tiling four watermark signal blocks. The network outputs a 256×256 style-processed image. Again, an interior (e.g., central) 128×128 block is excerpted from this result. (All of the signal blocks shown in FIGS. 15A-15ZZ are seamlessly tileable.)

Aspects of such method are illustrated in the flow charts of FIGS. 14B and 14C. (The dashed rectangles show acts that are usually performed later—not necessarily by the software whose user interface is depicted in FIG. 14A.)

Figure 29A:
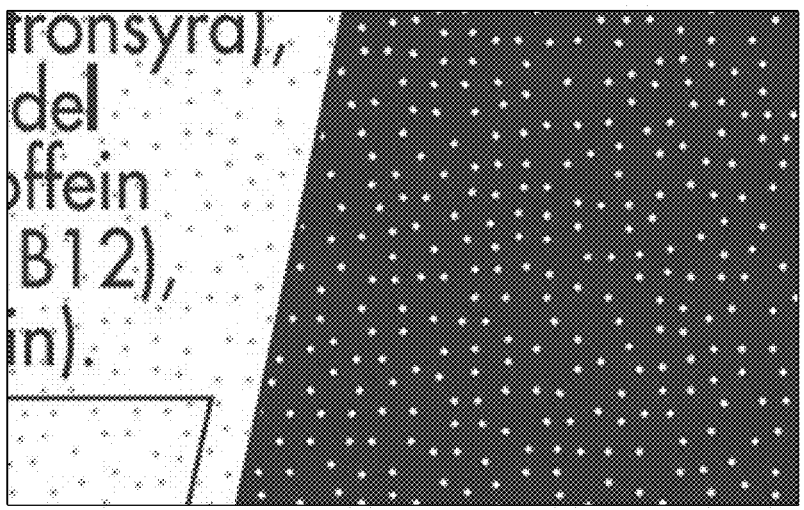
FIGS. 29A-29C illustrate use of artistic signaling patterns, based on sparse watermarks, as graphic backgrounds on a grocery item.
Figure 29B:
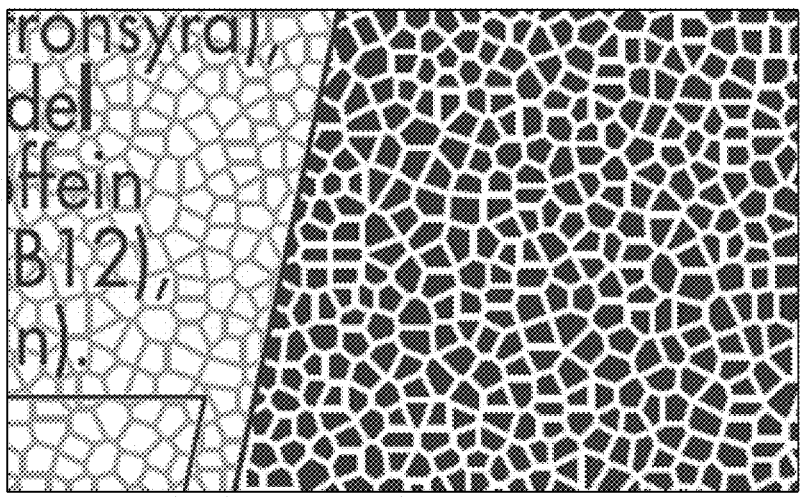
Figure 29C:
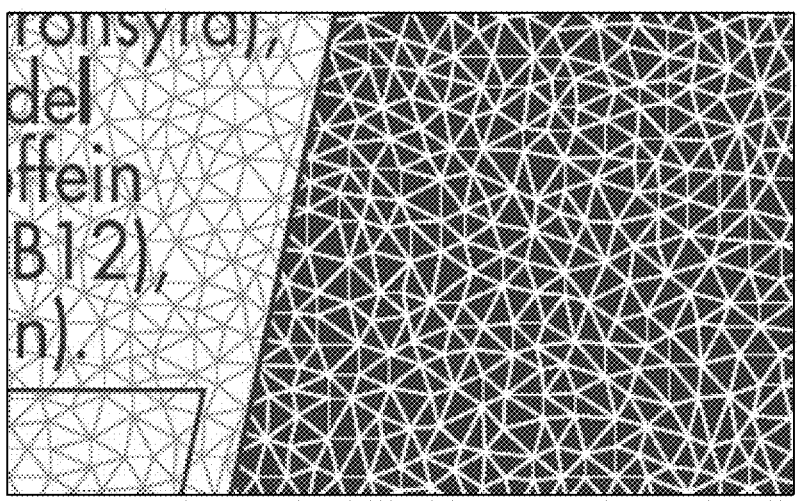

FIG. 29A is an excerpt of product packaging showing a sparse dot pattern (a stipple pattern) as a graphical background (enlarged about 3×). FIG. 29B shows a Voronoi counterpart to the FIG. 29A pattern, again used as a graphical background. FIG. 29C shows a Delaunay counterpart to the FIG. 29A pattern.

Comparing the right sides of FIGS. 29A-29C, it will be seen that the introduction of more white features within the dark blue background serves to effectively lighten the blue background—at least as seen from a distance. In accordance with a further aspect of the present technology, a background spot or process color may be rendered darker than normal, so that the addition of a light-colored pattern of dots or lines serves to lighten the area to achieve a desired appearance. For example, an ink can be applied at a higher screen setting, or with a smaller proportion of a thinner, to yield a darker tone. Or a darker ink color can be selected.

Inversely on the left side. The addition of dark features darkens the light background color. This can be mitigated by starting with a lighter background color, so the addition of the darker features yields a composite appearance of a desired tone. The background ink layer may be screened-back, or the ink may be diluted. Or a lighter ink may be chosen. (Of course, if white is the background, as in FIGS. 29A-29C, then options to further lighten the background are limited.)

Triangulation patterns, based on sparse dot patterns, can be used as the bases for many aesthetically pleasing patterns suitable for product packaging, etc. One class of such patterns is to take a Delaunay pattern, and fill the triangles with different greyscale values, or with differently-screened tones of a particular color. As long as the lines bounding the triangles are lighter, or darker, than most of the triangle interiors, the pattern will decode fine. (The convergences of lighter or darker boundary lines at the triangle vertices define points of localized luminance extrema by which the encoded signals are represented.)

Figure 30A:
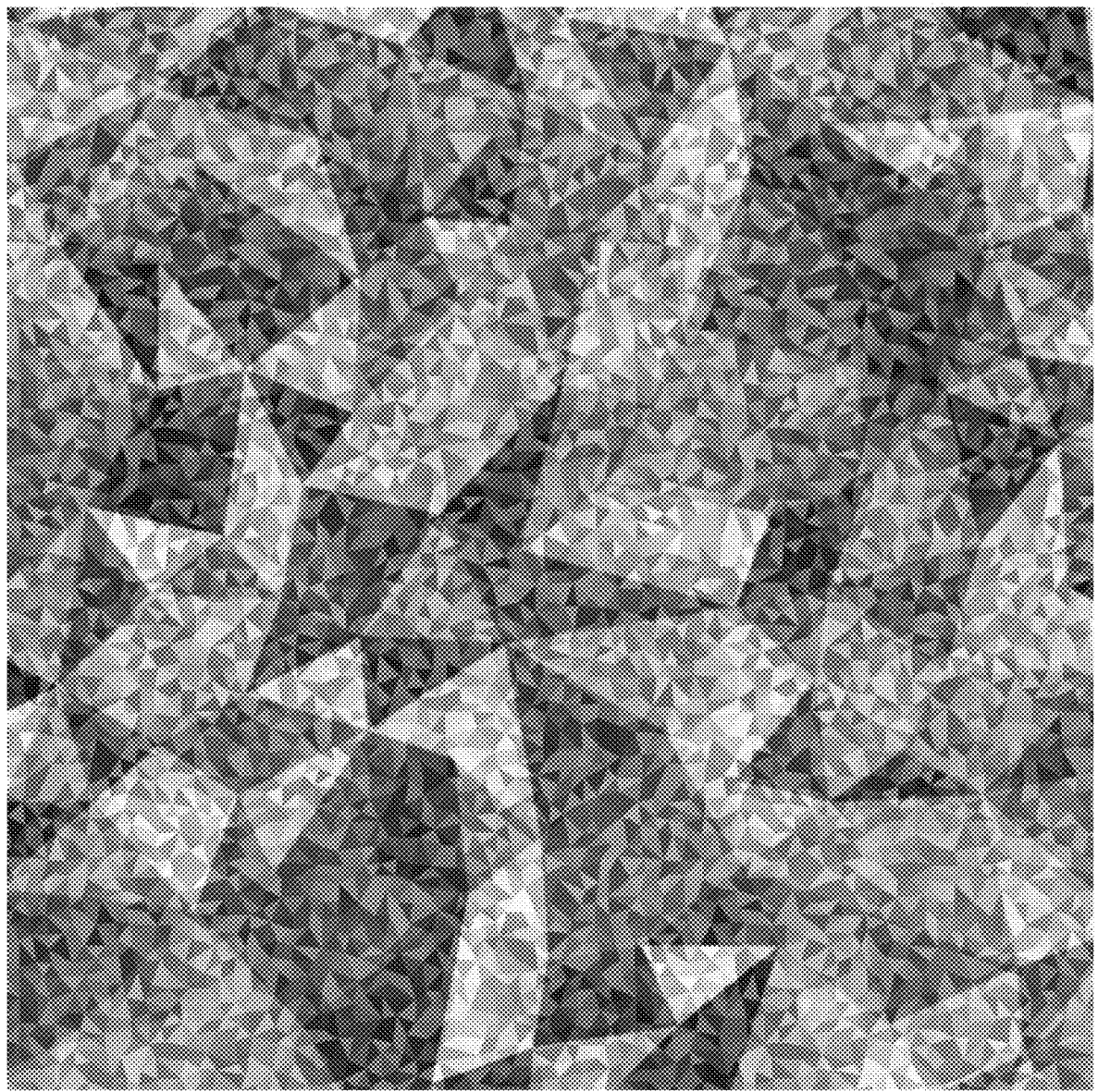
FIGS. 30A and 30B show polygon-based patterns based on continuous tone watermarks.

Another pleasing triangle-based arrangement is shown in FIG. 30A. This pattern is two patterns overlaid, each conveying a payload signal, but at different spatial resolutions—permitting decoding from two different (overlapping) reading distance zones.

In the FIG. 30A arrangement, the triangles are not bordered by lighter or darker lines. The vertices thus don't serve as luminance extrema that represent the encoded signals. Instead of carrying signal, the vertices and edges correspond to a sparse mark obtained from local extrema in the gradients within the watermark signal block. The motive is that each triangle encircles local minima or maxima in the signal tile. The lightness or darkness within each triangle corresponds to the lightness or darkness of a corresponding area in the watermark signal block. So the greyscale values of the triangles actually carry the signal. (In another arrangement, the triangles needn't be defined by gradients in the watermark signal. A random scattering of points can serve as vertices for a field of triangles and will work just as well, defining triangles whose interiors are made darker or lighter in correspondence with localized luminance within the desired watermark signal block.)

Due to the typically-small physical size of the component watermark elements (waxels), the triangles must be commensurately small to effectively carry the signal—on the order of eight square waxels, or about 2000 triangles per 128×128 waxel block (the more the better). But such triangles are often smaller than desired for aesthetic purposes, e.g., when rendered by printing at 75 waxels per inch. So the same signal is added, with transparency, at a larger scale (e.g., 6×, or 12.5 waxels per inch). These larger triangles are more readily visible, but do not hinder the decoding of signal from the smaller triangles, because the larger triangles are effectively filtered-out by down-sampling and/or oct-axis filtering in the decoder.

In many embodiments, both the large and small triangles encode the same payload, although this needn't be the case. In other arrangements, the larger scale overlay needn't be signal-bearing. It can be a strictly ornamental pattern, within which the smaller scale triangles serve as an intriguing, and signal-conveying, texture detail. In still other arrangements, polygons other than triangles can be employed. In some arrangements, the smaller triangles would be sub-triangulations of the larger triangles, to further enhance aesthetics. More simply, the vertices of each larger triangles may be snapped to the nearest vertices of the small triangles.

Figure 30B:
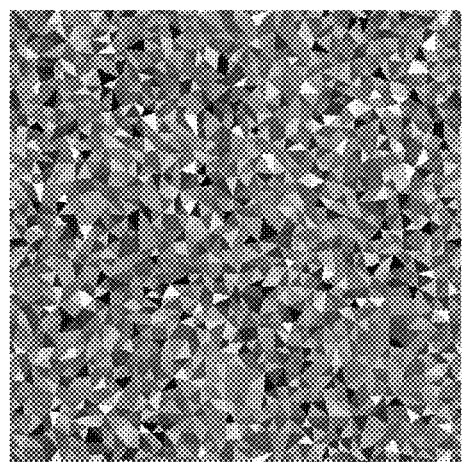

FIG. 30B shows a watermark signal block quantized into triangular areas, with the luminance of each area corresponding to a luminance within the watermark.

Figure 31A:
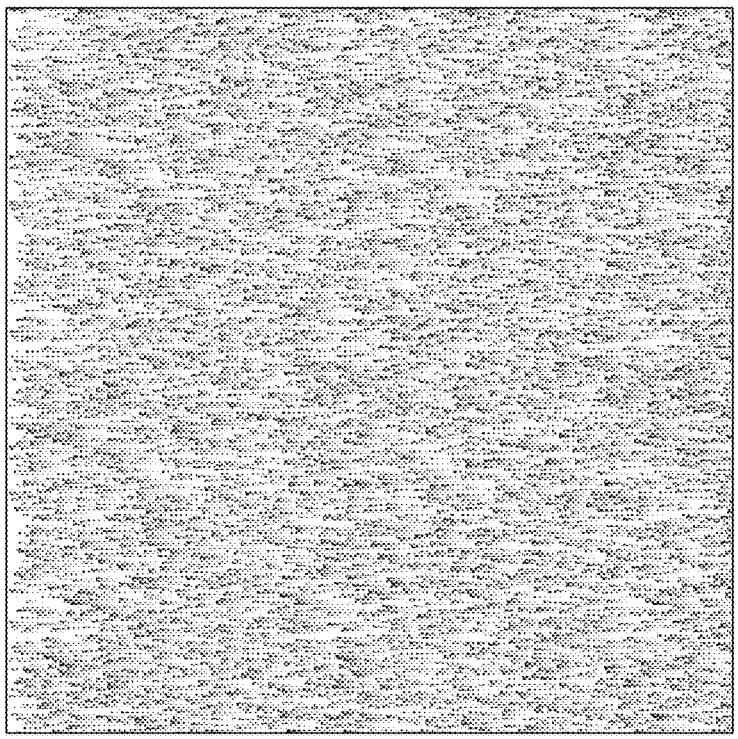
FIG. 31A shows an artistic signaling pattern generated from a sparse mark using various image transformations.
Figure 31B:
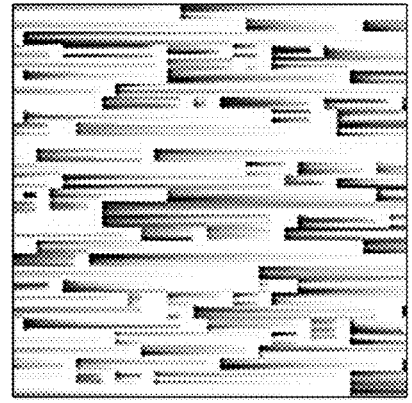
FIG. 31B is an enlargement from FIG. 31A.

FIG. 31A shows a pattern derived using Photoshop software to manipulate a sparse watermark (generated using any of the methods taught in the earlier-cited patent documents), and FIG. 31B shows an enlarged excerpt. The sparse, dark dots are here all smeared in straight parallel lines. The dots thus have corresponding tails which diminish in darkness with distance from the original location. The dots themselves appear inverted, as white regions.

This effect is generated by the following acts:

A sparse dot watermark (black dots on white background) is created, with a desired payload, using the Digimarc Barcode plug-in software for Photoshop. Dot density is set to 20, and dot size is set to 4. The Photoshop Wind filter is applied, with the option From the Left selected. This Wind filter is applied three successive times. The resulting image is then inverted (Image/Adjustments/Invert), and the mode is changed to Lighten. A new layer is then created and the above acts are repeated, but this time with the Wind option set to From the Right.

(As is familiar to artisans, a wind filter detects edges in an image, and extends new features from the detected edges. The features are commonly tails that diminish in width and intensity with distance from the edges.)

Figure 32A:
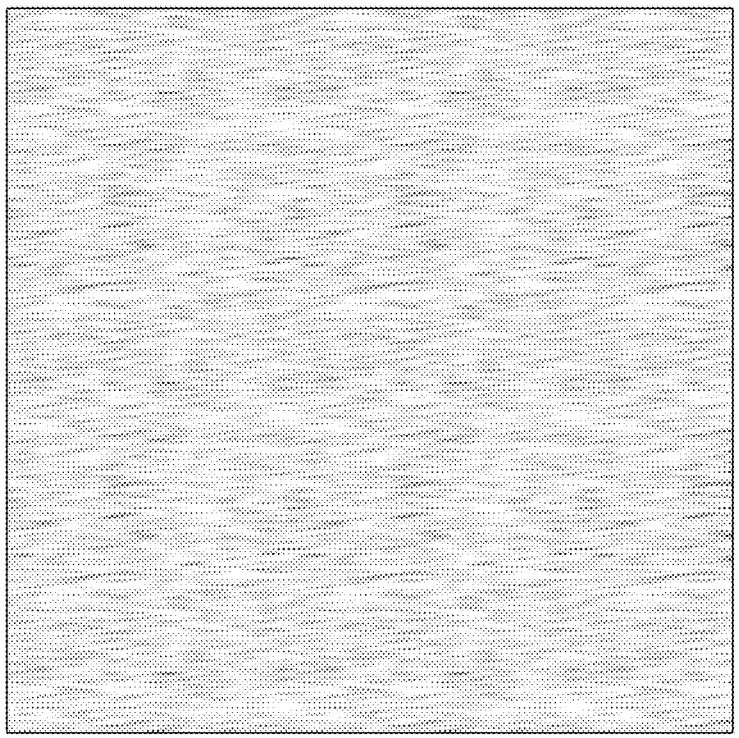
Figure 32B:
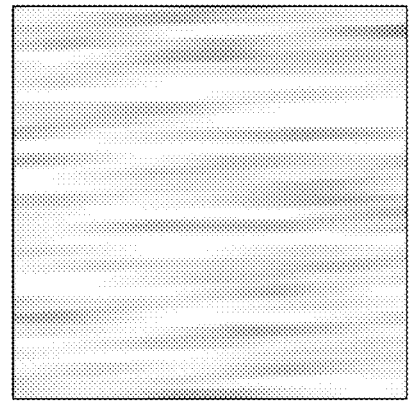

The pattern of FIGS. 32A and 32B is generated in Photoshop software by creating a sparse dot watermark as before, with a dot density of 20 and a dot size of 4. The Motion Blur filter is then applied using settings of 0 Degrees and Distance=32 pixels.

The pattern of FIGS. 33A and 33B is generated by starting with a negative sparse dot watermark (i.e., white dots on a black background). Again, dot density is set to 20 and dot size is set to 4. A Motion Blur filter is applied with settings of 90 Degrees and Distance=15 pixels. A new layer is then created with the same dot pattern, and a Motion Blur filter is applied with settings of 0 degrees and Distance=15 pixels. The mode of the top layer is then changed to Lighten.

FIGS. 34A and 34B show a pattern produced from a sparse field of white dots on a black background, which are then smeared in straight parallel lines. Here the dots have corresponding tails which diminish in brightness with distance from the original location.

This pattern can be produced by generating a negative sparse dot watermark as just-detailed, with dot density of 20 and dot size of 4. A Motion Blur filter is applied, set to 0 Degrees, and Distance=15 pixels. A new layer is created with the same dot pattern. A Wind filter is then applied, with Direction set to From the Left. This filter is applied a second time on this layer. The mode of the top layer is then changed to Lighten.

The pattern of FIGS. 35A and 35B is produced by generating a negative sparse dot watermark as just-detailed, and applying a Motion Blur filter with settings of 90 degrees and Distance=15 pixels.

The pattern of FIGS. 36A and 36B is produced by from a field of black dots on a white, with dot density of 20 and dot size of 4. A Motion Blur filter is applied with settings of 90 Degrees and Distance=15 pixels. A new layer is created with the same dot pattern, and the Motion Blur filter is applied to this new layer with settings of 0 Degrees and Distance=15 pixels. The Mode of the top layer is then changed to Multiply.

Figure 37A:
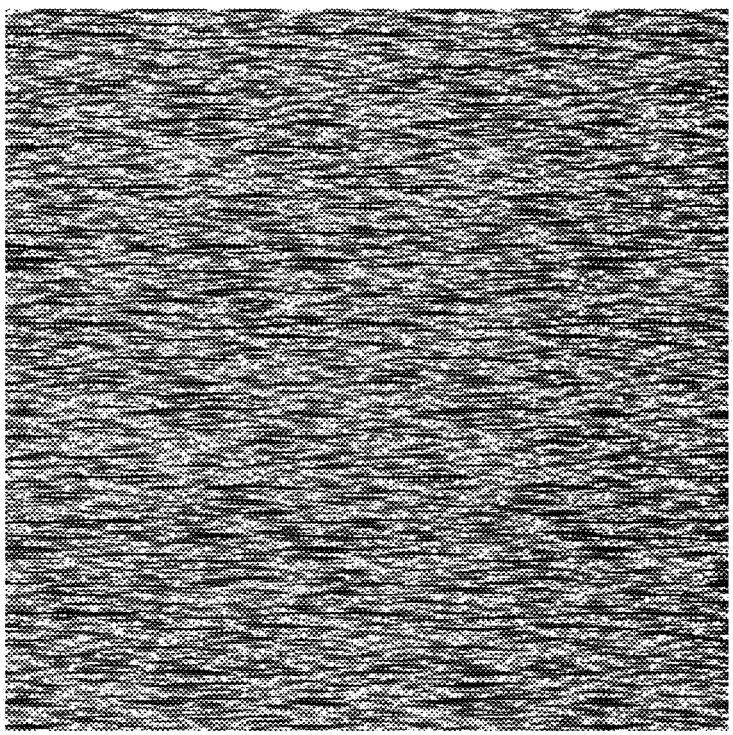
Figure 37B:
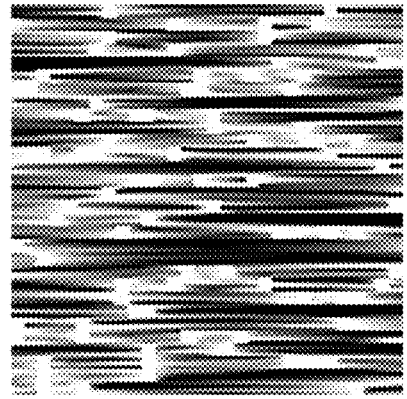

The pattern of FIGS. 37A and 37B starts with a pattern of white dots on black, as before. The Wind filter is applied, set to From the Right. This filter is re-applied two more times. A new layer is then created with the same dot pattern, and the Wind filter is similarly applied three times, but this time set to From the Left. The mode of the top layer is then changed to Lighten.

Figure 38A:
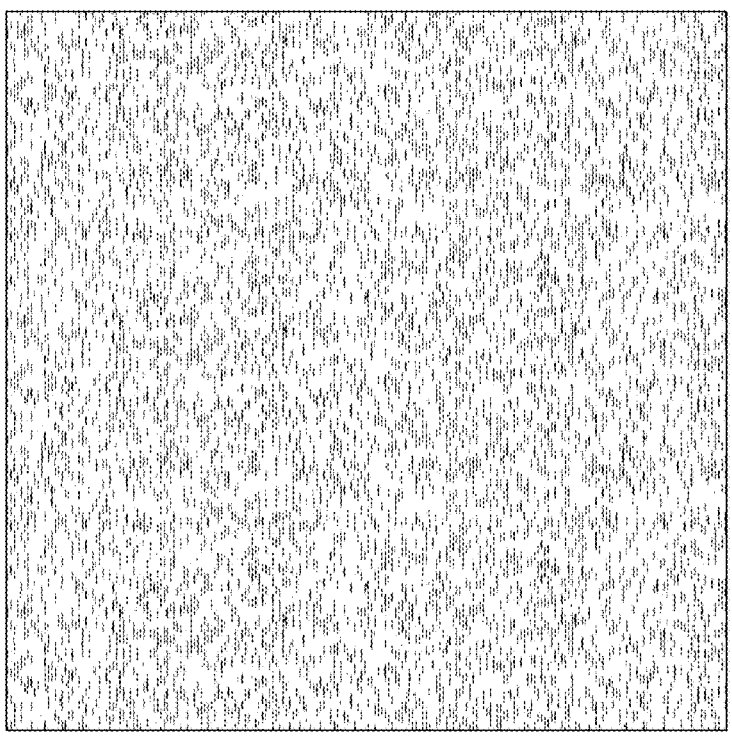
Figure 38B:
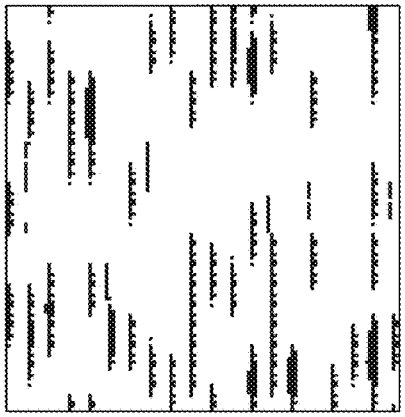

FIGS. 38A and 38B look similar to FIGS. 39A and 39B, except each clump of dots numbers between 0 and 9 dots, depending on the local amplitude of the watermark. This pattern is generated by generating a sparse mark of black dots on a white background, as described earlier. A Motion Blur filter is applied with settings of 90 Degrees, and Distance=15 pixels. The mode is then changed to Bitmap, at 300 Pixels/Inch, and with a Halftone Screen. The halftone screen parameters are set to a Frequency of 50 Lines/Inch, an Angle of 90 Degrees, and a Shape of Line.

FIGS. 39A and 39B appear to show a continuous tone luminance watermark that is sampled at points along spaced-apart parallel lines. Around each sample point a clump of black dots (numbering from 0 to 4 dots) is formed, in accordance with the amplitude of the watermark at that point. A pattern of intermittent line-like structures, of varying thickness, is thereby formed.

Such pattern is produced by starting with a greyscale document set to 4% black. The Digimarc plug-in software is then used to enhance this document with a continuous tone luminance mark at Strength=10. The Photoshop software is then used to change the mode to Bitmap, with settings of 300 Pixels/Inch, Halftone Screen, a Frequency of 50 Lines/Inch, an Angle of 90 degrees, and Shape set to Line.

FIGS. 40A and 40B have the appearance of a continuous tone luminance watermark that is sampled at points in an orthogonal two-dimensional grid. A clump of black dots (e.g., numbering from 0 to 7 dots) is then formed around each sample point, in accordance with the amplitude of the watermark at that point.

Such pattern is produced by starting with a greyscale document set to 4% black. The Digimarc plug-in software is then used to enhance this document with a continuous tone watermark at Strength=10. The Photoshop software is then used to change the mode to Bitmap, with settings of 300 Pixels/Inch, Halftone Screen, a Frequency of 50 Lines/Inch, and an Angle of 45 degrees. The Shape is set to Line.

Of course the parameters given above can be modified more or less to yield results that are more or less different, as best suits a particular application. Similarly, the order of the detailed steps can be changed, and steps can be added or omitted. And naturally, the patterns can be colored, e.g., as shown in FIG. 41.

Figure 41:
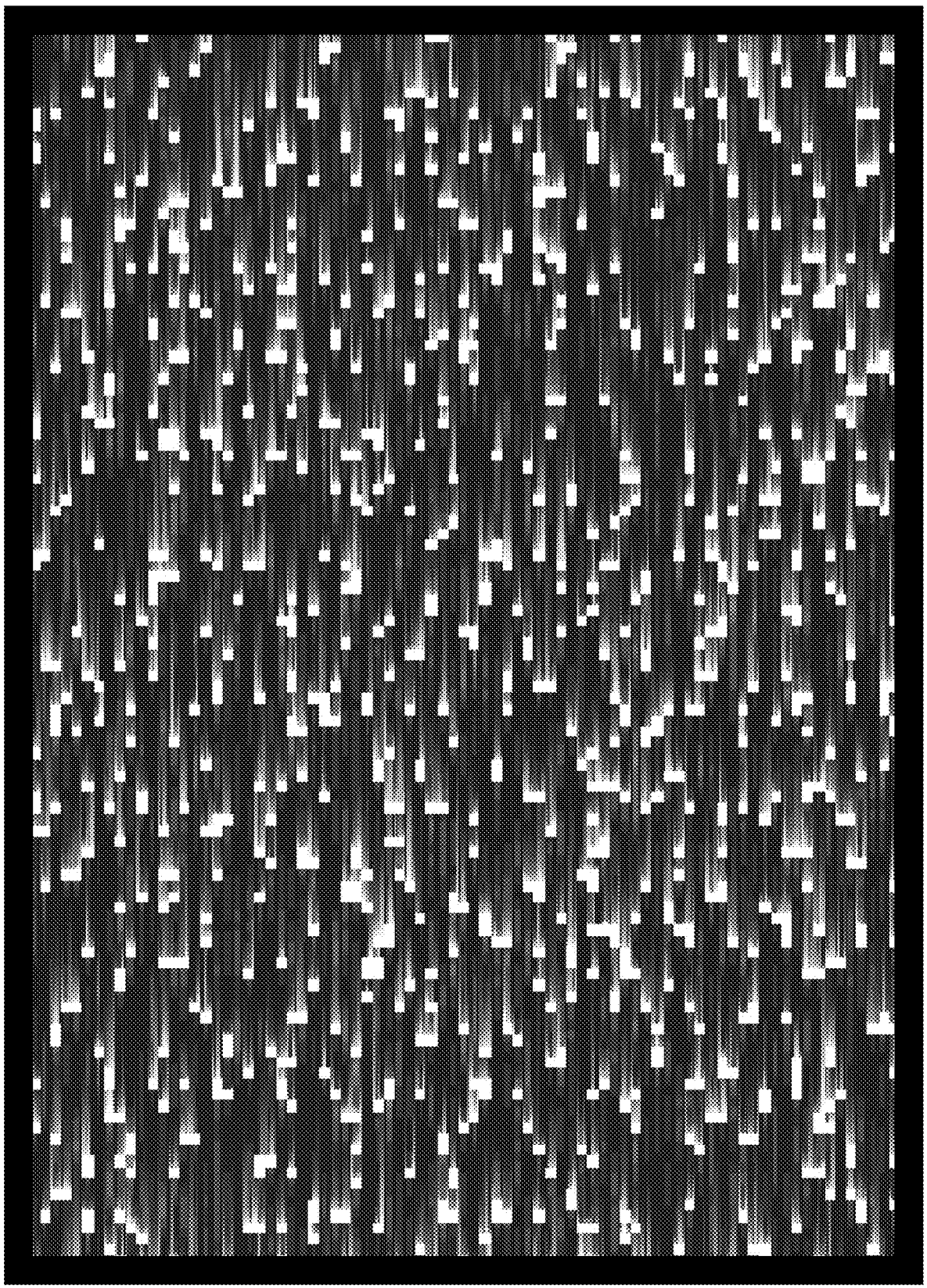
FIG. 41 shows a colored artistic signaling pattern produced from a sparse mark.

It will be recognized that a pattern like that shown in FIG. 41 has a visual appeal that a spattering of black dots, as in a plain sparse mark, does not. Such pattern, and others generated by the detailed techniques, thus give graphic designers greater options for encoding product identifiers on all surfaces of product packaging. And this new-found flexibility comes without the worry about press tolerances that was formerly a concern, since signal-carrying structures no longer need to be precisely rendered just below the threshold of human visibility.

Line Continuity Modulation

It should be recognized that there are other watermarking techniques besides the continuous tone and sparse arrangements detailed herein, and the detailed methods can be applied to artwork based on such other watermarking techniques. One example is line continuity modulation.

Figure 42A:
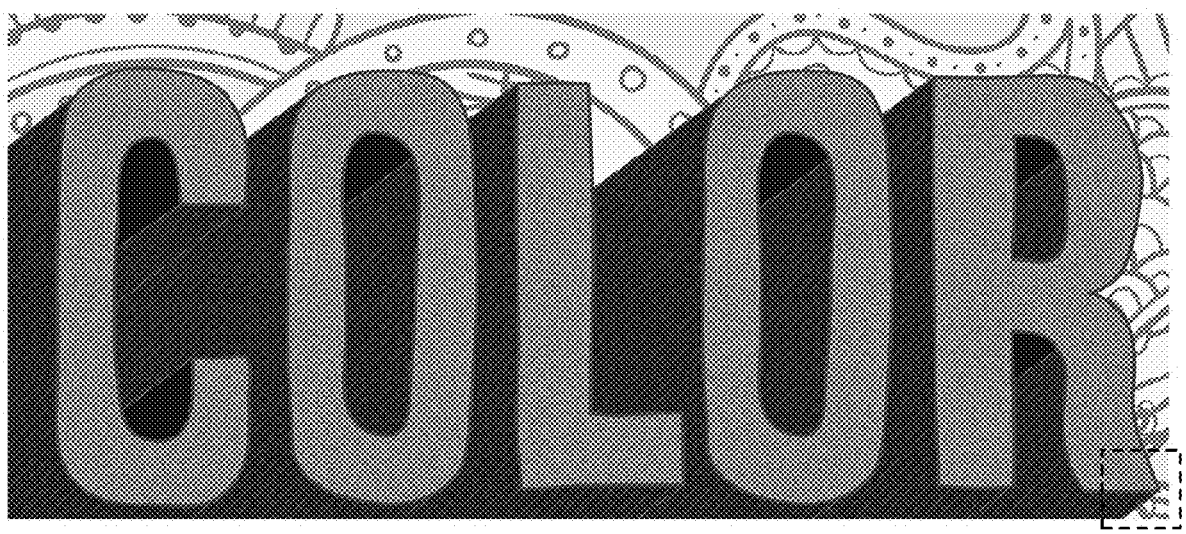
FIG. 42A shows an excerpt from a watermarked poster.
Figure 42B:
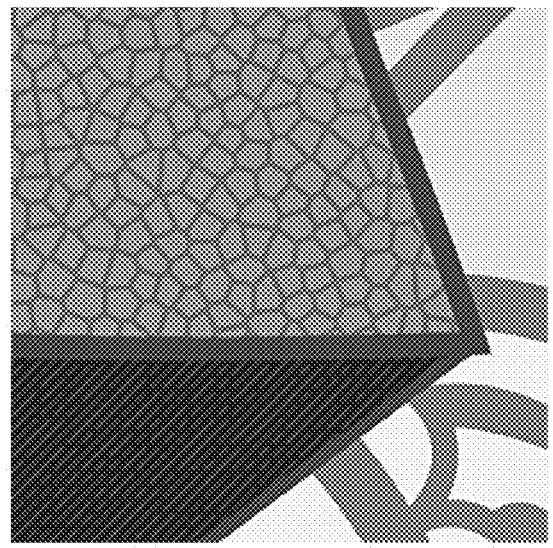
FIG. 42B shows an enlargement from FIG. 42A.

FIG. 42A shows an excerpt from artwork for a conference poster. FIG. 42B is an enlargement from the lower right corner of FIG. 42A. As can be seen, the shadows of the letters include diagonal dark blue lines that are broken into segments. These segments, and their breaks, serve to modulate the local luminance and chrominance of the artwork—modulations that are used to encode the watermark payload. (It will also be seen that the fills of the letters are Voronoi patterns based on a sparse watermark.)

The modulation of lines is implemented as follows: two images are created with slanted lines. All the lines are dashed, but lines in the first image have longer dashes than lines in the second image, so the average greyscale value of lines in the second image is lighter. A watermark signal block is thresholded to create a binary mask, so that watermark block signal values between 128 and 255 (in an 8-bit image representation) are white, while watermark signal values of 0-127 are black. Then we choose complete line segments from the second image within the white masked area, and we apply the black mask similarly to choose the segments from the first image. The lighter greyscale dashed lines are thus picked in regions where the watermark signal block is lighter, and the darker greyscale dashed lines are thus picked in regions where the watermark signal block is darker. The combination of the dashed lines from the two masked layers produces the embedded image. A horizontal line density of at least 2/3=67% lines per waxel is found to be best to assure robust detection.

In a variant implementation, line continuity modulation can be effected by poking holes in an array of continuous lines at positions defined by dots in a negative sparse mark.

Styluses, Etc.

Another aspect of the present technology concerns code signaling via manually-created art and other content.

Styluses are in widespread use for manually-creating content, both by graphics professionals (e.g., producing art) and by office workers (e.g., taking handwritten notes). Styluses are commonly used with tablets. Tablets may be categorized in two varieties. One variety is tablets in which a stylus is applied to a touch-sensitive display screen of a computer (e.g., the Apple iPad device). The other variety is tablets in which a stylus is applied on a touch-sensitive pad that serves as a peripheral to a separate computer (e.g., the Wacom Intuos device). The latter device is sometimes termed a graphics tablet.

As is familiar to artisans, tablets repeatedly sense the X- and Y-locations of the tip of the stylus, allowing the path of the stylus to be tracked. A marking—such as a pen or pencil stroke—can thereby be formed on a display screen, and corresponding artwork data can be stored in a memory.

Various location-sensing technologies are used. So-called "passive" systems (as typified by many Wacom devices) employ electromagnetic induction technology, where horizontal and vertical wires in the tablet operate as both transmitting and receiving coils. The tablet generates an electromagnetic signal, which is received by an inductor-capacitor (LC) circuit in the stylus. The wires in the tablet then change to a receiving mode and read the signal generated by the stylus. Modern arrangements also provide pressure sensitivity and one or more buttons, with the electronics for this information present in the stylus. On older tablets, changing the pressure on the stylus nib or pressing a button changed the properties of the LC circuit, affecting the signal generated by the stylus, while modern ones often encode into the signal as a digital data stream. By using electromagnetic signals, the tablet is able to sense the stylus position without the stylus having to even touch the surface, and powering the stylus with this signal means that devices used with the tablet never need batteries.

Active tablets differ in that the stylus contains self-powered electronics that generate and transmit a signal to the tablet. These styluses rely on an internal battery rather than the tablet for their power, resulting in a more complex stylus. However, eliminating the need to power the stylus from the tablet means that the tablet can listen for stylus signals constantly, as it does not have to alternate between transmit and receive modes. This can result in less jitter.

Many tablets now employ capacitive sensing, in which electric coupling between electrodes within the tablet varies in accordance with the presence of an object—other than air—adjacent the electrodes. There are two types of capacitive sensing system: mutual capacitance, where an object (finger, stylus) alters the mutual coupling between row and column electrodes (which are scanned sequentially); and self- or absolute capacitance, where the object (such as a finger) loads the sensor or increases the parasitic capacitance to ground. Most smartphone touch screens are based on capacitive sensing.

Then there are some styluses that don't require a tablet—those that rely on optical sensing. These devices are equipped with small cameras that image features on a substrate, by which movement of the stylus can be tracked. Motion deduced from the camera data is sent to an associated computer device. The Anoto pen is an example of such a stylus.

The pressure with which the stylus is urged against the virtual writing surface can be sensed by various means, including sensors in the stylus itself (e.g., a piezo-electric strain gauge), and sensors in the tablet surface (e.g., sensing deflection by a change in capacitance). Examples are taught in patent documents 20090256817, 20120306766, 20130229350, 20140253522, and references cited therein.

A variety of other stylus/tablet arrangements are known but are not belabored here; all can be used with the technology detailed herein.

In use, a computer device monitors movements of the stylus, and writes corresponding information to a memory. This information details the locations traversed by the status, and may also include information about the pressure applied by the stylus. The location information may be a listing of every {X,Y} point traversed by the stylus, or only certain points may be stored—with the computer filling-in the intervening locations by known vector graphics techniques. Each stroke may be stored as a distinct data object, permitting the creator to "un-do" different strokes, or to format different strokes differently.

Each stroke is commonly associated with a tool, such as a virtual pen, pencil or brush. (The term "brush" is used in this description to refer to all such tools.) The tool defines characteristics by which the stroke is rendered for display, e.g., whether as a shape that is filled with a fully saturated color (e.g., as is commonly done with pen tools), or as a shape that is filled with a pattern that varies in luminance, and sometimes chrominance, across its extent (e.g., as is commonly done with pencil tools). When pressure is sensed, the pressure data may be used to vary the width of the stroke, or to increase the darkness or saturation or opacity of the pattern laid down by the stroke.

Users commonly think of their stylus strokes as applying digital "ink" to a virtual "canvas." Different "layers" may be formed—one on top of the other—by instructions that the user issues through a graphical user interface. Alternatively, different layers may be formed automatically—each time the user begins a new stroke. The ink patterns in the different layers may be rendered in an opaque fashion—occluding patterns in any lower layer, or may be only partially opaque (transparent)—allowing a lower layer to partially show-through. (As noted, opacity may be varied based on stylus pressure. Additionally, going over a stroke a second time with the same tool may serve to increase its opacity.)

In practical implementation, all of the input information is written to a common memory, with different elements tagged with different attributes. The present description usually adopts the user's view—speaking of canvas and layers, rather than the well-known memory constructs by which computer graphic data are stored. The mapping from "canvas" to "memory" is straightforward to the artisan. Transparency is commonly implemented by a dedicated "alpha" channel in the image representation. (For example, the image representation may comprise red, green, blue and alpha channels.)

Figure 43:
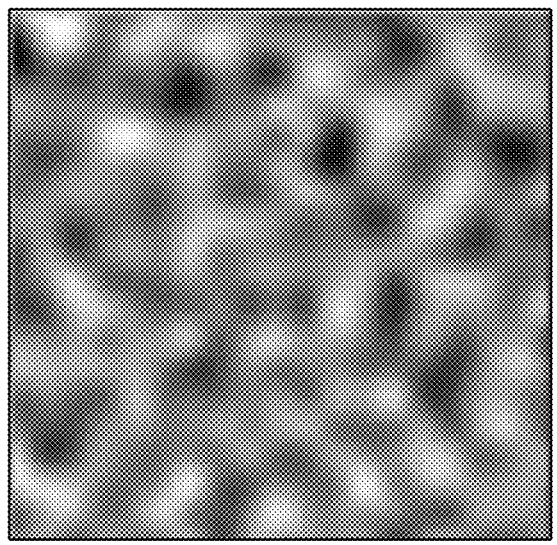
FIGS. 43 and 44 show excerpts of tiles of signal-carrying patterns.
Figure 44:
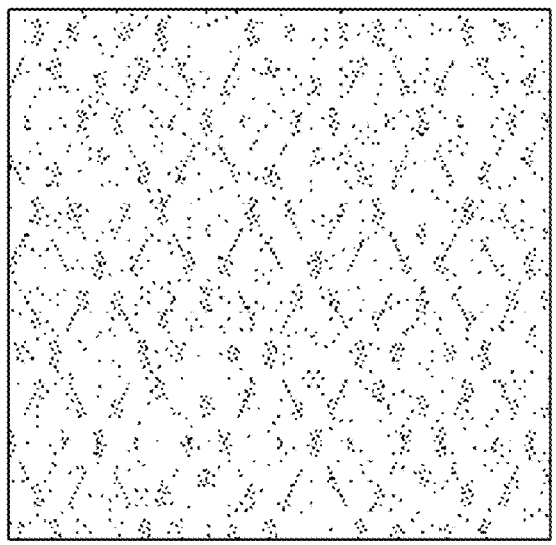

FIGS. 43 and 44 are tiles of illustrative signal-bearing patterns. These are greatly magnified for purposes of reproduction; the actual patterns have a much finer scale. Also, the actual patterns are continuous—the right edge seamlessly continues the pattern on the left edge, and similarly with the top and bottom edges. As described earlier, FIG. 43 may be regarded as a continuous pattern—comprised of element values (e.g., pixels) that vary through a range of values. FIG. 44 may be regarded as a sparse pattern FIG. 43 also greatly exaggerates the contrast of the pattern for purposes of illustration. The depicted tile has a mean value (amplitude) of 128, on a 0-255 scale, and some pixels have values of near 0 and others have values near 255. More typically the variance, or standard deviation, from the mean is much smaller, such as 5 or 15 digital numbers. Such patterns commonly have an apparently uniform tonal value, with a mottling, or salt-and-pepper noise, effect that may be discerned only on close human inspection.

A first method for human-authoring of signal-bearing content is to tile blocks of a desired signal-carrying pattern, edge-to-edge, in a layer, to create a pattern coextensive with the size of the user's canvas. A second layer, e.g., of solid, opaque, white, is then applied on top of the first. This second layer is all that is visible to the user, and serves as the canvas layer on which the user works. The tool employed by the user to author signal-bearing content does not apply pattern (e.g., virtual ink, or pixels) to this second layer, but rather erases from it—revealing portions of the patterned first layer below.

Technically, the erasing in this arrangement is implemented as changing the transparency of the second layer—allowing excerpts of the underlying first layer to become visible. The tool used can be a pen, pencil, brush, or the like. The tool may change the transparency of every pixel within its stroke boundary to 100% (or, put another way, may change the opacity of every pixel to 0%). Alternatively, the brush may change the transparency differently at different places within the area of the stroke, e.g., across the profile of the brush.

Figure 45:
FIG. 45 shows how glyphs hand-written on a tablet can employ a signal-carrying pattern.
Figure 46:
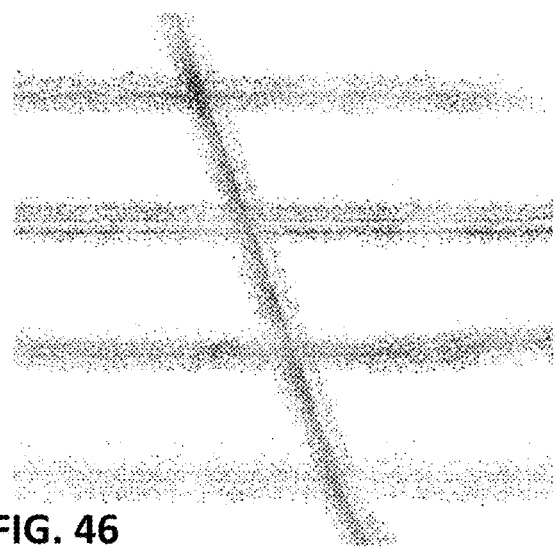
FIG. 46 shows how strokes on a tablet can have directional texture associated with the brush, and/or its direction of use, while also employing a signal-carrying pattern.

FIG. 45 shows the former case—the brush changes the transparency of every pixel in its path from 0% to 100%, resulting in a pattern with sharp edges. FIG. 46 shows the latter case—different regions in the brush change the transparency differently—a little in some places, a lot in others. (In so-doing, the brush changes the mean value, and the variance, of the underlying pattern as rendered on the canvas.) Such a brush adds texture.

The texture added by a brush commonly has an orientation that is dependent on the direction the brush is used—just as filaments of a physical brush leave fine lines of texture in their wake. The signal-carrying pattern revealed by the brush has a texture, too. But the signal-carrying pattern texture always has a fixed orientation—both in rotation, scale and position. It does not matter in which direction the brush is applied; the spatial pose of the revealed pattern is constant.

In some embodiments, repeated brush strokes across a region successively increase the transparency of the top layer, revealing the underlying signal-carrying pattern to successively darker degrees. A first brush stroke may reveal the pattern by applying a 20% transparency to the covering second layer. Such a pattern has a light tone; a high mean value (and a small variance). A second brush over the same area stroke may increase the transparency to 40%, darkening the tone a bit, and increasing the variance. And then 60%, and 80%, until finally the covering layer is 100% transparent, revealing the underlying pattern with its original mean and variance. With each increase in transparency, the contrast of the rendered, revealed signal pattern is increased.

This is schematically illustrated by FIGS. 47 and 48. FIG. 47 conceptually illustrates how a prior art brush applies marks to a canvas—with a texture whose orientation is dependent on the directions of the strokes (shown by arrows). Where strokes overlap, a darker marking is rendered—since more virtual ink is applied in the region of overlap. FIG. 48 is a counterpart illustration for this aspect embodiment of the present technology. The orientation of the pattern does not depend on the direction of the brush stroke. Where strokes cross, the underlying pattern is rendered more darkly, with greater contrast.

The degree of transparency of a stroke can also be varied by changing the pressure applied to the stylus. At one pressure, a stroke may increase the transparency of the covering layer by 70% (e.g., from 0% to 70%). At a second, higher, pressure, a stroke may change the transparency of the covering layer by 100% (from 0% to 100%). Many intermediate values are also possible.

Such arrangement is shown in FIG. 49A. The digit '5' is written at one pressure, and the digit '7' is written with a lighter pressure. The latter stroke is rendered with less transparency (pixels within the boundaries of the '5' stroke are rendered at 100% transparency, whereas the pixels within the '7' are rendered at a lesser transparency). The mean value of the pixels within the boundary of the '5' in FIG. 47 matches the mean value of the corresponding pixels in the underlying signal-carrying pattern. In contrast, the mean value of the pixels within the boundary of the '7' have a mean value higher than that of the corresponding pixels in the underlying pattern.

(As noted, the contrast is greatly exaggerated in most of the images; FIG. 49B shows handwritten digits with contrast of a more typical value. FIG. 49C shows the handwritten digits with a more typical contrast and size.)

While the just-described arrangement employs an underlying, signal-conveying layer that is coextensive in size with the top layer, this is not necessary. Since the pattern is repeated in a tiled arrangement, the system memory may store just a single tile's worth of pattern data. Such a tile may have dimensions of 128×128 (e.g., pixels), while the canvas may have dimensions of 1280×1024. If the user picks a signaling brush (i.e., one that reveals the signal-carrying pattern), and draws a brush stroke starting from canvas X-, Y-coordinates {10,100}, and continuing to coordinates {10, 200} (and encompassing a surrounding region dependent on a profile of the brush), the system effects a modulo operation to provide pattern when the original tile "runs-out" of data (i.e., after coordinate {10,128}. That is, for the start of the stroke, the erasing operation reveals the signal pattern between coordinates {10,100} and {10,128}. Once it reaches value 128 (in either dimension), it performs a mod-128 operation and continues. Thus, the pattern that is revealed at coordinates {10,130} is read from tile coordinates {10,2}, and so forth.

While the foregoing description was based on erasing a blank layer to reveal a signal-carrying layer beneath, more typically a different approach is used. That is, a brush applies digital ink to an artwork layer in a pattern conveying the plural-bit payload. The pattern is two-dimensional and stationary, with an anchor point (e.g., at the upper left corner of the canvas) to which the pattern is spatially related (i.e., establishing what part of the pattern is to be laid-down at what part of the canvas).

A simple implementation can be achieved by using the capability to pattern-draw that is built into certain graphics tools, like Photoshop. In that software, a tile of signal-conveying pattern can be imported as an image, selected, and then defined as a Photoshop pattern (by Edit/Define Pattern). The user then paints with this pattern by selecting the Pattern Stamp tool, selecting the just-defined pattern from the pattern menu, and choosing a brush from the Brush Presets panel. By selecting the "Aligned" option, the pattern is aligned from one paint stroke to the next. (If Aligned is deselected, the pattern is centered on the stylus location each time a new stroke is begun.)

Instead of modulating transparency, software may be written so that stylus pressure (or stroke over-writing) modulates the mean value of the payload-carrying pattern: darker pattern (i.e., lower mean values) is deposited with more pressure; lighter pattern (higher mean values) is deposited with less pressure. The signal-carrying strength of the pattern (i.e., its variance) can be set as a menu parameter of the brush with which the pattern is applied.

The signal-carrying pattern typically includes both plural-bit payload information, and also a synchronization signal. The payload information may include data identifying the user, the date, the GPS-indicated time, a product GTIN, or other metadata specified by the user. This information may literally be encoded in the payload, or the payload may be a generally-unique ID that serves as a pointer into a local or remote database where corresponding metadata is stored. As is familiar from the prior art (including U.S. Pat. No. 6,590,996), the payload is error-correction encoded, randomized, and expressed as +/−"chips" that serve to increase or decrease parameters (e.g., luminance or chrominance) of respective pixels in a reference signal tile. The synchronization signal can comprise an ensemble of multiple spatial domain sinusoids of different frequencies (and, optionally, of different phases and amplitudes), which can be specified succinctly by parameters in a frequency domain representation. A Fourier transform can then be applied to produce a corresponding spatial domain representation of any dimension. The resulting sinusoids are coextensive with the reference signal tile, and are added to it, further adjusting pixel values.

In some embodiments, the software enables the brushes to be configured to apply signal-carrying patterns having different means and variances, as best suits the user's requirements. To introduce highlights into an artwork, a pattern having a light tone, such as a mean digital value of 200, can be employed. To introduce shadows, a pattern having a dark tone, such as a mean value of 50, can be employed. The variance, too, may be user selectable—indicating the degree of visible mottling desired by the content creator. As is familiar from graphics programs such as Photoshop, the user may invoke software to present a user-interface by which such specific parameters of the brush can be specified. The software program responds by generating a reference signal tile (or a needed excerpt) having desired mean and variance values.

One particular approach to enabling such variation in mean amplitude and variance is to store reference data for the tile as an array of real-valued numbers, ranging from −1 to +1. (Such an array can be produced by summing a +/− chip, and a synchronization signal value, for each element in a tile, and then scaling the resultant array to yield the −1 to +1 data array.) This reference data can then be multiplied by a user-selected variance (e.g., 15, yielding values between −15 and +15), and then summed with a user-specified mean value (e.g., 200, yielding values between 185 and 215) to generate a reference tile with the desired variance and mean.

The variance or the mean, or both, may be modulated in accordance with the stylus pressure. If the pressure increases, the darkness can be increased by reducing the mean value. (E.g., a nominal pressure may correspond to a mean value of 128; greater pressures may cause this value to reduce—ultimately to 30; lesser pressures may cause this value to increase—ultimately to 220.)

The spatial scale of the signaling pattern can also be varied, e.g., by specifying a reference signal tile that conveys its information at a specific spatial scale. For example, a tile that is usually 128×128 pixels may instead be specified as 256×256 pixels, causing the spatial scale to double (which halves the spatial frequency of the signaling components). Again, the user can set such parameter to whatever value gives a desired visual effect. (The reference data can be generated accordingly, e.g., by spreading the payload chips over a 256×256 data array, and summing with a spatial synchronization signal that has been transformed from its frequency domain representation to a spatial signal having a 256×256 scale.) Typically, a smaller scale is used, so that the payload can be recovered from a smaller excerpt of pattern-based art.

Some drawing applications associate a (virtual) physical texture with the canvas. This causes certain tools to behave differently: the virtual ink deposited depends not just on the tool configuration, but also on the surface microtopology where the ink is applied. At points where the surface microtopology has a local maximum, more ink is deposited (being analogous to more pressure being applied—by the surface more firmly engaging the tool at such locations). At valleys between such maxima, less ink is deposited.

So, too, with embodiments of the present technology. A texture descriptor associated with the canvas serves to similarly modulate the contrast with which the signal-carrying pattern is rendered on the canvas. The pattern is rendered more darkly at locations where the texture has higher local peaks. As the user applies more pressure to the stylus, more of the valleys between the peaks are filled-in with pattern (or are filled-in with darker pattern).

Figure 50A:
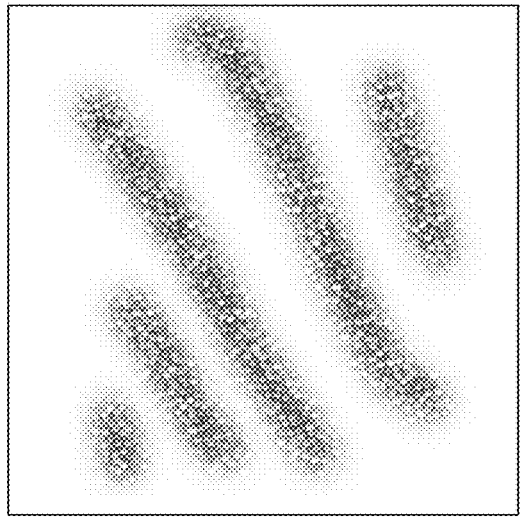
FIGS. 50A and 50B show how handwritten glyphs entered by a stylus can be patterned with different patterns, including a neural network-derived signal-carrying pattern.
Figure 50B:
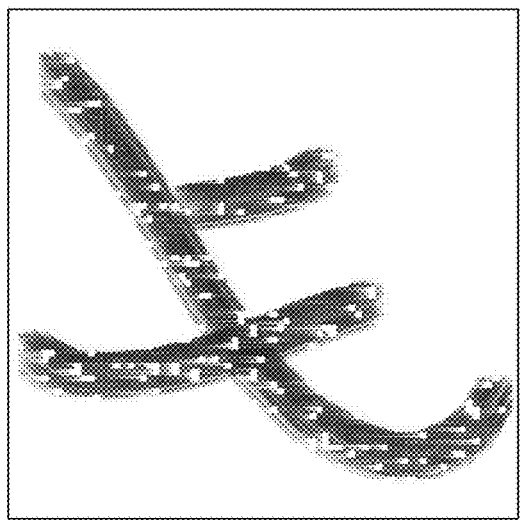

Although the depicted examples use a continuous-tone monochrome pattern consisting of just signal (e.g., the tile of FIG. 43), in many applications other signal-carrying patterns are used. Exemplary are the signal-carrying patterns produced using the neural network techniques described above. FIGS. 50A and 50B show stylus strokes with exemplary neural network-produced patterning. Patterns based on natural imagery (e.g., the rice grains and water droplets of FIGS. 15A and 15B) and synthetic imagery (e.g., bitonal geometrical patterns of the sort used in FIGS. 8-10) can both be used.

Figure 51:
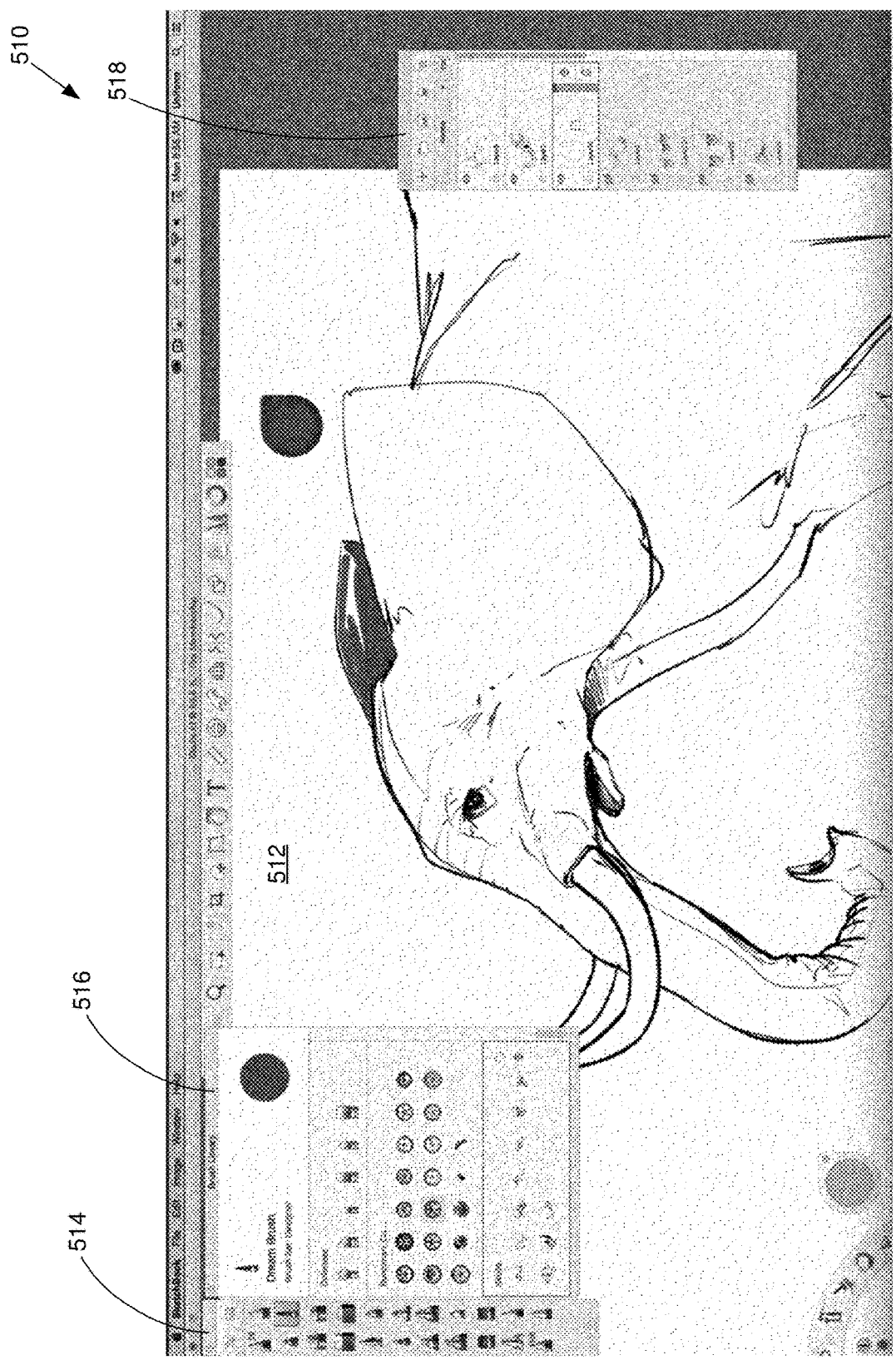
FIG. 51 shows the user interface of a prior art tablet drawing program.

FIG. 51 shows a prior art user interface 510 of a tablet drawing app (Sketchbook by Autodesk, Inc.). In addition to a drawing area 512, the interface includes a tools menu 514, a properties panel 516, and a layers guide 518. The user can pick up a desired tool (e.g., brush, pencil, etc.) by tapping the stylus on a corresponding icon in the tools menu 514. The properties panel 516 can be opened to customize the parameters of the tool. The layers guide 518 enables the user to select different layers for editing.

In some embodiments of the present technology, one or more tools are dedicated to the purpose of drawing with a signal-carrying pattern, as detailed above. These tools may be so denoted by including graphical indicia within the icon, such as the binary bits "101," thereby clueing-in the user to their data encoding functionality. When a user selects such a tool from the tools menu 514, selections can be made from the properties panel 516 to define signal-customization parameters, such as the pattern to be used (e.g., the patterns of FIGS. 1, 11, 15A, 44, etc.), color, mean value, variance, and scale—in addition to the parameters usually associated with prior art tools.

In other embodiments, no tools are dedicated to applying signal-carrying patterns. Instead, all tools have this capability. This capability can be invoked, for a particular tool, making a corresponding selection in that tool's properties panel. Again, signal-customization options such as mean value, variance, and scale can be presented.

In still other embodiments, all tools apply signal-carrying patterns. The properties panel for each tool include options by which such signal can be customized.

To review, certain embodiments according to these aspects of the technology concern a method of generating user-authored graphical content. Such method makes use of a hardware system including a processor and a memory, and includes: receiving authoring instructions from a user, where the instructions taking the form of plural strokes applied to a virtual canvas by a virtual tool; and responsive to said instructions, rendering a first signal-carrying pattern on the canvas in a first area included within a first stroke. Such arrangement is characterized in that (1) the content conveys a plural-bit digital payload encoded by said signal-carrying pattern; and (2) the signal-carrying pattern was earlier derived, using a neural network, from an image depicting a natural or synthetic pattern.

Another method is similar, but is characterized in that (1) the graphical content conveys a plural-bit digital payload encoded by said signal-carrying pattern; (2) the first signal-carrying pattern is rendered with a first mean value or contrast, due a pressure with which the user applies the physical stylus to a substrate when making the first stroke; and (3) the second signal-carrying pattern is rendered with a second mean value or contrast due to a pressure with which the user applies the physical stylus to the substrate when making the second stroke, where the second value is different than the first.

Another method is also similar, but involves—responsive to input from the user's virtual tool—rendering a first signal-carrying pattern on the canvas in a first area included within a first stroke, and rendering a second signal-carrying pattern on the canvas in a second area included within a second stroke, where the rendered first and second patterns both correspond to a common reference pattern stored in the memory. Such arrangement is characterized in that (1) the graphical content conveys a plural-bit digital payload encoded by patterns defined by the plural strokes; and (2) elements of the first pattern, rendered within the first area, have a variance or mean amplitude that differs from a variance or mean amplitude, respectively, of spatially-corresponding elements of the reference pattern.

Figure 52:
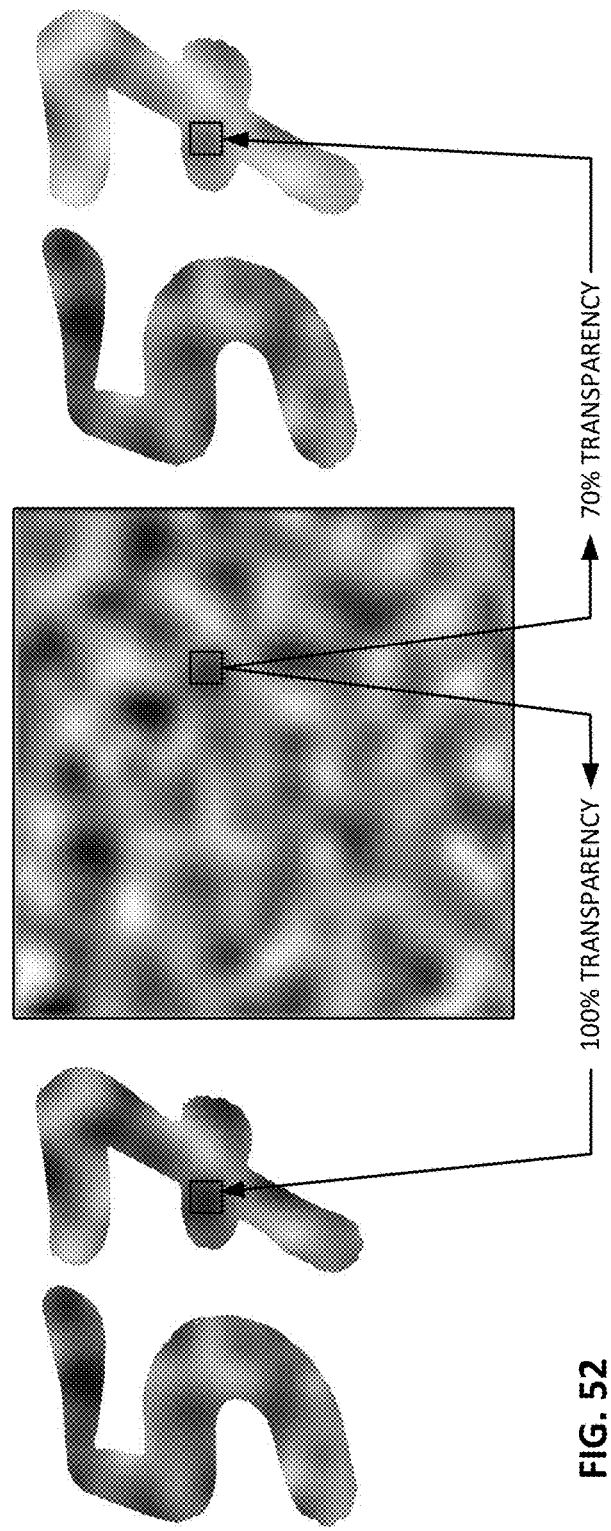
FIG. 52 shows correspondence between a signal-carrying pattern, and handwritten strokes of different pressures—causing the pattern to be rendered with different mean values.

An example of this latter arrangement is illustrated by FIG. 52. Elements of the "7" on the right side of the figure (e.g., within the small box), have a mean amplitude that is different than that of spatially-corresponding elements of the reference pattern (e.g., within the corresponding small box in the center of the figure).

Graphical content produced by the described arrangements can be printed and scanned, or imaged by a camera-equipped device (like a smartphone) from on-screen or a print rendering, to produce an image from which the payload can be extracted, using techniques detailed in the cited art. (The image format is irrelevant—data can be extracted from TIF, JPG, PDF, etc., data.) This enables a great number of applications, including authoring artwork for product packaging that encodes a UPC code or that links to product information, communicating copyright, indicating irrefutable authorship, and authenticating content (e.g., by use of digital signature conveyed by the pattern). It also helps bridge the analog/digital divide, by enabling handwritten notes—on tablets and electronic whiteboards—to be electronically stored and searched, using metadata that is inseparably bound with the notes.

Material from 62/751,084

Application 62/751,084 is incorporated by reference above. To facilitate reference, certain of its disclosures are reproduced below.

The signaling arrangements described below are advantageous in that they more closely approach the Shannon limit for information transfer (at a given reliability), than prior art sparse code arrangements.

Applicant discovered that prior art watermark detectors, which were generally optimized to discern optical codes hidden in continuous tone host artwork (e.g., as detailed in U.S. Pat. Nos. 9,747,656, 9,959,587 and application Ser. No. 15/628,400, filed Jun. 20, 2017, and references cited therein—sometimes also collectively referenced herein as "conventional" or "continuous tone" watermark decoders) are sub-optimal when applied to sparse codes, because most of the artwork in sparse codes is blank (or uniformly-toned). Although blank, the captured imagery in such areas is not uniformly-valued (e.g., not all such pixels have value of full-white: 255). Instead, there is typically slight variation among the pixel values, e.g., ranging between 230-255 for a white background. This variation leads prior art detectors to discern signals where, really, there is none. Such "phantom" signals act as noise that interferes with correct decoding of the true signal.

To avoid this problem, applicant devised various arrangements that limit, or avoid, recovery of phantom signals from areas that are expected to be devoid of signal (e.g., blank). In particular, such embodiments identify a subset of image locations (e.g., less than 50% of the image locations, and more typically 15%, 10%, or less, of the image locations) where the sparse dots are expected to be located. The decoder discerns message signal only from this small subset of locations. Noise is reduced commensurately. In a preferred embodiment, these locations correspond to extrema of the multi-valued 2D reference (registration) signal.

By arrangements such as those detailed below, Applicant has demonstrated that the number of dots used to represent a message can be reduced substantially compared to previous sparse code arrangements—such as taught in U.S. Pat. No. 9,635,378—by 30%, 50%, 70%, or more, without noticeably impairing robustness. (Robustness can be assessed by adding increasing levels of Gaussian white noise to an encoded image, and noting the noise level at which the detection rate falls from 100 to some threshold value, such as 98%, over a large number of sample images.)

In a first such embodiment, only 1024 dark marks are employed among the 16,384 areas within a 128×128 signal tile. The marks all represent the reference signal (by its extrema), but their selection represents the message signal.

The method starts with a reference signal tile—such as the one depicted as signal 70 in FIG. 53. (This figure is presented as FIG. 10 in publication 20190171856, which has additional information.) At the center of each square element (e.g., waxel) in the reference signal tile (e.g., in a 128×128 element tile), the reference signal has a corresponding real signal value, e.g., ranging from 0 (black) to 255 (white). (In other systems, such as shown in FIG. 53, the values are real-valued, e.g., varying from about −0.6 (black) to 0.6 (white).) The 16,384 elements are sorted by value to generate a ranked list, including the 2048 darkest elements. Each entry in the list is associated with an ordinal position (1, 2, 3 . . . ), and {X,Y} data specifying the element's position within the tile, by column and row. Table 1 shows an excerpt of such a list:

TABLE 1

| Rank | Value | {X,Y} |
|---|---|---|
| 1 | 7.1 | {18,22} |
| 2 | 7.33 | {72,32} |
| 3 | 9.6 | {1,33} |
| 4 | 10.21 | {26,82} |
| 5 | 10.55 | {14,7} |
| 6 | 12.2 | {33,73} |
| 7 | 13.7 | {19,83} |
| 8 | 13.8 | {1,123} |
| 9 | 14.2 | {78,23} |
| 10 | 14.8 | {26,121} |
| 11 | 16.2 | {100,15} |
| 12 | 16.3 | {119,99} |
| 13 | 17 | {70,34} |
| 14 | 19.5 | {87,65} |
| 15 | 19.6 | {34,108} |
| 16 | 21.4 | {98,73} |
| . . . | . . . | . . . |
| 2048 | 101.3 | {79,89} |

(The value of the reference signal is computed as a real number, rather than an integer value, at the center of each element, to assure an unambiguous order to the points.)

The payload, e.g., of 47 bits, is processed by convolutional encoding and, optionally, repetition and CRC-coding, to yield a message that is 1024 bits in length, as further detailed in publication 20190171856. Each bit in the message is associated with a successive pair of reference signal elements in the ranked list. One pair consists of the locations ranked 1 and 2. The next pair consists of the locations ranked 3 and 4. Etc.

If the first bit of the message signal is even-valued (i.e., 0), then the even-ranked location (i.e., #2) from the first pair in Table 1 determines a location in the output signal tile that is darkened. If that first bit is odd-valued (i.e., 1), then the odd-ranked location (i.e., #1) from that first pair determines the location in the output tile that is darkened. Similarly for the second bit of the message signal: choosing between locations ranked 3 and 4. Etc. Thus, 1024 of the reference signal elements are selected, from the 2048 elements identified in Table 1, based on the bit values of the 1024 message bits, and define 1024 locations in the output signal tile that are darkened.

To illustrate, consider a message that starts 01001110 . . . . In such case, the elements in the output signal tile identified in Table 2 are darkened:

TABLE 2

| {72,32} |
| {1,33} |
| {33,73} |
| {1,123} |
| {78,23} |
| {100,15} |
| {119,99} |
| {87,65} |
| {34,108} |
| ... |

Each of the 1024 dots in the output signal tile corresponds to one of the darkest values in the original reference signal tile. Each such dot also represents a corresponding bit of the 1024 message bits.

Figure 54A:
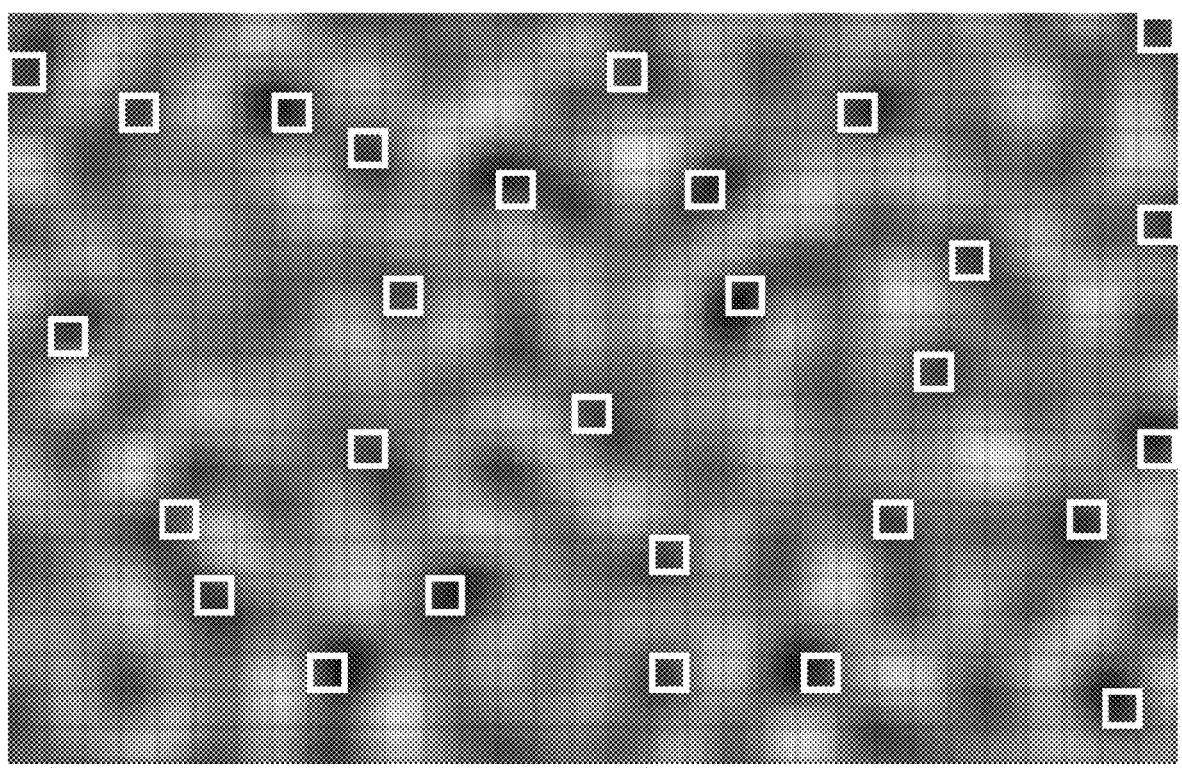
FIG. 54A shows an excerpt from a reference signal tile, with a set of 2N dark waxels identified.
Figure 54B:
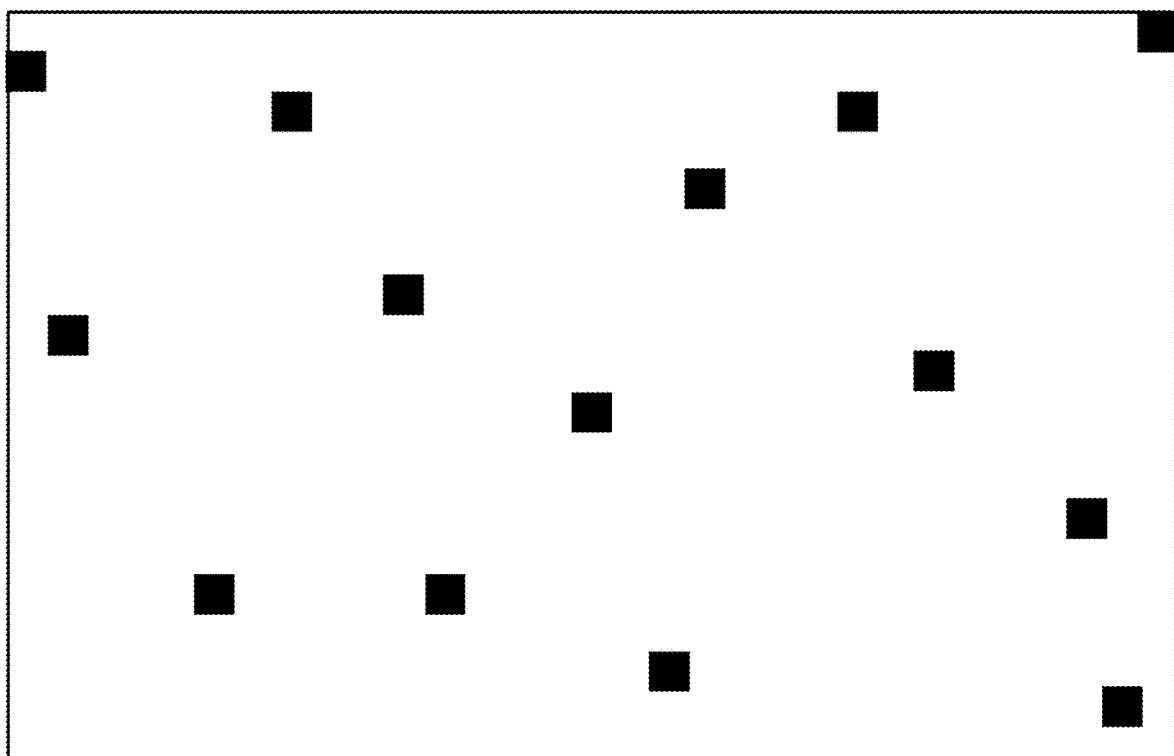
FIG. 54B shows an optical code produced using N of the dark waxels identified in FIG. 54A, to encode an N-bit message.

FIGS. 54A and 54B depict such an arrangement. FIG. 54A shows an excerpt of a reference signal, with certain waxels having extrema values (i.e., the darkest waxels) highlighted by white boxes. In the discussed embodiment, 2048 such extrema would be identified in a full reference signal tile. (The indicated waxels have been selected so that no two are immediately adjacent, enforcing a simple keep-out constraint.)

The extrema are paired (not shown), and one location of each pair is marked in accordance with a respective bit of the message signal, yielding a sparse code excerpt like that shown in FIG. 54B. 1024 locations are marked in the complete 128×128 waxel tile—half of the 2048 candidate locations.

In decoding a captured image depicting a sparse pattern like that shown in FIG. 54B, the affine transformation of the image is first determined by reference to the reference signal. (Although the dot markings of FIG. 54B are sparse, they are sufficient, across a larger excerpt of the tile, to characterize the affine transformation of the captured image, since the dots correspond to extrema—the most significant portions of the reference signal.) The image is then typically counter-distorted to restore the pattern to its original presentment. (More precisely, the received image is re-sampled in accordance with a coordinate system that is defined from the determined affine transformation.) These operations are more particularly detailed in the earlier-cited prior art documents.

To extract the message, the detector uses its own copy of data from Table 1. (This table is consistent for all marks employing the particular reference signal, and occupies negligible memory in the detector code.) The detector examines the counter-distorted imagery to determine the pixel values at the two locations specified by the first pair of entries in the table (i.e., ranks 1 and 2). Ideally, one is dark and one is light. The dark one indicates the value of the first message bit. The detector then examines the imagery to determine the pixel values at the third and fourth entries in the table (i.e., ranks 3 and 4). Again, ideally one is dark and the other is light. The dark one indicates the value of the second message bit. And so on.

In actual practice, the two locations examined by the detector—in considering each possible bit of the message—may be far apart in value (indicating high confidence in the bit determination) or may be closer together in value (indicating less confidence). To quantify the confidence associated with each message bit determination, a score is computed based on the values of the pixels at the locations indicated by the odd- and even-numbered entries of the pair in the table. One suitable score is:

Score=$\log_2$(value of pixel at even location/value of pixel at odd location)

In the above example, if the value of the pixel at the even location {72,32} is 30 and the value of the pixel at the odd location {18,22} is 240, the score is a negative 3, indicating that the first bit of the message has value "0." (Any negative value indicates the bit value is "0.")

Considering the next bit, the detector may find the value of the pixel at the even location {26,82} to be 130, and the value of the pixel at the odd location {1,33} to be 101. In this case the score is 0.364. The positive score indicates the corresponding bit value is "1." The absolute magnitude of the score, however, is low (e.g., relative to the absolute value of the first bit score: 3). This indicates less confidence in this determination.

The string of message bits obtained by this procedure (after considering all 2048 candidate locations in the counter-distorted imagery), together with the confidence score for each, is applied to a soft decoder, such as a Viterbi, Reed-Solomon, or Turbo decoder. From these raw bit determinations and confidence scores, the decoder returns the original 47-bit payload.

It will be recognized that the just-described decoder examines just 2048 locations in the 16,384-waxel reference signal tile. The other 14,336 waxels are disregarded, so that any phantom signal present in those other waxels does not interfere with decoding.

The just-described arrangement pairs extrema points in the reference signal based on adjacency in a sort order. This is a reasoned choice, because the alternate locations for each payload bit representation are of similar reference signal strength. But this is not essential. Pairing can be done in any fashion, e.g., randomly within a subset of reference signal elements having values below a threshold value.

To review, in this first particular sparse embodiment, the message consists of plural bits, each having a first or a second value (e.g., 0 or 1) at a respective position in the binary message string. A list of M (e.g., 2048) 2D reference signal elements is ranked by value, so that each has an ordinal position in the list, and each is associated with a location in the 2D reference signal. The list thus defines plural pairs of elements, having ordinal positions of 2N−1 and 2N, for N=1, 2, . . . (M/2). Each pair of elements includes an element with an even ordinal position and an element with an odd ordinal position. Each position in the message signal is associated with a pair of elements in the ranked list. A mark is provided in the output signal tile at a location corresponding to the location of the even element in a pair, when the associated position in the message signal has a first value (e.g., "0"). Similarly, a mark is provided in the output signal tile at a location corresponding to the location of the odd element in a pair, when the associated position in the message signal has a second value (e.g., "1").

In the just-described first particular sparse embodiment, a message signal of 1024 bits is represented by 1024 marks (dots), located among 2048 candidate locations. That is, a mark is formed for each message bit, regardless of whether the bit has a value of "0" or "1." In a second particular sparse embodiment, this is not so.

In the second particular sparse embodiment, each respective bit position in the message string is associated with a single extrema location in the reference signal (not a pair of locations, as in the first sparse embodiment). Each successive bit of the message signal can be mapped to a successive location in the Table 1 ranking, i.e., the first message bit corresponds to the darkest extrema (rank #1); the second message bit corresponds to the second-darkest extrema (rank #2), etc.

In this second sparse embodiment, a message bit of "1" is signaled by a mark, but a message bit of "0" is signaled by absence of a mark. (Or vice versa.) Instead of drawing from 2048 candidate locations and marking only half, this second sparse embodiment draws from 1024 locations. Some of these 1024 locations are marked and some are not—depending on whether a "1" or "0" bit is being represented at that location.

Figure 55A:
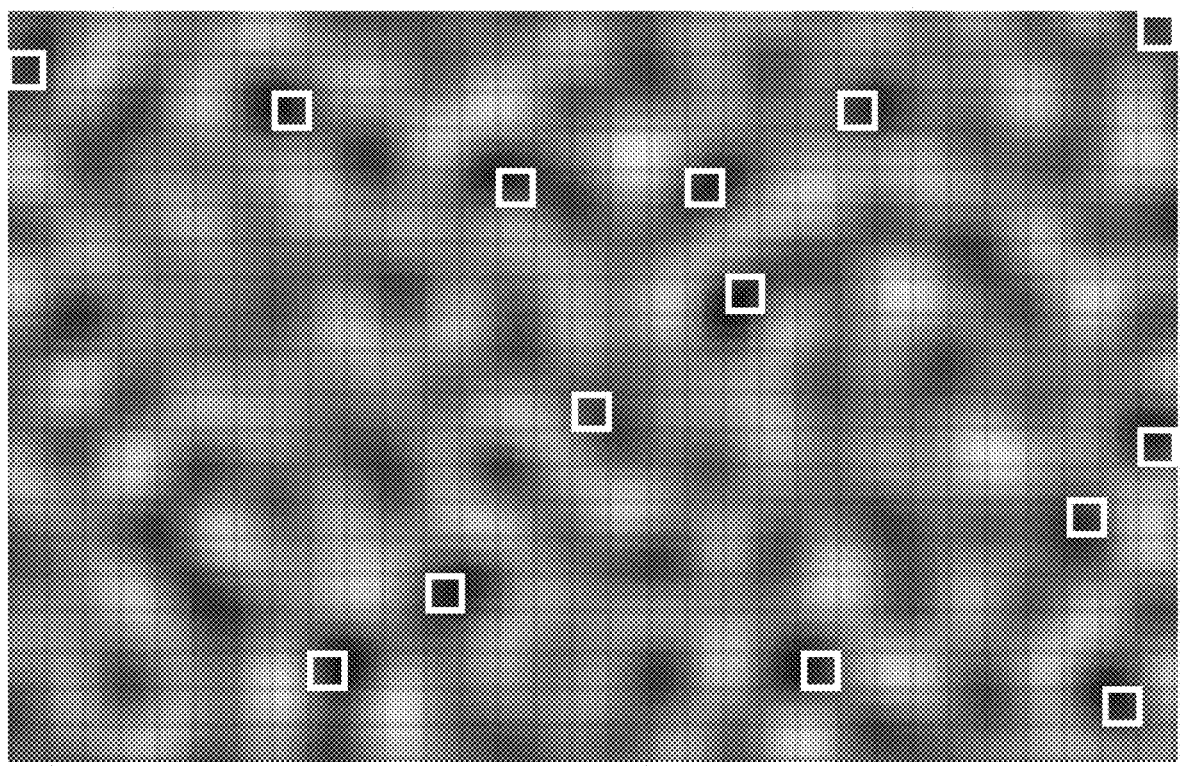
FIG. 55A shows an excerpt from a reference signal tile, with a set of N dark waxels identified.
Figure 55B:
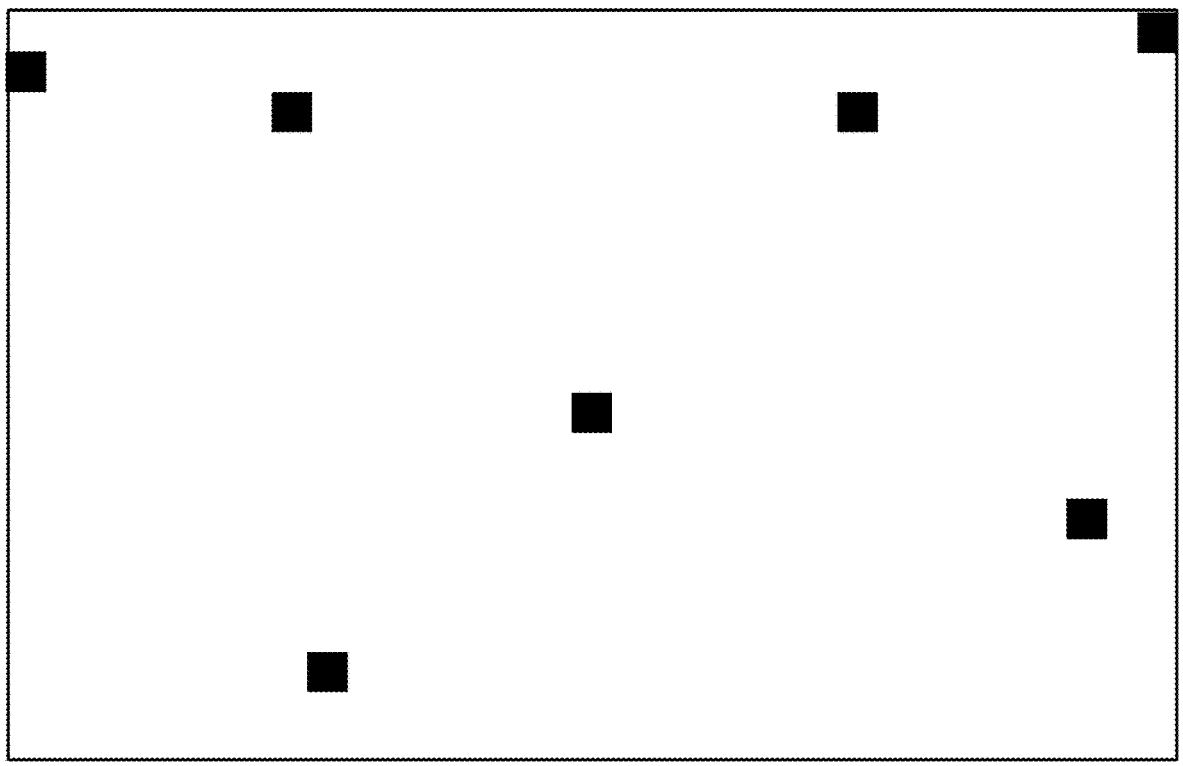
FIG. 55B shows an optical code produced using N/2 of the dark waxels identified in FIG. 55A, to encode an N-bit message.

This second arrangement is illustrated in FIGS. 55A and 55B. In comparison with FIGS. 64A and 64B, it will be seen that only half as many candidate locations are identified. (These, are, however, the darkest of the dark waxels. The lighter ones highlighted in FIG. 54A are no longer selected in FIG. 55A.) Of these candidate locations, about half are marked. (The number of "1" bits in the message signal, meriting a mark, is commonly between 400 and 600 bits; the number of marked locations is rarely exactly half of the 1024 candidate locations.)

As in the first sparse embodiment, the detector in this second sparse embodiment is coded with a list of the 1024 candidate locations, and the association of each location to a respective bit position in the 1024-bit message string.

It will be recognized that this second particular sparse embodiment of FIGS. 55A and 55B involves many fewer marks, and is thus much less conspicuous than the earlier, first sparse embodiment. The decoder examines only 1024 locations for data, rather than the 2048 in the first sparse embodiment. 15,360 of the 16,384 locations in the reference signal tile are disregarded—further cutting down on the influence of phantom signals. However, the information conveyed by the dots (the message signal and the reference signal) is conveyed with correspondingly less robustness, since roughly half as much ink is used to convey the same amount of information.

Due to the redundant, e.g., convolutional, coding of the payload to produce the string of message signal bits, robustness of the message signal is not usually an issue. The correct payload can typically be recovered even from the smaller number of dots employed in the second particular sparse embodiment. However, this reduction in the number of dots also reduces the robustness of the reference signal—sometimes to an unacceptable level (which depends on the particular application).

To increase the robustness of the reference signal, extra dots (fixed marks) can be added to the FIG. 55B pattern—serving only to further express the reference signal; not indicating any message bits.

To illustrate, in this second particular sparse embodiment, the 1024 bit message signal may comprise 505 "0" bits and 519 "1" bits. 519 marks are thus formed in each output signal tile to represent the message signal. To increase the robustness of the reference signal, an extra 300 fixed marks may be added, signaling just the reference signal.

In one such sparse embodiment, an ordered list of the 1324 most extreme values in the reference signal is produced (e.g., by sorting)—each with an associated spatial location (as in Table 1 above). The first 1024 locations are allocated for expression of bit values. (In the example just-given, 519 of these 1024 locations are marked.) The final 300 locations from the ordered list (i.e., locations ranked as #1025-#1324) are employed as fixed marks—solely to boost the reference signal. By using 300 extra locations to express the reference signal, the number of dots from which a decoding system can discern the reference signal (and the affine transformation of the captured image) increases from 519 to 819—an increase of 58%.

The gain in reference signal robustness actually falls short of this just-quoted 58% figure because the fixed mark locations correspond to less-extreme values of the reference signal. In a variant sparse embodiment, however, the extrema locations dedicated to expressing solely the reference signal may instead be taken from the top of the ranked list. In the foregoing example, of the 1324 locations in the ordered list, locations #1 through #300 can be used for fixed marks—solely to solely express the reference signal—while locations #301 through #1324 can be used to express the bits of the message signal (as well as to express the reference signal). In such variant, the strength of the reference signal increases by more than the 58% indicated by the simple ratio of 819/519, since the 300 fixed marks correspond to the most extreme values of the reference signal.

In other sparse embodiments, fixed marks devoted solely to expression of the reference signal can be drawn from the middle of the ranked list, or drawn from scattered positions within the list. For example, every sixth location in the ranked list can be dedicated to expression of the reference signal, and not represent any message signal bit.

In yet other sparse embodiments, the payload is not expressed as a 1024 bit string with, e.g., 519 dark marks. Instead, the convolutional coding rate is adjusted to reduce the length of the resultant message bit string, e.g., to 600 or 800 bits, for which commensurately fewer locations are marked. The payload can still be recovered, due to its redundant, convolutional coding. The extrema locations that are thereby freed from message transmission can be used, instead, as fixed marks, to represent the reference signal.

Combinations of the foregoing arrangements can also naturally be used.

(While 300 fixed marks were referenced in the foregoing discussion, it will be recognized that the reference signal can be supplemented by marks at any number of extra locations—as best fits the application. In some applications, 100 or less such extra locations can be employed. In others, 500 or more such extra locations can be employed. Similarly, while the use of fixed marks is described in the context of the second particular sparse embodiment, such arrangement can be employed in all of the sparse embodiments detailed herein.)

In a third particular sparse embodiment, 1024 message bits are again represented by 1024 marks. However, rather than being drawn from 2048 possible locations, these 1024 marks are found in 1024 twin-waxel areas. The bit encoded by each mark depends on which of the two waxels is marked in its respective area.

In particular, the marks in this third sparse embodiment are 2×1, or 1×2, element features, termed "dyads." Each dyad comprises a marked element adjacent an unmarked element.

Figure 56A:
FIGS. 56A-56D show 4 different dyads, for signaling "0" and "1" bits using horizontally- and vertically-oriented waxel pairs.
Figure 56B:
Figure 56C:
Figure 56D:

Four possible dyads are shown in FIGS. 56A-56D. FIGS. 56A and 56B show horizontal dyads. FIGS. 56C and 56D show vertical dyads. FIG. 56A represents a "0" message bit. FIG. 56B represents a "1" bit. FIG. 56C represents a "0" bit. FIG. 56D represents a "1" bit. Each is comprised of a dark (marked) element adjacent to a white (unmarked) element.

In this third embodiment, instead of ranking candidate single elements in the reference signal tile by value (e.g., as in Table 1), 2×1 and 1×2 areas across the tile are ranked by their average (or total) value. The darkest 1024 areas are selected. Each is associated with one bit position in the 1024 bit message. Each area is marked with a dyad. If a selected area is horizontally-oriented, one of the two horizontal dyads, FIG. 56A or 56B, is used—depending on whether the message bit to be encoded at that location is a "0" or a "1." Similarly, if a dark region is vertically-oriented, one of the two vertical dyads, FIG. 56C or 56D, is used—depending on whether the message bit to be encoded at that location is a "0" or a "1."

Figure 57A:
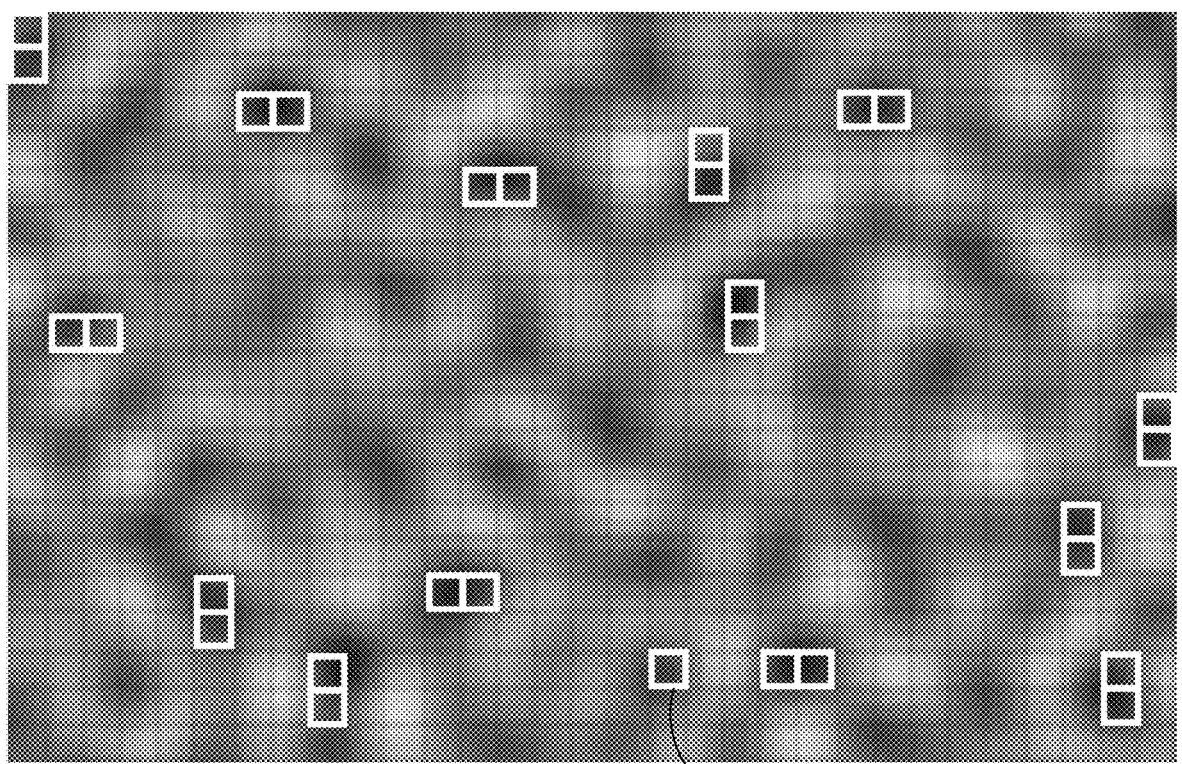
FIG. 57A shows an excerpt from a reference signal tile, with a set of N dark waxel pairs identified.
Figure 57B:
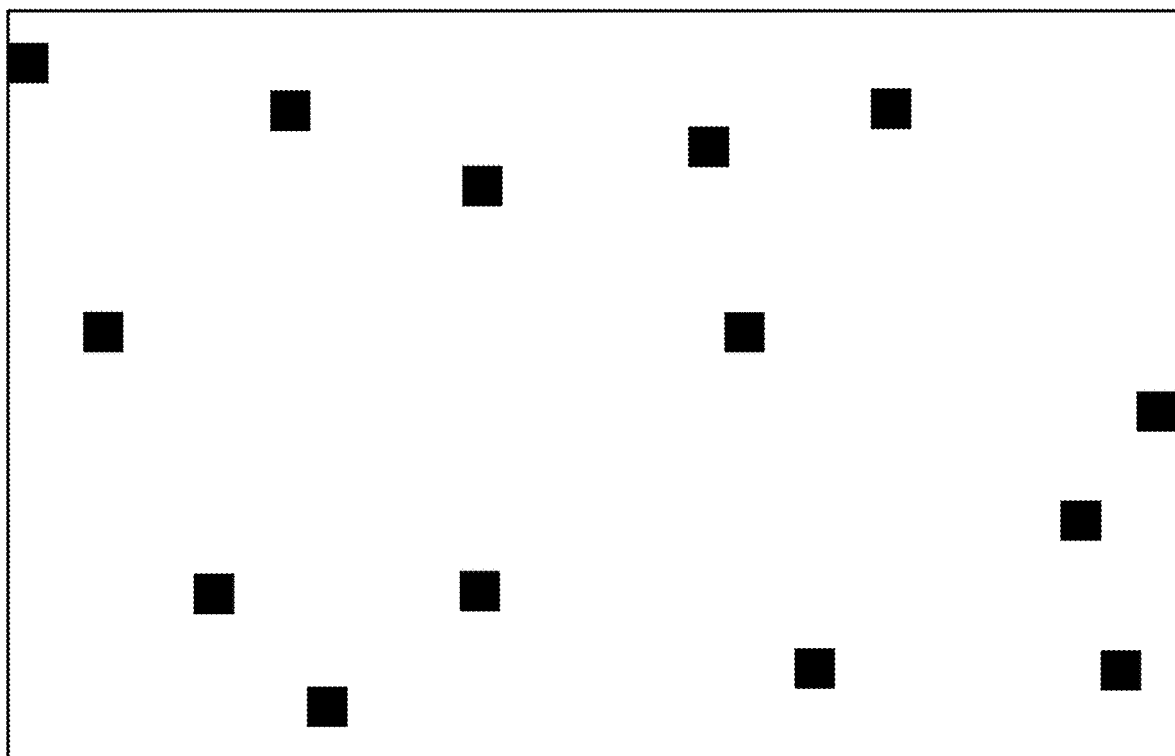
FIG. 57B shows an optical code produced by marking one waxel from each waxel pair identified in FIG. 57A.

This is made clearer by the example depicted in FIGS. 57A and 57B. FIG. 57A shows the 1×2 and 2×1 waxel regions of the reference signal that are found to have the lowest signal values (i.e., darkest—in sum or average). In FIG. 57B, one waxel of each dyad is marked, depending on whether the message signal bit represented by that dyad has a "1" or "0" bit—using the arrangements shown in FIGS. 56A-56D. The number of marks, across the entire reference signal tile, is the same as in the first sparse embodiment (FIGS. 54A, FIG. 54B), although the positions of the dots are different due to the different selection criteria employed (i.e., darkest pairs of adjoining waxels).

Each dot in this third embodiment is always approximately at the same location—regardless of the message being encoded—shifting only a single waxel element one way or the other depending on its bit value. This contrasts with the first sparse embodiment, in which each dot can be placed at either of two potentially-widely-spaced locations. The generally-consistent placement of dots in this third embodiment, around 1024 locations, can be advantageous, e.g., in sparse markings of small physical areas, where the 2048 possible locations required by the first sparse embodiment may sometimes force two dots to be in objectionable proximity, or may place a dot too close to adjoining text.

A variant of this third embodiment does not rank candidate areas based on the average (or total) value of two adjoining elements of the reference signal. Instead, a ranking is obtained based on individual element values—as in the first and second sparse embodiments. 1024 of these extreme locations are selected, and each anchors a two-waxel area that is associated with a bit position in the message. Each is analyzed to determine the structure of the reference signal pattern at that location: does it evidence a horizontal aspect or a vertical aspect? In one particular implementation, the four edge-adjoining waxel elements, i.e., to the north, south, east and west of a selected element, are examined to determine which has a value closest to the (extreme) value of the selected element. The one closest in value is selected as the second element that is paired with the selected element for placement of a dyad. As before, different dyads are placed at different locations, to signify different bit values.

Sometimes a single element of the reference signal may have an extreme (dark) value, but be surrounded by much lighter elements, so that no two-element area including the extreme element is selected for placement of a dyad. (Such an isolated element is shown at 671 in FIG. 57A.) These single dark elements are candidates for marking to reinforce the reference signal—if needed. In some implementations, a list is generated of the 100, 300 or 750 darkest elements that were not selected for placement of a message bit-indicating dyad, and these elements are marked instead to express the reference signal.

As in the above-described sparse embodiments, the detector is coded with information indicating the locations where dots will be placed (here, 1×2 and 2×1 waxel areas), and the association of a message bit position to each such area. As before, the detector examines only those locations in the captured imagery that are expected to carry a dot (2048 in this embodiment—2 locations for each dyad); the other locations are excluded from demodulation.

(In variations of the foregoing embodiments, this information about locations where dots will/may be placed, and the message bit-significance of each location, is not hard-coded into the detector. Instead, the detector computes it on the fly, based on its knowledge of the reference signal—from which it can identify and rank extrema, and construct a message bit mapping.)

While reference was made to assignment of successive bits of the message signal to elements of the reference signal in order of successive reference signal values, this is not essential. For example, in another arrangement, the assignment can be made based on spatial arrangement of the reference signal extrema. For example, in the second sparse embodiment, 1024 extrema can be identified, and assignment can start in the upper left of a reference signal tile, with the leftmost extrema in the topmost row assigned to the first bit of the message, and subsequent extrema assigned to subsequent message bits in order of a raster scan across and down the tile. These and other such mappings may be regarded as rational, i.e., based on logical rules. Such rational mappings are in contrast to prior art methods, in which successive message bits were assigned to locations in a 128×128 message tile on a deliberately random (or more accurately pseudo-random) basis.

Figure 58A:
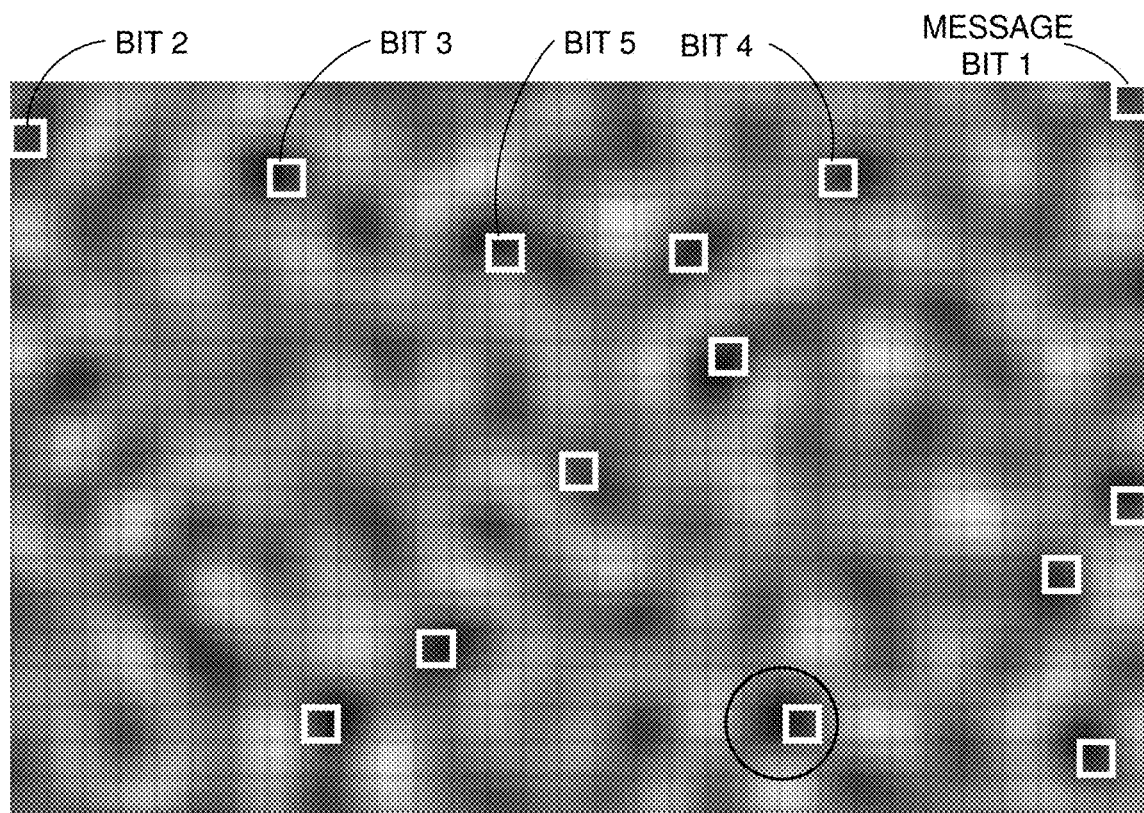
FIG. 58A shows an excerpt from a reference signal tile, with a set of dark waxels identified—each of which is associated with a message bit in accordance with the waxel's spatial location.
Figure 58B:
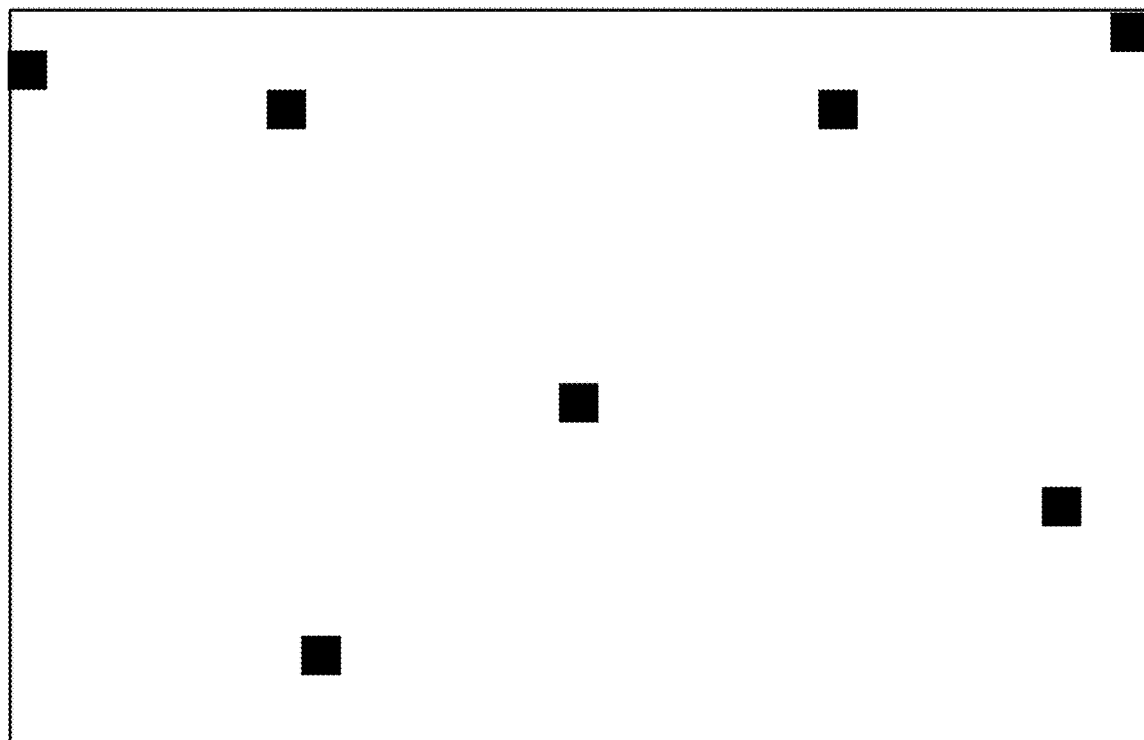
FIG. 58B shows an optical code, starting with 11110, produced by marking certain of the waxels identified in FIG. 58A.

Such a bit assignment arrangement is shown in FIGS. 58A and 58B, in which message bits 1-5 (of a 1024 bit message) are identified based on their spatial location. Since in this second sparse embodiment, the presence of a mark indicates a "1" bit, and the absence of a mark indicates a "0" bit, it will be understood that the marks shown in FIG. 58B indicate a message string starting with the five bits 11110.

Figure 59A:
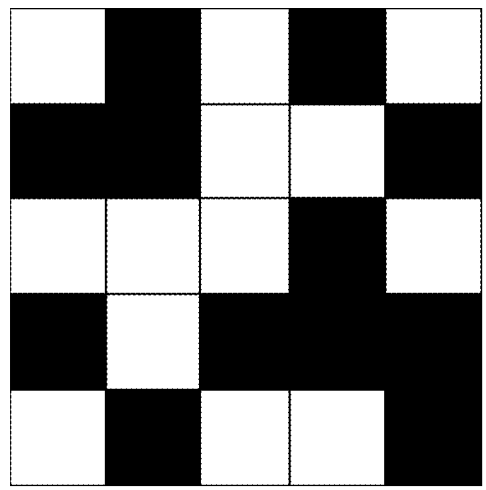
FIG. 59A is a diagram illustrating a tile of an optical code component. This may be used as a reference signal component, an encoded payload component, or a reference signal encoded with a payload. It may also be used as an encoded payload signal that is arranged into a reference signal structure.

A fourth particular embodiment starts with a binary message signal tile of the sort shown (in excerpted form) in FIG. 59A. The 1024 message signal bits are redundantly spread across the 16,384 waxel locations in a tile, with approximately 8,192 dark elements (i.e., signaling a message value "0") and a like number of light elements (i.e., signaling a message value "1").

This fourth embodiment enables the number N of dark elements in the final sparse output tile to be roughly-settable by the user, as an input parameter. Say we want about 750 dots. Twice this number of darkest elements in the reference signal tile (e.g., the darkest 2N locations in the reference signal tile shown in 59B) are identified—here 1500 waxel locations. Dots are formed in the output sparse code where one of the—8,192 dark elements in the binary message code pattern (i.e., representing a "0") is found at one of these 1500 identified waxel locations. Put another way, the 1500 identified waxels start out dark, but are turned off wherever the message tile wants to encode a "1" datum.

Figure 59B:
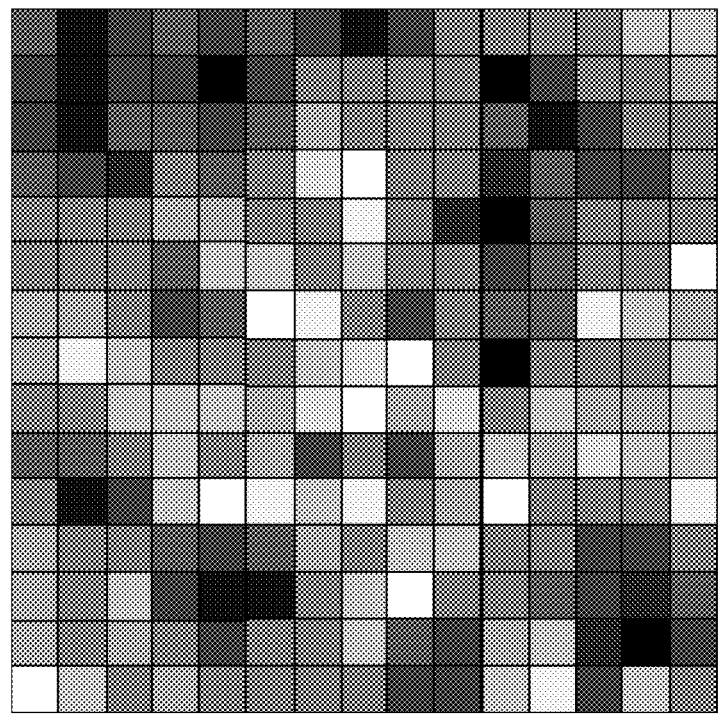
FIG. 59B is a diagram of a tile of an encoded payload signal.

(FIGS. 59A and 59B are presented as FIGS. 8 and 7 in publication 20190171856, which includes related information.)

An advantage to this fourth embodiment (in addition to the user-settable number of dark elements) is that it can be decoded with the prior art watermark decoders identified above. That is, bits of the message are located in their conventional, randomly-spread spatial locations—although many such locations are left blank.

As with the other embodiments, the decoder begins by compensating the captured imagery for affine distortion, using the reference signal in the conventional manner (i.e., as described in the above-cited references). In decoding the message signal, only data from the 2N identified locations (of reference signal dark elements) are considered by the decoder. A value of 255 (white) can be substituted for all other elements—overwriting any phantom signal that may otherwise be present at those locations. This improves the robustness of the message decoding, compared to prior art watermark decoding.

In this fourth embodiment, as in others, the procedure to create a sparse optical code can be executed at a resolution that matches the resolution with which the code will be printed. In other implementations the procedures are executed at a lower resolution. In these latter cases, the resulting sparse patterns can be up-sampled to a higher, print, resolution—typically while maintaining the same number of dots. (For each dot, the nearest integer neighbor to each fractional up-sampled coordinate at the print resolution is chosen to carry the dot.)

Up-sampling of a signal from a native tile resolution (e.g., 128×128) to a print resolution (e.g., 203 DPI) may result in a dot being placed at a location not coincident with a local extrema of the reference signal in the up-sampled signal space. Steps can be taken to mitigate this issue.

Figure 60A:
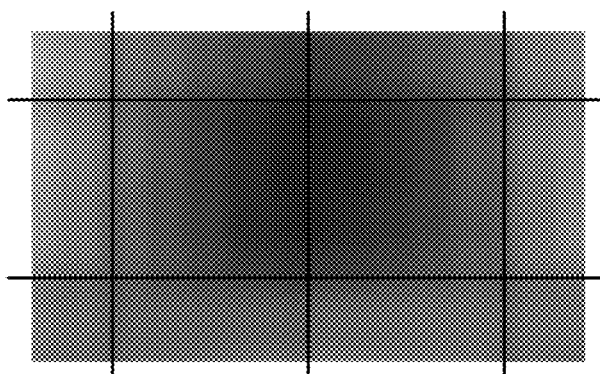
FIGS. 60A-60D illustrate how a reference signal can have an extrema near a boundary between two waxels at one resolution, leading to mis-identification of the extrema at a higher resolution, and a solution thereto.
Figure 60B:
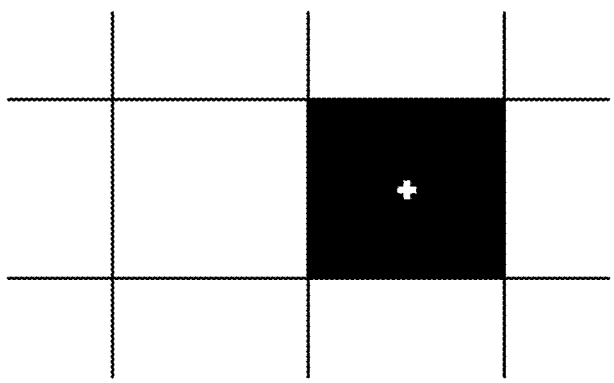

Consider, for example, the excerpt of the reference signal denoted by the circled area at the bottom of FIG. 58A. This area is shown greatly enlarged in FIG. 60A, with waxel boundaries more clearly indicated. The local extrema of the reference signal in this area is near the boundary between two waxels. The right waxel is the darker, and is darkened in the output code if the value of the message signal element mapped to this location is a "0." A corresponding excerpt of the resultant sparse output code is as shown in FIG. 60B.

Figure 60C:
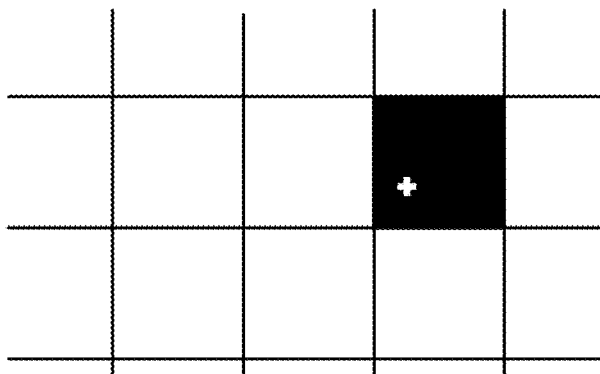
Figure 60D:
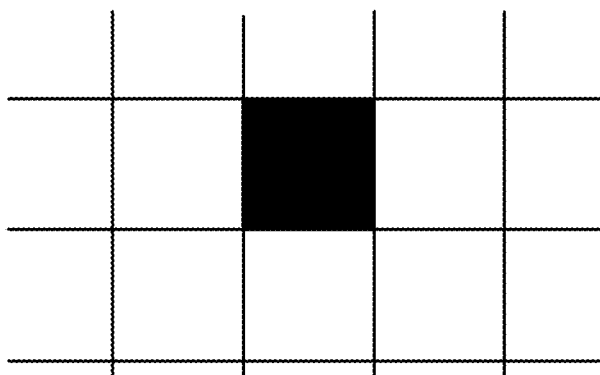

If the original sparse output code is up-sampled by a factor of 3/2, and the single dot from the original code is maintained in the up-sampled code at the element corresponding to the center of the original dot (shown by the white plus signs), then an output code such as shown at FIG. 60C results. However, a more faithful reproduction of the true reference signal extrema (per FIG. 60A) is obtained by nudging the dot one element to the left, as shown in FIG. 60D.

In a particular implementation of the fourth embodiment encoder, the up-sampled sparse code is processed to identify which dots are no longer at sample points that best correspond to extrema points of the reference signal. These dots are nudged (tweaked) left or right, or up or down, to reposition them to better-coincide with true reference signal extrema locations, prior to printing. This aids in obtaining accurate geometric registration of captured images of the code, which, in turns, improves recovery of the message bits.

However, such nudging can impair decoding of the message bits if the decoder is not alert to it, since dots are generally placed away from their ideal message-signaling locations. Fortunately, such issues can be recognized by the decoder, because artifacts due to up-sampling of the reference signal extrema points are predictable, and such data can be stored in a table included with the decoder. For example, after geometric registration (and optional down-sampling), a decoder can consult a stored data table identifying dots which, if present, should be nudged in a particular direction prior to demodulation, and by how much. (In other embodiments, instead of consulting a table to obtain such information, the decoder can model up-sampling of a sparse code and identify which dots—like the dot in FIG. 60D—were nudged to better coincide with reference signal extrema. The decoder then applies a corrective-nudge of each such dot prior to extracting the encoded message.) In some embodiments the nudges are fractional parts of a waxel, or of printed dot rows/columns, as needed to decode with greatest fidelity.

Decoding can also be aided by transforming the captured imagery back to the print resolution for decoding, rather than transforming back to the native tile resolution.

As in other embodiments, with very sparse signals, the reference signal may become difficult to detect due to a paucity of ink. As before, this can be redressed by adding further dots at locations corresponding to additional extrema of the reference signal. The detector is configured to ignore dots at these additional locations when extracting the message signal; they serve only as reference signal data. (Or, if a prior art detector is used, and does not ignore such further dots, the convolutional coding of the message bit will generally permit correct recovery of the payload, notwithstanding the further dots.)

In this fourth embodiment, experiments suggest that, if a dot is detected at a location, this pretty reliably signifies that the probability of "1" message bit being represented at that location is nil. However, if a dot is not detected, things are less certain, with the probability that a "0" bit is represented depending on the value of the reference signal at that location.

As the value of the reference signal approaches zero (dark), the probability that a "0" bit is represented diminishes accordingly (and the probability that a "1" bit is represented increases accordingly). But as the reference signal increases in value (e.g., to 128 and beyond), not-detecting a mark is associated with lower probability determinations. A "1" may be represented—or maybe a "0." It's a coin-flip at values above about 128. Such conditional probability assessments can be provided to a soft-decoder, together with the respective waxel values, for enhanced decoding.

Although the four just-discussed embodiments employ a reference signal with a random appearance, in other implementations a reference signal with a structured appearance (e.g., as discussed in connection with FIGS. 36 and 36A of publication 20190171856) can be used instead.

In certain implementations of the foregoing embodiments, the candidate extrema of the reference signal are filtered to enforce a distance constraint (keep-out region), e.g., so that no two extrema (whether individual elements, or dyads) are closer than a threshold distance from each other. In some such embodiments, the keep-out region may be non-symmetric around a vertical and/or horizontal axis (e.g., as shown in FIGS. 55-57D of publication 20190171856).

In other implementations, dots may be clumped, depending on the values of the reference signal extrema. In one such arrangement, if first and second edge- or corner-adjoining waxels are both among the 1024 lowest-valued reference signal values in a tile, and one of them is among the X lowest-valued reference signal values (where X is e.g., 20-200), then they both may be marked (or may serve as candidates for marking, in the case of bit-representing marks)—notwithstanding their proximity. If a third waxel edge- or corner-adjoins both the first and second waxels, and it is also among the 1024 lowest-valued extrema, then it may be marked too. Ditto a fourth extrema-valued waxel that adjoins the previous three waxels. In this last instance, a 2×2 region of waxels is marked. (Such arrangement can result in a few 2×2 marked regions, a few more clumps of 3, and still more clumps of 2, but not more than X such clumps in total, per tile.)

Dot clumping is most commonly used when the contrast between the dot color and the substrate color is not conspicuous due to human visual system insensitivity. For example, dots of Pantone 9520C ink (a very pale green), on a white substrate, are difficult to discern by humans. However, red light scanners, of the sort used at supermarket point of sale stations, can readily distinguish such markings. (Further information about Pantone 9520C ink, and its use, is provided in patent publication 20180047126.)

While reference was made to sorting the values of image elements to identify extrema, techniques other than sorting, per se, can be used. For example, a thresholding operation can be applied to identify reference signal waxels having values below, e.g., 30. If that operation does not yield enough locations, the threshold can be raised to 40, and applied to the locations that did not pass the earlier thresholding test, etc. The threshold can be raised until the needed number of points is identified. (If required for a particular implementation, this smaller set of points can then be sorted.)

Although important decoding advantages are achieved by disregarding predictably-blank areas in the captured imagery, it will be understood that identifying such areas first typically requires geometric registration of the captured imagery, e.g., correcting for affine distortion. Determining affine distortion is performed by considering the complete set of captured imagery; no area is disregarded at this stage of operation. Disregarding blank areas is used after registration—to enhance decoding of the message bits.

It will be understood that the sparse patterns resulting from the above-described first through third embodiments cannot be decoded using the cited prior art watermark decoders. Although geometric registration of imagery depicting such patterns (e.g., determining their affine transforms) can proceed in the previous manner, the representation of the message signal itself is unconventional, and must be performed by a decoder designed for this purpose.

The sparse pattern resulting from the fourth embodiment may be, but desirably should not be, decoded using the cited prior art watermark decoders, because such decoders do not know to ignore predictably-blank areas of the sparse code.

In a preferred implementation, a decoder is multi-functional—able to apply different decoding procedures to different marks. Such a decoder makes an initial determination of the type of encoding used to represent the message signal, and applies a corresponding decoding method.

In one such arrangement, the type of encoding is signaled by the presence or absence of certain spatial frequencies in the reference signal. As noted, this reference signal typically comprises several dozen different spatial frequencies (and phases). A few more spatial frequencies (e.g., 1-10) can be added (or omitted) to serve as a flag, to a compliant detector, indicating that a particular one of the just-detailed encoding procedures is being used, and that a corresponding decoding method should likewise be used. That is, such a detector examines the reference signal to determine whether certain flag spatial frequencies are present (or absent) in the reference signal, and applies a decoding method corresponding to the output of such determination. The presence or absence of such frequencies does not interfere with the reference signal's purpose of enabling synchronization of the decoder to the message signal, since that synchronization process is robust to various distortions of the reference signal.

In another embodiment, the decoder begins by compensating the captured imagery for affine distortion, using the reference signal in the conventional manner. It then examines locations that are used for marking in the embodiments detailed above, and locations that should be blank. The decoder determines which are marked, and which are unmarked. If some threshold number K of marks are found at locations where a particular embodiment should have no mark, then that embodiment is ruled-out. Similarly, if some threshold number M of unmarked regions are found at locations where a particular embodiment should have a mark, then that embodiment is ruled-out. By a process of elimination, the decoder narrows down the possibilities to hopefully one, or in some instances two, particular sparse embodiments that may be in use. It then applies a decoding algorithm for the one embodiment and, if that does not yield valid data (e.g., as indicated by checksum information), it applies a decoding algorithm for the second embodiment (if still a candidate).

One particular implementation identifies tile locations that should not have any marking, by identifying extrema of the reference signal that are light, i.e., of values greater than 128. This can be done by sorting the reference signal samples for the 16,384 tile locations to identify, e.g., the 1024 highest-valued extrema. A like number of lowest-valued (darkest) extrema of the reference signal are conversely determined. If the number of dots in the locations associated with the lowest-valued extrema is J times the number of dots in the locations associated with the highest-valued extrema (where J is, e.g., 2 or 3 or more), then the input signal is apparently a sparse mark, and a sparse decoding procedure can be applied. Else, a conventional watermark decoding procedure can be applied.

A related arrangement computes two correlation metrics from the input signal after oct-axis filtering (e.g., producing output values in the range of −8 to 8) and geometric registration. A first metric is based on signal values at the set of, e.g., 1024, locations at which the reference signal has the lowest (darkest) values—termed "sparseLocs." A second metric is based on signals values at the set of, e.g., 1024, locations at which the reference signal has the highest (lightest) values—termed "compLocs."

The first metric, "sparseMet," is computed as follows:

$$\text{sparseMet} = -\text{sum}(x(\text{sparseLocs}))/\text{sqrt}(x(\text{sparseLocs})'*x(\text{sparseLocs}))$$

The second metric, "compMet," is computed as follows:

$$\text{compMet} = \text{sum}(x(\text{compLocs}))/\text{sqrt}(x(\text{compLocs})'*x(\text{compLocs}))$$

where x(sparseLocs) is a vector (e.g., a row vector) of the tile values at the 1024 sparseLocs locations; and X(sparseLocs)' is its transpose. Similarly for x(compLocs).

When applied to imagery marked with a continuous tone watermark, both metrics have approximately the same value. When applied to imagery marked with sparse codes, however, the metrics diverge, with sparseMet having a value that is typically 4 to 10 or more times that of compMet.

These metrics can naturally be based on more or less points. In one alternative, sparseMet is based on a set of fixed marks (representing only the reference signal), while compMet is based on a like number of the lightest values in the reference signal tile.

Yet another approach to distinguishing a sparse input signal from a conventional, continuous tone watermark signal is by reference to the spatial frequency composition of the reference signal. The representation of the reference signal by a sparse selection of extrema points somewhat distorts its spatial frequency content. For example, the higher frequency components are higher in amplitude than the lower frequency components, when represented by sparse extrema dots. Extrema that are always marked to reinforce the reference signal contribute stronger signal components, on average, than extrema that may be present or absent depending on message bit values. Etc.

The conventional watermark decoding process involves correlating the Fourier transform of the captured image signal with a template of the reference signal (i.e., a matched filter operation). A decoder can apply two such matched-filtering operations to the transformed image signal: one determining correlation with the traditional, continuous tone reference signal, and the other determining correlation with a distorted counterpart associated with a sparse selection of reference signal extrema (e.g., with certain of the extrema at half-strength, due to bit modulation). If the captured imagery is found to better correspond to the latter signal, then this indicates that a sparse mark is being decoded, and a corresponding decoding process can then be applied—instead of a conventional decoding process.

Still another approach to sensing whether the input signal is sparse or not is to try different input filtering operations. Conventional watermark detectors typically employ an oct-axis filter, as described in various patent publications, including 20180005343. Alternate filtering operations may be more suitable for sparse codes, such as a 5×5 pixel MinMax filter kernel, or a donut filter. (A MinMax filter produces an output equal to the center element value divided by the difference between the largest and smallest values of the 5×5 element area centered on the center element. A donut filter determines correlation of an, e.g., 5×5 element patch, with a reference pattern consisting of a black element surrounded by white elements). By running both an oct-axis filter on the input data, and one of the alternate filters, and examining the results, the type of input data may be discerned as either being a conventional watermark or a sparse watermark.

Just as the presence or absence of certain spatial frequencies in the reference signal can be used to signal different encoding schemes, the same approach can additionally, or alternatively, serve to signal different print resolutions. For example, a sparse code printed with a 300 dpi printer may be composed with a reference signal that includes spatial frequencies of 11 and 21 cycles per inch. A sparse code printed with a 203 dpi printer may be composed with a reference signal that includes spatial frequencies of 13 and 19 cycles per inch. The decoder can discern such frequencies, and convert the captured image to the corresponding resolution prior to extracting the message bits.

(While the foregoing discussion referred to a message string of 1024 bits, a payload of 47 bits, a tile of 128×128 waxels, etc., it will be recognized that these numbers are for purposes of illustration only, and can be varied as fits particular applications.)

In a particular implementation, a message string of 1024 bits is formed as the concatenation of (a) a 100 bit string indicating the encoding protocol used in the code, followed by (b) a 924 bit string based on 47 bits of payload data. These latter bits are formed by concatenating the 47 bits of payload data with 24 corresponding CRC bits. These 71 bits are then convolutionally-encoded with a 1/13 rate to yield the 924 bits.

Reference was earlier made to soft-decision decoding—in which the 1024 message bits, and corresponding confidence values, are input, e.g., to a Viterbi decoder. In some embodiments, confidence in a dark mark (signaling a "0" bit) is based on its darkness (e.g., 8-bit waxel value).

In one implementation, candidate mark locations are each examined, and those having values below 128 are regarded as dots, and others are regarded as blank. An average value of waxels with dots is then computed. The average value may be, e.g., 48. This can be regarded as a nominal dot value. The confidence of each dot is then determined based on its value's variance from this nominal value. A dot of value 40 is treated as more confident. A dot of value 30 is treated as still more confident. Conversely, dots of value 60 and 70 are treated as progressively less confident. Dots of the average value may be assigned a first confidence (e.g., 85%), with dots of lower and higher values being assigned higher or lower confidence values, respectively.

In another implementation, the nominal dot value is based on fixed marks, signaling the reference signal. Message dots are then confidence-valued in relation to the average value of the fixed marks.

Figure 61:
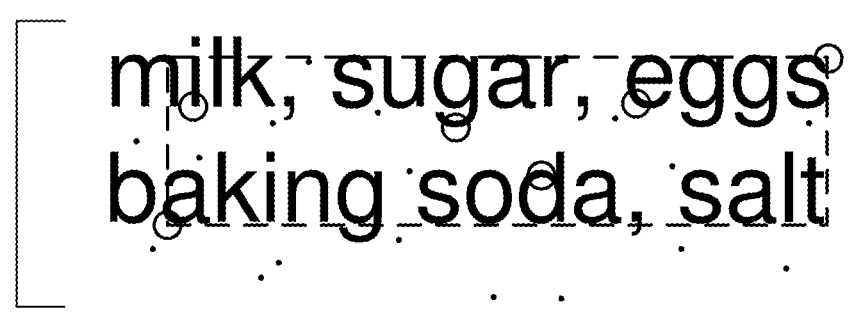

Sometimes fixed marks, and message marks, are not printed, e.g., if dots in a portion of a code tile are suppressed due to their positioning within a text-based keep-out zone. FIG. 61 gives an example—showing a fractional part of a label. The circles indicate the positions where fixed marks would normally go but, due to the presence of text, are suppressed. (Message marks close to the text are similarly suppressed, but their absence is not marked.)

In accordance with another aspect of the technology, these absent fixed marks serve to bound a region of the label (shown by the dashed rectangle, and aligned with the waxel rows) where all data is untrustworthy. A dot at a candidate message location may not reliably signal a "0." A missing dot at a candidate location (if the encoding scheme is one in which certain blank areas signal "1" message bits—such as the second embodiment, above) may not reliably signal a "1." Data extracted from such region, whether signaling "1" or "0" bit values, are all assigned very low confidence values (e.g., zero).

Figure 62A:
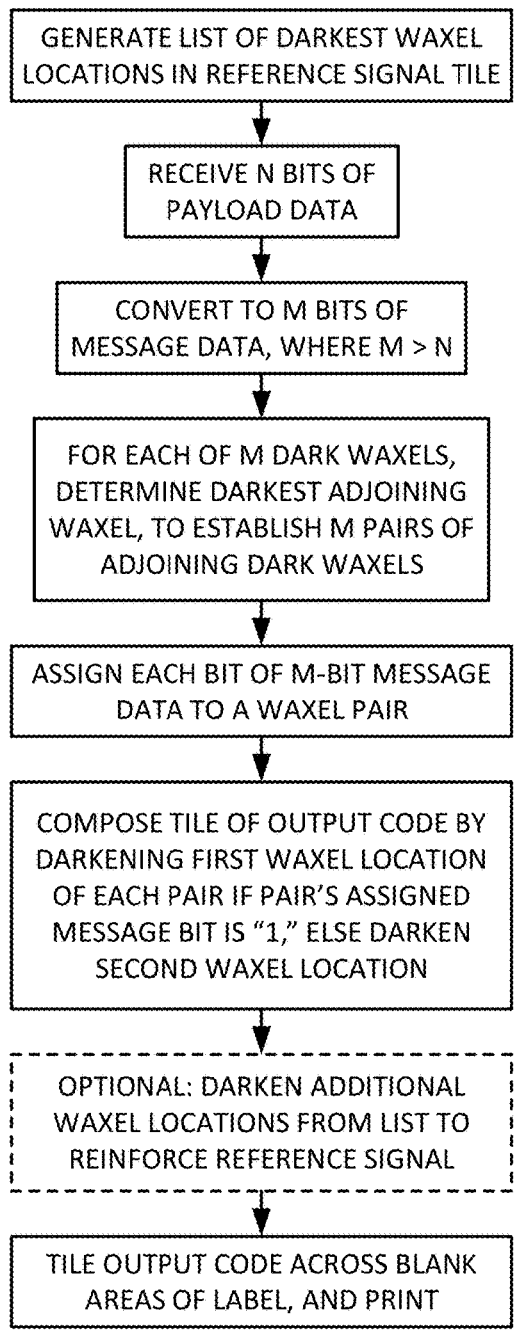
FIGS. 62A and 62B illustrate exemplary methods for producing, and reading, a label with an optical code.
Figure 62B:
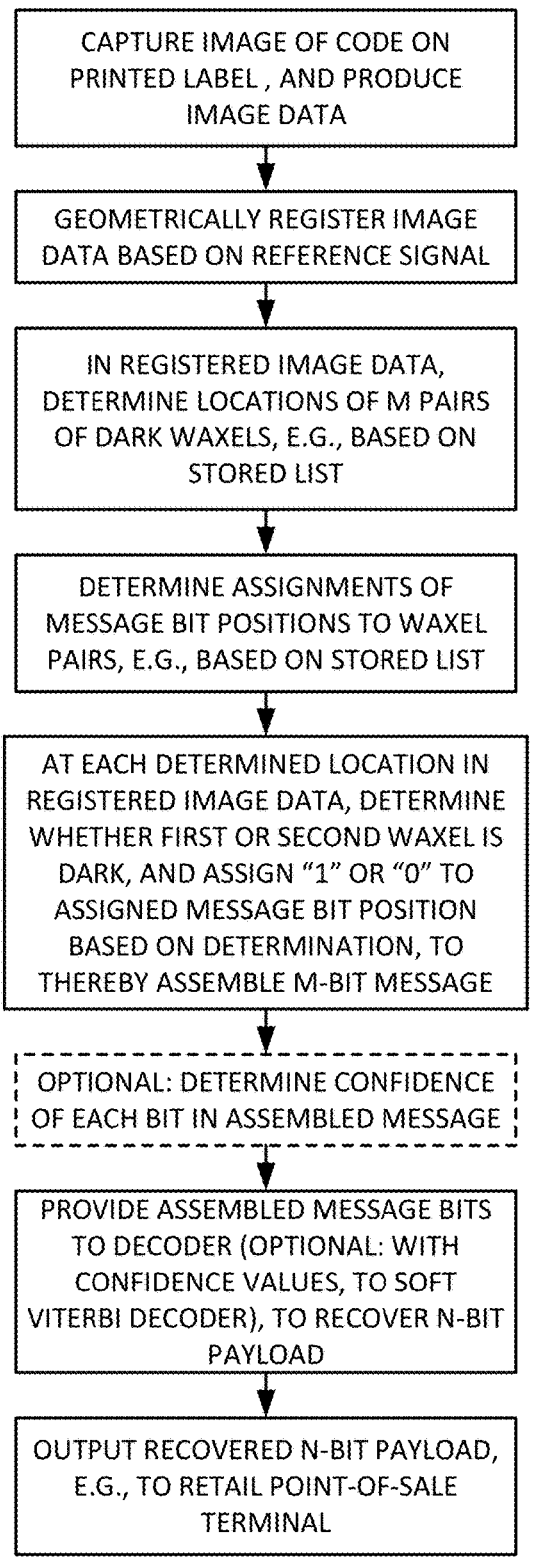

FIG. 62A shows an illustrative method according to the foregoing, which may be practiced by a printer, e.g., in a deli or bakery department of a retail store. FIG. 62B shows a corresponding method that may be practiced by a point-of-sale retail scanner.

From the foregoing, it will be recognized that improved sparse messaging, with dot densities much less than the prior art, can be achieved by providing the decoder a priori knowledge of candidate dot locations, enabling the decoder to disregard predictably-blank areas of the captured imagery, and the phantom signals that such areas might represent.

The following discussion provides additional details concerning particular implementations based on the fourth embodiment, above. Except as noted, features discussed above can be used with these detailed implementations.

In this arrangement, the reference signal consists of 32 or less spatial sinusoids, e.g., 16. These reference frequencies are a subset of the (more than 32) frequencies that form the reference signal in the continuous-tone watermark. This permits the synchronization algorithm for the continuous-tone watermark to also perform synchronization for this sparse watermark.

The reference signal is expressed in a tile of size 128×128 waxels. The 1500 darkest local extrema in this reference signal are determined. This may be done by computing the reference signal value at each point in a finely spaced grid across the tile (e.g., at a million uniformly-spaced points), and sorting the results. The darkest point is chosen, and points near it (e.g., within a keep-out distance of a waxel or two) are disqualified. The next-darkest point is then chosen, and points near it are disqualified. This process continues until 1500 points have been identified. (Although laborious, this process needs to be performed only once.) This results in a table listing the X- and Y-coordinates, in floating point, of 1500 local extrema within the reference signal tile. These darkest 1500 locations are termed "printable locations."

Of the 1500 printable locations, the very darkest 300 locations are always marked (black) in the output signal (optical code), so as to strongly express extrema of the reference signal (the "always-dark" locations). The remaining 1200 candidate locations ("variable data locations") are marked, or not, depending on whether the corresponding element of the message signal tile conveys a "0" or a "1." (Hereafter we use the equivalent −1/1 notation for the two states of a binary signal.)

Lists of the floating point X- and Y-coordinate values for the 300 always-dark locations, and for the 1200 variable data locations, are stored in a data table of exemplary decoders as side information.

In this particular implementation, tiles are printed at a scale of about 150 waxels per inch (WPI). At 150 WPI, each tile spans 128/150, or about 0.85 inches.

While the extrema locations are known with floating point resolution, actual printing hardware can produce marks only at discretely spaced locations. Popular printers have printheads that produce output markings at resolutions of 203 dots per inch (DPI) and 300 DPI. These resolutions require interpolation of the 128×128 message tile (e.g., by bilinear or bicubic interpolation).

For DPI-agnostic encoding, the encoder examines the −1 or +1 value in the interpolated message array at the location that is closest to each of the printable, variable data locations. If the interpolated message has a "−1" value at that location, the variable data location in the output code is marked. If the interpolated message has a "1" value at that location, the variable data location in the output code is left unmarked.

In a decoder, after a marked image has been geometrically registered, decoding can proceed by interpolating among the registered image data to determine the signal values at the variable data locations defined by stored floating point X- and Y-coordinate values.

It will be recognized that the decoder, in such arrangement, is looking at exact extrema locations during decoding, whereas the encoder was unable to put marks at those precise positions. This is a compromise, but it works regardless of the DPI of the printing hardware. That is, the decoder needn't know the DPI of the printer.

If the DPI of the printing hardware is known (or is determinable) by the decoder, a variant arrangement can be employed. In such case, instead of identifying extrema in the high resolution reference signal (i.e., yielding floating point coordinates), the reference signal value is sampled at the center of each of the locations that the printer can mark, e.g., at 203 DPI, within the reference signal tile. The 1500 darkest extrema are identified from this smaller sampled set.

A tile that is 128 waxels across, at 150 WPI, when printed at 203 dpi, works out to be 173.23 dots across. That's an awkward number to work with. Better is for each tile to have a dimension, in dots, that is an integer, and preferably one that is divisible by two. In this illustrative implementation, 174 is chosen as the dot dimension for the tile—a value that is divisible by four. This yields a WPI value of (203*128)/174=149.33 WPI—an inconsequential difference from a nominal 150 WPI value.

The reference signal is computed at sample points (quantization points) across the tile of 174×174 dot locations (i.e., 30,276 dots). The 1500 sample points having the smallest (darkest) values are identified as printable locations. (Again, a keep-out zone can be employed, if desired.) As before, the very darkest 300 locations serve as always-dark locations, while the 1200 others serve as variable data locations.

Again, a listing of these locations is provided as side information to decoders. However, instead of being expressed as floating point coordinates, the printable locations can be identified simply by their row/column numbers within a 174×174 dot tile.

In this variant arrangement, it will be recognized that the decoder is looking for marks at dot locations (and marks are printed at these same dot locations), in contrast to the earlier arrangement in which the decoder is looking for marks at floating point locations (and marks are printed at slightly different, albeit not exactly known, dot locations).

One particular decoder employs a hybrid of the foregoing arrangements. Such a decoder is equipped with stored side information that expresses the coordinates of printable locations in both forms—both as floating point coordinates, and as row/column coordinates based on 203 DPI. To decide which to apply, after performing geometric registration of an input tile, the decoder does a trial examination of, e.g., 100 of the always-dark locations, using both the floating point coordinates, and the 203 DPI row/column coordinates. If the latter set of coordinates yields darker image samples, on average, than the former set of coordinates, then the decoder knows the code was printed at 203 DPI, and uses the row/column data to examine all of the printable locations. Else, it uses the floating point coordinates.

Such arrangement can be extended to include other DPI as well, e.g., with the decoder having printable locations defined by floating point coordinates, row/column coordinates in a 203 DPI tile, and row/column coordinates in a 300 DPI tile. Each can be trialed. If row/column coordinates at 203 or 300 DPI yields darker samples, it is used; else the floating point coordinates can be used.

Figure 63A:
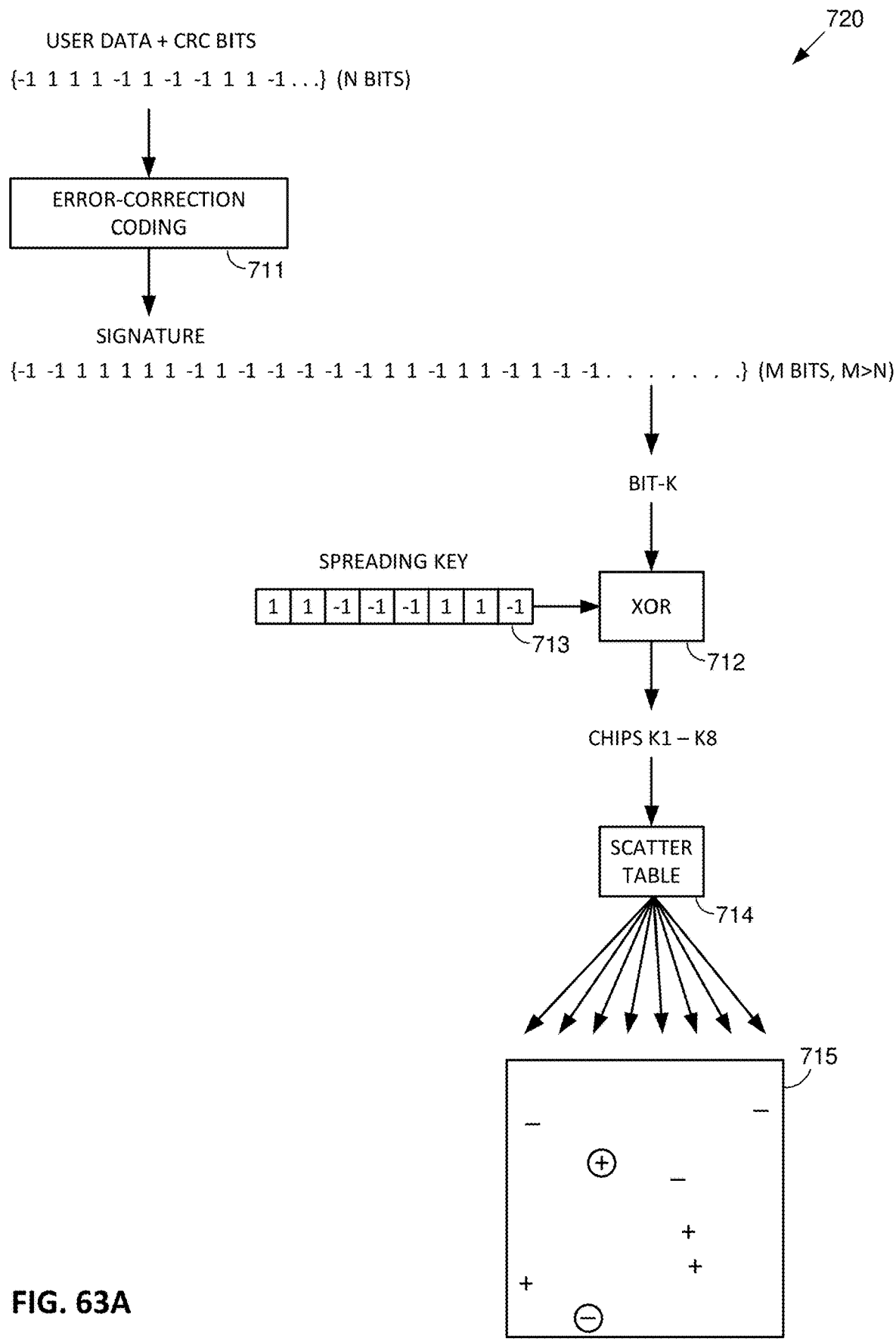
FIGS. 63A and 63B illustrate aspects of an encoder and decoder.

FIG. 63A illustrates aspects of one particular encoder 720. Data to be conveyed by the optical code (e.g., user data and associated CRC bits—N bits in all) are provided to an error-correction coding module 711. This module applies convolutional encoding (e.g., tailbite encoding with rate of 1/13) and, optionally, repetition coding. It produces a longer (M bit) string, or signature, as its output. In a particular embodiment, M=1024.

Each bit of the signature is XORed (712) with each element of a plural-element binary spreading key 713. An eight element key is shown in FIG. 72A, but other length keys can be used (e.g., 4 or 16 elements). This operation transforms a single bit of the signature (e.g., "bit-K") into eight corresponding binary "chips" of −1 or +1 value. A scatter table 714 assigns each of the chips to a different location within a message tile 715, as shown by the "+" and "−" symbols in FIG. 72A.

The tile 715 has 1500 printable locations, and a great many more non-printable locations. Some of the printable locations are always-black, reducing the count of printable locations that are available to express chips. In the depicted FIG. 72A tile, the circles denote printable locations that are available to express chips, and that are mapped to chips associated with bit-K. (It is uncommon for chips for a single signature bit to be assigned to two printable locations.) The scatter table maps one chip, having a "+1" value, to one printable location, and maps another chip, having a "−1" value, to another printable location. As discussed earlier, only one of these two different binary values results in a printed mark—here the −1. The location to which the +1 chip is assigned is left unprinted. Thus, although chips for bit-K are assigned to two locations, only one location is marked. (If chips were assigned to two locations, and both chips had the same value, then either (a) both chip locations would be marked—if the chips' value is −1, or (b) neither chip location would be marked—if the chips' value is +1.)

In this implementation, each of the M bits of the signature is spread by the same spreading key.

(Not shown in FIG. 63A is a scrambling operation applied to the M-bit signature, by XORing each of its bits with a corresponding bit of an M-bit scrambling key. This yields a keyed M-bit signature from which the chips are derived. A reciprocal unscrambling operation is performed during decoding. Such scrambling/descrambling is straightforward and is not further belabored.)

When a particular tile encoded according to the foregoing method was analyzed (but using a 16 bit spreading key, yielding 16 chips per signature bit), it was found that 344 bits of the M=1024 bit signature were not mapped to any of the variable data locations. That is, none of the 16 chips associated with each of these 344 bits was assigned to even one of the 1200 variable data locations.

382 bits of the signature were each mapped to one of the variable data locations. That is, of the 16 chips associated with each of these 382 bits, one chip for each was mapped by the scatter table to a variable data location.

210 bits of the signature were each mapped to two of the variable data locations. That is, two chips expressing each of these 210 bits found a place among the 1200 variable locations. (This is the case with bit-K in FIG. 63A.)

75 bits among the 1024 signature bits were expressed by three chips each.

A smaller number of bits in the signature were expressed by between four and six chips at variable data locations.

Despite the daunting odds (e.g., only 1200 variable data locations among 30,276 tile locations, and with 344 bits of the 1024-bit signature (slightly over one-third) finding no expression whatsoever), the originally-input user data/CRC can be recovered with a robustness comparable to other schemes that result in much more conspicuous markings. As noted, this is due in part to a decoding arrangement that disregards most input image data, and examines only those locations at which data is known to be possibly encoded.

Figure 63B:
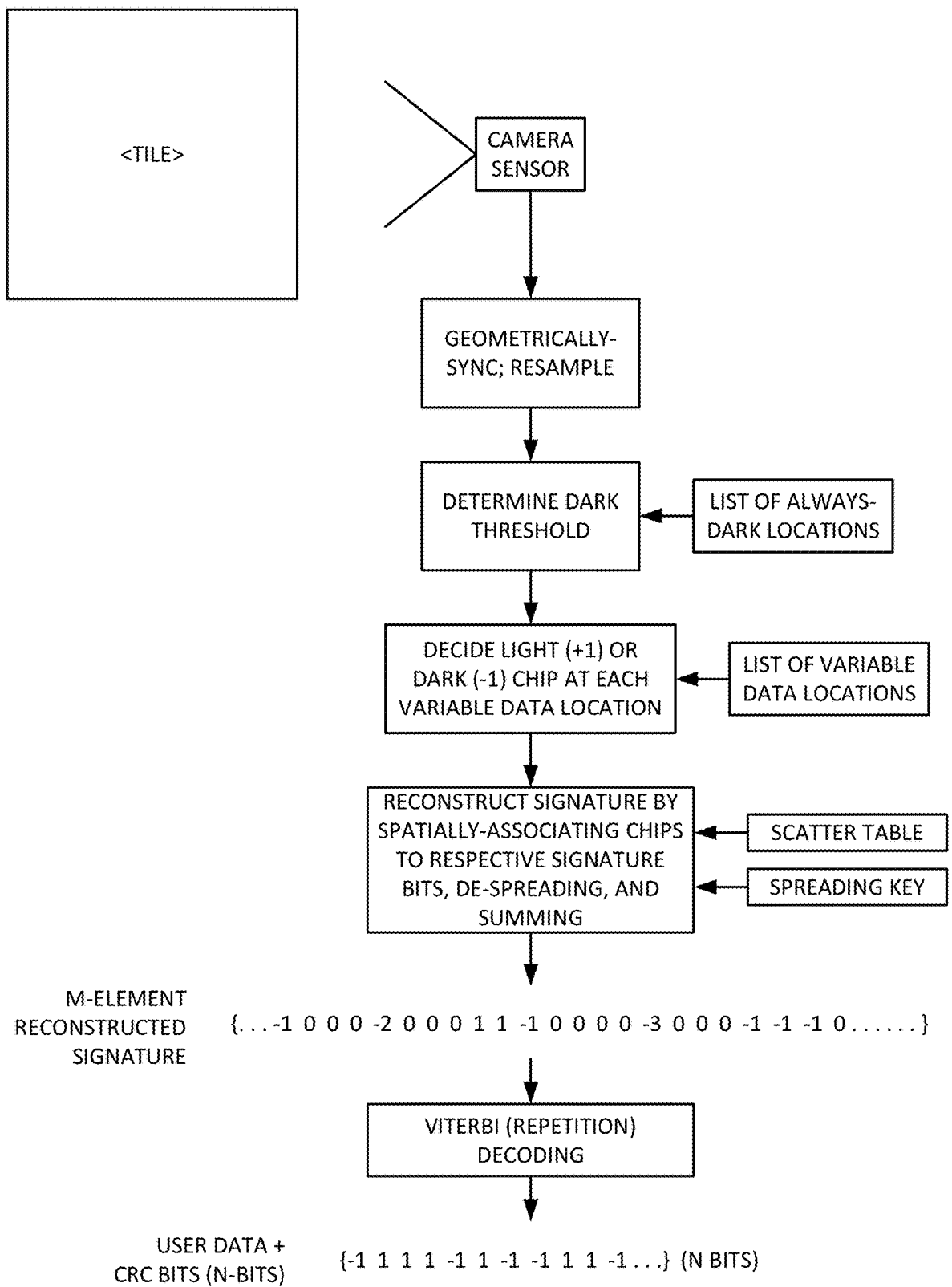

Aspects of a complementary decoder are shown in FIG. 63B. This decoder first performs geometrical synchronization on captured imagery, based on the 300 always-dark marks, and the approximately 600 dark marks that do double-duty representing both reference signal extrema and "−1" chips. Once the code is synchronized, it is resampled, e.g., at a 128×128 WPI spacing, and/or a 174×174 DPI spacing.

The decoder knows (by the stored side information) the locations of the 300 always-dark locations. It determines statistics for the luminances (or chrominances) at some or all of these locations, e.g., finding the average luminance value (in an 8-bit binary scale) and the standard deviation across the always-dark locations. The decoder then examines the remaining 1200 variable data locations (for which it also knows the x- and y-locations from the stored information), and notes the luminance at each. The locations having a luminance within a given threshold of the just-computed average luminance for the always-dark locations (e.g., having a value less than 1.5 standard deviations above the average), are regarded as being dark, and are assigned chip values of "4." The other locations, of the 1200, not meeting this test, are regarded as being light, and are assigned chip values of "+1."

Each of the chip values discerned from the 1200 printable locations is mapped map to an associated bit of the signature, and de-spread (e.g., by XORing with associated elements of the spreading key) to indicate the value of that signature bit. If a bit of the signature is expressed by two or more chips at printable tile locations (as in FIG. 63A), then the signature bit values respectively indicated by these chips are summed. If there are no errors, each such chip consistently indicates the same signature bit value, and the sum over plural chips will total +2 or +3 or −2, or −3, etc. The higher absolute values indicate, to the decoder, successively higher confidences in the value of that particular signature bit. If there are errors, and two such chips indicate conflicting bit values for a signature bit, then the sum over the plural chips equals zero. This indicates, to the decoder, that no information is available about the value of that signature bit.

As noted, many of the originally-encoded 1024 signature bits are not represented in the optical code. None of their chips is mapped to a printable, variable data location. These are treated as missing bits in the signature, and are similarly assigned values of "0" when submitted for decoding.

A reconstructed signature is thereby assembled, and is submitted to a Viterbi decoder. This decoder (in conjunction with an optional repetition decoder) outputs an N-bit string of data, including decoded user data and decoded CRC bits. The CRC bits are used to check the user data and, after correspondence is confirmed, the user data is output to a receiving system.

As noted, more than a third of the 1024 scrambled signature bits find no expression in the optical code (in this particular embodiment). This is because the scatter table (1) maps most of the corresponding chips to locations in the tile that are not among the 1500 printable locations, or (2) maps them to locations that are reserved for always-dark marks. In a variant embodiment, the scatter table is designed to differently map chips representing the 1024 signature bits, so that each finds expression in at least one of the 1200 variable data locations. However, applicant prefers the detailed arrangement because the scatter table can be the same one used with existing continuous-tone watermarks, preserving backwards compatibility. (Another variant involves re-design of the reference signal, so the dark extrema fall at locations where the existing scatter table maps at least one chip for each scrambled signature bit. But this, too, interferes with backwards compatibility.)

It will be understood that count of 1500 printable locations (and the component counts of 300 always-dark locations and 1200 variable data locations) can be varied as different applications dictate. By increasing the number of the always-dark locations, the reference signal becomes more resilient to interference (i.e., more robust). By increasing the number of variable data locations, the message signal becomes more resilient to interference. By reducing the number of printable locations, the code is made more inconspicuous.

A decoder can auto-detect which of various encoding protocols is used. For example, different protocols can have the following always-dark and variable data locations (identified from a ranked list of reference signal extrema):

TABLE 3

| Protocol | Always-Dark Locations | Variable Data Locations |
|---|---|---|
| A | 1-300 | 301-1500 |
| B | 1-400 | 401-1500 |
| C | 1-500 | 501-2000 |

All of the protocols share the same reference signal. Protocol A is as described above. Protocol B has 100 more always-dark locations, and 100 fewer variable data locations, than Protocol A. Protocol C has 200 more always-dark locations, and 300 more variable data locations, than Protocol A. The decoder is provided a ranked list of the 2500 darkest locations, each with its coordinate values.

When an image is captured (and geometrically-registered using the reference signal as expressed by its printed dots), the decoder examines the locations ranked 1-300 (which should be dark in all protocols) to generate luminance (or chrominance) statistics for these always-dark locations, e.g., the average value, and/or the standard deviation. This information is then used to evaluate the image to see if it is encoded with Protocol A, B or C.

In particular, the decoder examines locations 301-400, which should be always-dark in both Protocols B and C. If the statistics for these 100 locations match—to within a specified degree of correspondence—the statistics for locations 1-300, then locations 301-400 are regarded as always-dark too. (The specified degree of correspondence may be, e.g., having an average value within +20%/–20% of the other average, and/or a standard deviation within +30%/–30%.) If no such match is found, the Protocol is known to be Protocol A, and the decoder proceeds as above—examining the extrema locations ranked as 301-1500 to discern the user data.

If locations 301-400 are judged to be always-dark, the decoder examines locations 401-500. If the statistics for these locations match, within the specified degree of correspondence, the statistics for locations 1-300, then locations 401-500 are regarded as always-dark too. In this case, the detector knows the image is marked according to Protocol C. It then examines the extrema locations ranked as 501-2500 to discern the user data. If the statistics don't match, then the detector knows the image is marked according to Protocol B. It then examines the extrema locations ranked as 401-1500 to discern the user data.

This is a simple example. In more complex arrangements there may be additional encoding protocols that are similarly differentiated. Also, the decoder can employ different scatter tables, spreading keys, scrambling keys, etc., depending on the identified protocol (based on a number of locations identified as being always-dark).

It should be noted that sparse techniques of the sort detailed herein can be used in conjunction with continuous tone artwork, e.g., on food and other packaging. For example, a sparse code can overlie CMYK and/or spot color artwork, e.g., depicting photographic imagery. Similarly, a sparse code can be used on flat (e.g., white) areas of packaging, while other areas of the packaging—bearing continuous tone artwork—can be encoded using prior art watermarking methods.

Consider artwork for a cereal box that includes a CMYK illustration of cereal, with black lettering presented on a differently-colored background. The illustration of the cereal can be watermarked with earlier-referenced continuous tone methods. The black lettering can be encoded with a sparse mark in a first contrasting color. The background can be encoded with a sparse mark in a second contrasting color. Thus, a single package may include two or three (or more) different forms of encoding. All may convey the same payload. Desirably, the reference signals included in all the marks are geometrically-consistent, i.e., indicating common values of scale and rotation to a decoding device, and indicating a common origin to the translation frame of reference.

A sparse code can be applied by a monochrome printing technology, such as thermal or ink jet. Alternatively, it can be applied by the same printing technology employed for CMYK or spot color printing of package artwork, such as offset or flexo printing—in some instances being applied by the same printing plate that prints elements of the host artwork.

Reference was made to continuous tone watermarking (and watermarks). Such signaling is characterized by complementary tweaks to a host signal to represent "1" and "0" message bits. For example, luminance of the host artwork may be increased in some places (e.g., waxels), and decreased in other places. Or chrominance of the host artwork may be adjusted in one color direction in some places (e.g., more blue), and in a different color direction in other places (e.g., less blue, or more yellow). Such complementarity of adjustments is in contrast to sparse marks, in which all adjustments are made in the same direction (e.g., reducing luminance).

Although the detailed implementations concern tiles comprises of square waxels, arrayed in rows and columns, it should be recognized that this is not essential. For example, a tile can be comprised of elements arrayed in hexagonal cells, etc.

While the focus of this discussion has been on sparse codes in the form of isolated dots, it will be recalled that other optical codes can be derived from sparse patterns. An example is Voronoi, Delaunay and stipple patterns, as detailed in application 62/682,731, filed Jun. 8, 2018. Other artistic expressions of data carrying patterns, based on simpler patterns, are detailed in application 62/745,219, filed Oct. 12, 2018. Patterns produced by the arrangements detailed in application 62/751,084 can be used as the bases for the more complicated patterns detailed in the just-cited specifications. The resulting artwork can be printed (e.g., on product label artwork) and later scanned to convey digital data (e.g., GTIN data). Those specifications provide other teachings suitable for use in connection with features of the technology detailed in this specification, and vice versa.

While some of the detailed implementations gathered statistics characterizing "always-black" pixels based on a set of 100-300 such pixels, sets of differing sizes can naturally be used. (Five pixels is probably near the low end size for such a set.)

Many of the detailed arrangements can achieve patterns of variable, user-configurable darkness (density), by controlling the number of marks that are printed (e.g., by varying the number of darkest reference signal locations to make available for signaling of message information). In other arrangements, density can be increased (and robustness can be similarly increased) in other ways, such as by changing the size of the marks. Marks may be single dots, or clumps of two dots (e.g., in a 2×1 or 1× array), or clumps of three dots, or clumps of four dots (e.g., in a 2×2 array), etc. In an arrangement that employs always-dark marks to help signal the reference signal, the darkest reference signal locations (e.g., ranked as #1-20) are each printed with a clump of four dots. The next-darkest locations (e.g., ranked as #21-40) are each printed with a clump of three dots. The next-darkest locations (e.g., ranked as #41-60) are each printed with a clump of two dots. Further locations in the ranked list are printed as solitary dots.

Signal Rich Art Variants

The specification made various references to Voronoi patterns. It should be understood that other such patterns derived from dot patterns can alternatively be used, such as Delaunay, stipple, countour, traveling salesman, and bricks patterns, as detailed in the incorporated-by-reference documents. Such methods are reviewed in the following discussion.

Figure 64:
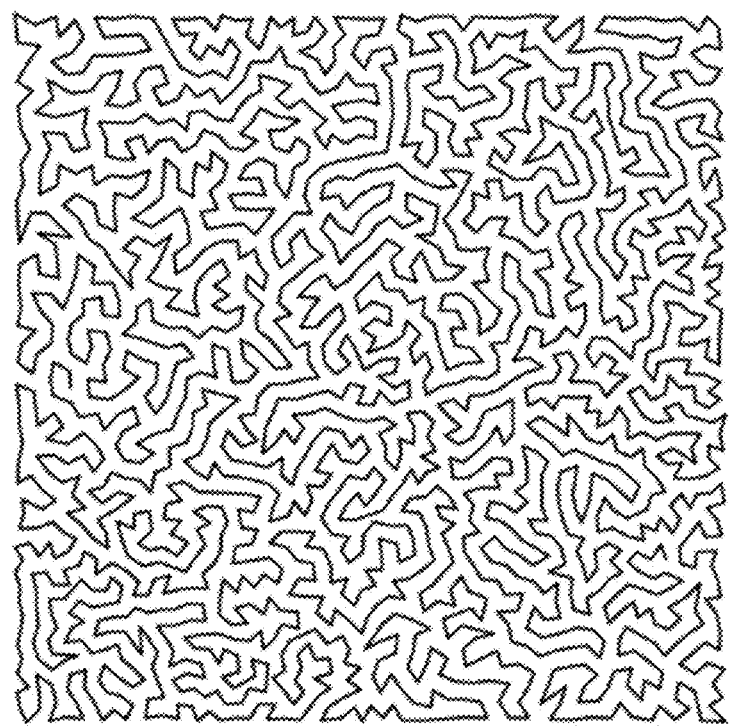
FIG. 64 illustrates an optical code signal tile created by connecting sparse coordinates of the signal tile with a traveling salesman method.

FIG. 64 illustrates an optical code signal tile 514 created by connecting sparse points with a traveling salesman method. The traveling salesperson problem (TSP) has been studied in computing and adapted to practical applications. The TSP is commonly framed as: Given a list of cities and the distances between each pair of cities, what is the shortest possible route that visits each city and returns to the origin city? In our case, the cities are sparse coordinates derived from the optical code signal (or optical code signal combined with artwork) and the path generated by the TSP solution is rendered to embed the optical code signal in rendered output. This approach is effective in retaining a robust optical code signal as it traverses points, namely minima, of high priority components of the optical code signal. Further, due to the fact that the path of line segments does not cross (other than at the "cities'), it does not create line crossings that would otherwise represent spurious minima. For testing, we used the TSP software, called LKH, which is an implementation of the Lin-Kernighan heuristic for solving the TSP. LKH is described, e.g., in writings by K. Helsgaun of Roskilde University.

Figure 65:
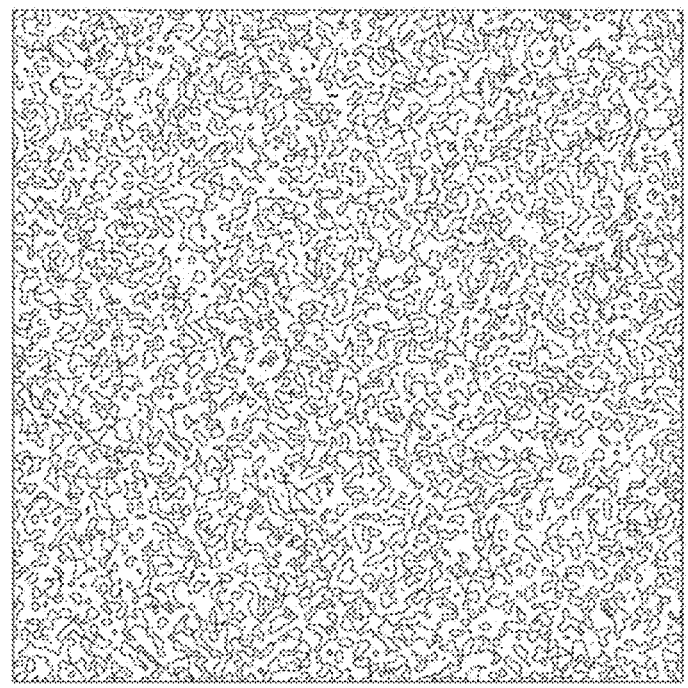
FIG. 65 illustrates an optical code signal tile created using a contour plot.

FIG. 65 illustrates an optical code signal tile 516 created using a contour plot. A contour plot is a programmatic method takes a gray-scale image as input, determines for a specified number of levels the contour lines through coordinates in the image at the same gray level. One example of this type of image processing routine is imcontour in MatLab software from MathWorks. This routine takes an image and number of contour levels as input and outputs contour lines for each level, specifying contours as line segments between X and Y coordinates in the image. This approach retains optical code signal from the dense tile because it creates lines through the signal valleys formed by the luminance minima.

The contour is drawn at a level lower than the global mean value of the pixel values of the dense tile. With this constraint, the loop defined by the contour will circle tightly around the local minima, and this loop creates a local grayscale depression in the output image. When the level of the contour is too low, this method produces a sparse optical code signal with contours only around the lowest minima in the tile and may not provide sufficient information to recover the signal. When the contour level is too close to the global mean of the dense optical code signal, the local minima may not be sufficiently emphasized. Therefore, it is desirable to choose a level that is about one standard deviation below the mean to balance the signal robustness and sparseness of the artwork carrying the optical code signal.

Figure 66:
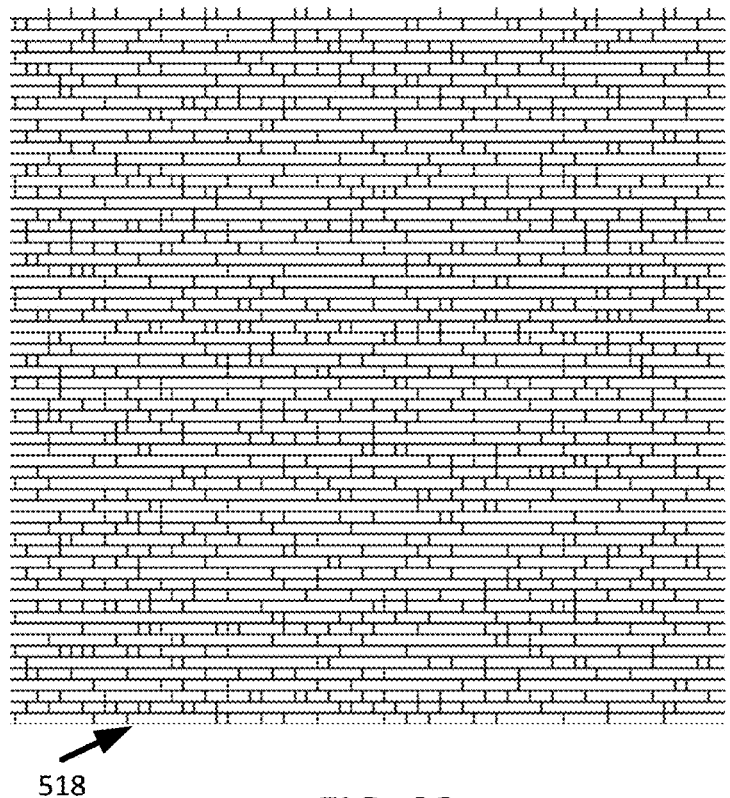
FIG. 66 illustrates an optical code signal tile created by placing vertical lines at sparse coordinates.

Providing yet another example, FIG. 66 illustrates an optical code signal tile 518 created by placing vertical lines at sparse points, and forming horizontal lines at intermediate positions, thereby defining rectangular regions. This approach retains optical code signal because it places the dark vertical lines through coordinates at its luminance minima.

Figure 67:
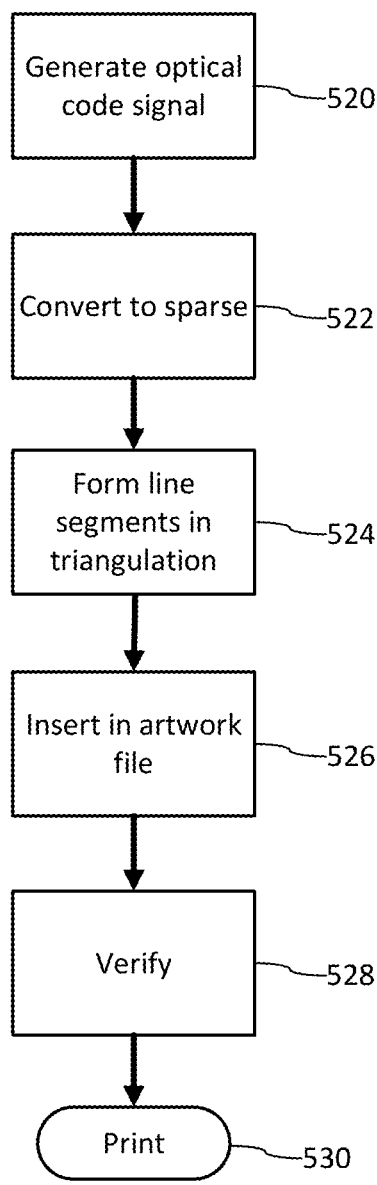
FIG. 67 is a flow diagram illustrating a method of constructing an optical code signal from a Delaunay triangulation of sparse coordinates of the code signal.

Continuing with this theme, FIG. 67 is a flow diagram illustrating a method of constructing an optical code signal from a Delaunay triangulation of sparse coordinates in the code signal. The software modules 520, 522, 526, and 528 are implemented as described for modules as 502, 504, 508 and 510. Module 524 forms line segments connecting the sparse coordinates of the codes signal by generating a Delaunay triangulation of vertices at those coordinates. Suitable routines for implementing Delaunay triangulation are Qhull and the Delaunay function in MatLab from MathWorks. As explained above for module 508, the tiling of a signal rich tile in the artwork in module 526 is preferably executed using boundary wrapping conditions. For triangulation, this means the triangulation is computed with wrap around. One way to accomplish this is to compute Voronoi regions at the boundaries assuming a wraparound from left to right edge and top to bottom edge of the tile, and then obtain the Delaunay triangulation from the dual of the Voronoi graph.

In converting the dense code signal to a sparse one, module 522 chooses coordinates of the vertices that are located at luminance minima, taking into account desired spacing and dot density. While other types of triangulations will achieve the objective of connecting the minima, the Delaunay triangulation has certain benefits, elaborated on below in connection with Voronoi diagrams. The Delaunay triangulation is a triangulation of a set of points in a plane, such that no point is inside the circumcircle of any triangle. It maximizes the minimum angle of the triangles, which tends to avoid sliver triangles.

After verifying the optical code signal in a design file (528), the artwork of that file is printed 530 on an object (e.g., package substrate, label, etc.).

Figure 68:
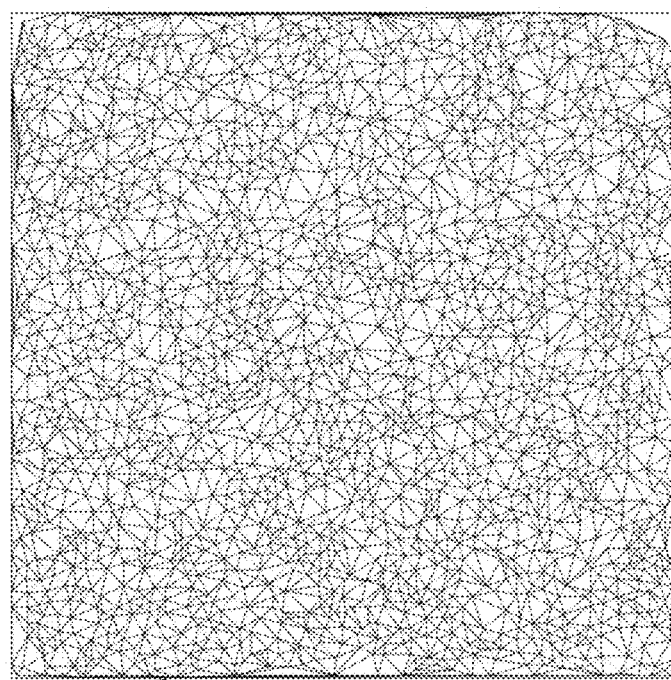
FIG. 68 illustrates an optical code signal tile created by the method of FIG. 67.

FIG. 68 illustrates an optical code signal tile 532 created by the method of FIG. 67. As depicted in FIG. 68, the vertices are the darkest points of the output image, as they are at the convergence of plural line segments.

The four examples shown in FIGS. 64-66 and 68 illustrate techniques that place dark markings at coordinates in the signal tile corresponding to luminance minima. A complementary approach that retains a robust optical code signal is to place dark markings in valleys around the luminance maxima. We illustrate this by showing examples of it, starting with an approach based on a Voronoi diagram. Additionally, each of these approaches may be inverted for dark artwork, in which the sparse signal carrying elements are luminance maxima (bright pixels) relative to a darker background.

A Voronoi diagram is a partitioning of a plane into regions based on distance to points in a specific subset of the plane. That set of points (called seeds, sites, or generators) is specified beforehand, and for each seed there is a corresponding region consisting of all points closer to that seed than to any other. These regions are called Voronoi region. Each such Voronoi region is obtained from the intersection of half-spaces, and hence it is a convex polygon. The line segments of the Voronoi diagram are all the points in the plane that are equidistant to the two nearest sites. The Voronoi vertices (nodes) are the points equidistant to three (or more) sites.

Voronoi diagrams find application in a signal processing technique called vector quantization. Vector quantization is a quantization technique in which probability density functions are modeled by the distribution of prototype vectors. It divides a large set of data points (vectors, like pixel values) into groups having approximately the same number of points closest to them. Each group is represented by its centroid point. The applications of vector quantization for data compression seeks to represent a signal with the fewest points, yet at highest signal fidelity or quality.

The Voronoi diagram provides a way to group points of the signal into quantization bins, where each bin is represented by the centroid of the bin, or in the case of a Voronoi region, the centroid of the region. In our application, the objective is to create an optical code signal at a desired optical density with fewest optical code signal points, while achieving a desired level of visual quality and signal robustness. Our adaptation of the Voronoi diagram achieves this objective by minimizing the points needed to represent the code signal tile while providing desired spacing between the points and producing a pattern that has artistic effects.

The Voronoi diagram is the dual graph of the Delaunay triangulation. Connecting the centers of the circumcircles of the triangles in the Delaunay triangulation produces the Voronoi diagram. The Voronoi diagram may be implemented using the Voronoi function in MatLab from MathWorks, or via the Delaunay triangulation computed by the Qhull program. Qhull outputs the Voronoi vertices for each Voronoi region.

Figure 69:
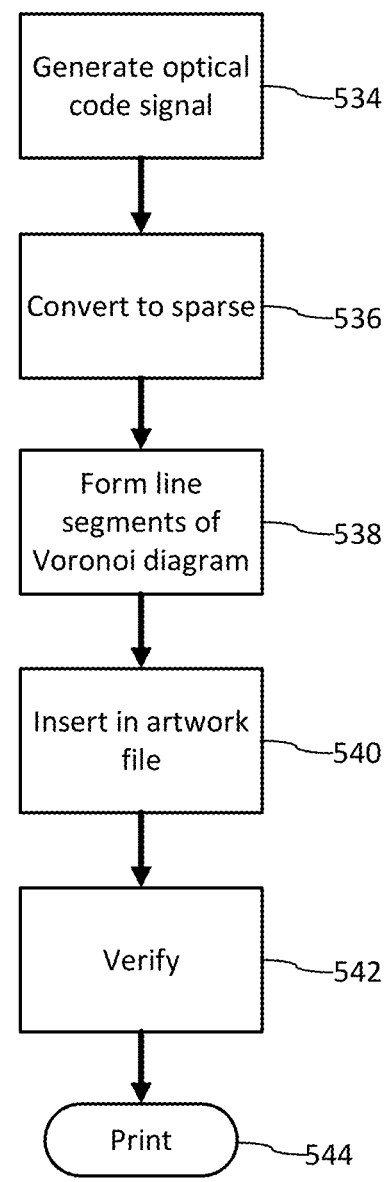
FIG. 69 is a flow diagram illustrating a method of constructing an optical code signal from a Voronoi diagram derived from maxima of an optical code signal.

FIG. 69 is a flow diagram illustrating a method of constructing an optical code signal from a Voronoi diagram derived from the maxima of an optical code signal. Here, modules 534, 540, 542, and output marking 544 are similar to their counterparts in FIGS. 65 (520, 526, 528 and 530). The methods of FIGS. 65 and 67 differ in that module 536 finds maxima (vs. minima in 522), and module 538 forms a Voronoi diagram from the coordinates of the maxima. Additionally, in module 540, the tiling method preferably employs boundary wrapping conditions, such as Toroidal or periodic boundary conditions based on Voronoi regions computed at the boundaries.

FIG. 70 illustrates an optical code signal tile 550 created by the method of FIG. 69. As depicted in FIG. 70, the lines of the Voronoi diagram are the darkest points of the tile 550. FIGS. 71-72 illustrate additional examples of optical code signal, masked to fit the shape of artwork elements, specifically, leaves 552 and 554. Here the line segments in the Voronoi diagram form a natural pattern of veins within the leavers 552, 554.

FIGS. 73-74 illustrate additional examples of optical code signal tiles generated from coordinates of maxima in a dense optical code signal tile. The optical code signal tile 556 is generated by programmatically forming squares around coordinates of maxima. Similarly tile 558 in FIG. 74 is generated by forming rectangles around coordinates of maxima.

The optical code signal tiles of FIGS. 71-72 are generated according to the following acts:

Generate a dense optical code signal tile;

Identify a set of maxima in the tile by based on pixel value;

At each identified maximum, place a graphical element in a shape, such as a square, circle, rectangle, triangles, etc.;

The process of identifying maxima may be implemented in alternative ways. In one approach, a programmatic method sorts the pixel values in a tile by amplitude and selects the pixels in order of amplitude, starting the pixel of largest amplitude, and rejecting subsequent pixels within a minimum spacing distance. The minimum spacing distance is evaluated by rejecting maxima that are within a keep out region of a previously selected maxima. This selection process can be sped up by grouping pixel values into bins by value and/or removing pixels by threshold-compare operation as a pre-processing step prior to the sort.

The placing of graphical elements may be achieved in a variety of ways as well. In one approach, an image editing program is invoked to select image elements in an image and replace them with a different graphical element, centered at the location of the selected element. An alternative implementation is to execute a MatLab routine that replaces image elements with a graphical shape (e.g., square, circle, rectangle, triangles, etc.) proceeding in a random manner, sequentially, so that each new element is placed in the top layer, masking all the elements underneath it. The order of placement of the elements changes the results but does not impact the signal robustness.

To improve robustness, a programmatic implementation should filter the result to remove small objects from the final image. In particular, the image filter removes irregular image blobs smaller than 8 pixels that are formed in the gaps in multiple overlapping masks in the same area. These small blobs decrease robustness and degrade visual quality. Thus, removing them both improves the reliability of the optical code signal and improves visual quality.

Stipple Methods

Continuing with the theme of optimizing signal robustness and visual quality of a sparse code signal, we now transition to stipple methods for generating artwork that carries optical code signals. Our stipple-based methods leverage properties of vector quantization, and in some embodiments, Voronoi diagrams. Stippling is the creation of a pattern simulating grayscale or shading by using small dots. These dots may be made in any desired color, and as such, may be used to represent artwork elements of any color. Further, the dots may be used to convey optical code signals in luminance modifications or chrominance modifications, in one or more color separations or inks of an image design file. Variation in spatial density of the dots allows the representation of a desired grayscale value or intensity at a region corresponding to a grayscale level in the artwork. These variations, in turn, facilitate the modulation of the artwork to convey optical code signal tiles.

Figure 75:
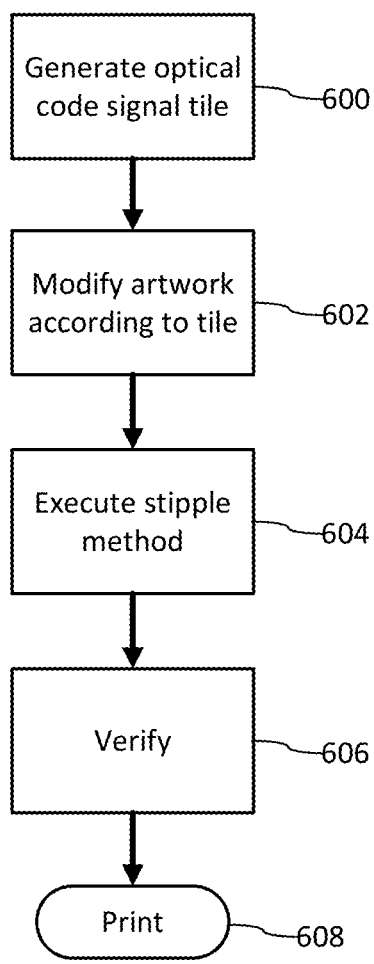
FIG. 75 is a flow diagram illustrating a stipple method for converting data carrying artwork to stipple art at desired density.

FIG. 75 is a flow diagram illustrating a stipple method for converting data carrying artwork to stipple art at desired density. In module 600, this method begins by generating an optical code signal tile, e.g., using any of the techniques described herein.

Next, module 602 applies the modifications of the optical code signal tile to corresponding artwork elements in host artwork. The module first maps the tile redundantly in X and Y directions to areas of the artwork corresponding to the area of a tile. It then modifies pixel values (luminance or chrominance) at locations of the artwork corresponding to the bit cells in the tile mapped to those pixels. The modifications can be applied at high strength, meaning that the maximum positive and negative adjustments to the luminance or chrominance, can be quite high, yet the method still produces output imagery of sufficient visual quality. The reason for this is that the stipple method reduces the visual impact of the modifications.

Module 604 executes a stipple method to convert the modified imagery output from 602. Preferably, module 604 employs a weighted centroidal Voronoi diagram method to generate locations for stipples in a stipple pattern representing the modified imagery.

Next, module 606 verifies that the robustness of the optical code signal is sufficient. This approach is implemented using one or more of the signal detection metrics described previously and referenced above in connection with robustness prediction.

Finally, the verified image file is printed to create a physical object, e.g., package, label or other substrate bearing the optical code signal (608).

Figure 76:
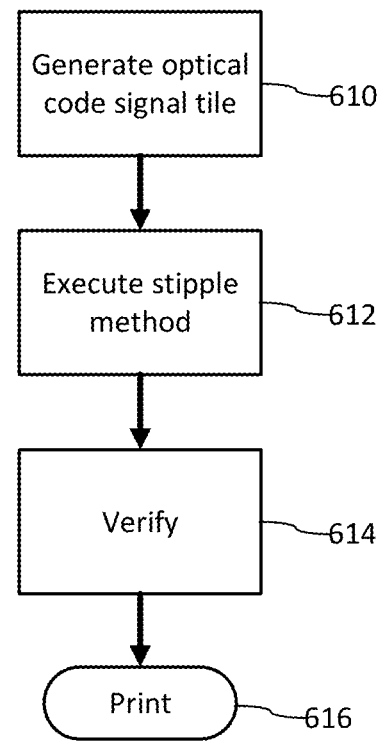
FIG. 76 is a flow diagram illustrating a stipple method for converting data carrying image to a stipple pattern at desired density.

FIG. 76 is a flow diagram illustrating a stipple method for converting data carrying image to stipple pattern at desired density. This method differs from FIG. 75 in that the stipple method is applied directly to the optical code signal tile. Modules 610, 612, and 614 are implemented similarly to 600, 604 and 606 of FIG. 75, and the result is printed or otherwise marked onto an object (616). To save processing resources, a single tile of optical code signal from module 610 is converted to a stipple pattern, and boundary wrapping conditions, as described above (in particular for the Voronoi based method) are used to create stipple patterns at the edges of the tile. This approach enables the single tile to be tiled efficiently to fit a larger artwork area without the need to repeat the generating of a stipple pattern for the larger artwork.

Figure 77:
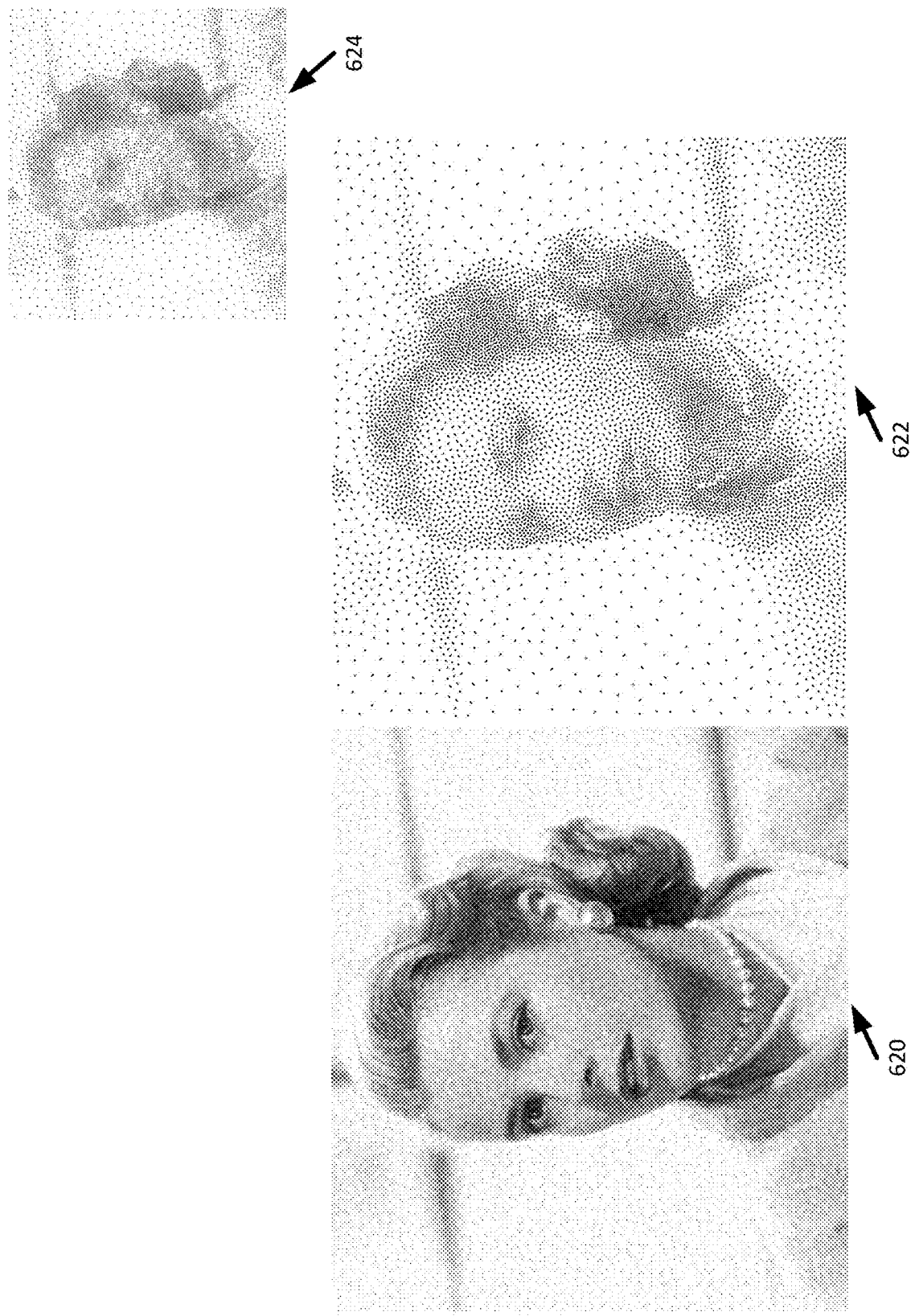
FIG. 77 illustrates an example of signal bearing artwork, converted to a stipple pattern.

FIG. 77 illustrates an example of signal bearing artwork, converted to a stipple pattern based on the technique of FIG. 75. In this example, module 602 modulates luminance of the artwork in image 620 to embed tiles of optical code signal across the image. In a related approach, module 602 is adapted to modulate a color separation or one or more chrominance channels of an image. This process executed in module 602 produces a signal bearing image 620 shown on the left of FIG. 75. Then, the stipple method of module 604 converts image 620 to stipple pattern 622. Stipple pattern 622 is enlarged to show detail. The normal scale of the image is illustrated on the far right, as image 624 to illustrate the visual quality of the final image, even with a strongly embedded optical code signal.

Figure 78:
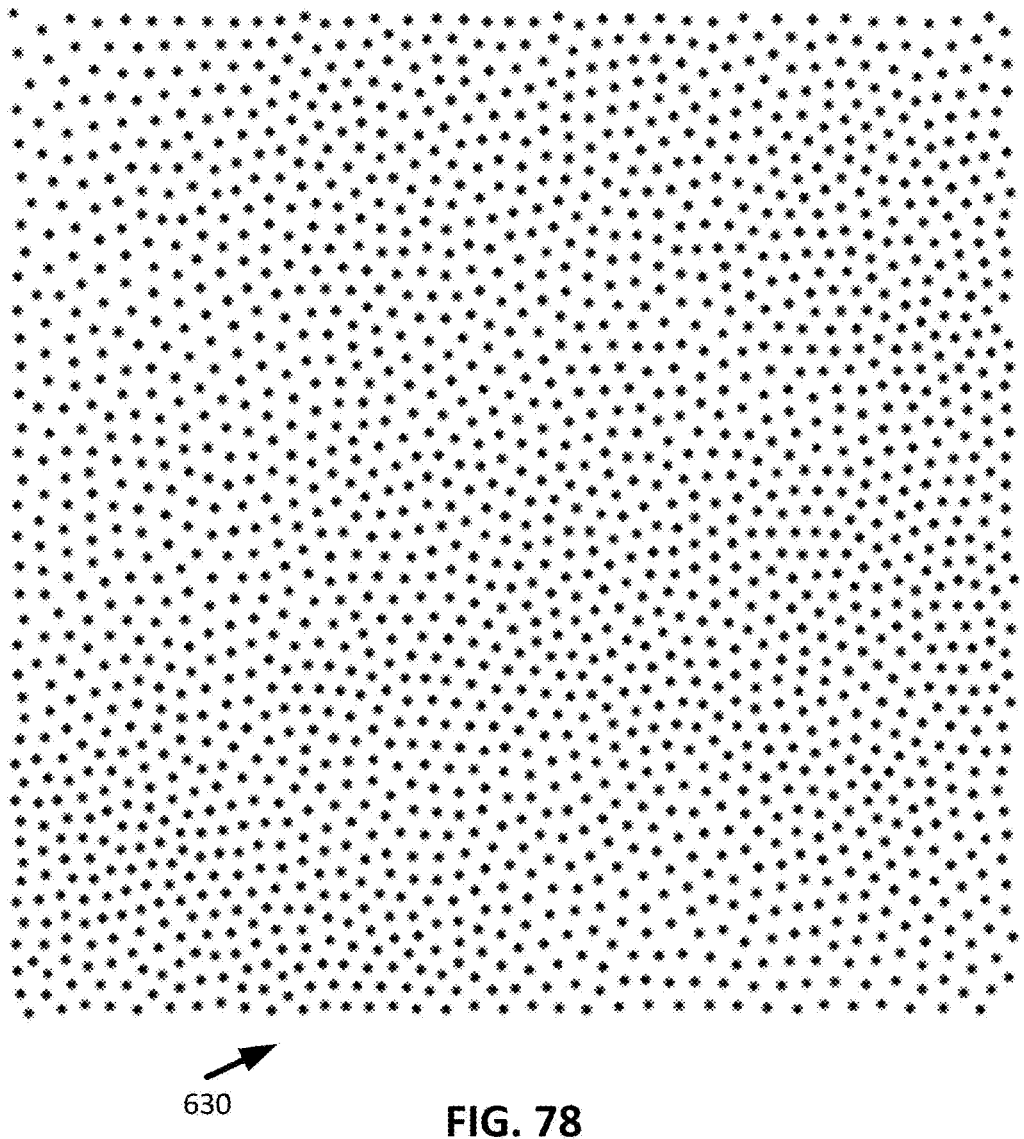
FIG. 78 illustrates an example of a stipple pattern of an optical code signal.

FIG. 78 illustrates an example of a stipple pattern of an optical code signal tile 630. This is generated using the approach of FIG. 74 to provide a sparse optical code signal with a desired dot density.

Figure 79:
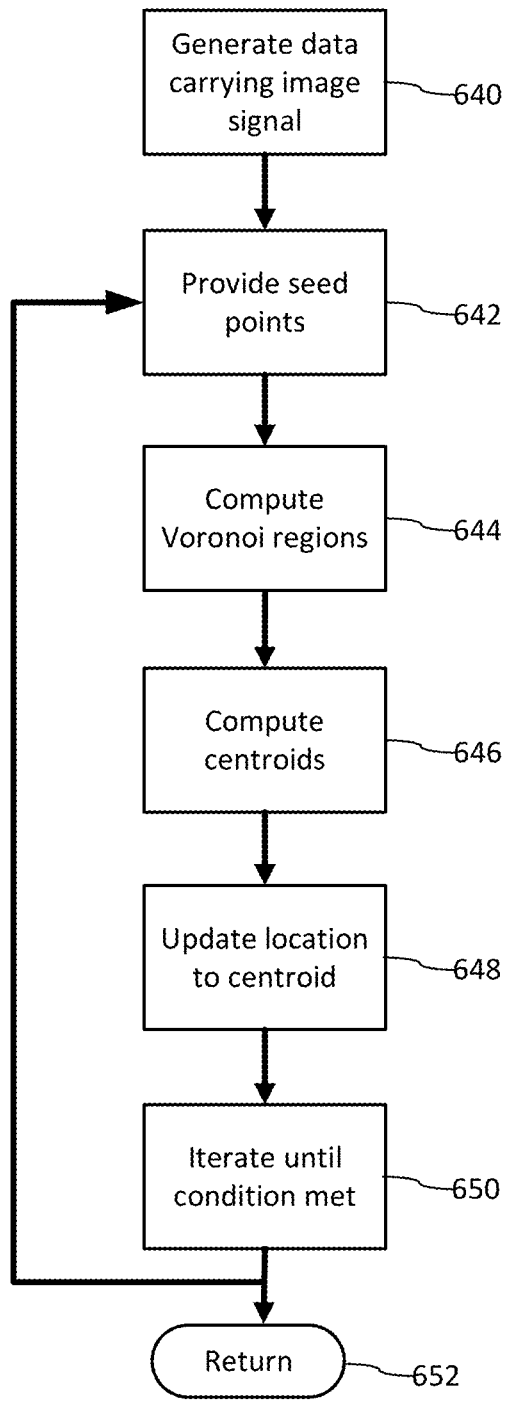
FIG. 79 is a flow diagram illustrating a method of employing weighted centroidal Voronoi diagrams to generate a stipple pattern of artwork carrying an optical signal.

FIG. 79 is a flow diagram illustrating a method of employing weighted Voronoi diagrams to generate a stipple pattern of artwork carrying an optical signal. This process begins by generating a data carrying image signal. For example, module 640 is implemented by generating a tile and modulating artwork with the tile as in 600, 602 of FIG. 73 and 620 of FIG. 75, or by generating an optical code signal tile as in 610 of FIG. 74.

Next, the method initiates a vector quantization process to determine locations of stipples to represent the image bearing signal output from module 640. This particular process does so by generating centroidal Voronoi diagrams starting with a set of seed points. These seed points may be randomly positioned at pixels locations within the input image. However, for better performance, it is preferred to select points that are more likely closer to the desired output. The sparse signal generation methods described in this document provide one approach for selecting seed points, as they are intended to pick locations of high priority code signal components in each tile that will provide desired robustness of the optical code for a desired dot density. Thus, a preferred implementation of module 642 executes a sparse signal generation process on the optical code signal of the input image from module 640. Other approaches include starting with evenly spaced array of points, or pseudo-randomly selected set of points, constrained by a minimum spacing distance between the seed point locations. For example, the spacing may be constrained by a minimum distance parameter, such as described previously as a keep out distance between dots.

Module 644 computes a Voronoi diagram from the current set of seed points provided by 642. The Voronoi diagram software noted above may be used to implement module 644.

Next, module 646 computes the centroid of each Voronoi region. This module is implemented, for example, using the method for computing centroids described by Secord in A. Secord, "*Weighted Voronoi Stippling*," Proc. 2nd Ann. Symp. Non-Photorealistic Animation and Rendering (NPAR 2002), ACM Press, 2002, pp. 27-43 ("Secord"), which is hereby incorporated by reference. In Secord, the centroid, $C_i$ of the region, i, is defined as follows;

$$C_i = \frac{\int_A x\rho(x)dA}{\int_A \rho(x)dA}$$

Where A is the region, x, is the position and $\rho(x)$ is the density function. Secord describes an optimized way of computing the centroids. The integrals in the above expression for the centroid are over arbitrary Voronoi regions. Secord's method converts these integrals to iterated integrals and integrates a region row by row. This enables the method to rely on pre-computed parts of the integral. The final computation, after excluding pre-computed parts, includes numerical integration in the y-direction and computation of expressions at the x values of the region boundaries. This converts the integral computation into look ups into look up tables of values that are pre-computed from the image's density function, a multiplication and subtraction. Secord also explains how to deal with the issue caused by discrete calculation of Voronoi regions affected by resolution (error in the centroid location increases as pixels in the Voronoi region decrease, and generating points may overlap at low resolution). Secord notes that Hoff provides a solution in Hoff III, K., Culver, T., Keyser, J., Lin, M., and Manocha, D. 1999, "*Fast Computation of Generalized Voronoi Diagrams Using Graphics Hardware*," In Proceedings of SIGGRAPH 99, ACM Press/ACM SIGGRAPH, New York, A. Rockwood, Ed., Computer Graphics Proceedings, Annual Conference Series, ACM, 277-286.

Next, module 648 updates the location of each point to the centroid in its Voronoi region. The routines of modules 642-648 iterate (650) until the points converge to centroids or a predetermined limit is reached. At this point, the method returns control (652) to the process that invoked the program. With each iteration, points from the last iteration are the starting seed points for the new iteration. The implementer may choose to limit the number of iterations to either a limit or convergence, whichever occurs first. The weighting of the centroid calculation by the density function tends to pack points closer in higher density areas of the input image than in lower density areas. For the optical code signal, this has the beneficial effect that points are clustered around peaks of the signal, which has higher priority with respect to robustness of the signal. Further, for cases where watermarked images are provided as input, the method provides a higher visual quality of the image as it makes a more accurate representation of the image with fewer number of stipples. In both cases, the method provides a vector quantization, representing the image within each Voronoi region with a representative stipple that optimizes the fit to the grayscale values of the input image.

Despite its benefits, the method of FIG. 79 may not be suitable in certain applications where the computational resources of the device generating the signal carrying art are limited. This may be the case for certain types of label printers or personal computer workstations, where the processing power of the CPU or processor allocated to the task in the device is limited. Additionally, it may not be suitable for serialization methods in which unique optical code signals may need to be provided to a printing or marking engine with limited latency ("real time") to mark unique instance of items with different optical codes. In such case, the real time constraint is defined in terms of the time allocated to generate the uniquely marked image within the time between the markings of each serialized instance. In a label printer, this is the time between printing each new label. In a commercial digital press, this is the time allocated to generating a new serialized instance of a package design. It is possible to buffer pre-computed unique instances and feed them to the marking engine, which would reduce latency. However, this approach requires additional memory and potentially memory bandwidth capability to move unique images into marking engine memory. For example, for a digital press, this would entail transferring unique images from the digital front end to the print engine.

Figure 80:
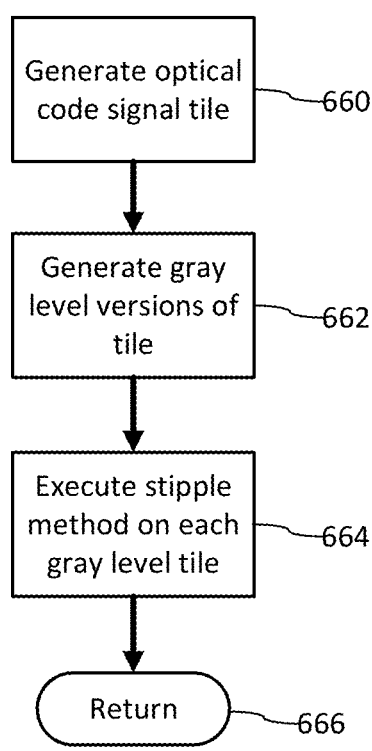
FIG. 80 is a flow diagram of method of generating stipple patterns of optical code signals at different dot densities.
Figure 81:
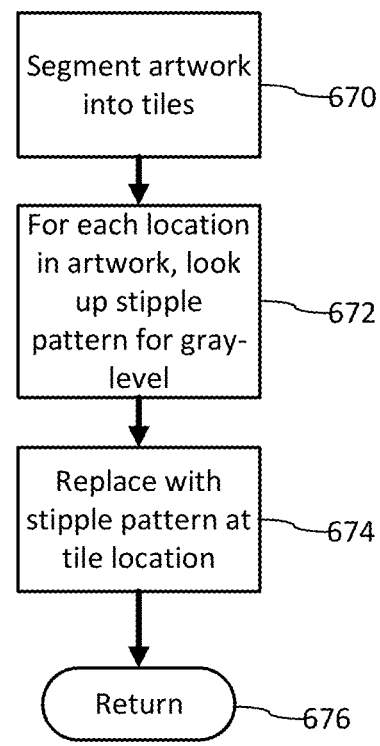
FIG. 81 is a flow diagram of applying the stipple patterns generated in the method of FIG. 80 to encode an optical code signal tile in artwork.

FIGS. 80-81 illustrate a two-part method that reduces required computation to generate artwork carrying the optical code signal. The process of FIG. 80 pre-computes stipple patterns for different gray levels, representing each level of a quantization of the dynamic range from light to dark into a pre-determined number of quantization levels. The process of FIG. 81 then converts artwork into signal bearing art using the pre-computed stipple patterns.

FIG. 80 is a flow diagram of method of generating stipple patterns of optical code signals at different dot densities. Module 660 generates a dense optical code signal tile using any of the methods described above.

Module 662 generates gray level versions of the tile at each level of a predetermined number of gray levels. One approach is to apply adjustments to gray level images at each level using the dense optical code signal to guide the positive/negative adjustments to luminance at pixels corresponding to the bit cells of each gray level tile.

Next, module 664 executes a stipple pattern method to convert each gray level tile into a stipple pattern. One approach is to use the method of FIG. 77. The method of FIG. 78 then returns processing control to the process that invoked it (666). At this point, stipple patterns have been computed and stored for fast look up. These patterns each carry the optical code signal of a tile at their respective gray levels.

Another method seeks to perform a more seamless weighted Voronoi stippling over progressive grayscale layers. First, this method computes a stipple pattern at the highest grayscale level. Then, it generates the stipple pattern at the next lower grayscale level as follows: compute the Voronoi cells and the centroid of each cell, then compute the centroid of the cell corresponding to the region defined by the nearest neighbor stipples in the higher layer. This is not a Voronoi cell. The goal is to place the stipples in the gaps of the stipples in the higher layer to achieve a seamless transition. Then move each stipple in the current layer to a weighted vector resultant of the centroid of the current Voronoi cell and the centroid of the nearest neighbor cell in the higher layer, with a higher weighting for the centroid vector in the current layer. This may yield a more seamless transition of the stipple dots in a smoothly varying grayscale region. However, there is the potential for stipple artifacts at edges when the grayscale value jumps discontinuously between levels.

FIG. 81 is a flow diagram of applying the stipple patterns generated previously to encode an optical code signal tile in artwork. The artwork is represented as an image or graphic element in a color channel of a package design. Module 670 segments the artwork into areas corresponding to the areas of tiles, arranged contiguously in X and Y directions and cropped to fit the shape of the artwork. This effectively maps the signal carrying tile to locations within the artwork. Each cell of the mapped tiles corresponds to a region of pixels in the artwork.

Next, module 672 steps through the cells of each of the mapped tiles and fetches the gray level at the corresponding pixel region in the artwork. It then looks up the corresponding stipple pattern of the pre-computed stipple pattern for that gray level, at the cell location in the stipple pattern corresponding to the cell location of the tile mapped to the artwork. In module 674, the method replaces the artwork at this cell location with the stipple pattern. Modules 672-674 repeat this process until a stipple pattern is completed for all of the cells in the artwork. The method then returns processing control to the process that invoked it (676).

To briefly review, an illustrative Voronoi pattern is achieved by forming a mesh of triangular regions with their vertices at locations corresponding to the dots. The Delaunay pattern is the dual of the Voronoi pattern, in which the regions take the form of polygons of different numbers of sides. The traveling salesman pattern is achieved by defining a traveling salesman path that visits each dot in a sparse array of dots. The bricks pattern is achieved by placing a vertical line segments at dot positions in an array of sparse dots, and forming horizontal lines at intermediate positions, thereby defining rectangular regions.

Concluding Remarks

Having described and illustrated our technology with reference to exemplary embodiments, it should be recognized that our technology is not so limited.

For example, while described in the context of generating patterns for use in printing retail packaging, it should be recognized that the technology finds other applications as well, such as in printed security documents.

Moreover, printing is not required. The patterns produced by the present technology can be displayed on, and read from, digital displays—such as smartphones, digital watches, electronic signboards, tablets, etc.

Similarly, product surfaces may be textured with such patterns (e.g., by injection molding or laser ablation) to render them machine-readable.

All of the patterns disclosed herein can be inverted (black/white), colored, rotated and scaled—as best fits particular contexts.

It should be understood that the watermarks referenced above include two components: a reference or synchronization signal (enabling geometric registration), and a payload signal (conveying plural symbols of information—such as a GTIN). It will be noted that each of the depicted signal-carrying patterns can be detected by the Digimarc app for the iPhone or Android smartphones.

While the detailed embodiments involving continuous tone watermarks usually focused on luminance watermarks, it should be recognized that the same principles extend straightforwardly to chrominance watermarks.

Although described in the context of imagery, the same principles can likewise be applied to audio—taking a pseudo-random payload-conveying signal, and imparting to it a structured, patterned audio aesthetic that renders it more sonically pleasing.

The VGG neural network of FIG. 4 is preferred, but other neural networks can also be used. Another suitable network is the "AlexNet" network, e.g., as implemented in Babenko, et al, Neural Codes for Image Retrieval, arXiv preprint arXiv:1404.1777 (2014)).

Naturally, the number and sizes of the layers and stacks can be varied as particular applications may indicate.

Additional code adapted by applicant for use in the detailed embodiments is publicly available at the github repository, at the web address github<dot>com/llSourcell/How_to_do_style_transfer_in_tensorflow/blob/master/Style_Transfer.ipynb. A printout of those materials is attached to application 62/596,730.

In the first embodiment, rather than start with a random image as the test image, the watermark image, or the geometrical pattern image, are instead used as starting points, and are then morphed by the detailed methods towards the other image.

While the detailed embodiments draw primarily from work by Gatys and Johnson regarding neural network-based style transfer, it will be recognized that there are other such neural network-based techniques—any of which can similarly be used as detailed above. Examples include Li et al, Combining Markov Random Fields and Convolutional Neural Networks for Image Synthesis, Proc. IEEE Conference on Computer Vision and Pattern Recognition (CVPR), 2016, pp. 2479-2486; Chen, et al, Stylebank: An explicit representation for neural image style transfer, CVPR 2017, p. 4; Luan, et al, Deep Photo Style Transfer, CVPR 2017, pp. 6997-7005; and Huang, et al, Arbitrary Style Transfer in Real-Time with Adaptive Instance Normalization, 2017 Intl Conference on Computer Vision, pp. 1510-1519. Others are detailed in patent documents U.S. Pat. No. 9,922,432, 20180158224, 20180082715, and 20180082407. Again, such techniques are familiar to artisans in the style transfer art.

Various examples of watermark encoding protocols and processing stages of these protocols are detailed in Applicant's prior work, such as our U.S. Pat. Nos. 6,614,914, 5,862,260, and 6,674,876, and US patent publications 20100150434 and 20160275639—all of which are incorporated herein by reference. More information on signaling protocols, and schemes for managing compatibility among protocols, is provided in U.S. Pat. No. 7,412,072, which is hereby incorporated by reference.

There are an increasing number of toolsets that have been designed specifically for working with neural networks. Caffe is one—an open source framework for deep learning algorithms, distributed by the Berkeley Vision and Learning Center. Another is Google's TensorFlow.

In certain implementations, applicant uses a computer equipped with multiple Nvidia TitanX GPU cards. Each card includes 3,584 CUDA cores, and 12 GB of fast GDDRSX memory.

Alternatively, the neural networks can be implemented in a variety of other hardware structures, such as a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of one of the above-detailed algorithms on a microprocessor—such as the conversion of an iterated test image into a line art pattern—can begin by first defining the sequence of operations in a high level computer language, such as MatLab or C++(sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed arrangements, due to the nature of the data being processed, and the opportunities for parallelism.

While microprocessors can be reprogrammed, by suitable software, to perform a variety of different algorithms, ASICs cannot. While a particular Intel microprocessor might be programmed today to serve as a deep neural network, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified function). The custom design makes more efficient use of the available substrate space—allowing shorter signal paths and higher speed performance. Full-custom ASICs can also be fabricated to include analog components, and other circuits.

Generally speaking, ASIC-based implementations of the detailed arrangements offer higher performance, and consume less power, than implementations employing microprocessors. A drawback, however, is the significant time and expense required to design and fabricate circuitry that is tailor-made for one particular application.

An ASIC-based implementation of one of the above arrangements again can begin by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to implement the above-detailed arrangements is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of the above-detailed arrangements begins by specifying a set of operations in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to implement the detailed arrangements. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, the weights of convolution kernels can be defined by parameters stored in a re-writable memory. By such arrangement, the same ASIC may be incorporated into two disparate devices, which employ different convolution kernels. One may be a device that employs a neural network to recognize grocery items. Another may be a device that morphs a watermark pattern so as to take on attributes of a desired geometrical pattern, as detailed above. The chips are all identically produced in a single semiconductor fab, but are differentiated in their end-use by different kernel data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASH' may be designed to include native instructions that serve operations associated with some or all of: convolution, pooling, ReLU, etc., etc. However, such native instruction set would lack certain of the instructions available in more general purpose microprocessors.

Reconfigurable hardware and ASH' arrangements are further detailed in U.S. Pat. No. 9,819,950, the disclosure of which is incorporated herein by reference.

Processing hardware suitable for neural network are also widely available in "the cloud," such as the Azure service by Microsoft Corp, and CloudAI by Google.

In addition to the toolsets developed especially for neural networks, familiar image processing libraries such as OpenCV can be employed to perform many of the methods detailed in this specification. Software instructions for implementing the detailed functionality can also be authored by the artisan in C, C++, MatLab, Visual Basic, Java, Python, Tcl, Perl, Scheme, Ruby, etc., based on the descriptions provided herein.

Software and hardware configuration data/instructions are commonly stored as instructions in one or more data structures conveyed by tangible media, such as magnetic or optical discs, memory cards, ROM, etc., which may be accessed across a network.

Some of applicant's other work involving neural networks is detailed in patent application Ser. No. 15/726,290, filed Oct. 5, 2017, Ser. No. 15/059,690, filed Mar. 3, 2016 (now U.S. Pat. No. 9,892,301), Ser. No. 15/149,477, filed May 9, 2016 (now U.S. Pat. No. 10,180,339), Ser. No. 15/255,114, filed Sep. 1, 2016 (now U.S. Pat. No. 10,042,038), and in published applications 20150030201, 20150055855 and 20160187199.

Additional information about the retail environments in which the encoded signals are utilized is provided in published applications 20170249491, and in pending application Ser. No. 15/851,298, filed Dec. 21, 2017.

This specification has discussed various arrangements. It should be understood that the methods, elements and features detailed in connection with one arrangement can be combined with the methods, elements and features detailed in connection with other arrangements.

In addition to the prior art works identified above, other documents from which useful techniques can be drawn include:

Goodfellow, et al, Generative adversarial nets, Advances in Neural Information Processing Systems, 2014 (pp. 2672-2680);

Ulyanov, et al, Instance normalization: The missing ingredient for fast stylization. arXiv preprint arXiv: 1607.08022, Jul. 27, 2016;

Zhu, et al, Unpaired image-to-image translation using cycle-consistent adversarial networks. arXiv preprint arXiv:1703.10593, Mar. 30, 2017.

Moreover, it will be recognized that the detailed technology can be included with other technologies—current and upcoming—to advantageous effect. Implementation of such combinations should be straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

We claim:

1. A method of generating artwork for labeling of a retail package, comprising the acts:
receiving a first image that encodes a plural-bit payload therein;
neural network processing the first image to reduce a difference measure between processed imagery and a second image, the second image having a desired style, thereby yielding an output image;
testing the output image to ensure that the plural-bit payload is decodable therefrom; and
incorporating some or all of the output image in artwork for labeling of a retail package;
wherein the plural-bit payload persists in the output image, enabling a compliant decoder module in a retail point of sale station to recover the plural-bit payload from an image of the retail package.

2. The method of claim 1 in which the difference measure is based on a difference between a Gram matrix for the processed imagery and a Gram matrix for the second image, where each Gram matrix can be expressed as:

$$C_{ij}^l = \sum_k \left( G_{ik}^l G_{jk}^l \right).$$

3. The method of claim 1 in which the second image includes various features, wherein the neural network adapts features from the second image to express details of the first image, to thereby yield an output image in which features from the second image contribute to encoding of said plural-bit payload.

4. The method of claim 1 in which the second image depicts a multitude of items of a first type, wherein the neural network processing adapts scale, location, and rotation of said items as depicted in the output image to echo features of the first image, to thereby produce an output image depicting plural of said items in a configuration that encodes said plural-bit payload.

5. The method of claim 1 in which said neural network processing comprises a step for neural network processing the first image to reduce a difference measure between the processed imagery and the second image.

6. The method of claim 5 in which said step for neural network processing comprises:
(a) using a convolutional neural network to discern features characterizing the first image;
(b) using a convolutional neural network to discern features characterizing the second image; and
(c) iteratively modifying a third image, and using a convolutional neural network to discern features characterizing the modified third image, to reduce a difference between features discerned from the modified third image, and said first and second features discerned from the first and second images.

7. The method of claim 5 in which said step for neural network processing comprises using a loss network to define both (a) a feature reconstruction loss and (b) a style reconstruction loss between the first image and the second image, wherein the loss network comprises a convolutional neural network that has been pretrained for image classification, and wherein the feature reconstruction loss is determined using data from one layer of said loss network, and the style reconstruction loss is determined using data from plural layers of said loss network.

8. The method of claim 1 in which said neural network processing comprises:
determining a loss function that characterizes a difference between content of the first and second images;
determining a loss function that characterizes a difference between style of the first and second images; and
modifying the first image to reduce a joint loss function that combines said first and second loss functions.

9. The method of claim 1 in which the second image depicts grains of rice, water droplets, leaves, pasta noodles, candy corn, woven basket reeds, or fabric.

10. The method of claim 1 that includes false-coloring the output image.

11. The method of claim 1 in which the first image comprises a digital watermark pattern that encodes said plural-bit payload.

12. The method of claim 11 in which the digital watermark pattern is comprised of waxels, each having a first scale, and in which the second image depicts elements each having a second scale in the range of 0.5 to 25x of the first scale.

13. The method of claim 11 in which the digital watermark pattern is comprised of waxels, each having a first scale, and in which the second image depicts elements each having a second scale in the range of 0.5 to 25x of the first scale.

14. The method of claim 11 in which the plural-bit payload is not uniformly encoded through the output image but rather is lumpy, with its signal energy concentrated in limited areas comprising between 10-30% of the output image.

15. The method of claim 1 in which the testing comprises deriving a signal strength metric detailing a strength of the encoded plural-bit payload at different locations in the output image.

16. The method of claim 1 that includes receiving an input GTIN code, and generating a watermark pattern that encodes said GTIN code, said watermark pattern serving as said first image.

17. The method of claim 16 in which said watermark pattern is a continuous tone luminance watermark pattern.

18. The method of claim 1 in which the neural network processing comprises applying the first image to an input of a neural network, the neural network also having one or more outputs and plural intermediate layers—each comprised of plural filters, wherein each filter is characterized by plural parameters that define a response of the filter to a given input.

19. The method of claim 1 in which the first image is a bitonal image defining a mesh of lines that encodes said plural-bit payload.

20. The method of claim 1 in which the first image initially comprises a watermark pattern of N×N elements, and the method further includes enlarging the N×N pattern by padding to achieve a first image of M×M elements before performing said neural network processing, said neural network processing yielding an output image larger than N×N elements, wherein the method further includes excerpting a central region of N×N elements from the output image for use in tiling in the artwork for labeling of the retail package.

21. A retail package including label artwork, the artwork having previously been produced using a first image that encodes a plural bit payload in a machine-readable code pattern, and a second image that has a desired style, wherein said second image previously used in producing said label artwork depicted a multitude of items of a first type, and said label artwork comprises elements mimicking said items of the first type, and being arrayed to represent said code pattern of the first image, wherein the label artwork steganographically encodes said plural-bit payload.

22. The retail package of claim 21 in which the second image comprises natural imagery rather than synthetic imagery.

23. The retail package of claim 21 in which the items of the first type comprise grains of rice, beans, water droplets, leaves, blades of grass, pasta noodles, candy corn, candy balls, woven basket reeds, bricks, or fabric threads.

24. The retail package of claim 21 in which said label artwork is printed on the retail package by a dry offset printing process.

25. The retail package of claim 21 in which the payload includes an identifier that functions to enable a camera-equipped point-of-sale terminal to access, from a database, metadata corresponding said retail package.

26. A method comprising the acts:
capturing imagery depicting a retail package including label artwork, the artwork having previously been produced using a first image that encodes a plural bit payload in a machine-readable code pattern, and a second image that has a desired style, wherein said second image previously used in producing said label artwork depicted a multitude of items of a first type, and said label artwork comprises elements mimicking said items of the first type, and being arrayed to represent said code pattern of the first image, wherein the label artwork steganographically encodes said plural-bit payload;
decoding the plural-bit payload from the captured imagery; and
taking an action using the decoded plural-bit payload.

27. The method of claim 26 in which said action includes employing data in the decoded plural-bit payload as a pointer to access metadata corresponding to said package that is stored in a local or remote database, and taking a further action using said metadata.

28. The method of claim 27 in which said further action includes adding said retail package to a shopper's checkout tally.

29. The method of claim 26 in which the second image comprises natural imagery rather than synthetic imagery.

30. The method of claim 26 in which the items of the first type comprise grains of rice, beans, water droplets, leaves, blades of grass, pasta noodles, candy corn, candy balls, woven basket reeds, bricks, or fabric threads.

31. The method of claim 26 in which said label artwork is printed on the retail package by a dry offset printing process.

* * * * *